United States Patent [19]
Mochizuki et al.

[11] Patent Number: 5,905,814
[45] Date of Patent: May 18, 1999

[54] ONE-DIMENSIONAL TIME SERIES DATA COMPRESSION METHOD, ONE-DIMENSIONAL TIME SERIES DATA DECOMPRESSION METHOD

[75] Inventors: Yoshiyuki Mochizuki; Toshiya Naka, both of Ooskashi, Japan

[73] Assignee: Matsushita Electric Industrial Co., Ltd., Japan

[21] Appl. No.: 08/901,965

[22] Filed: Jul. 29, 1997

[30] Foreign Application Priority Data

Jul. 29, 1996 [JP] Japan .................................. 8-198717

[51] Int. Cl.$^6$ ...................................................... G06K 9/00
[52] U.S. Cl. ............................................ 382/239; 382/238
[58] Field of Search ..................................... 348/699, 700,
348/701, 550, 521, 525, 500, 489; 358/425,
426, 261.2, 428, 430, 431; 382/190, 232,
233, 234, 235, 236, 238, 239, 240, 241,
242, 243, 244, 245, 246, 248, 249, 250,
251, 252, 253

[56] References Cited

U.S. PATENT DOCUMENTS

| | | | |
|---|---|---|---|
| 4,266,253 | 5/1981 | Matherat | 358/425 |
| 4,691,245 | 9/1987 | Hickok | 348/489 |
| 5,086,487 | 2/1992 | Katayama et al. | 358/261.2 |
| 5,225,904 | 7/1993 | Golin et al. | 358/133 |
| 5,307,441 | 4/1994 | Tzeng | 395/2.31 |
| 5,327,518 | 7/1994 | George et al. | 395/2.2 |
| 5,473,742 | 12/1995 | Polyakov et al. | 395/142 |
| 5,717,462 | 2/1998 | Hayashi | 348/700 |
| 5,809,459 | 9/1998 | Bergstrom et al. | 704/223 |

FOREIGN PATENT DOCUMENTS 0 350 557 A1  1/1990  European Pat. Off. ........ G01R 13/34

OTHER PUBLICATIONS

Patent Abstracts of Japan; vol. 017, No. 140 (E–1336), Mar. 22, 1993 & JP 04 309092 A (Mitsubishi Electric Corp), Oct. 30, 1992, *abstract* (p. 1) (Inventor: Yasuhiro), "Video Signal Processing Unit."

"Fourier Principles for Emotion–Based Human Figure Animation"; Munetoshi Unuma et al.; Computer Graphics Proceedings, Los Angeles, CA; Aug. 6–11, 1995, pp. 91–96, XP000546219, *abstract; figure 1*.

*Primary Examiner*—Jose L. Couso
*Assistant Examiner*—B. Tadayon
*Attorney, Agent, or Firm*—Parkhurst & Wendel

[57] ABSTRACT

A method of compressing one-dimensional time series data at uniform time intervals includes: a first process of inputting the one-dimensional time series data and an approximation accuracy thereof; a second process of calculating node candidates of an interpolation function approximating the one-dimensional time series data; a third process of optimizing positions of the node candidates; a fourth process of judging an error between one-dimensional time series data produced using the interpolation function, based on the node candidates at optimized positions, and the original one-dimensional time series data; a fifth process of judging an error between one-dimensional time series data produced using the interpolation function on the basis of the node candidates at optimized positions and the original one-dimensional time series data, and changing a node number and returning to the second process when the error exceeds a value based on the approximation accuracy; and a sixth process of outputting data of the node candidates and corresponding time data as compressed data when it is judged in the fifth process that the error does not exceed the value based on the approximation accuracy. Therefore, compression adapted to the properties of the given one-dimensional time series data is performed.

75 Claims, 26 Drawing Sheets

ONE-DIMENSIONAL TIME SERIES DATA COMPRESSION METHOD, ONE-DIMENSIONAL TIME SERIES DATA DECOMPRESSION METHOD

FIELD OF THE INVENTION

The present invention relates to a method of compressing one-dimensional time series data, a method of decompressing one-dimensional time series data, a recording medium for one-dimensional time series data compressing program, a recording medium for one-dimensional time series data decompression program, a compression device for one-dimensional time series data, and a decompression device for one-dimensional time series data. These belong to a field of signal processing technology, but can be applied for time series data which describes motion of a rigid body multi-joint object, transformation of meshed surfaces, and transformation of an elastic object or the like.

BACKGROUND OF THE INVENTION

Recently, the internet has achieved a remarkable development. The internet can deal with two-dimensional image and sound signals using Hyper Text Makeup Language (HTML) and, therefore, it can be used as a communication medium for image information, sound information, or other multimedia information.

The HTML, however, cannot deal with three-dimensional CG images although treating two-dimensional images, proposed as an alternative to the HTML is Virtual Reality Modeling Language (VRML) which enables three-dimensional image processing.

Nevertheless, VRML is hard to express three-dimensional CG images representing motions of human being. For expressing such images, it is necessary to treat the human being as a rigid body multi-joint object and to describe each joint's position or the like as time series data. This process, however, produces an enormous quantity of data.

Such problem about data amount can be solved by decomposing multi-dimensional time series data including joint positions into one-dimensional time series data and then performing compression to each one-dimensional time series data.

As such compression method for one-dimensional time series data, generally used is compression using orthogonal transform such as discrete Fourier transform and discrete cosine transformation. The orthogonal transform is described in several reference literatures including "Sound" by Kazuo Nakata, ed by Japan Acoustic Society, Colona, 1977. Time series data of joint angles of a rigid body multi-joint object is described in Unuma, M, et al., "Fourier Principles for Emotion-based Human Figure Animation", SIGGRAPH95 Proceedings, 1955, pp 91–95.

In the information compression method using orthogonal transform, given one-dimensional time series data is transformed into discrete Fourier series expansion expression and discrete cosine series expansion expression, using the data obtained at each time, and high-frequency component of the transformed series expansion expression, are eliminated to compress the information amount.

For the information compressed using such orthogonal transform, information decompression is performed by applying inverse Fourier transform and inverse cosine transformation. This produces, as decompressed data, not only data of the same number as the original data but data of arbitrary number which is different from the original data in number. However, the decompression of data is performed based on trigonometric function, and this may affect the decompressed data's properties.

SUMMARY OF THE INVENTION

It is an object of the present invention to provide a method of compressing one-dimensional time series data and a method of decompressing one-dimensional time series data which complement the prior art compression and decompression methods and extend the range of choice for compressing and decompressing data.

It is another object of the present invention to provides a compression device for one-dimensional time series data and a decompression device for one-dimensional time series data which implement such new compression and decompression methods.

It is still another object of the present invention to provide a recording medium for one-dimensional time series data compression program and a recording medium for one-dimensional time series data decompression program which implement such new compression and decompression methods.

Other objects and advantages of the present invention will become apparent from the detailed description given hereinafter. It should be understood however, that the detailed description and specific embodiments are given by way of illustration only, since various changes and modifications within the spirit and scope of the invention will become apparent to those of skill in the art from the following detailed description.

According to a 1st aspect of the present invention, a method of compressing one-dimensional time series data at uniform time intervals, comprises a first process of inputting the one-dimensional time series data and an approximation accuracy thereof; a second process of calculating node candidates of an interpolation function approximating the one-dimensional time series data; a third process of optimizing positions of the node candidates; a fourth process of judging an error between one-dimensional time series data produced using the interpolation function, based on the node candidates at optimized positions, and the original one-dimensional time series data; a fifth process of judging an error between one-dimensional time series data produced using the interpolation function on the basis of the node candidates at optimized positions and the original one-dimensional time series data, and changing a node number and returning to the second process when the error exceeds a value based on the approximation accuracy; and a sixth process of outputting data of the node candidates and corresponding time data as compressed data when it is judged in the fifth process that the error does not exceed the value based on the approximation accuracy. Therefore, compression adapted to the properties of the given one-dimensional time series data is performed. In addition, since the compression ratio is controlled by the approximation accuracy, errors after decompression can be grasped in advance.

According to a 2nd aspect of the present invention, a method of compressing one-dimensional time series data at uniform time intervals, comprises a first process of inputting the one-dimensional time series data and an approximation accuracy thereof; a second process of judging whether the one-dimensional time series data includes data within the approximation accuracy or not; a third process of calculating node candidates of an interpolation function which approximates the one-dimensional time series data, when the one-dimensional time series data includes no data within the approximation accuracy; a fourth process of optimizing positions of the node candidates; a fifth process of judging an error between one-dimensional time series data produced on the basis of the node candidates at optimized positions, using the interpolation function, and the original one-dimensional time series data; a sixth process of judging an error between one-dimensional time series data produced on the basis of the node candidates whose number is optimized, using the interpolation function, and the original one-dimensional time series data, and changing a node number and returning to the second process when the error exceeds a value based on the approximation accuracy; a seventh process of outputting information indicating that the one-dimensional time series data includes data within the approximation accuracy when it is judged in the second process that the one-dimensional time series data includes the data within the approximation accuracy, or outputting data of the node candidates and corresponding time data as compressed data when it is judged in the sixth process that the error does not exceed the value based on the approximation accuracy. Therefore, compression adapted to the properties of the given one-dimensional time series data is performed. In addition, since the compression ratio is controlled by the approximation accuracy, errors after decompression can be grasped in advance. Further, with respect to data within the approximation accuracy, processes for these data can be dispensed with.

According to a 3rd aspect of the present invention, a method of compressing one-dimensional time series data at uniform time intervals, comprises a first process of inputting the one-dimensional time series data and an approximation accuracy thereof, attaching indices to the one-dimensional time series data in a temporal order, and calculating an initial node number of an interpolation function which interpolates the one-dimensional time series data; a second process of deciding node candidates including start data and end data, at random, in such a way that a number of decided candidates corresponds to the node number; a third process of interpolating the node candidates, using an interpolation function which utilizes the index numbers of the node candidates as an independent variable, and calculating an error between the interpolation result and the original one-dimensional time series data; a fourth process of calculating, from the error, a value of a first objective function defined as weighted sum of the maximum value of the error, the average of the error, and the variance of the error; a fifth process of changing the node candidates repeatedly until the first objective function takes a smallest value and deciding quasi-optimal node candidates; a sixth process of interpolating the quasi-optimal node candidates using the interpolation function, to generate one-dimensional time series data approximating the original one-dimensional time series data, and calculating an error between the one-dimensional time series data and the original one-dimensional time series data; a seventh process of calculating, from the error, a second objective function defined as weighted sum of the maximum value of the error, the average of the error, and the variance of the error; an eighth process of deciding the node number with an increment as a new node number when the value of the second objective function is greater than or equal to a threshold corresponding to the approximation accuracy, and repeating the second to seventh processes; and a ninth process of outputting an initial time and a time interval of the one-dimensional time series data, and compressed data consisting of index numbers of finally decided node candidates and the values of the node candidates, when the value of the second objective function is less than the threshold. Therefore, compression adapted to the properties of the given one-dimensional time series data is performed. In addition, since the compression ratio is controlled by the approximation accuracy, errors after decompression can be grasped in advance.

According to a 4th aspect of the present invention, a method of compressing one-dimensional time series data obtained at uniform time intervals, comprises a first process of inputting the one-dimensional time series data and an approximation accuracy thereof, and attaching indices to the one-dimensional time series data in a temporal order, and calculating an initial node number of an interpolation function interpolating the one-dimensional time series data; a second process of deciding node candidates including start and end data and having the indices attached at approximately equal intervals, in such a way that the number of the decided node candidates corresponds to the initial node number; a third process of interpolating the node candidates with an interpolation function using the index numbers of the node candidates as an independent variable and calculating an error between the interpolation result and the original one-dimensional time series data; a forth process of calculating, from the error, a value of a first objective function defined as weighted sum of the maximum of the error, the average of the error, and the variance of the error; a fifth process of changing the node candidates repeatedly until the first objective function takes a smallest value, and deciding quasi-optimal node candidates; a sixth process of interpolating the quasi-optimal node candidates with the interpolating function to generate one-dimensional time series data approximating the original one-dimensional time series data, and calculating an error between the one-dimensional time series data and the original one-dimensional time series data; a seventh process of calculating, from the error, a value of a second objective function defined as weighted sum of the maximum value of the error, the average of the error, and the variance of the error; an eighth process of employing the node number with an increment as a new node number and repeating the second to seventh processes when the value of the second objective function is greater than or equal to a threshold corresponding to the approximation accuracy; and a ninth process of outputting an initial time and a time interval of the one-dimensional time series data, and compressed data consisting of index numbers of finally decided node candidates, and the values of the node candidates when the value of the second objective function exceeds the threshold. Therefore, compression adapted to the properties of the given one-dimensional time series data is performed. In addition, since the compression ratio is controlled by the approximation accuracy, errors after decompression can be grasped in advance.

According to a 5th aspect of the present invention, a method of compressing one-dimensional time series data obtained at uniform time intervals, comprises a first process of inputting the one-dimensional time series data and an approximation accuracy thereof, and attaching indices to the one-dimensional time series data in a temporal order, and calculating an initial node number of an interpolation function which interpolates the one-dimensional time series data; a second process of judging whether all the absolute values of the one-dimensional time series data are less than the approximation accuracy or not, and when the absolute values are all less than the approximation accuracy, outputting an identifier indicating that all the values are zero to complete the processing, or proceeding to a third process described later when all the absolute values are not less then the approximation accuracy; a third process of deciding node candidates including start data and end data, at random, in such a way that a number of decided node candidates corresponds to the initial node number; a forth process of interpolating the node candidates with an interpolation function using the index numbers of the node candidates as an independent variable and calculating an error between the interpolation result and the original one-dimensional time series data; a fifth process of calculating, from the error, a value of a first objective function defined as weighted sum of the maximum value of the error, the average of the error, and the variance of the error; a sixth process of changing the node candidates repeatedly until the first objective function takes a smallest value and deciding quasi-optimal node candidates; a seventh process of interpolating the quasi-optimal node candidates using the interpolation function to generate one-dimensional time series data approximating the original one-dimensional time series data and calculating an error between the one-dimensional time series data and the original one-dimensional time series data; an eighth process of calculating, from the error, a value of second objective function defined as weighted sum of the maximum value of the error, the average of the error, and the variance of the error; a ninth process of deciding the node number with an increment as a new node number when the value of the second objective function is greater than or equal to a threshold corresponding to the approximation accuracy, and repeating the third to eighth processes; and a tenth process of outputting an initial time and a time interval of the one-dimensional time series data, and compressed data consisting of index numbers of finally decided node candidates and the values of the node candidates, when the value of the second objective function is less than the threshold. Therefore, compression adapted to the properties of the given one-dimensional time series data is performed. In addition, since the compression ratio is controlled by the approximation accuracy, errors after decompression can be grasped in advance. Further, with respect to data within the approximation accuracy, processes for these data can be dispensed with.

According to a 6th aspect of the present invention, a method of compressing one-dimensional time series data at uniform time intervals, comprises a first process of inputting the one-dimensional time series data and an approximation accuracy thereof, and attaching indices to the one-dimensional time series data in a temporal order, and calculating an initial node number of an interpolation function interpolating the one-dimensional time series data; a second process of judging whether all the absolute values of the one-dimensional time series data are less than the approximation accuracy or not, and when the values are all less than the approximation accuracy, outputting an identifier indicating that all the values are zero to complete the processing, or proceeding to a third process described later when all the absolute values exceed the approximation accuracy; a third process of deciding node candidates including start and end data and having the indices attached at approximately equal intervals, in such a way that the number of the node candidates corresponds to the initial node number; a fourth process of interpolating the node candidates with an interpolation function using the index numbers of the node candidates as an independent variable and calculating an error between the interpolation result and the original one-dimensional time series data; a fifth process of calculating, from the error, a value of a first objective function defined as weighed sum of the maximum of the error, the average of the error, and the variance of the error; a sixth process of changing the node candidates repeatedly until the first objective function takes a smallest value, and deciding quasi-optimal node candidates; a seventh process of interpolating the quasi-optimal node candidates with the interpolation function to generate one-dimensional time series data approximating the original one-dimensional time series data, and calculating an error between the one-dimensional time series data and the original one-dimensional time series data; an eighth process of calculating, from the error, a value of a second objective function defined as weighted sum of the maximum value of the error, the average of the error, and the variance of the error; a ninth process of employing the node number with an increment as a new node number and repeating the third to eighth processes when the value of the second objective function is greater than or equal to a threshold corresponding to the approximation accuracy; and a tenth process of outputting a start time and a time interval of the one-dimensional time series data, and compressed data consisting of index numbers of finally decided node candidates and the values of the node candidates when the value of the second objective function is less than the threshold. Therefore, compression adapted to the properties of the given one-dimensional time series data is performed. In addition, since the compression ratio is controlled by the approximation accuracy, errors after decompression can be grasped in advance. Further, with respect to data within the approximation accuracy, processes for these data can be dispensed with.

According to a 7th aspect of the present invention, in a method for compressing one-dimensional data as defined in any of the 3rd to 6th aspects, assuming that the indices of the node candidates numbered in an increasing order are described as $I(j)$ ($0 \leq j \leq m$), the quasi-optimal node candidates are calculated in a procedure comprising: when a relationship $I(j-1) < I(j)-1$ is satisfied, calculating a value of the first objective function obtained at the exchange of node candidates $I(j)$ with node candidates $I(j)-1$, calculating a value $\Delta E(1-)$ which is the value of the first objective function from which the value of the original first objective function is subtracted, and setting the value $\Delta E(1-)$ to zero when $I(j-1) \geq I(j)-1$; when a relationship $I(j)+1 < I(j+1)$ is satisfied, calculating a value of the first objective function obtained at the exchange of node candidates $I(j)$ with node candidates $I(j)+1$, calculating a value $\Delta E(1+)$ which is the value of the first objective function from which the value of the original first objective function is subtracted, and setting the value $\Delta E(1+)$ to zero when $I(j)+1 \geq I(j+1)$; when relationships $\Delta E(1-) < 0$ and $\Delta E(1+) \geq 0$ are satisfied, exchanging the node candidates $I(j)$ with the node candidates $I(j)-1$; when relationships $\Delta E(1-) \geq 0$ and $\Delta E(1+) < 0$ are satisfied, exchanging the node candidates $I(j)$ with the node candidates $I(j)+1$; when relationships $\Delta E(1-) \geq 0$ and $\Delta E(1+) \geq 0$ are satisfied, not performing exchange of the node candidates $I(j)$; when relationships $\Delta E(1-) < 0$ and $\Delta E(1+) < 0$ are satisfied and $\Delta E(1-)$ is less than $\Delta E(1+)$, exchanging the node candidates $I(j)$ with the node candidates $I(j)-1$; when relationships $\Delta E(1-) < 0$ and $\Delta E(1+) < 0$ are satisfied and $\Delta E(1-)$ exceeds $\Delta E(1+)$, exchanging the node candidates $I(j)$ with the node candidates $I(j)+1$ in an increasing order for $j$ of odd numbers and in a decreasing order for $j$ of even numbers; when the value of the first objective function obtained at the completion of the sequential processes is less than the value of the original first objective function from which the threshold is subtracted, exchanging the node candidates again in an increasing order for $j$ of odd numbers and in a decreasing order for $j$ of even numbers; and when the exchange of the node candidates is not performed at all, or the value of the first objective function exceeds the value of the original first objective function from which the threshold is subtracted, completing the processing. Therefore, a process for obtaining quasi-optimal nodes of an interpolation function is realized. Thereby, compression adapted to the properties of the given one-dimensional time series data is performed. In addition, since the compression ratio is controlled by the approximation accuracy, errors after decompression can be grasped in advance.

According to an 8th aspect of the present invention, in a method for compressing one-dimensional time series data as defined in any of the 3rd to 6th aspects, assuming that the indices of the node candidates numbered in an increasing order are described as $I(j)$ ($0 \leq j \leq m$), the quasi-optimal candidates are calculated in a procedure comprising: when a relationship $I(j-1) < I(j)-1$ is satisfied, calculating a value of the first objective function obtained at the exchange of node candidates $I(j)$ with node candidates $I(j)-1$, calculating a value $\Delta E(1-)$ which is the value of the first objective function from which the value of the original first objective function is subtracted, and setting the value $\Delta E(1-)$ to zero when $I(j-1) \geq I(j)-1$; when a relationship $I(j)+1 < I(j+1)$ is satisfied, calculating a value of the first objective function obtained at the exchange of node candidates $I(j)$ with node candidates $I(j)+1$, calculating a value $\Delta E(1+)$ which is the value of the first objective function from which the value of the original first objective function is subtracted, and setting the value $\Delta E(1+)$ to zero when $I(j)+1 \geq I(j+1)$; when relationships $\Delta E(1-) < 0$ and $\Delta E(1+) \geq 0$ are satisfied, exchanging the node candidates $I(j)$ with the node candidates $I(j)-1$; when relationships $\Delta E(1-) \geq 0$ and $\Delta E(1+) < 0$ are satisfied, exchanging the node candidates $I(j)$ with the node candidates $I(j)+1$; when relationships $\Delta E(1-) \geq 0$ and $\Delta E(1+) \geq 0$ are satisfied, not performing exchange of the node candidates $I(j)$; when relationships $\Delta E(1-) < 0$ and $\Delta E(1+) < 0$ are satisfied and $\Delta E(1-)$ is less than $\Delta E(1+)$, exchanging the node candidates $I(j)$ with the node candidates $I(j)-1$; when relationships $\Delta E(1-) < 0$ and $\Delta E(1+) < 0$ are satisfied and $\Delta E(1-)$ exceeds $\Delta E(1+)$, exchanging the node candidates $I(j)$ with the node candidates $I(j)+1$ in a decreasing order for j of odd numbers and in an increasing order for j of even numbers; when the value of the first objective function obtained at the completion of the sequential processes is less than the value of the original first objective function from which the threshold is subtracted, exchanging the node candidates again in a decreasing order for j of odd numbers and in an increasing order for j of even numbers; and when the exchange of the node candidates is not performed at all, or the value of the first objective function exceeds the value or the original first objective function from which the threshold is subtracted, completing the processing. Therefore, the same effects as mentioned above are achieved.

According to a 9th aspect of the present invention, in a method for compressing one-dimensional time series data as defined in any of the 3rd to 6th aspects, assuming that the indices of the node candidates numbered in an increasing order are described as $I(j)$ ($0 \leq j \leq m$), the quasi-optimal candidates are calculated in a procedure comprising: when a relationship $I(j-1) < I(j)-1$ is satisfied, calculating a value of the first objective function obtained at the exchange of node candidates $I(j)$ with node candidates $I(j)-1$, calculating a value $\Delta E(1-)$ which is the value of the first objective function from which the value of the original first objective function is subtracted, and setting the value $\Delta E(1-)$ to zero when $I(j-1) \geq I(j)-1$; when a relationship $I(j)+1 < I(j+1)$ is satisfied, calculating a value of the first objective function obtained at the exchanges of node candidates $I(j)$ with node candidates $I(j)+1$, calculating a value $\Delta E(1+)$ which is the value of the first objective function from which the value of the original first objective function is subtracted, and setting the value $\Delta E(1+)$ to zero when $I(j)+1 \geq I(j+1)$; when relationships $\Delta E(1-) < 0$ and $\Delta E(1+) \geq 0$ are satisfied, exchanging the node candidates $I(j)$ with the node candidates $I(j)-1$; when relationships $\Delta E(1-) \geq 0$ and $\Delta E(1+) < 0$ are satisfied, exchanging the node candidates $I(j)$ with the node candidates $I(j)+1$; when relationships $\Delta E(1-) \geq 0$ and $\Delta E(1+) \geq 0$ are satisfied, not performing exchange of the node candidates $(I(j))$; when relationships $\Delta E(1-) < 0$ and $\Delta E(1+) < 0$ are satisfied and $\Delta E(1-)$ is less than $\Delta E(1+)$, exchanging the node candidates $I(j)$ with the node candidates $I(j)-1$; when relationships $\Delta E(1-) < 0$ and $\Delta E(1+) < 0$ are satisfied and $\Delta E(1-)$ exceeds $\Delta E(1+)$, successively exchanging the node candidates $I(j)$ with the node candidates $I(j)+1$, initially from $j=1$ to $j=[m/2]$ and then from $j=m-1$ to $j=[m/2]+1$; when the value of the first objective function obtained at the completion of the sequential processes is less than the value of the original first objective function from which the threshold is subtracted, successively exchanging the node candidates again from $j=1$ to $j=[m/2]$ and then from $j=m-1$ to $j=[m/2]+1$; and when the exchange of the node candidates is not performed at all, or the value of the first objective function exceeds the value of the original first objective function from which the threshold is subtracted, completing the processing. Therefore, the same effects as mentioned above are achieved.

According to a 10th aspect of the present invention, in a method for compressing one-dimensional time series data as defined in any of the 3rd to 6th aspects, assuming that the indices of the node candidates numbered in an increasing order are described as $I(j)$ ($0 \leq j \leq m$), the quasi-optimal candidates are calculated in a procedure comprising: when a relationship $I(j-1) < I(j)-1$ is satisfied, calculating a value of the first objective function obtained at the exchange of node candidates $I(j)$ with node candidates $I(j)-1$, calculating a value $\Delta E(1-)$ which is the value of the first objective function from which the value of the original first objective function is subtracted, and setting the value $\Delta E(1-)$ to zero when $I(j-1) \geq I(j)-1$; when a relationship $I(j)+1 < I(j+1)$ is satisfied, calculating a value of the first objective function obtained at the exchange of node candidates $I(j)$ with node candidates $I(j)+1$, calculating a value $\Delta E(1+)$ which is the value of the first objective function from which the value of the original first objective function is subtracted, and setting the value $\Delta E(1+)$ to zero when $I(j)+1 \geq I(j+1)$; when relationships $\Delta E(1-) < 0$ and $\Delta E(1+) \geq 0$ are satisfied, exchanging the node candidates $I(j)$ with the node candidates $I(j)-1$; when relationships $\Delta E(1-) \geq 0$ and $\Delta E(1+) < 0$ are satisfied, exchanging the node candidates $I(j)$ with the node candidates $I(j)+1$; when relationships $\Delta E(1-) \geq 0$ and $\Delta E(1+) \geq 0$ are satisfied, not performing exchange of the node candidates $I(j)$; when relationships $\Delta E(1-) < 0$ and $\Delta E(1+) < 0$ are satisfied and $\Delta E(1-)$ is less than $\Delta E(1+)$, exchanging the node candidates $I(j)$ with the node candidates $I(j)-1$; when relationships $\Delta E(1-) < 0$ and $\Delta E(1+) < 0$ are satisfied and $\Delta E(1-)$ exceeds $\Delta E(1+)$, successively exchanging the node candidates $I(j)$ with the node candidates $I(j)+1$, initially from $j=[m/2]$ to $j=1$ and then from $j=[m/2]+1$ to $j=m-1$; when the value of the first objective function obtained at the completion of the sequential processes is less than the value of the original first objective function from which the threshold is subtracted, successively exchanging the node candidates again from $j=[m/2]$ to $j=1$ and then from $j=[m/2]+1$ to j=m−1; and when the exchange of the node candidates is not performed at all, or the value of the first objective function exceeds the value of the original first objective function from which the threshold is subtracted, completing the processing. Therefore, the same effects as mentioned above are achieved.

According to an 11th aspect of the present invention, in a method for compressing one-dimensional time series data as defined in any of the 3rd to 6th aspects, assuming that the indices of the node candidates numbered in an increasing order are described as $I(j)$ ($0 \leq j \leq m$), the quasi-optimal candidates are calculated in a procedure comprising: when a relationship of $I(j-1)<I(j)-1$ is satisfied, calculating a value of the first objective function obtained at the exchange of node candidates $I(j)$ with node candidates $I(j)-1$, calculating a value $\Delta E(1-)$ which is the value of the first objective function from which the value of the original first objective function is subtracted, and setting the value $\Delta E(1-)$ to zero when $I(j-1) \geq I(j)-1$; when a relationship $I(j)+1<I(j+1)$ is satisfied, calculating a value of the first objective function obtained at the exchange of node candidates $I(j)$ with node candidates $I(j)+1$, calculating a value $\Delta E(1+)$ which is the value of the first objective function from which the value of the original first objective function is subtracted, and setting the value $\Delta E(1+)$ to zero when $I(j)+1 \geq I(j+1)$; when relationships $\Delta E(1-)<0$ and $\Delta E(1+) \geq 0$ are satisfied, exchanging the node candidates $I(j)$ with the node candidates $I(j)-1$; when relationships $\Delta E(1-) \geq 0$ and $\Delta E(1+)<0$ are satisfied, exchanging the node candidates $I(j)$ with the node candidates $I(j)+1$; when relationships $\Delta E(1-) \geq 0$ and $\Delta E(1+) \geq 0$ are satisfied, not performing exchange of the node candidates $I(j)$; when relationships $\Delta E(1-)<0$ and $\Delta E(1+)<0$ are satisfied and $\Delta E(1-)$ is less than $\Delta E(1+)$, exchanging the node candidates $I(j)$ with the node candidates $I(j)-1$; when relationships $\Delta E(1-)<0$ and $\Delta E(1+)<0$ are satisfied and $\Delta E(1-)$ exceeds $\Delta E(1+)$, exchanging the node candidates $I(j)$ with the node candidates $I(j)+1$ successively from $j=1$ to $j=m-1$; when the value of the first objective function obtained at the completion of the successive processes is less then the value of the original first objective function from which the threshold is subtracted, successively exchanging the node candidates again, from $j=1$ to $j=m-1$; and when the exchange of the node candidates is not performed at all, or the value of the first objective function exceeds the value of the original first objective function from which the threshold is subtracted, completing the processing. Therefore, the same effects as mentioned above are achieved.

According to a 12th aspect of the present invention, in a method for compressing one-dimensional time series data as defined in any of the 3rd to 6th aspects, assuming that the indices of the node candidates numbered in an increasing order are described as $I(j)$ ($0 \leq j \leq m$), the quasi-optimal candidates are calculated in a procedure comprising: when a relationship $I(j-1)<I(j)-1$ is satisfied, calculating a value of the first objective function obtained at the exchange of node candidates $I(j)$ with node candidates $I(j)-1$, calculating a value $\Delta E(1-)$ which is the value of the first objective function from which the value of the original first objective function is subtracted, and setting the value $\Delta E(1-)$ to zero when $I(j-1) \geq I(j)-1$; when a relationship $I(j)+1<I(j+1)$ is satisfied, calculating a value of the first objective function obtained at the exchange of node candidates $I(j)$ with node candidates $I(j)+1$, calculating a value $\Delta E(1+)$ which is the value of the first objective function from which the value of the original first objective function is subtracted, and setting the value $\Delta E(1+)$ to zero when $I(j)+1 \geq I(j+1)$; when relationships $\Delta E(1-)<0$ and $\Delta E(1+) \geq 0$ are satisfied, exchanging the node candidates $I(j)$ with the node candidates $I(j)-1$; when relationships $\Delta E(1-) \geq 0$ and $\Delta E(1+)<0$ are satisfied, exchanging the node candidates $I(j)$ with the node candidates $I(j)+1$; when relationships $\Delta E(1-) \geq 0$ and $\Delta E(1+) \geq 0$ are satisfied, not performing exchange of the node candidates $I(j)$; when relationships $\Delta E(1-)<0$ and $\Delta E(1+)<0$ are satisfied and $\Delta E(1-)$ is less than $\Delta E(1+)$, exchanging the node candidates $I(j)$ with the node candidates $I(j)-1$; when relationships $\Delta E(1-)<0$ and $\Delta E(1+)<0$ are satisfied and $\Delta E(1-)$ exceeds $\Delta E(1+)$, successively exchanging the node candidates $I(j)$ with the node candidates $I(j)+1$ from $j=m-1$ to $j=1$; when the value of the first objective function obtained at the completion of the sequential processes is less than the value of the original first objective function from which the threshold is subtracted, successively exchanging node candidates again from $j=m-1$ to $j=1$; and when the exchange of the node candidates is not performed at all, or the value of the first objective function exceeds the value of the original first objective function from which the threshold is subtracted, completing the processing. Therefore, the same effects as mentioned above are achieved.

According to a 13th aspect of the present invention, in a method for compressing one-dimensional time series data as defined in any of the 3rd to 6th aspects, assuming that the indices of the node candidates numbered in an increasing order are described as $I(j)$ ($0 \leq j \leq m$), the quasi-optimal candidates are calculated in a procedure comprising: when a relationship $I(j-1)<I(j)-1$ is satisfied, calculating a value of the first objective function obtained at the exchange of node candidates $I(j)$ with node candidates $I(j)-1$, calculating a value $\Delta E(1-)$ which is the value of the first objective function from which the value of the original first objective function is subtracted, and setting the value $\Delta E(1-)$ to zero when $I(j-1) \geq I(j)-1$; when a relationship $I(j)+1<I(j+1)$ is satisfied, calculating a value of the first objective function obtained at the exchange of node candidates $I(j)$ with node candidates $I(j)+1$, calculating a value $\Delta E(1+)$ which is the value of the first objective function from which the value of the original first objective function is subtracted, and setting the value $\Delta E(1+)$ to zero when $I(j)+1 \geq I(j+1)$; when relationships $\Delta E(1-)<0$ and $\Delta E(1+) \geq 0$ are satisfied, exchanging the node candidates $I(j)$ with the node candidates $I(j)-1$ and exchanging the value of the first objective function obtained by the exchange, with the value of the original first objective function; when relationships $\Delta E(1-) \geq 0$ and $\Delta E(1+)<0$ are satisfied, exchanging the node candidates $I(j)$ with the node candidates $I(j)+1$, and exchanging the value of the first objective function obtained by the exchange, with the value of the original first objective function; when relationships $\Delta E(1-) \geq 0$ and $\Delta E(1+) \geq 0$ are satisfied, not performing exchange of the node candidates $I(j)$; when relationships $\Delta E(1-)<0$ and $\Delta E(1+)<0$ are satisfied and $\Delta E(1-)$ is less than $\Delta E(1+)$, exchanging the node candidates $I(j)$ with the node candidates $I(j)-1$, and exchanging the value of the first objective function obtained by the exchange, with the value of the original first objective value; when relationships $\Delta E(1-)<0$ and $\Delta E(1+)<0$ are satisfied and $\Delta E(1-)$ exceeds $\Delta E(1+)$, exchanging the node candidates $I(j)$ with the node candidates $I(j)+1$ and then exchanging the value of the first objective function obtained by the exchange, with the value of the original objective function, both in an increasing order for j of odd numbers and in a decreasing order for j of even numbers; when the value of the first objective function obtained at the completion of the sequential processes is less than the value of the original first objective function from which the threshold is subtracted, performing the above exchanges again in an increasing order for j of odd numbers and in a decreasing order for j as even numbers; and when the exchange of the node candidates is not performed at all, or the value of the first objective function exceeds the value of the original first objective function from which the threshold is subtracted, completing the processing. Therefore, the same effects as mentioned above are achieved.

According to a 14th aspect of the present invention, in a method for compressing one-dimensional time series data as defined in any of the 3rd to 6th aspects, assuming that the indices of the node candidates numbered in an increasing order are described as I(j) ($0 \leq j \leq m$), the quasi-optimal candidates are calculated in a procedure comprising: when a relationship I(j−1)<I(j)−1 is satisfied, calculating a value of the first objective function obtained at the exchange of node candidates I(j) with node candidates I(j)−1, calculating a value $\Delta E(1-)$ which is the value of the first objective function from which the value of the original first objective function is subtracted, and setting the value $\Delta E(1-)$ to zero when I(j−1)$\geq$I(j)−1; when a relationship I(j)+1<I(j+1) is satisfied, calculating a value of the first objective function obtained at the exchange of node candidates I(j) with node candidates I(j)+1, calculating a value $\Delta E(1+)$ which is the value of the first objective function from which the value of the original first objective function is subtracted, and setting the value $\Delta E(1+)$ to zero when I(j)+1$\geq$I(j+1); when relationships $\Delta E(1-)<0$ and $\Delta E(1+)\geq 0$ are satisfied, exchanging the node candidates I(j) with the node candidates I(j)−1; when relationships $\Delta E(1-)\geq 0$ and $\Delta E(1+)<0$ are satisfied, exchanging the node candidates I(j) with the node candidates I(j)+1, and exchanging the value of the first objective function obtained by the exchange, with the value of the original first objective function; when relationships $\Delta E(1-)\geq 0$ and $\Delta E(1+)\geq 0$ are satisfied, not performing exchange of the node candidates I(j); when relationships $\Delta E(1-)<0$ and $\Delta E(1+)<0$ are satisfied and $\Delta E(1-)$ is less than $\Delta E(1+)$ exchanging the node candidates I(j) with the node candidates I(j)−1 and exchanging the value of the first objective function obtained by the exchange, with the value of the original first objective value; when relationships $\Delta E(1-)<0$ and $\Delta E(1+)<0$ are satisfied and $\Delta E(1-)$ exceeds $\Delta E(1+)$, exchanging the node candidates I(j) with the node candidates I(j)+1, and exchanging the value of the first objective function obtained by the exchange, with the value of the original first objective function, both in a decreasing order for j as odd numbers and in an increasing order for j as even numbers; when the value of the first objective function obtained at the completion of the sequential processes is less than the value of the original first objective function from which the threshold is subtracted, performing the above exchanges again in a decreasing order for j as odd numbers and in an increasing order for j as even numbers; and when the exchange of the node candidates is not performed at all, or the value of the first objective function exceeds the value of the original first objective function from which the threshold is subtracted, completing the processing. Therefore, the same effects as mentioned above are achieved.

According to a 15th aspect of the present invention, in a method for compressing one-dimensional time series data as defined in any of the 3rd to 6th aspects, assuming that the indices of the node candidates numbered in an increasing order are described as I(j) ($0 \leq j \leq m$), the quasi-optimal candidates are calculated in a procedure comprising: when a relationship I(j−1)<I(j)−1 is satisfied, calculating a value of the first objective function obtained at the exchange of node candidates I(j) with node candidates I(j)−1, calculating a value $\Delta E(1-)$ which is the value of the first objective function from which the value of the original first objective function is subtracted, and setting the value $\Delta E(1-)$ to zero when I(j−1)$\geq$I(j)−1; when a relationship I(j)+1<I(j+1) is satisfied, calculating a value of the first objective function obtained at the exchange of node candidates I(j) with node candidates I(j)+1, calculating a value $\Delta E(1+)$ which is the value of the first objective function from which the value of the original first objective function is subtracted, and setting the value $\Delta E(1+)$ to zero when I(j)+1$\geq$I(j+1); when relationships $\Delta E(1-)<0$ and $\Delta E(1+)\geq 0$ are satisfied, exchanging the node candidates I(j) with the node candidates I(j)−1, and exchanging the value of the first objective function obtained by the exchange, with the value of the original first objective function; when relationships $\Delta E(1-)\geq 0$ and $\Delta E(1+)<0$ are satisfied, exchanging the node candidates I(j) with the node candidates I(j)+1, and exchanging the value of the first objective function obtained by the exchange, with the value of the original first objective function; when relationships $\Delta E(1-)\geq 0$ and $\Delta E(1+)\geq 0$ are satisfied, not performing exchange of the node candidates I(j); when relationships $\Delta E(1-)<0$ and $\Delta E(1+)<0$ are satisfied and $\Delta E(1-)$ is less than $\Delta E(1+)$, exchanging the node candidates I(j) with the node candidates I(j)−1, and exchanging the value of the first objective function obtained by the exchange, with the value of the original first objective function; when relationships $\Delta E(1-)<0$ and $\Delta E(1+)<0$ are satisfied and $\Delta E(1-)$ exceeds $\Delta E(1+)$, exchanging the node candidates I(j) with the node candidates I(j)+1 and then exchanging the value of the first objective function obtained by the exchange, with the value of the original first objective function, both successively from j=1 to j=[m/2] and than from j=m−1 to j=[m/2]+1; when the value of the first objective function obtained at the completion of the sequential processes is less than the value of the original first objective function from which the threshold is subtracted, performing the above exchanges again, successively from j=1 to j=[m/2] and then from j=m−1 to j=[m/2]+1; and when the exchange of the node candidates is not performed at all, or the value of the first objective function exceeds the value of the original first objective function from which the threshold is subtracted, completing the processing. Therefore, the same effects as mentioned above are achieved.

According to a 16th aspect of the present invention, in a method for compressing one-dimensional time series data as defined in any of the 3rd to 6th aspects, assuming that the indices of the node candidates numbered in an increasing order are described as I(j) ($0 \leq j \leq m$), the quasi-optimal candidates are calculated in a procedure comprising: when a relationship I(j−1)<I(j)−1 is satisfied, calculating a value of the first objective function obtained at the exchange of node candidates I(j) with node candidates I(j)−1, calculating a value $\Delta E(1-)$ which is the value of the first objective function from which the value of the original first objective function is subtracted, and setting the value $\Delta E(1-)$ to zero when I(j−1) a I(j)−1; when a relationship I(j)+1<I(j+1) is satisfied, calculating a value of the first objective function obtained at the exchange of node candidates I(j) with node candidates I(j)+1, calculating a value $\Delta E(1+)$ which is the value of the first objective function from which the value of the original first objective function is subtracted, and setting the value $\Delta E(1+)$ to zero when I(j)+1$\geq$I(j+1); when relationships $\Delta E(1-)<0$ and $\Delta E(1+)\geq 0$ are satisfied, exchanging the node candidates I(j) with the node candidates I(j)−1, and exchanging the value of the first objective function obtained by the exchange, with the value of the original first objective function; when relationships $\Delta E(1-)\geq 0$ and $\Delta E(1+)<0$ are satisfied, exchanging the node candidates I(j) with the node candidates I(j)+1, and exchanging the value of the first objective function obtained by the exchange, with the value of the original first objective function; when relationships $\Delta E(1-)\geq 0$ and $\Delta E(1+)\geq 0$ are satisfied, not performing exchange of the node candidates I(j); when relationships $\Delta E(1-)<0$ and $\Delta E(1+)<0$ are satisfied and $\Delta E(1-)$ is less than $\Delta E(1+)$, exchanging the node candidates I(j) with the node candidates I(j)−1, and exchanging the value of the first objective function obtained by the exchange, with the value of the original first objective function; when relationships $\Delta E(1-)<0$ and $\Delta E(1+)<0$ are satisfied and $\Delta E(1-)$ exceeds $\Delta E(1+)$, exchanging the node candidates I(j) with the node candidates I(j)+1 and then exchanging the value of the first objective function obtained by the exchange, with the value of the original first objective function, both successively from j=[m/2] to j=1 and then from j=[m/2]+1 to j=m−1; when the value of the first objective function obtained at the completion of the sequential processes is less than the value of the original first objective function from which the threshold is subtracted, performing the above exchanges again, successively from j=[m/2] to j=1 and then from j=[m/2]+1 to j=m−1; and when the exchange of the node candidates is not performed at all, or the value of the first objective function exceeds the value of the original first objective function from which the threshold is subtracted, completing the processing. Therefore, the same effects as mentioned above are achieved.

According to a 17th aspect of the present invention, in a method for compressing one-dimensional time series data as defined in any of the 3rd to 6th aspects, assuming that the indices of the node candidates numbered in an increasing order are described as I(j) ($0\leq j\leq m$), the quasi-optimal candidates are calculated in a procedure comprising: when a relationship I(j−1)<I(j)−1 is satisfied, calculating a value of the first objective function obtained at the exchange of node candidates I(j) with node candidates I(j)−1, calculating a value $\Delta E(1-)$ which is the value of the first objective function from which the value of the original first objective function is subtracted, and setting the value $\Delta E(1-)$ to zero when I(j−1)$\geq$I(j)−1, when a relationship I(j)+1<I(j+1) is satisfied, calculating a value of the first objective function obtained at the exchange of node candidates I(j) with node candidates I(j)+1, calculating a value $\Delta E(1+)$ which is the value of the first objective function from which the value of the original first objective function is subtracted, and setting the value $\Delta E(1+)$ to zero when I(j)+1$\geq$I(j+1), when relationships $\Delta E(1-)<0$ and $\Delta E(1+)\geq 0$ are satisfied, exchanging the node candidates I(j) with the node candidates I(j)−1 and then exchanging the value of the first objective function obtained by the exchange, with the value of the original first objective function; when relationships $\Delta E(1-)\geq 0$ and $\Delta E(1+)<0$ are satisfied, exchanging the node candidates I(j) with the node candidates I(j)+1, and then exchanging the value of the first objective function obtained by the exchange, with the value of the original first objective function; when relationships $\Delta E(1-)\geq 0$ and $\Delta E+(1+)\geq 0$ are satisfied, not performing exchange of the node candidates I(j); when relationships $\Delta E(1-)<0$ and $\Delta E(1+)<0$ are satisfied and $\Delta E(1-)$ is less than $\Delta E(1+)$, exchanging the node candidates I(j) with the node candidates I(j)−1, and exchanging the value of the first objective function obtained by the exchange, with the value of the original first objective function; when relationships $\Delta E(1-)<0$ and $\Delta E(1+)<0$ are satisfied and $\Delta E(1-)$ exceeds $\Delta E(1+)$, exchanging the node candidates I(j) with the node candidates and then exchanging the value of the first objective function obtained by the exchange, with the value of the original first objective function, both successively from j=1 to j=m−1; when the value of the first objective function obtained at the completion of the sequential processes is less then the value of the original first objective function from which the threshold is subtracted, preforming the above exchanges again, successively from j=1 to j=m−1; and when the exchange of the node candidates is not performed at all, or the value of the first objective function exceeds the value of the original first objective function from which the threshold is subtracted, completing the processing. Therefore, the same effects as mentioned above are achieved.

According to an 18th aspect of the present invention, in a method for compressing one-dimensional time series data as defined in any of the 3rd to 6th aspects, assuming that the indices of the node candidates numbered in an increasing order are described as I(j) ($0\leq j\leq m$), the quasi-optimal candidates are calculated in a procedure comprising: when a relationship I(j−1)<I(j)−1 is satisfied, calculating a value of the first objective function obtained at the exchange of node candidates I(j) with node candidates I(j)−1, calculating a value $\Delta E(1-)$ which is the value of the first objective function from which the value of the original first objective function is subtracted, and setting the value $\Delta E(1-)$ to zero when I(j−1)$\geq$I(j)−1; when a relationship I(j)+1<I(j+1) is satisfied, calculating a value of the first objective function obtained at the exchange of node candidates I(j) with node candidates I(j)+1, calculating a value $\Delta E(1+)$ which is the value of the first objective function from which the value of the original first objective function is subtracted, and setting the value $\Delta E(1+)$ to zero when I(j)+1$\geq$I(j+1); when relationships $\Delta E(1-)<0$ and $\Delta E(1+)\geq 0$ are satisfied, exchanging the node candidates I(j) with the node candidates I(j)−1, and exchanging the value of the first objective function obtained by the exchange, with the value of the original first objective function; when relationships $\Delta E(1-)\geq 0$ and $\Delta E(1+)<0$ are satisfied, exchanging the node candidates I(j) with the node candidates I(j)+1, and exchanging the value of the first objective function obtained by the exchange, with the value of the original first objective function; when relationships of $\Delta E(1-)\geq 0$ a $\Delta E(1+)\geq 0$ are satisfied, not performing exchange of the node candidates I(j); when relationships $\Delta E(1-)<0$ and $\Delta E(1+)<0$ are satisfied and $\Delta E(1-)$ is less then $\Delta E(1+)$, exchanging the node candidates I(j) with the node candidates I(j)−1, and exchanging the value of the first objective function obtained by the exchange, with the value of the original first objective function; when relationships $\Delta E(1-)<0$ and $\Delta E(1+)<0$ are satisfied and $\Delta E(1-)$ exceeds $\Delta E(1+)$, exchanging the node candidates I(j) with the node candidates I(j)+1 and then exchanging the value of the first objective function obtained by the exchange, with the value of the original first objective function, both successively from j=m−1 to j=1; when the value of the first objective function obtained at the completion of the sequential processes is less than the value of the original first objective function from which the threshold is subtracted, performing the above exchanges again, successively from j=m−1 to j=1; and when the exchange of the node candidates is not performed at all, or the value of the first objective function exceeds the value of the original first objective function from which the threshold is subtracted, completing the processing. Therefore, the same effects as mentioned above are achieved.

According to a 19th aspect of the present invention, in a method of compressing one-dimensional time series data as defined in any of the 3rd to 6th aspects, when the number of the finally decided node candidates are less than the number of the data not selected as the node candidates, compressed data is output consisting of the identifier indicating the node candidates, the index numbers of the finally decided node candidates, and the values of the node candidates and, when the number of the finally decided node candidates exceeds the number of the data not selected as the node candidates, compressed data is output consisting of the identifier indicating non-node candidates, the index numbers of the data not selected as the node candidates, and the values of the node candidates. Therefore, the same effects as mentioned above are achieved.

According to a 20th aspect of the present invention, in a method of compressing one-dimensional time series data as defined in any of the 3rd to 6th aspects, data compression is performed individually for time and data of the one-dimensional time series data at irregular time intervals, to compress the time and the data separately. Therefore, the same effects as mentioned above are achieved for one-dimensional time series data at irregular time intervals.

According to a 21st aspect of the present invention, in a method of compressing one-dimensional time series data as defined in any of the 3rd to 6th aspects, data compression is individually performed for each of the plural one-dimensional time series data constituting multi-dimensional time series data, to compress the multi-dimensional time series data. Therefore, the same effects as mentioned above are achieved for multi-dimensional time series data.

According to a 22nd aspect of the present invention, in a method of compressing one-dimensional time series data as defined in any of the 3rd to 6th aspects, for plural one-dimensional time series data whose errors propagate, data compression is repeated with an approximation accuracy increasing gradually from one of the time series data from which the propagation starts, to compress all of the data. Therefore, data compression is performed without increasing propagation of errors, in addition to the above-mentioned effects.

According to a 23rd aspect of the present invention, there is provided a method for decompressing one-dimensional time series data compressed by a compression method for one-dimensional time series data as defined in any of the 1st, 3rd, and 4th aspects, and the method comprises a first process of inputting compressed data and a number of data to be obtained by decompressing the compressed data; a second process of interpolating the compressed data using an interpolation function identical to that used for compression to calculate data whose number is equal to the data number, and calculating time data whose number is equal to the data number on the basis of an initial time and a time interval; and a third process of outputting the data and the time both compressed in the second process. Since continuous data processing using an interpolation function is performed in decompression, compressed data, which have been compressed by any of the above-mentioned compression methods, can be decompressed. In addition, data decompression at an arbitrary number is possible.

According to a 24th aspect of the present invention, there is provided a method of decompressing one-dimensional time series data compressed by a compression method for one-dimensional time series data as defined in any of the 2nd, 5th, and 6th aspects, and the method comprises a first process of inputting compressed data and a number of data to be obtained by decompressing the compressed data; a second process of calculating zero data whose number is equal to the data number and time data whose number is equal to the data number based on an initial time and a time interval when an identifier indicating that the compressed data are all zero is attached to the compressed data, or calculating data whose number is equal to the data number by interpolating the compression data using an interpolation function identical to that used for compression and calculating time data whose number is equal to the data number based an the initial tie and the time interval when an identifier indicating that the compressed data are all zero is not attached to the compressed data; and a third process of outputting the data and time data calculated in the second process. Therefore the same effects as method above are achieved.

According to a 25th aspect of the present invention, in a method of decompressing one-dimensional time series data as defined in any of the 23rd and 24th aspects, data decompression is performed individually for each of plural compressed one-dimensional time series data constituting compressed multi-dimensional time series data, to decompress the compressed multi-dimensional time series data. Therefore, the same effects as mentioned above are achieved for multi-dimensional time series data.

According to a 26th aspect of the present invention, there is provided a recording medium for one-dimensional time series data compression program storing a compression program for one-dimensional time series data at uniform time intervals, and the program comprises a first process of inputting the one-dimensional time series data and an approximation accuracy thereof; a second process of calculating node candidates of an interpolation function approximating the one-dimensional time series data; a third process of optimizing positions of the node candidates; a fourth process of deciding an error between one-dimensional time series data produced based on the node candidates at optimized positions, using an interpolation function, and the original one-dimensional time series data; a fifth process of judging an error between one-dimensional time series data produced an the basis of the node candidates at optimized positions, using the interpolation function, and the original one-dimensional time series data, and changing a node number and returning to the second process when the error exceeds a value based on the approximation precision; and a sixth process of outputting data of the node candidates and corresponding time data as compressed data when it is judged in the fifth process that the error is less than the value based on the approximation accuracy. Therefore, compression adapted to the properties of the given one-dimensional time series data is performed. In addition, since the compression ratio is controlled by the approximation accuracy, errors after decompression can be grasped in advance.

According to a 27th aspect of the present invention, there is provided a recording medium for one-dimensional time series data compression program storing a compression program of one-dimensional time series data at uniform time intervals, and the program comprises a first process of inputting the one-dimensional time series data and an approximation accuracy thereof; a second process of judging whether the one-dimensional time series data includes data within the approximation accuracy or not; a third process of calculating node candidates of an interpolation function which approximates the one-dimensional time series data, when the one-dimensional time series data includes no data within the approximation accuracy; a fourth process of optimizing positions of the node candidates; a fifth process of judging an error between one-dimensional time series data produced on the basis of the node candidates at optimized positions, using the interpolation function, and the original one-dimensional time series data; a sixth process of judging an error between one-dimensional time series data produced on the basis of the node candidates whose number is optimized, using the interpolation function, and the original one-dimensional time series data, and changing a node number and returning to the second process when the error exceeds a value based on the approximation accuracy; a seventh process of outputting information indicating that the one-dimensional time series data includes data within the approximation accuracy when it is judged in the second process that the one-dimensional time series data includes the data within the approximation accuracy, or outputting data of the node candidates and corresponding time data as compressed data when it is judged in the sixth process that the error does not exceed the value based on the approximation accuracy. Therefore, compression adapted to the properties of the given one-dimensional time series data is performed. In addition, since the compression ratio is controlled by the approximation accuracy, errors after decompression can be grasped in advance.

According to a 28th aspect of the present invention, there is provided a recording medium for one-dimensional time series data compression program storing a compression program of one-dimensional time series data at uniform time intervals, and the program comprises a first process of inputting the one-dimensional time series data and an approximation accuracy thereof, attaching indices to the one-dimensional time series data in a temporal order, and calculating an Initial node number of an interpolation function which interpolates the one-dimensional time series data; a second process of deciding node candidates including start data and end data, at random, in such a way that a number of decided candidates corresponds to the node number; a third process of interpolating the node candidates, using an interpolation function which utilizes the index numbers of the node candidates as an independent variable, and calculating an error between the interpolation result and the original one-dimensional time series data; a fourth process of calculating, from the error, a value of a first objective function defined as weighted sum of the maximum value of the error, the average of the error, and the variance of the error; a fifth process of changing the node candidates repeatedly until the first objective function takes a smallest value and deciding quasi-optimal node candidates; a sixth process of Interpolating the quasi-optimal node candidates using the Interpolation function, to generate one-dimensional time series data approximating the original one-dimensional time series data, and calculating an error between the one-dimensional time series data and the original one-dimensional time series data; a seventh process of calculating, from the error, a second objective function defined as weighted sum of the maximum value of the error, the average of the error, and the variance of the error; an eighth process of deciding the node number with an increment as a new node number when the value of the second objective function exceeds a threshold corresponding to the approximation accuracy, and repeating the second to seventh processes; and a ninth process of outputting an initial time and a time interval of the one-dimensional time series data, and compressed data consisting of index numbers of finally decided node candidates and the values of the node candidates, when the value of the second objective function is less than the threshold. Therefore, compression adapted to the properties of the gives one-dimensional time series data is performed. In addition, since the compression ratio is controlled by the approximation accuracy, errors after decompression can be grasped in advance.

According to a 29th aspect of the present invention, there is provided a recording medium for one-dimensional time series data compression program storing a compression program of one-dimensional time series data at uniform time intervals, and the program comprises a first process of inputting the one-dimensional time series data and an approximation accuracy thereof, attaching indices to the one-dimensional time series data in a temporal order, and calculating an initial node number of an interpolation function which interpolates the one-dimensional time series data; a second process of deciding node candidates including start data and end data and having the indices attached at approximately equal intervals, in such a way that a number of decided candidates corresponds to the node number; a third process of interpolating the node candidates, using an interpolation function which utilizes the index numbers of the node candidates as an independent variable, and calculating an error between the interpolation result and the original one-dimensional time series data; a fourth process of calculating, from the error, a value of a first objective function defined as weighted sum of the maximum value of the error, the average of the error, and the variance of the error; a fifth process of changing the node candidates repeatedly until the first objective function takes a smallest value and deciding quasi-optimal node candidates; a sixth process of interpolating the quasi-optimal node candidates using the interpolation function, to generate one-dimensional time series data approximating the original one-dimensional time series data, and calculating an error between the one-dimensional time series data and the original one-dimensional time series data; a seventh process of calculating, from the error, a second objective function defined as weighted sum of the maximum value of the error, the average of the error, and the variance of the error; an eighth process of deciding the node number with an increment as a new node number when the value of the second objective function is greater than or equal to a threshold corresponding to the approximation accuracy, and repeating the second to seventh processes; and a ninth process of outputting an initial time and a time interval of the one-dimensional time series data, and compressed data consisting of index numbers of finally decided node candidates and the values of the node candidates, when the value of the second objective function is less than the threshold. Therefore, compression adapted to the properties of the given one-dimensional time series data is performed. In addition, since the compression ratio is controlled by the approximation accuracy, errors after decompression can be grasped in advance.

According to a 30th aspect of the present invention, there is provided a recording medium for one-dimensional time series data compression program storing a compression program of one-dimensional time series data at uniform time intervals, and the program comprises a first process of inputting the one-dimensional time series data and an approximation accuracy thereof, and attaching indices to the one-dimensional time series data in a temporal order, and calculating an initial node number of an interpolation function which interpolates the one-dimensional time series data; a second process of judging whether all the absolute values of the one-dimensional time series data are less than the approximation accuracy or not, and when the absolute values are all less than the approximation accuracy, outputting an identifier indicating that all the values are zero to complete the processing or proceeding to a third process described later when all the absolute values are not less than the approximation accuracy; a third process of deciding node candidates including start data and end data, at random, in such a way that a number of decided node candidates corresponds to the initial node number; a forth process of interpolating the node candidates with an interpolation function using the index numbers of the node candidates as an independent variable and calculating an error between the interpolation result and the original one-dimensional time series data; a fifth process of calculating, from the error, a value of a first objective function defined as weighted sum of the maximum value of the error, the average of the error, and the variance of the error; a sixth process of changing the node candidates repeatedly until the first objective function takes a smallest value and deciding quasi-optimal node candidates; a seventh process of interpolating the quasi-optimal node candidates using the interpolation function to generate one-dimensional time series data approximating the original one-dimensional time series data and calculating an error between the one-dimensional time series data and the original one-dimensional time series data; an eighth process of calculating, from the error, a value of second objective function defined as weighted sum of the maximum value of the error, the average of the error, and the variance of the error; a ninth process of deciding the node number with an increment as a new node number when the value of the second objective function is greater than or equal to a threshold corresponding to the approximation accuracy, and repeating the third to eighth processes; and a tenth process of outputting an initial time and a time interval of the one-dimensional time series data, and compressed data consisting of index numbers of finally decided node candidates and the values of the node candidates, when the value of the second objective function is less than the threshold. Therefore, compression adapted to the properties of the given one-dimensional time series data is performed. In addition, since the compression ratio is controlled by the approximation accuracy, errors after decompression can be grasped in advance. Further, with respect to data within the approximation accuracy, processes for these data can be dispensed with.

According to a 31st aspect of the present invention, there is provided a recording medium for one-dimensional time series data compression program storing a compression program of one-dimensional time series data at uniform time intervals, and the program comprises a first process of inputting the one-dimensional time series data and an approximation accuracy thereof, and attaching indices to the one-dimensional time series data in a temporal order, and calculating an initial node number of an interpolation function interpolating the one-dimensional time series data; a second process of judging whether all the absolute values of the one-dimensional time series data are less than the approximation accuracy or not, and when the values are all less than the approximation accuracy, outputting an identifier indicating that all the values are zero to complete the processing, or proceeding to a third process described later when all the absolute values exceed the approximation accuracy; a third process of deciding node candidates including start and end data and having the indices attached at approximately equal intervals, in such a way that the number of the node candidates corresponds to the initial node number; a fourth process of calculating an error from the original one-dimensional time series data by interpolating the node candidates by an interpolation function using the index numbers of the node candidates as an independent variable; a fifth process of calculating, from the error, a value of a first objective function defined as weighed sum of the maximum of the error, the average of the error, and the variance of the error; a sixth process of changing the node candidates repeatedly until the first objective function takes a smallest value, and deciding quasi-optimal node candidates; a seventh process of interpolating the quasi-optimal node candidates with the interpolation function to generate one-dimensional time series data approximating the original one-dimensional time series data, and calculating an error between the one-dimensional time series data and the original one-dimensional time series data; an eighth process of calculating, from the error, a value of a second objective function defined as weighted sum of the maximum value of the error, the average of the error, and the variance of the error; a ninth process of employing the node number with an increment as a new node number and repeating the third to eighth processes when the value of the second objective function is greater than or equal to a threshold corresponding to the approximation accuracy; and a tenth process of outputting a start time and a time interval of the one-dimensional time series data, and compressed data consisting of index numbers of finally decided node candidates and the values of the node candidates when the value of the second objective function is less than the threshold. Therefore, compression adapted to the properties of the given one-dimensional time series data is performed. In addition, since the compression ratio is controlled by the approximation accuracy, errors after decompression can be grasped in advance. Further, with respect to data within the approximation accuracy, processes for these data can be dispensed with.

According to a 32nd aspect of the present invention, in a recording medium for one-dimensional time series data compression program as defined in any of the 28th to 31st aspects, the program performs calculation of the quasi-optimal node candidates, on the assumption that the indices of the node candidates numbered in an increasing order are described as $I(j)$ ($0 \leq j \leq m$), according to a procedure comprising: when a relationship $I(j-1)<I(j)-1$ is satisfied, calculating a value of the first objective function obtained at the exchange of node candidates $I(j)$ with node candidates $I(j)-1$, calculating a value $\Delta E(1-)$ which is the value of the first objective function from which the value of the original first objective function is subtracted, and setting the value $\Delta E(1-)$ to zero when $I(j-1) \geq I(j)-1$; when a relationship $I(j)+1<I(j+1)$ is satisfied, calculating a value of the first objective function obtained at the exchange of node candidates $I(j)$ with node candidates $I(j)+1$, calculating a value $\Delta E(1+)$ which is the value of the first objective function from which the value of the original first objective function is subtracted, and setting the value $\Delta E(1+)$ to zero when $I(j)+1 \geq I(j+1)$; when relationships $\Delta E(1-)<0$ and $\Delta E(1+) \geq 0$ are satisfied, exchanging the node candidates $I(j)$ with the node candidates $I(j)-1$; when relationships $\Delta E(1-) \geq 0$ and $\Delta E(1+)<0$ are satisfied, exchanging the node candidates $I(j)$ with the node candidates $I(j)+1$; when relationships $\Delta E(1-) \geq 0$ and $\Delta E(1+) \geq 0$ are satisfied, not performing exchange of the node candidates $I(j)$; when relationships $\Delta E(1-)<0$ and $\Delta E(1+)<0$ are satisfied and $\Delta E(1-)$ is less than $\Delta E(1+)$, exchanging the node candidates $I(j)$ with the node candidates $I(j)-1$; when relationships $\Delta E(1-)<0$ and $\Delta E(1+)<0$ are satisfied and $\Delta E(1-)$ exceeds $\Delta E(1+)$, exchanging the node candidates $I(j)$ with the node candidates $I(j)+1$ in an increasing order for j of odd numbers and in a decreasing order for j of even numbers; when the value of the first objective function obtained at the completion of the sequential processes is less than the value of the original first objective function from which the threshold is subtracted, exchanging the node candidates again in an increasing order for j of odd numbers and in a decreasing order for j of even numbers; and when the exchange of the node candidates is not performed at all, or the value of the first objective function exceeds the value of the original first objective function from which the threshold is subtracted, completing the processing. Therefore, a process for obtaining quasi-optimal nodes of an interpolation function is realized. Thereby, compression adapted to the properties of the given one-dimensional time series data is performed. In addition, since the compression ratio is controlled by the approximation accuracy, errors after decompression can be grasped in advance.

According to a 33rd aspect of the present invention, in a recording medium for one-dimensional time series data compression program as defined in any of the 28th to 31st aspects, the program performs the calculation of the quasi-optimal node candidates, on the assumption that the indices of the node candidates numbered in an increasing order are described as I(j) ($0 \leq j \leq m$), according to a procedure comprising when a relationship I(j−1)<I(j)−1 is satisfied, calculating a value of the first objective function obtained at the exchange of node candidates I(j) with node candidates I(j)−1, calculating a value $\Delta E(1-)$ which is the value of the first objective function from which the value of the original first objective function is subtracted, and setting the value $\Delta E(1-)$ to zero when I(j−1)$\geq$I(j)−1; when a relationship I(j)+1<I(j+1) is satisfied, calculating a value of the first objective function obtained at the exchange of node candidates I(j) with node candidates I(j)+1, calculating a value $\Delta E(1+)$ which is the value of the first objective function from which the value of the original first objective function is subtracted, and setting the value $\Delta E(1+)$ to zero when I(j)+1$\geq$I(j+1); when relationships $\Delta E(1-)<0$ and $\Delta E(1+)\geq 0$ are satisfied, exchanging the node candidates I(j) with the node candidates I(j)−1; when relationships $\Delta E(1-)\geq 0$ and $\Delta E(1+)<0$ are satisfied, exchanging the node candidates I(j) with the node candidates I(j)+1; when relationships $\Delta E(1-)\geq 0$ and $\Delta E(1+)\geq 0$ are satisfied, not performing exchange of the node candidates I(j); when relationships $\Delta E(1-)<0$ and $\Delta E(1+)<0$ are satisfied and $\Delta E(1-)$ is less than $\Delta E(1+)$, exchanging the node candidates I(j) with the node candidates I(j)−1; when relationships $\Delta E(1-)<0$ and $\Delta E(1+)<0$ are satisfied and $\Delta E(1-)$ exceeds $\Delta E(1+)$, exchanging the node candidates I(j) with the node candidates I(j)+1 in a decreasing order for j of odd numbers and in an increasing order for j of even numbers; when the value of the first objective function obtained at the completion of the sequential processes is less than the value of the original first objective function from which the threshold is subtracted, exchanging the node candidates again in a decreasing order for j of odd numbers and in an increasing order for j of even numbers; and when the exchange of the node candidates is not performed at all, or the value of the first objective function exceeds the value of the original first objective function from which the threshold is subtracted, completing the processing. Therefore, the same effects as mentioned above are achieved.

According to a 34th aspect of the present invention, in a recording medium for one-dimensional time series data compression program as defined in any of the 28th to 31st aspects, the program performs the calculation of the quasi-optimal node candidates, on the assumption that the indices of the node candidates numbered in an increasing order are described as I(j) ($0 \leq j \leq m$), according to a procedure comprising: when a relationship I(j−1)<I(j)−1 is satisfied, calculating a value of the first objective function obtained at the exchange of node candidates I(j) with node candidates I(j)−1, calculating a value $\Delta E(1-)$ which is the value of the first objective function from which the value of the original first objective function is subtracted, and setting the value $\Delta E(1-)$ to zero when I(j−1)$\geq$I(j)−1; when a relationship I(j)+1<I(j+1) is satisfied, calculating a value of the first objective function obtained at the exchange of node candidates I(j) with node candidates I(j)+1, calculating a value $\Delta E(1+)$ which is the value of the first objective function from which the value of the original first objective function is subtracted, and setting the value $\Delta E(1+)$ to zero when I(j)+1$\geq$I(j+1); when relationships $\Delta E(1-)<0$ and $\Delta E(1+)\geq 0$ are satisfied, exchanging the node candidates I(j) with the node candidates I(j)−1; when relationships $\Delta E(1-)\geq 0$ and $\Delta E(1+)<0$ are satisfied, exchanging the node candidates I(j) with the node candidates I(j)+1; when relationships $\Delta E(1-)\geq 0$ and $\Delta E(1+)\geq 0$ are satisfied, not performing exchange of the node candidates I(j); when relationships $\Delta E(1-)<0$ and $\Delta E(1+)<0$ are satisfied and $\Delta E(1-)$ is less than $\Delta E(1+)$, exchanging the node candidates I(j) with the node candidates I(j)−1; when relationships $\Delta E(1-)<0$ and $\Delta E(1+)<0$ are satisfied and $\Delta E(1-)$ exceeds $\Delta E(1+)$, successively exchanging the node candidates I(j) with the node candidates I(j)+1, initially from j=1 to j=[m/2] and then from j=m−1 to j=[m/2]+1; when the value of the first objective function obtained at the completion of the sequential processes is less than the value of the original first objective function from which the threshold is subtracted, successively exchanging the node candidates again, from j=1 to j=[m/2] and then from j=m−1 to j=[m/2]+1; and when the exchange of the node candidates is not performed at all, or the value of the first objective function exceeds the value of the original first objective function from which the threshold is subtracted, completing the processing. Therefore, the same effects as mentioned above are achieved.

According to a 35th aspect of the present invention, in a recording medium for one-dimensional time series data compression program as defined In any of the 28th to 31st aspects, the program performs the calculation of the quasi-optimal node candidates, on the assumption that the indices of the node candidates numbered in an increasing order are described as I(j) ($0 \leq j \leq m$), according to a procedure comprising: when a relationship I(j−1)<I(j)−1 is satisfied, calculating a value of the first objective function obtained at the exchange of node candidates I(j) with node candidates I(j)−1, calculating a value $\Delta E(1-)$ which is the value of the first objective function from which the value of the original first objective function is subtracted, and setting the value $\Delta E(1-)$ to zero when I(j−1)$\geq$I(j)−1; when a relationship I(j)+1<I(j+1) is satisfied, calculating a value of the first objective function obtained at the exchange of node candidates I(j) with node candidates I(j)+1, calculating a value $\Delta E(1+)$ which is the value of the first objective function from which the value of the original first objective function is subtracted, and setting the value $\Delta E(1+)$ to zero when I(j)+1$\geq$I(j+1); when relationships $\Delta E(1-)<0$ and $\Delta E(1+)\geq 0$ are satisfied, exchanging the node candidates I(j) with the node candidates I(j)−1; when relationships $\Delta E(1-)\geq 0$ and $\Delta E(1+)<0$ are satisfied, exchanging the node candidates I(j) with the node candidates I(j)+1; when relationships $\Delta E(1-)\geq 0$ and $\Delta E(1+)\geq 0$ are satisfied, not performing exchange of the node candidates I(j); when relationships $\Delta E(1-)<0$ and $\Delta E(1+)<0$ are satisfied and $\Delta E(1-)$ is less than $\Delta E(1-)$, exchanging the node candidates I(j) with the node candidates I(j)−1; when relationships $\Delta E(1-)<0$ and $\Delta E(1+)<0$ are satisfied and $\Delta E(1-)$ exceeds $\Delta E(1+)$, successively exchanging the node candidates I(j) with the node candidates I(j)+1, initially from j=[m/2] to j=1 and then from j=[m/2]+1 to j=m−1; when the value of the first objective function obtained at the completion of the sequential processes is less than the value of the original first objective function from which the threshold is subtracted, successively exchanging the node candidates again, from j=[m/2] to j=1 and then from j=[m/2]+1 to j=m−1; and when the exchange of the node candidates is not performed at all, or the value of the first objective function exceeds the value of the original first objective function from which the threshold is subtracted, completing the processing. Therefore, the same effects as mentioned above are achieved.

According to a 36th aspect of the present invention, in a recording medium for one-dimensional time series data compression program as defined in any of the 28th to 31st aspects, the program performs the calculation of the quasi-optimal node candidates, on the assumption that the indices of the node candidates numbered in an increasing order are described as I(j) (0≦j≦m) according to a procedure comprising: when a relationship of I(j−1)<I(j)−1 is satisfied, calculating a value of the first objective function obtained at the exchange of node candidates I(j) with node candidates I(j)−1, calculating a value ΔE(1−) which is the value of the first objective function from which the value of the original first objective function is subtracted, and setting the value ΔE(1−) to zero when I(j−1)≧I(j)−1; when a relationship I(j)+1<I(j+1) is satisfied, calculating a value of the first objective function obtained at the exchange of node candidates I(j) with node candidates I(j)+1, calculating a value ΔE(1+) which is the value of the first objective function from which the value of the original first objective function is subtracted, and setting the value ΔE(1+) to zero when I(j)+1≧I(j+1); when relationships ΔE(1−)<0 and ΔE(1+)≧0 are satisfied, exchanging the node candidates I(j) with the node candidates I(j)−1; when relationships ΔE(1−)≧0 and ΔE(1+)<0 are satisfied, exchanging the node candidates I(j) with the node candidates I(j)+1; when relationships ΔE(1−)≧0 and ΔE(1+)≧0 are satisfied, not performing exchange of the node candidates I(j); when relationships ΔE(1−)<0 and ΔE(1+)<0 are satisfied and ΔE(1−) is less than ΔE(1+), exchanging the node candidates I(j) with the node candidates I(j)−1; when relationships ΔE(1−)<0 and ΔE(1+)<0 are satisfied and ΔE(1−) exceeds ΔE(1+), exchanging the node candidates I(j) with the node candidates I(j)+1 successively from j=1 to j=m−1; when the value of the first objective function obtained at the completion of the successive processes is less than the value of the original first objective function from which the threshold is subtracted, successively exchanging the node candidates again, from j=1 to j=m−1; and when the exchange of the node candidates is not performed at all, or the value of the first objective function exceeds the value of the original first objective function from which the threshold is subtracted, completing the processing. Therefore, the same effects as mentioned above are achieved.

According to a 37th aspect of the present invention, in a recording medium for one-dimensional time series data compression program as defined in any of the 28th to 31st aspects, the program performs the calculation of the quasi-optimal node candidates, on the assumption that the indices of the node candidates numbered in an increasing order are described as I(j) (0≦j≦m), according to a procedure comprising: when a relationship I(j−1)<I(j)−1 is satisfied, calculating a value of the first objective function obtained at the exchange of node candidates I(j) with node candidates I(j)−1, calculating a value ΔE(1−) which is the value of the first objective function from which the value of the original first objective function is subtracted, and setting the value ΔE(1−) to zero when I(j−1)≧I(j)−1; when a relationship I(j)+1<I(j+1) is satisfied, calculating a value of the first objective function obtained at the exchange of node candidates I(j) with node candidates I(j)+1, calculating a value ΔE(1+) which is the value of the first objective function from which the value of the original first objective function is subtracted, and setting the value ΔE(1+) to zero when I(j)+1≧I(j+1); when relationships ΔE(1−)<0 and ΔE(1+)≧0 are satisfied, exchanging the node candidates I(j) with the node candidates I(j)−1; when relationships ΔE(1−)≧0 and ΔE(1+)<0 are satisfied, exchanging the node candidates I(j) with the node candidates I(j)+1; when relationships ΔE(1−)≧0 and ΔE(1+)≧0 are satisfied, not performing exchange of the node candidates I(j); when relationships ΔE(1−)<0 and ΔE(1+)<0 are satisfied and ΔE(1−) is less than ΔE(1+), exchanging the node candidates I(j) with the node candidates I(j)−1; when relationships ΔE(1−)<0 and ΔE(1+)<0 are satisfied and ΔE(1−) exceeds ΔE(1+), successively exchanging the node candidates I(j) with the node candidates I(j)+1 from j=m−1 to j=1; when the value of the first objective function obtained at the completion of the sequential processes is less than the value of the original first objective function from which the threshold is subtracted, successively exchanging node candidates again from j=m−1 to j=1; and when the exchange of the node candidates is not performed at all, or the value of the first objective function exceeds the value of the original first objective function from which the threshold is subtracted, completing the processing. Therefore, the same effects as mentioned above are achieved.

According to a 38th aspect of the present invention, in a recording medium for one-dimensional time series data compression program as defined in any of the 28th to 31st aspects, the program performs the calculation of the quasi-optimal node candidates, on the assumption that the indices of the node candidates numbered in an increasing order are described as I(j) (0≦j≦m), according to a procedure comprising: when a relationship I(j−1)<I(j)−1 is satisfied, calculating a value of the first objective function obtained at the exchange of node candidates I(j) with node candidates I(j)−1, calculating a value ΔE(1−) which is the value of the first objective function from which the value of the original first objective function is subtracted, and setting the value ΔE(1−) to zero when I(j−1)≧I(j)−1; when a relationship I(j)+1<I(j+1) is satisfied, calculating a value of the first objective function obtained at the exchange of node candidates I(j) with node candidates I(j)+1, calculating a value ΔE(1+) which is the value of the first objective function from which the value of the original first objective function is subtracted, and setting the value ΔE(1+) to zero when I(j)+1≧I(j+1); when relationships ΔE(1−)<0 and ΔE(1+)≧0 are satisfied, exchanging the node candidates I(j) with the node candidates I(j)−1, and exchanging the value of the first objective function obtained by the exchange, with the value of the original first objective function; when relationships ΔE(1−)≧0 and ΔE(1+)<0 are satisfied, exchanging the node candidates I(j) with the node candidates I(j)+1, and exchanging the value of the first objective function obtained by the exchange, with the value of the original first objective function; when relationships ΔE(1−)≧0 and ΔE(1+)≧0 are satisfied, not performing exchange of the node candidates I(j); when relationships ΔE(1−)<0 and ΔE(1+)<0 are satisfied and ΔE(1−) is less than ΔE(1+), exchanging the node candidates I(j) with the node candidates I(j)−1, and exchanging the value of the first objective function obtained by the exchange, with the value of the original first objective value; when relationships ΔE(1−)<0 and ΔE(1+)<0 are satisfied and ΔE(1−) exceeds ΔE(1+), exchanging the node candidates I(j) with the node candidates I(j)+1 and then exchanging the value of the first objective function obtained by the exchange, with the value of the original objective function, both in an increasing order for j of odd numbers and in a decreasing order for j of even numbers; when the value of the first objective function obtained at the completion of the sequential processes is less than the value of the original first objective function from which the threshold is subtracted, performing the above exchanges again in an increasing order for j of odd numbers and in a decreasing order for j as even numbers; and when the exchange of the node candidates is not performed at all, or the value of the first objective function exceeds the value of the original first objective function from which the threshold is subtracted, completing the processing. Therefore, the same effects as mentioned above are achieved.

According to a 39th aspect of the present invention, in a recording medium for one-dimensional time series data compression program as defined in any of the 28th to 31st aspects, the program performs the calculation of the quasi-optimal node candidates, on the assumption that the indices of the node candidates numbered in an increasing order are described as $I(j)$ ($0 \leq j \leq m$), according to a procedure comprising: when a relationship $I(j-1)<I(j)-1$ is satisfied, calculating a value of the first objective function obtained at the exchange of node candidates $I(j)$ with node candidates $I(j)-1$, calculating a value $\Delta E(1-)$ which is the value of the first objective function from which the value of the original first objective function is subtracted, and setting the value $\Delta E(1-)$ to zero when $I(j-1) \geq I(j)-1$; when a relationship $I(j)+1<I(j+1)$ is satisfied, calculating a value of the first objective function obtained at the exchange of node candidates $I(j)$ with node candidates $I(j)+1$, calculating a value $\Delta E(1+)$ which is the value of the first objective function from which the value of the original first objective function is subtracted, and setting the value $\Delta E(1+)$ to zero when $I(j)+1 \geq I(j+1)$; when relationships $\Delta E(1-)<0$ and $\Delta E(1+) \geq 0$ are satisfied, exchanging the node candidates $I(j)$ with the node candidates $I(j)-1$, and exchanging the value of the first objective function obtained by the exchange, with the value of the original first objective function; when relationships $\Delta E(1-) \geq 0$ and $\Delta E(1+)<0$ are satisfied, exchanging the node candidates $I(j)$ with the node candidates $I(j)+1$, and exchanging the value of the first objective function obtained by the exchange, with the value of the original first objective function; when relationships $\Delta E(1-) \geq 0$ and $\Delta E(1+) \geq 0$ are satisfied, not performing exchange of the node candidates $I(j)$; when relationships $\Delta E(1-)<0$ and $\Delta E(1+)<0$ are satisfied and $\Delta E(1-)$ is less then $\Delta E(1+)$, exchanging the node candidates $I(j)$ with the node candidates $I(j)-1$ and exchanging the value of the first objective function obtained by the exchange, with the value of the original first objective value; when relationships $\Delta E(1-)<0$ and $\Delta E(1+)<0$ are satisfied and $\Delta E(1-)$ exceeds $\Delta E(1+)$, exchanging the node candidates $I(j)$ with the node candidates $I(j)+1$ and exchanging the value of the first objective function obtained by the exchange, with the value of the original first objective function, both in a decreasing order for j as odd numbers and in an increasing order for j as even numbers; when the value of the first objective function obtained at the completion of the sequential processes is less than the value of the original first objective function from which the threshold is subtracted, performing the above exchanges again in a decreasing order for j as odd numbers and in an increasing order for j as even numbers; and when the exchange of the node candidates is not performed at all or the value of the first objective function exceeds the value of the original first objective function from which the threshold is subtracted, completing the processing. Therefore, the same effects as mentioned above are achieved.

According to a 40th aspect of the present invention, in a recording medium for one-dimensional time series data compression program as defined in any of the 28th to 31st, the program performs the calculation of the quasi-optimal node candidates, on the assumption that the indices of the node candidates numbered in an increasing order are described as $I(j)$ ($0 \leq j \leq m$), according to a procedure comprising: when a relationship $I(j-1)<I(j)-1$ is satisfied, calculating a value of the first objective function obtained at the exchange of node candidates $I(j)$ with node candidates $I(j)-1$, calculating a value $\Delta E(1-)$ which is the value of the first objective function from which the value of the original first objective function is subtracted, and setting the value $\Delta E(1-)$ to zero when $I(j-1) \geq I(j)-1$; when a relationship $I(j)+1<I(j+1)$ is satisfied, calculating a value of the first objective function obtained at the exchange of node candidates $I(j)$ with node candidates $I(j)+1$, calculating a value $\Delta E(1+)$ which is the value of the first objective function from which the value of the original first objective function is subtracted, and setting the value $\Delta E(1+)$ to zero when $I(j)+1 \geq I(j+1)$; when relationships $\Delta E(1-)<0$ and $\Delta E(1+) \geq 0$ are satisfied, exchaning the node candidates $I(j)$ with the node candidates $I(j)-1$, and exchanging the value of the first objective function obtained by the exchange, with the value of the original first objective function; when relationships $\Delta E(1-) \geq 0$ and $\Delta E(1+)<0$ are satisfied, exchanging the node candidates $I(j)$ with the node candidates $I(j)+1$, and exchanging the value of the first objective function obtained by the exchange, with the value of the original first objective function; when relationships $\Delta E(1-) \geq 0$ and $\Delta E(1+) \geq 0$ are satisfied, not performing exchange of the node candidates $I(j)$; when relationships $\Delta E(1-)<0$ and $\Delta E(1+)<0$ are satisfied and $\Delta E(1-)$ is less then $\Delta E(1+)$, exchanging the node candidates $I(j)$ with the node candidates $I(j)-1$, and exchanging the value of the first objective function obtained by the exchange, with the value of the original first objective function; when relationships $\Delta E(1-)<0$ and $\Delta E(1+)<0$ are satisfied and $\Delta E(1-)$ exceeds $\Delta E(1+)$, successively exchanging the node candidates $I(j)$ with the node candidates $I(j)+1$ and exchanging the value of the first objective function obtained by the exchange, with the value of the original first objective function, both initially from j=1 to j=[m/2] and then from j=m−1 to j=[m/2]+1; when the value of the first objective function obtained at the completion of the sequential processes is less than the value of the original first objective function from which the threshold is subtracted, performing the above exchanges again, successively from j=1 to j=[m/2] and then from j=m−1 to j=[m/2]+1; and when the exchange of the node candidates is not performed at all, or the value of the first objective function exceeds the value of the original first objective function from which the threshold is subtracted, completing the processing. Therefore, the same effects as mentioned above are achieved.

According to a 41st aspect of the present invention, in a recording medium for one-dimensional time series data compression program as defined in any of the 28th to 31st aspects, the program performs the calculation of the quasi-optimal node candidates, on the assumption that the indices of the node candidates numbered in an increasing order are described as $I(j)$ ($0 \leq j \leq m$), according to a procedure comprising: when a relationship $I(j-1)<I(j)-1$ is satisfied, calculating a value of the first objective function obtained at the exchange of node candidates $I(j)$ with node candidates $I(j)-1$, calculating a value $\Delta E(1-)$ which is the value of the first objective function from which the value of the original first objective function is subtracted, and setting the value $\Delta E(1-)$ to zero when $I(j-1) \geq I(j)-1$; when a relationship $I(j)+1 < I(j+1)$ is satisfied, calculating a value of the first objective function obtained at the exchange of node candidates $I(j)$ with node candidates $I(j)+1$, calculating a value $\Delta E(1+)$ which is the value of the first objective function from which the value of the original first objective function is subtracted, and setting the value $\Delta E(1+)$ to zero when $I(j)+1 \geq I(j+1)$; when relationships $\Delta E(1-) < 0$ and $\Delta E(1+) \geq 0$ are satisfied, exchanging the node candidates $I(j)$ with the node candidates $I(j)-1$, and exchanging the value of the first objective function obtained by the exchange, with the value of the original first objective function; when relationships $\Delta E(1-) \geq 0$ and $\Delta E(1+) < 0$ are satisfied, exchanging the node candidates $I(j)$ with the node candidates $I(j)+1$, and exchanging the value of the first objective function obtained by the exchange, with the value of the original first objective function; when relationships $\Delta E(1-) \geq 0$ and $\Delta E(1+) \geq 0$ are satisfied, not performing exchange of the node candidates $I(j)$; when relationships $\Delta E(1-) < 0$ and $\Delta E(1+) < 0$ are satisfied and $\Delta E(1-)$ is less than $\Delta E(1+)$, exchanging the node candidates $I(j)$ with the node candidates $I(j)-1$, and exchanging the value of the first objective function obtained by the exchange, with the value of the original first objective function; when relationships $\Delta E(1-) < 0$ and $\Delta E(1+) < 0$ are satisfied and $\Delta E(1-)$ exceeds $\Delta E(1+)$, exchanging the node candidates $I(j)$ with the node candidates $I(j)+1$ and then exchanging the value of the first objective function obtained by the exchange, with the value of the original first objective function, both successively from $j=[m/2]$ to $j=1$, and then from $j=[m/2]+1$ to $j=m-1$; when the value of the first objective function obtained at the completion of the sequential processes is less than the value of the original first objective function from which the threshold is subtracted, performing the above exchanges again, successively from $j=[m/2]$ to $j=1$ and then from $j=[m/2]+1$ to $j=m-1$; and when the exchange of the node candidates is not performed at all, or the value of the first objective function exceeds the value of the original first objective function from which the threshold is subtracted, completing the processing. Therefore, the same effects as mentioned above are achieved.

According to a 42nd aspect of the present invention, in a recording medium for one-dimensional time series data compression program as defined in any of the 28th to 31st aspects, the program performs the calculation of the quasi-optimal node candidates, on the assumption that the indices of the node candidates numbered in an increasing order are described as $I(j)$ ($0 \leq j \leq m$), according to a procedure comprising: when a relationship $I(j-1) < I(j)-1$ is satisfied, calculating a value of the first objective function obtained at the exchange of node candidates $I(j)$ with node candidates $I(j)-1$ calculating a value $\Delta E(1-)$ which is the value of the first objective function from which the value of the original first objective function is subtracted, and setting the value $\Delta E(1-)$ to zero when $I(j-1) \geq I(j)-1$; when a relationship $I(j)+1 < I(j+1)$ is satisfied, calculating a value of the first objective function obtained at the exchange of node candidates $I(j)$ with node candidates $I(j)+1$, calculating a value $\Delta E(1+)$ which is the value of the first objective function from which the value of the original first objective function is subtracted, and setting the value $\Delta E(1+)$ to zero when $I(j)+1 \geq I(j+1)$; when relationships $\Delta E(1-) < 0$ and $\Delta E(1+) \geq 0$ are satisfied, exchanging the node candidates $I(j)$ with the node candidates $I(j)-1$, and exchanging the value of the first objective function obtained by the exchange, with the value of the original first objective function; when relationships $\Delta E(1-) \geq 0$ and $\Delta E(1+) < 0$ are satisfied, exchanging the node candidates $I(j)$ with the node candidates $I(j)+1$, and exchanging the value of the first objective function obtained by the exchange, with the value of the original first objective function; when relationships $\Delta E(1-) \geq 0$ and $\Delta E(1+) \geq 0$ are satisfied, not performing exchange of the node candidates $I(j)$; when relationships $\Delta E(1-) < 0$ and $\Delta E(1+) < 0$ are satisfied and $\Delta E(1-)$ is less than $\Delta E(1+)$, exchanging the node candidates $I(j)$ with the node candidates $I(j)-1$, and exchanging the value of the first objective function obtained by the exchange, with the value of the original first objective function; when relationships $\Delta E(1-) < 0$ and $\Delta E(1+) < 0$ are satisfied and $\Delta E(1-)$ exceeds $\Delta E(1+)$, exchanging the node candidate $I(j)$ with the node candidates and then exchanging the value of the first objective function obtained by the exchange, with the value of the original first objective function, both successively from $j=1$ to $j=m-1$; when the value of the first objective function obtained at the completion of the sequential processes is less than the value of the original first objective function from which the threshold is subtracted, successively preforming the above exchanges again from $j=1$ to $j=m-1$; and when the exchange of the node candidates is not performed at all, or the value of the first objective function exceeds the value of the original first objective function from which the threshold is subtracted, completing the processing. Therefore, the same effects as mentioned above are achieved.

According to a 43rd aspect of the present invention, in a recording medium for one-dimensional time series data compression program as defined in any of the 28th to 31st aspects, the program performs the calculation of the quasi-optimal node candidates, on the assumption that the indices of the node candidates numbered in an increasing order are described as $I(j)$ ($0 \leq j \leq m$), according to a procedure comprising: when a relationship $I(j-1) < I(j)-1$ is satisfied, calculating a value of the first objective function obtained at the exchange of node candidates $I(j)$ with node candidates $I(j)-1$, calculating a value $\Delta E(1-)$ which is the value of the first objective function from which the value of the original first objective function is subtracted, and setting the value $\Delta E(1-)$ to zero when $I(j-1) \geq I(j)-1$; when a relationship $I(j)+1 < I(j+1)$ is satisfied, calculating a value of the first objective function obtained at the exchange of node candidates $I(j)$ with node candidates $I(j)+1$, calculating a value $\Delta E(1+)$ which is the value of the first objective function from which the value of the original first objective function is subtracted, and setting the value $\Delta E(1+)$ to zero when $I(j)+1 \geq I(j+1)$; when relationships $\Delta E(1-) < 0$ and $\Delta E(1+) \geq 0$ are satisfied, exchanging the node candidates $I(j)$ with the node candidates $I(j)-1$, and exchanging the value of the first objective function obtained by the exchange, with the value of the original first objective function; when relationships $\Delta E(1-) \geq 0$ and $\Delta E(1+) < 0$ are satisfied, exchanging the node candidates $I(j)$ with the node candidates $I(j)+1$, and exchanging the value of the first objective function obtained by the exchange, with the value of the original first objective function; when relationships of $\Delta E(1-) \geq 0$ and $\Delta E(1+) \geq 0$ are satisfied, not performing exchange of the node candidates $I(j)$; when relationships $\Delta E(1-) < 0$ and $\Delta E(1+) < 0$ are satisfied and $\Delta E(1-)$ is less than $\Delta E(1+)$, exchanging the node candidates $I(j)$ with the node candidates $I(j)-1$, and exchanging the value of the first objective function obtained by the exchange, with the value of the original first objective function; when relationships $\Delta E(1-) < 0$ and $\Delta E(1+) < 0$ are satisfied and $\Delta E(1-)$ exceeds $\Delta E(1+)$, exchanging the node candidates $I(j)$ with the node candidates $I(j)+1$ and then exchanging the value of the first objective function obtained by the exchange, with the value of the original first objective function, both successively from j=m−1 to j=1; when the value of the first objective function obtained at the completion of the sequential processes is less than the value of the original first objective function from which the threshold is subtracted, successively performing the above exchanges again from j=m−1 to j=1; and when the exchange of the node candidates is not performed at all, or the value of the first objective function exceeds the value of the original first objective function from which the threshold is subtracted, completing the processing. Therefore, the same effects as mentioned above are achieved.

According to a 44th aspect of the present invention, a recording medium for one-dimensional time series data compression program as defined in any of the 28th to 31st aspects stores an one-dimensional time series data compression program wherein, when the number of the finally decided node candidates are less than the number of the data not selected as the node candidates, compressed data is output consisting of the identifier indicating the node candidates, the index numbers of the finally decided node candidates, and the values of the node candidates and, when the number of the finally decided node candidates exceeds the number of the data not selected as the node candidates, compressed data is output consisting of the identifier indicating non-node candidates, the index numbers of the data not selected as the node candidates, and the values of the node candidates. Therefore, the same effects as mentioned above are achieved.

According to a 45th aspect of the present invention, a recording medium for compression program of one-dimensional time series data as defined in any of the 28th to 31st aspects store a compression program wherein data compression is performed individually for time data and data of the one-dimensional time series data at irregular time intervals, to compress the time data and the data separately. Therefore, the same effects as mentioned above are achieved for one-dimensional time series data at irregular time intervals.

According to a 46th aspect of the present invention, a recording medium for one-dimensional time series data compression program defined in any of the 28th to 31st aspects stores a compression program wherein data compression is performed individually for each of the plural one dimensional time series data constituting multi-dimensional time series data to compress the multi-dimensional time series data. Therefore, the same effects as mentioned above are achieved for multi-dimensional time series data.

According to a 47th aspect of the present invention, a recording medium for one-dimensional time series data compression program as defined in any of the 28th to 31st aspects stores a compression program wherein, for plural one-dimensional time series data whose errors propagate, data compression is repeated with an approximation accuracy increasing gradually from one of the time series data from which the propagation starts, to compress all of the data. Therefore, in addition to the above-mentioned effects, data compression is performed without increasing propagation of errors.

According to a 48th aspect of the present invention, there is provided a recording medium for one-dimensional time series data decompression program storing a decompression program which performs the decompression of data compressed by a program stored in a recording medium for one-dimensional time series data compression program as defined in any of the 26th, 28th, and 29th aspects, the decompression program comprises a first process of inputting compressed data and a number of data to be obtained by decompressing the compressed data; a second process of interpolating the compressed data using an interpolation function identical to that used for compression to calculate data whose number is equal to the data number, and calculating time data whose number is equal to the data number on the basis of an initial time and a time interval; and a third process of outputting the data and the time both calculated in the second process. Since continuous data processing using an interpolation function is performed in decompression, compressed data, which have been compressed by any of the above-mentioned compression methods, can be decompressed. In addition, data decompression at an arbitrary number is possible.

According to a 49th aspect of the present invention, there is provided a recording medium for one-dimensional time series data decompression program storing a decompression program which performs the decompress of data compressed by a program stared in a recording medium for one-dimensional time series data compression program as defined in any of the 27th, 30th, and 31st aspects, the decompression program comprises first process of inputting compressed data and a number of data to be obtained by decompressing the compressed data; a second process of calculating zero data whose number is equal to the data number and, and calculating time data whose number is equal to the data number based on an initial time and a time interval, when an identifier indicating that the compressed data are all zero is attached to the compressed data, or interpolating the compression data using an interpolation function identical to that used for compression to calculate data whose number is equal to the data number and calculating time data whose number is equal to the data number based on the initial time and the time interval, when an identifier indicating that the compressed data are all zero is not attached to the compressed data; and a third process of outputting the data and time data calculated in the second process. Since continuous data processing using an interpolation function is performed in decompression, compressed data, which have been compressed by any of the above-mentioned compression methods, can be decompressed. In addition, data decompression at an arbitrary number is possible.

According to a 50th aspect of the present invention a recording medium for one-dimensional time series data decompression program as defined in any of the 48th and 49th aspects stores a decompression program including a program wherein data decompression is performed individually for each of plural compressed one-dimensional time series data constituting compressed multi-dimensional time series data, to decompress the compressed multi-dimensional time series data. Therefore, the same effects as mentioned above are achieved for multi-dimensional time series data.

According to a 51st aspect of the present invention, a compression device for one-dimensional time series data at uniform time intervals comprises a first means of inputting the one-dimensional time series data and an approximation accuracy thereof; a second means of calculating node candidates of an interpolation function approximating the one-dimensional time series data; a third means of optimizing positions of the node candidates; a fourth means of judging an error between one-dimensional time series data produced using the interpolation function, based on the node candidates at optimized positions, and the original one-dimensional time series data; a fifth means of judging an error between one-dimensional time series data produced using the interpolation function on the basis of the node candidates at optimized positions and the original one-dimensional time series data, and changing a node number and returning to the second means when the error exceeds a value based on the approximation accuracy; and a sixth means of outputting data of the node candidates and corresponding time data as compressed data when it is judged in the fifth means that the error does not exceed the value based on the approximation accuracy. Therefore, compression adapted to the properties of the given one-dimensional time series data is performed. In addition, since the compression ratio is controlled by the approximation accuracy, errors after decompression can be grasped in advance.

According to a 52nd aspect of the present invention, a compression device for one-dimensional time series data at uniform time intervals comprises a first means of inputting the one-dimensional time series data and an approximation accuracy thereof; a second means of judging whether the one-dimensional time series data includes data within the approximation accuracy or not; a third means of calculating node candidates of an interpolation function which approximates the one-dimensional time series data, when the one-dimensional time series data includes no data within the approximation accuracy; a fourth means of optimizing positions of the node candidates; a fifth means of judging an error between one-dimensional time series data produced on the basis of the node candidates at optimized positions, using the interpolation function, and the original one-dimensional time series data; a sixth means of judging an error between one-dimensional time series data produced on the basis of the node candidates whose number is optimized, using the interpolation function, and the original one-dimensional time series data, and changing a node number and returning to the second means when the error exceeds a value based on the approximation accuracy; and a seventh means of outputting information indicating that the one-dimensional time series data includes data within the approximation accuracy when it is judged in the second means that the one-dimensional time series data includes the data within the approximation accuracy, or outputting data of the node candidates and corresponding time data as compressed data when it is judged in the sixth means that the error does not exceed the value based on the approximation accuracy. Therefore, compression adapted to the properties of the given one-dimensional time series data is performed. In addition, since the compression ratio is controlled by the approximation accuracy, errors after decompression can be grasped in advance.

According to a 53th aspect of the present invention, a compression device for one-dimensional time series data at uniform time intervals comprises a first means of inputting the one-dimensional time series data and an approximation accuracy thereof, attaching indices to the one-dimensional time series data in a temporal order, and calculating an initial node number of an interpolation function which interpolates the one-dimensional time series data; a second means of deciding node candidates including start data and end data, at random, in such a way that a number of decided candidates corresponds to the node number; a third means of interpolating the node candidates, using an interpolation function which utilizes the index numbers of the node candidates as an independent variable, and calculating an error between the interpolation result and the original one-dimensional time series data; a fourth means of calculating, from the error, a value of a first objective function defined as weighted sum of the maximum value of the error, the average of the error, and the variance of the error; a fifth means of changing the node candidates repeatedly until the first objective function takes a smallest value and deciding quasi-optimal node candidates; a sixth means of interpolating the quasi-optimal node candidates using the interpolation function, to generate one-dimensional time series data approximating the original one-dimensional time series data, and calculating an error between the one-dimensional time series data and the original one-dimensional time series data; a seventh means of calculating, from the error, a second objective function defined as weighted sum of the maximum value of the error, the average of the error, and the variance of the error; an eighth means of deciding the node number with an increment as a new node number when the value of the second objective function is greater than or equal to a threshold corresponding to the approximation accuracy, and repeating the second to seventh means; and a ninth means of outputting an initial time and a time interval of the one-dimensional time series data, and compressed data consisting of index numbers of finally decided node candidates and the values of the node candidates, when the value of the second objective function is less than the threshold. Therefore, compression adapted to the properties of the given one-dimensional time series data is performed. In addition, since the compression ratio is controlled by the approximation accuracy, errors after decompression can be grasped in advance.

According to a 54th aspect of the present invention, a compression device for one-dimensional time series data at uniform time intervals comprises a first means of inputting the one-dimensional time series data and an approximation accuracy thereof, and attaching indices to the one-dimensional time series data in a temporal order, and calculating an initial node number of an interpolation function interpolating the one-dimensional time series data; a second means of deciding node candidates including start and end data and having the indices attached at approximately equal intervals, in such a way that the number of the decided node candidates corresponds to the initial node number; a third means of interpolating the node candidates with an interpolation function using the index numbers of the node candidates as an independent variable and calculating an error between the interpolation result and the original one-dimensional time series data; a forth means of calculating, from the error, a value of a first objective function defined as weighted sum of the maximum of the error, the average of the error, and the variance of the error; a fifth means of changing the node candidates repeatedly until the first objective function tales a smallest value, and deciding quasi-optimal node candidates; a sixth means of interpolating the quasi-optimal node candidates with the interpolation function to generate one-dimensional time series data approximating the original one-dimensional time series data, and calculating an error between the one-dimensional time series data and the original one-dimensional time series data; a seventh means of calculating, from the error, a value of a second objective function defined as weighted sum of the maximum value of the error, the average of the error, and the variance of the error; an eighth means of employing the node number with an increment as a new node number and repeating the second to seventh means when the value of the second objective function exceeds a threshold corresponding to the approximation accuracy; and a ninth means of outputting an initial time and a time interval of the one-dimensional time series data, and compressed data consisting of index numbers of finally decided node candidates, and the values of the node candidates when the value of the second objective function is less than the threshold. Therefore, compression adapted to the properties of the given one-dimensional time series data is performed. In addition, since the compression ratio is controlled by the approximation accuracy, errors after decompression can be grasped in advance.

According to a 55th aspect of the present invention, a compression device for one-dimensional time series data at uniform time intervals comprises a first means of inputting the one-dimensional time series data and an approximation accuracy thereof, and attaching indices to the one-dimensional time series data in a temporal order, and calculating an initial node number of an interpolation function which interpolates the one-dimensional time series data; a second means of judging whether all the absolute values of the one-dimensional time series data are less than the approximation accuracy or not, and when the absolute values are all less than the approximation accuracy, outputting an identifier indicating that all the values are zero to complete the processing, or proceeding to a third means described later when all the absolute values are not less then the approximation accuracy; a third means of deciding node candidates including start data and end data, at random, in such a way that a number of decided node candidates corresponds to the initial node number; a forth means of interpolating the node candidates with an interpolation function using the index numbers of the node candidates as an independent variable and calculating an error between the interpolation result and the original one-dimensional time series data; a fifth means of calculating, from the error, a value of a first objective function defined as weighted sum of the maximum value of the error, the average of the error, and the variance of the error; a sixth means of changing the node candidates repeatedly until the first objective function takes a smallest value and deciding quasi-optimal node candidates; a seventh means of interpolating the quasi-optimal node candidates using the interpolation function to generate one-dimensional time series data approximating the original one-dimensional time series data and calculating an error between the one-dimensional time series data and the original one-dimensional time series data; an eighth means of calculating, from the error, a value of second objective function defined as weighted sum of the maximum value of the error, the average of the error, and the variance of the error; a ninth means of deciding the node number with an increment as a new node number when the value of the second objective function is greater than or equal to a threshold corresponding to the approximation accuracy, and repeating the processes performed by the third to eighth means; and a tenth means of outputting an initial time and a time interval of the one-dimensional time series data, and compressed data consisting of index numbers of finally decided node candidates and the values of the node candidates, when the value of the second objective function is less than the threshold. Therefore, compression adapted to the properties of the given one-dimensional time series data is performed. In addition, since the compression ratio is controlled by the approximation accuracy, errors after decompression can be grasped in advance.

According to a 56th aspect of the present invention, a compression device for one-dimensional time series data at uniform time intervals comprises a first means of inputting the one-dimensional time series data and an approximation accuracy thereof, and attaching indices to the one-dimensional time series data in a temporal order, and calculating an initial node number of an interpolation function interpolating the one-dimensional time series data; a second means of judging whether all the absolute values of the one-dimensional time series data are less than the approximation accuracy or not, and when the values are all less than the approximation accuracy, outputting an identifier indicating that all the values are zero to complete the processing, or proceeding to a third means described later when all the absolute values are not less than the approximation accuracy; a third means of deciding node candidates including start and end data and having the indices attached at approximately equal intervals, in such a way that the number of the node candidates corresponds to the initial node number; a fourth means of interpolating the node candidates by an interpolating function using the index numbers of the node candidates as an independent variable and calculating an error between the interpolation result and the original one-dimensional time series data; a fifth means of calculating, from the error, a value of a first objective function defined as weighed sum of the maximum of the error, the average of the error, and the variance of the error; a sixth means of changing the node candidates repeatedly until the first objective function takes a smallest value, and deciding quasi-optimal node candidates; a seventh means of interpolating the quasi-optimal node candidates with the interpolation function to generate one-dimensional time series data approximating the original one-dimensional time series data, and calculating an error between the one-dimensional time series data and the original one-dimensional time series data; an eighth means of calculating, from the error, a value of a second objective function defined as weighted sum of the maximum value of the error, the average of the error, and the variance of the error; a ninth means of employing the node number with an increment as a new node number and repeating the third to eighth means when the value of the second objective function is greater than or equal to a threshold corresponding to the approximation accuracy; and a tenth means of outputting a start time and a time interval of the one-dimensional time series data, and compressed data consisting of index numbers of finally decided node candidates and the values of the node candidates when the value of the second objective function is less than the threshold. Therefore, compression adapted to the properties of the given one-dimensional time series data is performed. In addition, since the compression ratio is controlled by the approximation accuracy, errors after decompression can be grasped in advance. Further, with respect to data within the approximation accuracy, processes for these data can be dispensed with.

According to a 57th aspect of the present invention, in a compression device for one-dimensional time series data as defined in any of the 52nd to 56th aspects, assuming that the indices of the node candidates numbered in an increasing order are described as $I(j)$ ($0 \leq j \leq m$), the quasi-optimal node candidates are calculated in the steps of: when a relationship $I(j-1)<I(j)-1$ is satisfied, calculating a value of the first objective function at the exchange of node candidates $I(j)$ with node candidates $I(j)-1$, calculating a value $\Delta E(1-)$ which is the value of the first objective function from which the value of the original first objective function is subtracted, and setting the value $\Delta E(1-)$ to zero when $I(j-1) \geq I(j)-1$; when a relationship $I(j)+1<I(j+1)$ is satisfied, calculating a value of the first objective function at the exchange of node candidates $I(j)$ with node candidates $I(j)+1$, calculating a value $\Delta E(1+)$ which is the value of the first objective function from which the value of the original first objective function is subtracted, and setting the value $\Delta E(1+)$ to zero when $I(j)+1 \geq I(j+1)$; when relationships $\Delta E(1-)<0$ and ΔE(1+)≧0 are satisfied, exchanging the node candidates I(j) with the node candidates I(j)−1; when relationships ΔE(1−)≧0 and ΔE(1+)<0 are satisfied, exchanging the node candidates I(j) with the node candidates I(j)+1; when relationships ΔE(1−)≧0 and ΔE(1+)≧0 are satisfied, not performing exchange of the node candidates I(j); when relationships ΔE(1−)<0 and ΔE(1+)<0 are satisfied and ΔE(1−) is less than ΔE(1+), exchanging the node candidates I(j) with the node candidates I(j)−1; when relationships ΔE(1−)<0 and ΔE(1+)<0 are satisfied and ΔE(1−) exceeds ΔE(1+), exchanging the node candidates I(j) with the node candidates I(j)+1 in an increasing order for j of odd numbers and in a decreasing order for j of even numbers; when the value of the first objective function obtained at the completion of the sequential processes is less than the value of the original first objective function from which the threshold is subtracted, exchanging the node candidates again in an increasing order for j of odd numbers and in a decreasing order for j of even numbers; and when the exchange of the node candidates is not performed at all, or the value of the first objective function exceeds the value of the original first objective function from which the threshold is subtracted, completing the processing. Therefore, a process of obtaining quasi-optimal nodes of an interpolation function is realized. Thereby, compression adapted to the properties of the given one-dimensional time series data is performed. In addition, since the compression ratio is controlled by the approximation accuracy, errors after decompression can be grasped in advance.

According to a 58th aspect of the present invention, in a compression device for one-dimensional time series data as defined in any of the 53rd to 56th aspects, assuming that the indices of the node candidates numbered in an increasing order are described as I(j) ($0 \leq j \leq m$), the quasi-optimal candidates are calculated in the steps of: when a relationship I(j−1)<I(j)−1 is satisfied, calculating a value of the first objective function obtained at the exchange of node candidates I(j) with node candidates I(j)−1, calculating a value ΔE(1−) which is the value of the first objective function from which the value of the original first objective function is subtracted, and setting the value ΔE(1−) to zero when I(j−1)≧I(j)−1; when a relationship I(j)+1<I(j+1) is satisfied, calculating a value of the first objective function obtained at the exchange of node candidates I(j) with node candidates I(j)+1, calculating a value ΔE(1+) which is the value of the first objective function from which the value of the original first objective function is subtracted, and setting the value ΔE(1+) to zero when I(j)+1≧I(j+1); when relationships ΔE(1−)<0 and ΔE(1+)≧0 are satisfied, exchanging the node candidates I(j) with the node candidates I(j)−1; when relationships ΔE(1−)≧0 and ΔE(1+)<0 are satisfied, exchanging the node candidates I(j) with the node candidates I(j)+1; when relationships ΔE(1−)≧0 and ΔE(1+)≧0 are satisfied, not performing exchange of the node candidates I(j); when relationships ΔE(1−)<0 and ΔE(1+)<0 are satisfied and ΔE(1−) is less than ΔE(1+), exchanging the node candidates I(j) with the node candidates I(j)−1; when relationships ΔE(1−)<0 and ΔE(1+)<0 are satisfied and ΔE(1−) exceeds ΔE(1+), exchanging the node candidates I(j) with the node candidates I(j)+1 in a decreasing order for j of odd numbers and in an increasing order for j of even numbers; when the value of the first objective function obtained at the completion of the sequential processes is less than the value of the original first objective function from which the threshold is subtracted, exchanging the node candidates again in a decreasing order for j of odd numbers and in an increasing order for j of even numbers; and when the exchange of the node candidates is not performed at all, or the value of the first objective function exceeds the value of the original first objective function from which the threshold is subtracted, completing the processing. Therefore, the same effects as mentioned above are achieved.

According to a 59th aspect of the present invention, in a compression device for one-dimensional time series data as defined in any of the 53rd to 56th aspects, assuming that the indices of the node candidates numbered in an increasing order are described as I(j) ($0 \leq j \leq m$), the quasi-optimal candidates are calculated in the steps of: when a relationship I(j−1)<I(j)−1 is satisfied, calculating a value of the first objective function obtained at the exchange of node candidates I(j) with node candidates I(j)−1, calculating a value ΔE(1−) which is the value of the first objective function from which the value of the original first objective function is subtracted, and setting the value ΔE(1−) to zero when I(j−1)≧I(j)−1; when a relationship I(j)+1<I(j+1) is satisfied, calculating a value of the first objective function obtained at the exchange of node candidates I(j) with node candidates I(j)+1, calculating a value ΔE(1+) which is the value of the first objective function from which the value of the original first objective function is subtracted, and setting the value ΔE(1+) to zero when I(j)+1≧I(j+1); when relationships ΔE(1−)<0 and ΔE(1+)≧0 are satisfied, exchanging the node candidates I(j) with the node candidates I(j)−1; when relationships ΔE(1−)≧0 and ΔE(1+)<0 are satisfied, exchanging the node candidates I(j) with the node candidates I(j)+1; when relationships ΔE(1−)≧0 and ΔE(1+)≧0 are satisfied, not performing exchange of the node candidates I(j); when relationships ΔE(1−)<0 and ΔE(1+)<0 are satisfied and ΔE(1−) is less than ΔE(1+), exchanging the node candidates I(j) with the node candidates I(j)−1; when relationships ΔE(1−)<0 and ΔE(1+)<0 are satisfied and ΔE(1−) exceeds ΔE(1+), successively exchanging the node candidates I(j) with the node candidates I(j)+1, initially from j=1 to j=[m/2] and then from j=m−1 to j=[m/2]+1; when the value of the first objective function obtained at the completion of the sequential processes is less than the value of the original first objective function from which the threshold is subtracted, successively exchanging the nodes candidates again, from j=1 to j=[m/2] and then from j=m−1 to j=[m/2]+1; and when the exchange of the node candidates is not performed at all, or the value of the first objective function exceeds the value of the original first objective function from which the threshold is subtracted, completing the processing. Therefore, the same effects as mentioned above are achieved.

According to a 60th aspect of the present invention, in a compression device for one-dimensional time series data as defined in any of the 53rd to 56th aspects, assuming that the indices of the node candidates numbered in an increasing order are described as I(j) ($0 \leq j \leq m$), the quasi-optimal candidates are calculated in the steps of: when a relationship I(j−1)<I(j)−1 is satisfied, calculating a value of the first objective function obtained at the exchange of node candidates I(j) with node candidates I(j)−1, calculating a value ΔE(1−) which is the value of the first objective function from which the value of the original first objective function is subtracted, and setting the value ΔE(1−) to zero when i(j−1)≧I(j)−1; when a relationship I(j)+1<I(j+1) is satisfied, calculating a value of the first objective function obtained at the exchange of node candidates I(j) with node candidates I(j)+1, calculating a value ΔE(1+) which is the value of the first objective function from which the value of the original first objective function is subtracted, and setting the value ΔE(1+) to zero when I(j)+1≧I(j+1); when relationships $\Delta E(1-)<0$ and $\Delta E(1+)\geq 0$ are satisfied, exchanging the node candidates I(j) with the node candidates I(j)−1; when relationships $\Delta E(1-)\geq 0$ and $\Delta E(1+)<0$ are satisfied, exchanging the node candidates I(j) with the node candidates I(j)+1; when relationships $\Delta E(1-)\geq 0$ and $\Delta E(1+)\geq 0$ are satisfied, not performing exchange of the node candidates I(j); when relationships $\Delta E(1-)<0$ and $\Delta E(1+)<0$ are satisfied and $\Delta E(1-)$ is less than $\Delta E(1+)$, exchanging the node candidates I(j) with the node candidates I(j)−1; when relationships $\Delta E(1-)<0$ and $\Delta E(1+)<0$ are satisfied and $\Delta E(1-)$ exceeds $\Delta E(1+)$, successively exchanging the node candidates I(j) with the node candidates I(j)+1, initially from j=[m/2] to j=1 and then from j=[m/2]+1 to j=m−1; when the value of the first objective function obtained at the completion of the sequential processes is less than the value of the original first objective function from which the threshold is subtracted, successively exchanging the node candidates again, from j=[m/2] to j=1 and then from j=[m/2]+1 to j=m−1; and when the exchange of the node candidates is not performed at all, or the value of the first objective function exceeds the value of the original first objective function from which the threshold is subtracted, completing the processing. Therefore, the same effects as mentioned above are achieved.

According to a 61st aspect of the present invention, in a compression device for one-dimensional time series data as defined in any of the 53rd to 56th aspects, assuming that the indices of the node candidates numbered in an increasing order are described as I(j) ($0\geq j\geq m$), the quasi-optimal candidates are calculated in the steps of: when a relationship of $I(j-1)<I(j)-1$ is satisfied, calculating a value of the first objective function obtained at the exchange of node candidates I(j) with node candidates I(j)−1, calculating a value $\Delta E(1-)$ which is the value of the first objective function from which the value of the original first objective function is subtracted, and setting the value $\Delta E(1-)$ to zero when $I(j-1)\geq I(j)-1$; when a relationship $I(j)+1<I(j+1)$ is satisfied, calculating a value of the first objective function obtained at the exchange of node candidates I(j) with node candidates I(j)+1, calculating a value $\Delta E(1+)$ which is the value of the first objective function from which the value of the original first objective function is subtracted, and setting the value $\Delta E(1+)$ to zero when $I(j)+1\geq I(j+1)$; when relationships $\Delta E(1-)<0$ and $\Delta E(1+)\geq 0$ are satisfied, exchanging the node candidates I(j) with the node candidates I(j)−1; when relationships $\Delta E(1-)\geq 0$ and $\Delta E(1+)<0$ are satisfied, exchanging the node candidates I(j) with the node candidates I(j)+1; when relationships $\Delta E(1-)\geq 0$ and $\Delta E(1+)\geq 0$ are satisfied, not performing exchange of the node candidates I(j); when relationships $\Delta E(1-)<0$ and $\Delta E(1+)<0$ are satisfied and $\Delta E(1-)$ is less than $\Delta E(1+)$, exchanging the node candidates I(j) with the node candidates I(j)−1; when relationships $\Delta E(1-)<0$ and $\Delta E(1+)<0$ are satisfied and $\Delta E(1-)$ exceeds $\Delta E(1+)$, exchanging the node candidates I(j) with the node candidates I(j)+1 successively from j=1 to j=m−1; when the value of the first objective function obtained at the completion of the successive processes is less than the value of the original first objective function from which the threshold is subtracted, successively exchanging the node candidates again, from j=1 to j=m−1; and when the exchange of the node candidates is not performed at all, or the value of the first objective function exceeds the value of the original first objective function from which the threshold is subtracted, completing the processing. Therefore, the same effects as mentioned above are achieved.

According to a 62nd aspect of the present invention, in a compression device for one-dimensional time series data as defined in any of the 53rd to 56th aspects, assuming that the indices of the node candidates numbered in an increasing order are described as I(j) ($0\leq j\leq m$), the quasi-optimal candidates are calculated in the steps of: when a relationship $I(j-1)<I(j)-1$ is satisfied, calculating a value of the first objective function obtained at the exchange of node candidates I(j) with node candidates I(j)−1, calculating a value $\Delta E(1-)$ which is the value of the first objective function from which the value of the original first objective function is subtracted, and setting the value $\Delta E(1-)$ to zero when $I(j-1)\geq I(j)-1$; when a relationship $I(j)+1<I(j+1)$ is satisfied, calculating a value of the first objective function obtained at the exchange of node candidates I(j) with node candidates I(j)+1, calculating a value $\Delta E(1+)$ which is the value of the first objective function from which the value of the original first objective function is subtracted, and setting the value $\Delta E(1+)$ to zero when $I(j)+1\geq I(j+1)$; when relationships $\Delta E(1-)<0$ and $\Delta E(1+)\geq 0$ are satisfied, exchanging the node candidates I(j) with the node candidates I(j)−1; when relationships $\Delta E(1-)\geq 0$ and $\Delta E(1+)<0$ are satisfied, exchanging the node candidates I(j) with the node candidates I(j)+1; when relationships $\Delta E(1-)\geq 0$ and $\Delta E(1+)\geq 0$ are satisfied, not performing exchange of the node candidates I(j); when relationships $\Delta E(1-)<0$ and $\Delta E(1+)<0$ are satisfied and $\Delta E(1-)$ is less than $\Delta E(1+)$, exchanging the node candidates I(j) with the node candidates I(j)−1; when relationships $\Delta E(1-)<0$ and $\Delta E(1+)<0$ are satisfied and $\Delta E(1-)$ exceeds $\Delta E(1+)$, successively exchanging the node candidates I(j) with the node candidates I(j)+1 from j=m−1 to j=1; when the value of the first objective function obtained at the completion of the sequential processes is less than the value of the original first objective function from which the threshold is subtracted, successively exchanging the node candidates again from j=m−1 to j=1; and when the exchange of the node candidates is not performed at all, or the value of the first objective function exceeds the value of the original first objective function from which the threshold is subtracted, completing the processing. Therefore, the same effects as mentioned above are achieved.

According to a 63rd aspect of the present invention, in a compression device for one-dimensional time series data as defined in any of the 53rd to 56th aspects, assuming that the indices of the node candidates numbered in an increasing order are described as I(j) ($0\leq j\leq m$), the quasi-optimal candidates are calculated in the steps of: when a relationship $I(j-1)<I(j)-1$ is satisfied, calculating a value of the first objective function obtained at the exchange of node candidates I(j) with node candidates I(j)−1, calculating a value $\Delta E(1-)$ which is the value of the first objective function from which the value of the original first objective function is subtracted, and setting the value $\Delta E(1-)$ to zero when $I(j-1)\geq I(j)-1$; when a relationship $I(j)+1<I(j+1)$ is satisfied, calculating a value of the first objective function obtained at the exchange of node candidates I(j) with node candidates I(j)+1, calculating a value $\Delta E(1+)$ which is the value of the first objective function from which the value of the original first objective function is subtracted, and setting the value $\Delta E(1+)$ to zero when $I(j)+1\geq I(j+1)$; when relationships $\Delta E(1-)<0$ and $\Delta E(1+)\geq 0$ are satisfied, exchanging the node candidates I(j) with the node candidates I(j)−1, and exchanging the value of the first objective function obtained by the exchange, with the value of the original first objective function; when relationships $\Delta E(1-)\geq 0$ and $\Delta E(1+)<0$ are satisfied, exchanging the node candidates I(j) with the node candidates I(j)+1, and exchanging the value of the first objective function obtained by the exchange, with the value of the original first objective function; when relationships $\Delta E(1-) \geq 0$ and $\Delta E(1+) \geq 0$ are satisfied, not performing exchange of the node candidates $I(j)$; when relationships $\Delta E(1-)<0$ and $\Delta E(1+)<0$ are satisfied and $\Delta E(1-)$ is less than $\Delta E(1+)$, exchanging the node candidates $I(j)$ with the node candidates $I(j)-1$, and exchanging the value of the first objective function obtained by the exchange, with the value of the original first objective value; when relationships $\Delta E(1-)<0$ and $\Delta E(1+)<0$ are satisfied and $\Delta E(1-)$ exceeds $\Delta E(1+)$, exchanging the node candidates $I(j)$ with the node candidates $I(j)+1$ and then exchanging the value of the first objective function obtained by the exchange, with the value of the original objective function, both in an increasing order for j of odd numbers and in a decreasing order for j of even numbers; when the value of the first objective function obtained at the completion of the sequential processes is less than the value of the original first objective function from which the threshold is subtracted, performing the above exchanges again in an increasing order for j of odd numbers and in a decreasing order for j as even numbers; and when the exchange of the node candidates is not performed at all, or the value of the first objective function exceeds the value of the original first objective function from which the threshold is subtracted, completing the processing. Therefore, the same effects as mentioned above are achieved.

According to a 64th aspect of the present invention, in a compression device for one-dimensional time series data as defined in any of the 53rd to 56th aspects, assuming that the indices of the node candidates numbered in an increasing order are described as $I(j)$ ($0 \leq j \leq m$), the quasi-optimal candidates are calculated in the steps of: when a relationship $I(j-1)<I(j)-1$ is satisfied, calculating a value of the first objective function obtained at the exchange of node candidates $I(j)$ with node candidates $I(j)-1$, calculating a value $\Delta E(1-)$ which is the value of the first objective function from which the value of the original first objective function is subtracted, and setting the value $\Delta E(1-)$ to zero when $I(j-1) \geq I(j)-1$; when a relationship $I(j)+1<I(j+1)$ is satisfied, calculating a value of the first objective function obtained at the exchange of node candidates $I(j)$ with node candidates $I(j)+1$, calculating a value $\Delta E(1+)$ which is the value of the first objective function from which the value of the original first objective function is subtracted, and setting the value $\Delta E(1+)$ to zero when $I(j)+1 \geq I(j+1)$; when relationships $\Delta E(1-)<0$ and $\Delta E(1+) \geq 0$ are satisfied, exchanging the node candidates $I(j)$ with the node candidates $I(j)-1$, and exchanging the value of the first objective function obtained by the exchange, with the value of the original first objective function; when relationships $\Delta E(1-) \geq 0$ and $\Delta E(1+)<0$ are satisfied, exchanging the node candidates $I(j)$ with the node candidates $I(j)+1$, and exchanging the value of the first objective function obtained by the exchange, with the value of the original first objective function; when relationships $\Delta E(1-) \geq 0$ and $\Delta E(1+) \geq 0$ are satisfied, not performing exchange of the node candidates $I(j)$; when relationships $\Delta E(1-)<0$ and $\Delta E(1+)<0$ are satisfied and $\Delta E(1-)$ is less than $\Delta E(1+)$, exchanging the node candidates $I(j)$ with the node candidates $I(j)-1$, and exchanging the value of the first objective function obtained by the exchange, with the value of the original first objective function; when relationships $\Delta E(1-)<0$ and $\Delta E(1+)<0$ are satisfied and $\Delta E(1-)$ exceeds $\Delta E(1+)$, exchanging the node candidates $I(j)$ with the node candidates $I(j)+1$ and then exchanging the value of the first objective function obtained by the exchange, with the value of the original first objective function, both in a decreasing order for j as odd numbers and in an increasing order for j as even numbers; when the value of the first objective function obtained at the completion of the sequential processes is less than the value of the original first objective function from which the threshold is subtracted, performing the above exchanges again in a decreasing order for j as odd numbers and in an increasing order for j as even numbers; and when the exchange of the node candidates is not performed at all, or the value of the first objective function exceeds the value of the original first objective function from which the threshold is subtracted, completing the processing. Therefore, the same effects as mentioned above are achieved.

According to a 65th aspect of the present invention, in a compression device for one-dimensional time series data as defined in any of the 53rd to 56th aspects, assuming that the indices of the node candidates numbered in an increasing order are described as $I(j)$ ($0 \leq j \leq m$), the quasi-optimal candidates are calculated in the steps of: when a relationship $I(j-1)<I(j)-1$ is satisfied, calculating a value of the first objective function obtained at the exchange of node candidates $I(j)$ with node candidates $I(j)-1$, calculating a value $\Delta E(1-)$ which is the value of the first objective function from which the value of the original first objective function is subtracted, and setting the value $\Delta E(1-)$ to zero when $I(j-1) \geq I(j)-1$; when a relationship $I(j)+1<I(j+1)$ is satisfied, calculating a value of the first objective function obtained at the exchange of node candidates $I(j)$ with node candidates $I(j)+1$, calculating a value $\Delta E(1+)$ which is the value of the first objective function from which the value of the original first objective function is subtracted, and setting the value $\Delta E(1+)$ to zero when $I(j)+1 \geq I(j+1)$; when relationships $\Delta E(1-)<0$ and $\Delta E(1+) \geq 0$ are satisfied, exchanging the node candidates $I(j)$ with the node candidates $I(j)-1$, and exchanging the value of the first objective function obtained by the exchange, with the value of the original first objective function; when relationships $\Delta E(1-) \geq 0$ and $\Delta E(1+)<0$ are satisfied, exchanging the node candidates $I(j)$ with the node candidates $I(j)+1$, and exchanging the value of the first objective function obtained by the exchange, with the value of the original first objective function; when relationships $\Delta E(1-) \geq 0$ and $\Delta E(1+) \geq 0$ are satisfied, not performing exchange of the node candidates $I(j)$; when relationships $\Delta E(1-)<0$ and $\Delta E(1+)<0$ are satisfied and $\Delta E(1-)$ is less than $\Delta E(1+)$, exchanging the node candidates $I(j)$ with the node candidates $I(j)-1$, and exchanging the value of the first objective function obtained by the exchange, with the value of the original first objective function; when relationships $\Delta E(1-)<0$ and $\Delta E(1+)<0$ are satisfied and $\Delta E(1-)$ exceeds $\Delta E(1+)$, exchanging the node candidates $I(j)$ with the node candidates $I(j)+1$ and then exchanging the value of the first objective function obtained by the exchange, with the value of the original first objective function, both initially from $j=1$ to $j=[m/2]$ and then from $j=m-1$ to $j=[m/2]+1$; when the value of the first objective function obtained at the completion of the sequential processes is less then the value of the original first objective function from which the threshold is subtracted, performing the above exchanges again, successively from $j=1$ to $j=[m/2]$ and then from $j=m-1$ to $j=[m/2]+1$; and when the exchange of the node candidates is not performed at all, or the value of the first objective function exceeds the value of the original first objective function from which the threshold is subtracted, completing the processing. Therefore, the same effects as mentioned above are achieved.

According to a 66th aspect of the present invention, in a compression device for one-dimensional time series data as defined in any of the 53rd to 56th aspects, assuming that the indices of the node candidates numbered in an increasing order are described as I(j) (0≦j≦m), the quasi-optimal candidates are calculated in the steps of: when a relationship i(j−1l)<I(j)−1 is satisfied, calculating a value of the first objective function obtained at the exchange of node candidates I(j) with node candidates I(j)−1, calculating a value ΔE(1−) which is the value of the first objective function from which the value of the original first objective function is subtracted, and setting the value ΔE(1−) to zero when I(j−1)≧I(j)−1; when a relationship I(j)+1<I(j+1) is satisfied, calculating a value of the first objective function obtained at the exchange of node candidates I(j) with node candidates I(j)+1, calculating a value ΔE(1+) which is the value of the first objective function from which the value of the original first objective function is subtracted, and setting the value ΔE(1+) to zero when I(j)+1≧I(j+1); when relationships ΔE(1−)<0 and ΔE(1+)≧0 are satisfied, exchanging the node candidates I(j) with the node candidates I(j)−1, and exchanging the value of the first objective function obtained by the exchange, with the value of the original first objective function; when relationships ΔE(1−)≧0 and ΔE(1+)<0 are satisfied, exchanging the node candidates I(j) with the node candidates I(j)+1, and exchanging the value of the first objective function obtained by the exchange, with the value of the original first objective function; when relationships ΔE(1−)≧0 and ΔE(1+)≧0 are satisfied, not performing exchange of the node candidates I(j); when relationships ΔE(1−)<0 and ΔE(1+)<0 are satisfied and ΔE(1−) is less than ΔE(1+), exchanging the node candidates I(j) with the node candidates I(j)−1, and exchanging the value of the first objective function obtained by the exchange, with the value of the original first objective function; when relationships ΔE(1−)<0 and ΔE(1+)<0 are satisfied and ΔE(1−) exceeds ΔE(1+), exchanging the node candidates I(j) with the node candidates I(j)+1 and then exchanging the value of the first objective function obtained by the exchange, with the value of the original first objective function, both successively from j=[m/2] to j=1 and then from j=[m/2]+1 to j=m−1; when the value of the first objective function obtained at the completion of the sequential processes is less than the value of the original first objective function from which the threshold is subtracted, performing the above exchanges again, successively from j−[m/2] to j=1 and then from j=[m/2]+1 to j=m−1; and when the exchange of the node candidates is not performed at all, or the value of the first objective function exceeds the value of the original first objective function from which the threshold is subtracted, completing the processing. Therefore, the same effects as mentioned above are achieved.

According to a 67th aspect of the present invention, in a compression device for one-dimensional time series data as defined in any of the 53rd to 56th aspects, assuming that the indices of the node candidates numbered in an increasing order are described as I(j) (0≦j≦m), the quasi-optimal candidates are calculated in the steps of: when a relationship I(j−1)<I(j)−1 is satisfied, calculating a value of the first objective function obtained at the exchange of node candidates I(j) with node candidates I(j)−1, calculating a value ΔE(1−) which is the value of the first objective function from which the value of the original first objective function is subtracted, and setting the value ΔE(1−) to zero when I(j−1)≧I(j)−1; when a relationship I(j)+1<I(j+1) is satisfied, calculating a value of the first objective function obtained at the exchange of node candidates I(j) with node candidates I(j)+1, calculating a value ΔE(1+) which is the value of the first objective function from which the value of the original first objective function is subtracted, and setting the value ΔE(1+) to zero then I(j)+1≧I(j+1); when relationships ΔE(1−)<0 and ΔE(1+)≧0 are satisfied, exchanging the node candidates I(j) with the node candidates I(j)−1, and exchanging the value of the first objective function obtained by the exchange, with the value of the original first objective function; when relationships ΔE(1−)≧0 and ΔE(1+)<0 are satisfied, exchanging the node candidates I(j) with the node candidates I(j)+1, and exchanging the value of the first objective function obtained by the exchange, with the value of the original first objective function; when relationships ΔE(1−)≧0 and ΔE(1+)≧0 are satisfied, not performing exchange of the node candidates I(j); when relationships ΔE(1−)<0 and ΔE(1+)<0 are satisfied and ΔE(1−) is less than ΔE(1+), exchanging the node candidates I(j) with the node candidates I(j)−1, and exchanging the value of the first objective function obtained by the exchange, with the value of the original first objective function; when relationships ΔE(1−)<0 and ΔE(1+)<0 are satisfied and ΔE(1−) exceeds ΔE(1+), exchanging the node candidates I(j) with the node candidates and then exchanging the value of the first objective function obtained by the exchange, with the value of the original first objective function, both successively from j=1 to j=m−1; when the value of the first objective function obtained at the completion of the sequential processes is less than the value of the original first objective function from which the threshold is subtracted, successively preforming the above exchanges again from j=1 to j=m−1; and when the exchange of the node candidates is not performed at all, or the value of the first objective function exceeds the value of the original first objective function from which the threshold is subtracted, completing the processing. Therefore, the same effects as mentioned above are achieved.

According to a 68th aspect of the present invention, in a compression device for one-dimensional time series data as defined in any of the 53rd to 56th aspects, assuming that the indices of the node candidates numbered in an increasing order are described as I(j) (0≦j≦m), the quasi-optimal candidates are calculated in the steps of: when a relationship I(j−1)<I(j)−1 is satisfied, calculating a value of the first objective function obtained at the exchange of node candidates I(j) with node candidates I(j)−1, calculating a value ΔE(1−) which is the value of the first objective function from which the value of the original first objective function is subtracted, and setting the value ΔE(1−) to zero when I(j−1)≧I(j)−1; when a relationship I(j)+1<I(j+1) is satisfied, calculating a value of the first objective function obtained at the exchange of node candidates I(j) with node candidates I(j)+1, calculating a value ΔE(1+) which is the value of the first objective function from which the value of the original first objective function is subtracted, and setting the value ΔE(1+) to zero when I(j)+1≧I(j+1); when relationships ΔE(1−)<0 and ΔE(1+)≧0 are satisfied, exchanging the node candidates I(j) with the node candidates I(j)−1, and exchanging the value of the first objective function obtained by the exchange, with the value of the original first objective function; when relationships ΔE(1−)≧0 and ΔE(1+)<0 are satisfied, exchanging the node candidates I(j) with the node candidates I(j)+1, and exchanging the value of the first objective function obtained by the exchange, with the value of the original first objective function; when relationships of ΔE(1−)≧0 and ΔE(1+)≧0 are satisfied, not performing exchange of the node candidates I(j); when relationships ΔE(1−)<0 and ΔE(1+)<0 are satisfied and ΔE(1−) is less than ΔE(1+), exchanging the node candidates I(j) with the node candidates I(j)−1, and exchanging the value of the first objective function obtained by the exchange, with the value of the original first objective function; when relationships ΔE(1−)<0 and ΔE(1+)<0 are satisfied and ΔE(1−) exceeds ΔE(1+), exchanging the node candidates I(j) with the node candidates I(j)+1 and then exchanging the value of the first objective function obtained by the exchange, with the value of the original first objective function, both successively from j=m−1 to j=1; when the value of the first objective function obtained at the completion of the sequential processes is less than the value of the original first objective function from which the threshold is subtracted, successively performing the above exchanges again from j=m−1 to j=1; and when the exchange of the node candidates is not performed at all, or the value of the first objective function exceeds the value of the original first objective function from which the threshold is subtracted, completing the processing. Therefore, the same effects as mentioned above are achieved.

According to a 69th aspect of the present invention, in a compression device for one-dimensional time series data as defined in any of the 53rd to 56th aspects, when the number of the finally decided node candidates are less than the number of the data not selected as the node candidates, compressed data is output consisting of the identifier indicating the node candidates, the index numbers of the finally decided node candidates, and the values of the node candidates and, when the number of the finally decided node candidates exceeds the number of the data not selected as the node candidates, compressed data is output consisting of the identifier indicating non-node candidates, the index numbers of the data not selected as the node candidates, and the values of the node candidates. Therefore, compression adapted to the properties of the given one-dimensional time series data is performed. In addition, since the compression ratio is controlled by the approximation accuracy, errors after decompression can be grasped in advance.

According to a 70th aspect of the present invention, in a compression device for one-dimensional time series data as defined in any of the 53rd to 56th aspects, data compression is performed individually for time and data of the one-dimensional time series data at irregular time intervals, to compress the time and the data separately. Therefore, the same effects as mentioned above are achieved for one-dimensional time series data at irregular time intervals.

According to a 71st aspect of the present invention, in a compression device for one-dimensional time series data as defined in any of the 53rd to 56th aspects, data compression is individually performed for each of the plural one-dimensional time series data constituting multi-dimensional time series data, to compress the multi-dimensional time series data. Therefore, the same effects as mentioned above are achieved for multi-dimensional time series data.

According to a 72nd aspect of the present invention, in a compression device for one-dimensional time series data as defined in any of the 53rd to 56th aspects, for plural one-dimensional time series data whose errors propagate, data compression is repeated with an approximation accuracy increasing gradually from one of the time series data from which the propagation starts, to compress all of the data. Therefore, in addition to the above-mentioned effects, data compression is performed without increasing propagation of errors.

According to a 73rd aspect of the present invention, there is provided a decompression device for one-dimensional time series data which decompresses one-dimensional time series data compressed by a compression device for one-dimensional time series data as defined in any of the 51st, 53rd, and 54th aspects, and the device comprises a first process of inputting compressed data and a number of data to be obtained by decompressing the compressed data; a second process of interpolating the compressed data using an interpolation function identical to that used for compression to calculate data whose number is equal to the data number, and calculating time data whose number is equal to the data number on the basis of an initial time and a time interval; and a third process of outputting the data and the time both calculated in the second process. Since continuous data processing using an interpolation function is performed in decompression, compressed data, which have been compressed by any of the above-mentioned compression methods, can be decompressed. In addition, data decompression at an arbitrary number is possible.

According to a 74th aspect of the present invention, there is provided a decompression device for one-dimensional time series data which decompresses one-dimensional time series data compressed by a compression device for one-dimensional time series data as defined in any of the 52nd, 55th, and 56th aspects, the device comprises a first process of inputting compressed data and a number of data to be obtained by decompressing the compressed data; a second process of calculating zero data whose number is equal to the data number, and calculating time data whose number is equal to the data number based on an initial time and a time interval when an identifier indicating that the compressed data are all zero is attached to the compressed data, or interpolating the compression data using an interpolation function identical to that used for compression to calculate data whose number is equal to the data number and calculating time data whose number is equal to the data number based on the initial time and the time interval, when an identifier indicating that the compressed data are all zero is not attached to the compressed data; and a third process of outputting the data and time data calculated in the second process. Since continuous data processing using an interpolation function is performed in decompression, compressed data, which have bean compressed by any of the above-mentioned compression methods, can be decompressed. In addition, data decompression at an arbitrary number is possible.

According to a 75th aspect of the present invention, in a decompression device for one-dimensional time series data as defined in any of the 73rd and 74th aspects, data decompression is performed individually for each of plural compressed one-dimensional time series data constituting compressed multi-dimensional time series data, to decompress the compressed multi-dimensional time series data. Therefore, the same effects as described above are achieved for multi-dimensional time series data.

DETAILED DESCRIPTION OF THE PREFERRED EMBODIMENTS

Embodiment 1

A description is given of a method of compressing one-dimensional time series data according to a first embodiment of the invention, with reference to drawings.

Figure 1:
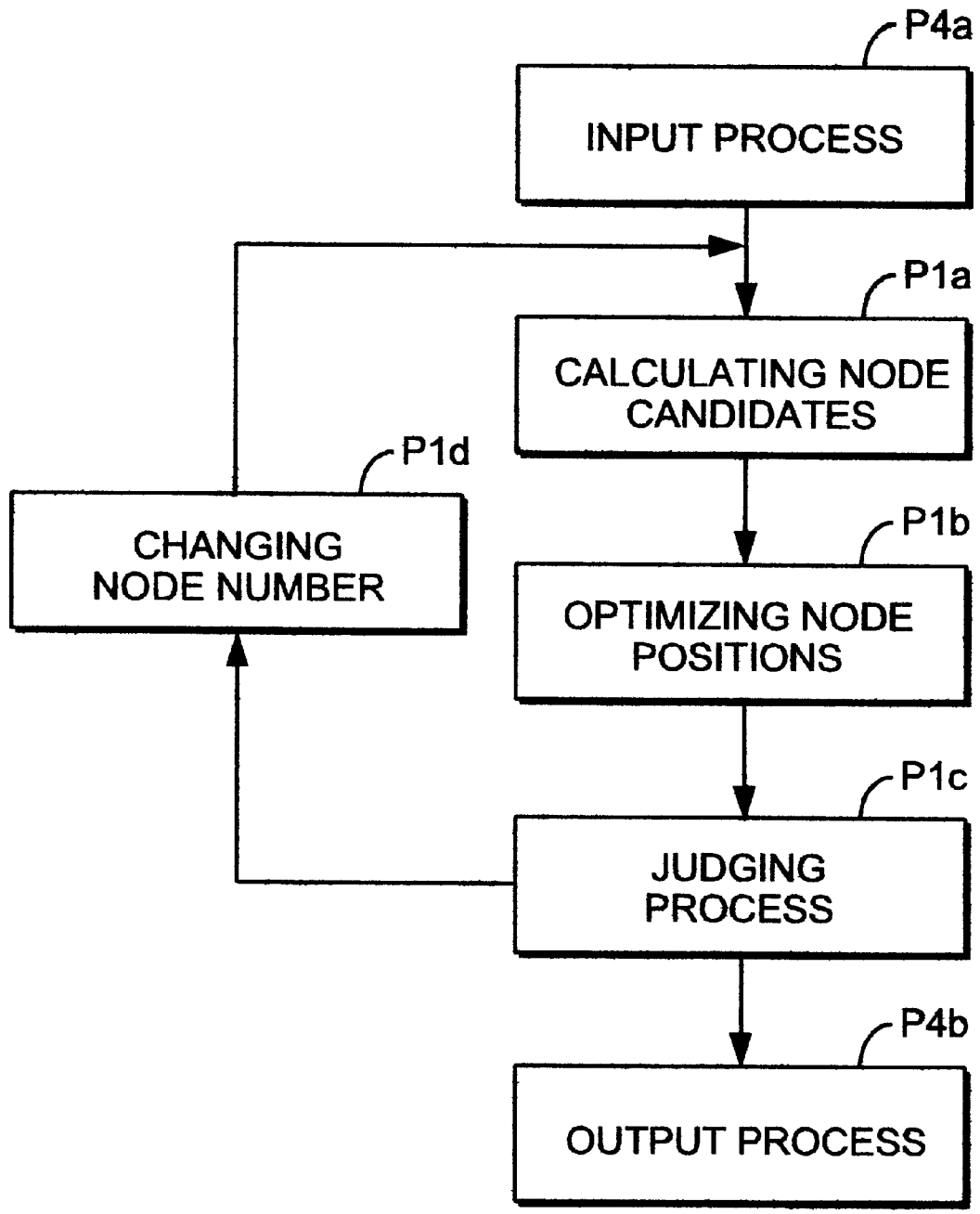
FIG. 1 is a flow chart of a compression method for one-dimensional time series data according to a first embodiment of the present invention.

FIG. 1 illustrates a process flow in the compression method for one-dimensional time series data according to the first embodiment of the invention.

In the figure, P4*a* is an input process of inputting one-dimensional time series data and a value of its approximation accuracy, P1*a* is a node candidate calculating process of calculating candidates for node through which an interpolation function approximating the one-dimensional time series data passes (hereinafter referred to as node candidates), P1*b* is a node position optimization process of optimizing positions of the node candidates calculated in P1*a*, P1*c* is a first judge process of judging whether or not an error between an interpolation function passing through the nodes obtained in the node position optimization process P1*b* and the original one-dimensional time series data is within a value corresponding to the approximation accuracy input in the input process P4*a*, P1*d* is a node number optimization process of performing optimization by changing the node number when the judging process P1*c* judges that the error is not within the approximation accuracy, P1*e* is a second judging process of judging whether or not an error between an interpolation function passing through the nodes obtained by the node number optimization process P1*d* and the original one-dimensional time series data is within the approximation accuracy value input in the input process P4*a*, P4*b* is an output process of outputting nodes and their indices as compressed information when the first judge process P1*c* or the second judge process P1*e* judges that the error between the interpolation function passing through the nodes and the original one-dimensional time series data is within the approximation accuracy value input by the input process P4*a*.

The compression method for one-dimensional time series data according to the first embodiment realizes data compression by producing a node number smaller than a data number of given one-dimensional time series data, using an interpolation function. In other words, the data compression is performed by calculating nodes of an interpolation function necessary for reproducing data approximated to the original one-dimensional time series data, and transferring only the data of the node number. Decompression of this data is performed by generating the data identical to the data eliminated during the data compression using the same interpolation function as that used for the data compression, and adding the generated data to the transferred data to obtain time series data approximated to the original time series data.

To be specific, as shown in FIG. 1, the input process P4*a* inputs one-dimensional time series data to be compressed and its approximation accuracy value, and the node candidate calculation process P1*a* calculates node candidates from all the one-dimensional data constituting the one-dimensional time series data so as to obtain one-dimensional time series data approximated to the original one-dimensional time series data by letting an interpolation function pass through this calculated node data. The node position optimization process P1*b* preforms optimization of the nodes positions by moving the node candidates, and the first judging process judges whether an error between a prescribed interpolation curve passing through the optimum node candidate and the original one-dimensional time series data reaches within a range of the input approximation accuracy value, and when the error is within this approximation accuracy range, the output process P4*b* immediately outputs the node candidates whose node positions have been optimized and their indices as compressed data.

Moreover, when it is judged in the judging process P1e that the error is not within the approximation accuracy range, node candidates are calculated again in the node candidate calculation process P1a and the subsequent processes are repeated.

As described above, since in the data compressing method shown In FIG. 1, data compression is done by producing a node number smaller than a data number of given one-dimensional time series data using an interpolation function, use of discrete Fourier series expansion or discrete cosine series expansion as an interpolation function enables to reduce positions requiring these coefficients with reliability, compared to the original one-dimensional time series data. Further, as optimization is performed for node position as well as node number, an error between decompressed data and original data is small, and compression with good compression ratio is possible. Moreover, if an error obtained during data decompression is set to have a wide range in compression process, it is possible to further reduce the node number by the increased range, thereby realizing the data compression with good compression ratio.

However, this depends on reproduction accuracy of data when decompressed. Further, as the data compression ratio depends on a degree of approximation between the one-dimensional time series data and the original data which is within the range of the accuracy of the specified error, the data compression ratio is generally unstable.

Furthermore, reducing the data with respect to high frequency components as in the prior art can further enhance the compression ratio compared to the prior art. That is, this method can be used as a complementary method for the prior art which increases the compression ratio of the prior art.

It is also true that even if the data compression is performed by the compression method of the first embodiment only without eliminating high-frequency components, the resultant compression ratio is higher than that of the prior art as long as the selected node number is smaller than the number of the frequency components obtained after the elimination of frequency components in the prior art compression method. This, however, depends on properties of given one-dimensional time series data and we cannot say that which of these methods can provide higher compression ratio than the other. We can say that the present invention extends a range of choices for data compression.

Further, if a polynomial function such as spline function is used as an interpolation function, decompressed data varies polynomially. This is effective for retaining an accuracy of one-dimensional time series data with no periodicity when decompressing the data.

Therefore, since accuracy of data cannot be degraded during decompression even if the number of data obtained after the decompression is different from the number of the original data, it is possible to reproduce the original data at high speed by reducing the data generated during decompression, and the accuracy of the data can be maintained. Further, by increasing the number of data generated during the decompression, the original data can be reproduced at slow speed, and the accuracy of the data can be maintained during such slow reproduction.

As described above, the first embodiment enables to complement the prior art compression method, and to extend a range of the choices for compression, by providing a new compression method which performs compression corresponding to properties of one-dimensional time series data.

Figure 12:
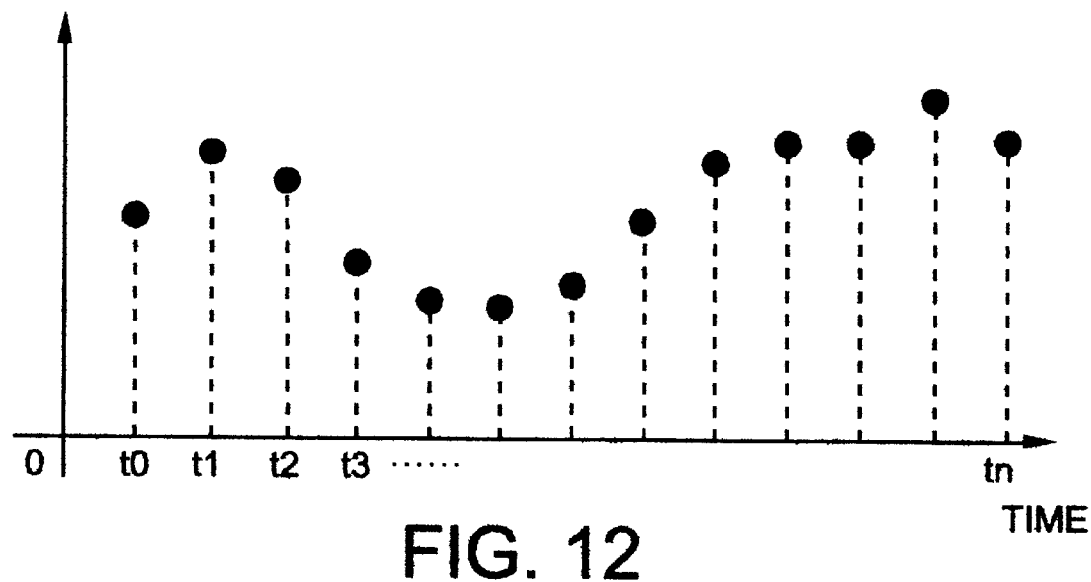
FIG. 12 is a drawing for explaining one-dimensional time series data.
Figure 22:
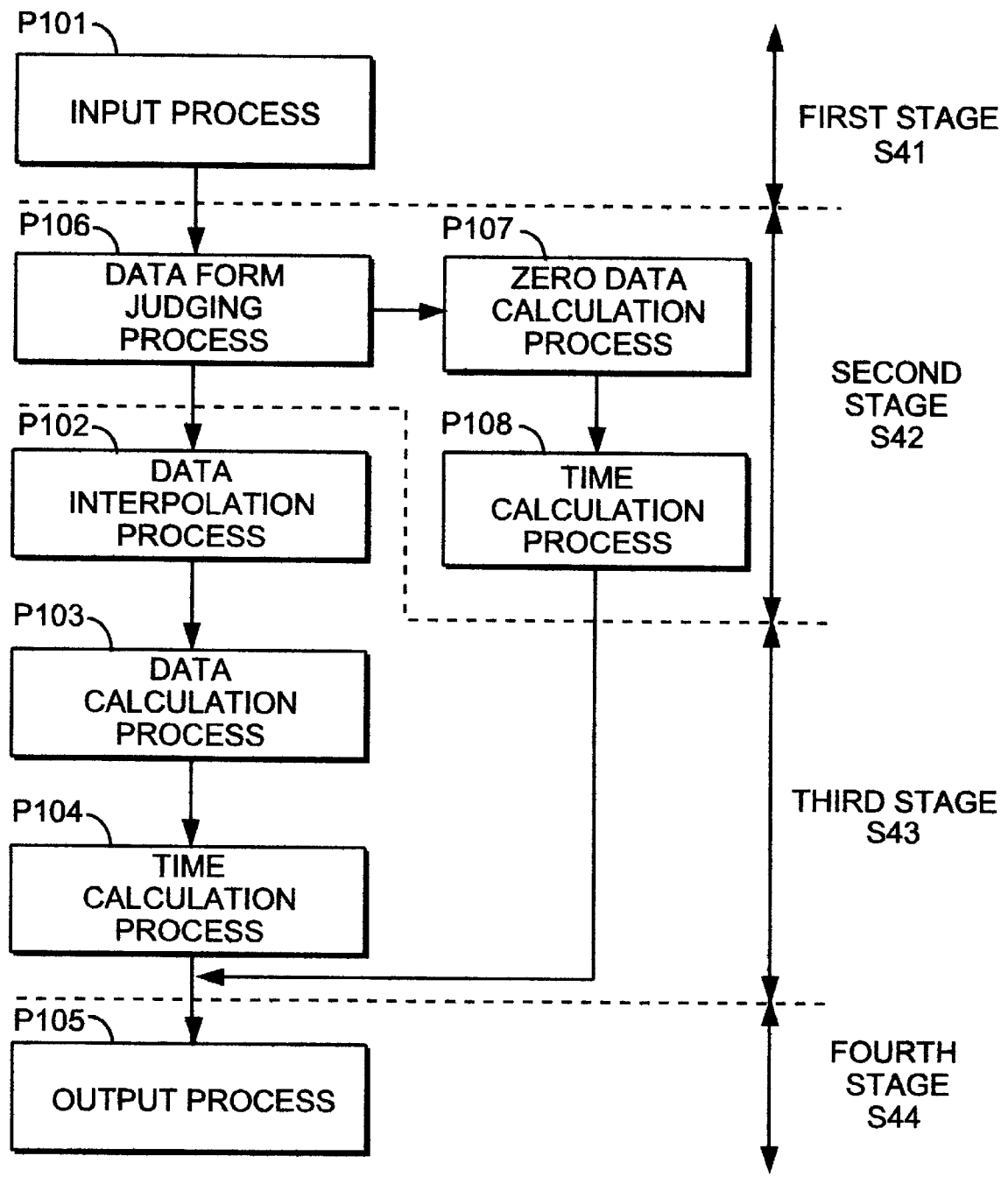
FIG. 22 is a detailed block diagram of the decompression method for one-dimensional time series data according to the seventh embodiment.

Hereinafter the processes of the first embodiment will be described in detail, but before the description, one-dimensional time series data will be explained with reference to FIG. 12. FIG. 22 is a plot of one-dimensional time series data, and black dots in the figure indicate one-dimensional time series data. As is obvious from the figure, one-dimensional data paired with time corresponding to the data is called one-dimensional time series data. Assuming that the data sampling time is t0, . . . , tn as shown in FIG. 12, a value of ti-ti-1 which is constant with respect to an arbitrary value i=1, . . . n is called an uniform time interval, whereas the value of ti-ti-1 not constant with respect to an arbitrary value i is called an irregular time interval.

Figure 2:
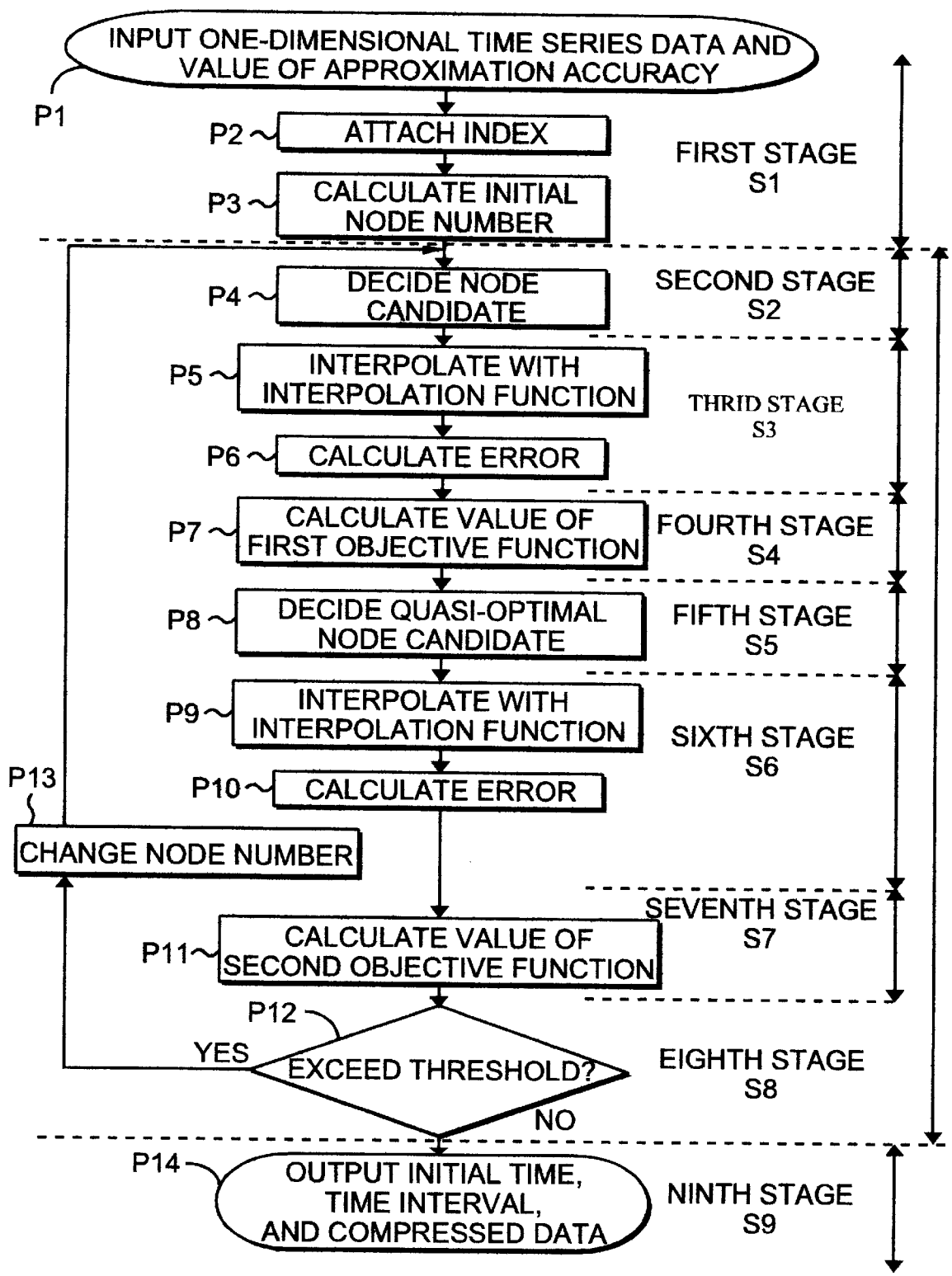
FIG. 2 is a detailed flow chart of a compression method for one-dimensional time series data according to the first embodiment.

FIG. 2 illustrates a flow of processes in the one-dimensional time series data compression method according to the first embodiment of the present invention. As shown in FIG. 2, the whole process is executed in nine stages, from a first stage S1 to a ninth stage S9. The first stags S1 consists of process P1, process P2, and process P3, the second stage S2 consists of process P4, the third stage S3 consists of process P5 and process P6, the forth stage S4 consists of process P7, the fifth stage S5 consists of process P8, the sixth stage consists of process P9 and process P10, the seventh stage S7 consists of process P11, the eighth stags S8 consists of processes P4 through P13, and the ninth stage S9 consists of process P14.

Figure 3A:
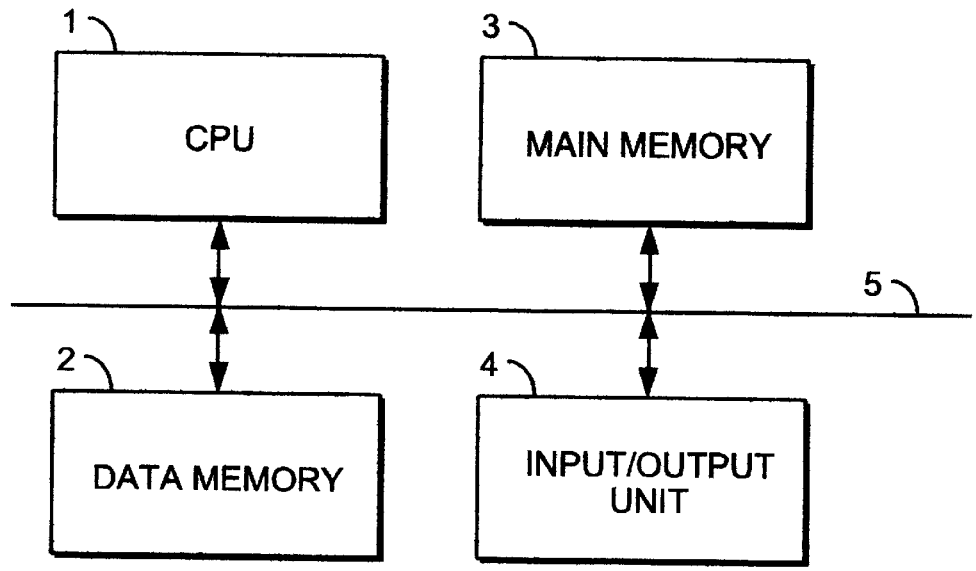
FIGS. 3(a) and 3(b) are drawings illustrating computers used for the compression methods for one-dimensional time series data and for the decompression methods for one-dimensional time series data, according to the embodiments of the present invention.
Figure 3B:
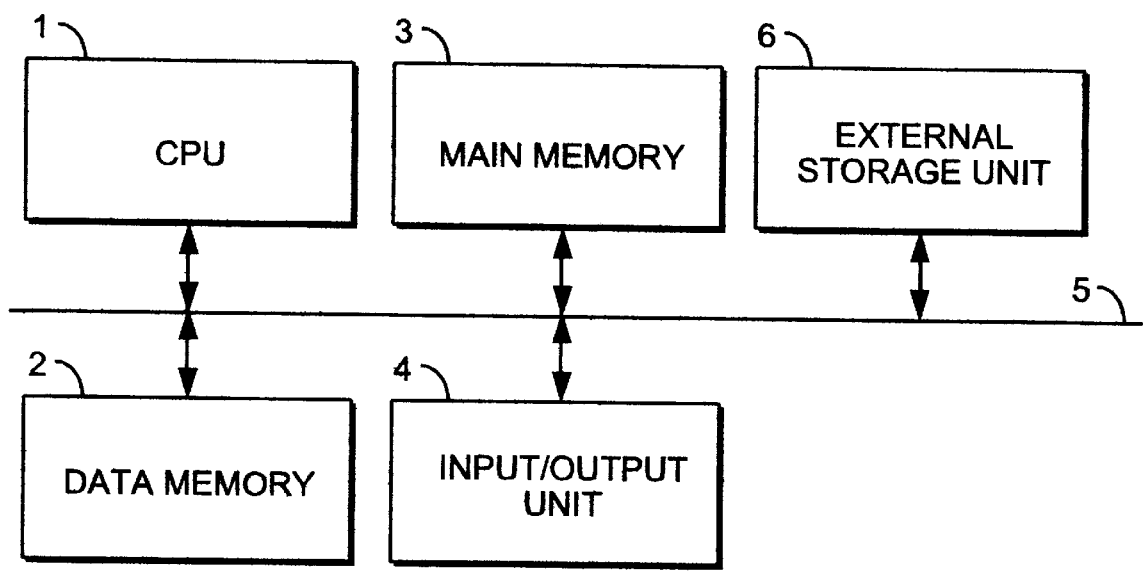

FIGS. 3(a) and 3(b) illustrate an example of a computer performing the flow process of FIG. 1 which is illustrated in detail in FIG. 2. In FIG. 3(a), reference numeral 1 designates a CPU for arithmetic processing, numeral 2 designates a data memory for storing data to be processed by the CPU, numeral 3 designates a main memory for storing a control program corresponding to the processes of FIG. 2 in advance, numeral 4 designates an input-output unit for performing input and output of data between the computer and the external devices, numeral 5 designates a bus through which the CPU 1, the data memory 2, the main memory 3, and the input-output unit 4 exchanges data or the like with one another. The data memory 2 and the main memory 3 may be implemented in a single memory.

The CPU 1 executes compression process illustrated in a flow chart of FIG. 2, according to a control program stored in the main memory 3 in advance.

Further, FIG. 3(b) shows an example of a computer configuration which performs compression according to a program read from program recording media or the like. In FIG. 3(b), reference numeral 6 designates an external storage unit connected to the bus 5, and a recording medium therein stores a control program corresponding to the processes of FIG. 2. The external storage unit 6 reads, from the recording medium, the control program corresponding to the processes of FIG. 2, loading the program in the main memory 3. The CPU 1 executes the compression process shown in the flow chart of FIG. 2, according to the control program loaded in the main memory 3.

Next, a description is given of the first stage S1 through the ninth stage S9 thus configurated in FIG. 2.

Initially, in process P1, inputting of one-dimensional time series data to be compressed and a value of an approximation accuracy of an interpolation function which approximates the one-dimensional time series data is performed. In process P2, indices are given to the one-dimensional time series data in its temporal order. Sampling time, generation time, input time or the like may be applied for the temporal order. Further, for indexing, gradually increasing data or gradually decreasing data may be used in place of the temporal order In process P3, an initial node number is calculated. This initial value of a node number used for calculating the interpolation function is set in advance because the initial value depends on a type of interpolation function. This can be calculated by, for example, setting a ratio to an initial number of data. In this process, initial node number is calculated with $1/a$ ($a>0$) of the total number of one-dimensional time series data as the initial value of the node number to be used.

In process P4, node candidates are decided in such a way that the number of selected data is equal to the calculated node number, by selecting, from the one-dimensional time series data to be compressed, start data and end data, and then the data between the start data and the end data at irregular intervals.

The operation will be described with reference to FIG. 13. Assuming that the number of nodes is m+1, data at time t0, which is start data, is selected as an initial node candidate. Next, data at time tn, which is end data, is selected as a final node candidate.

Next, using random numbers generated from an uniform probability of $1/(n-1)$, the rest m−1 node candidates are selected in such a way that the candidates do not overlap each other. After selection of m+1 node candidates in total in the above-described way, the selected nodes are sorted in an increasing temporal order, and the indices $I(j)$ ($0 \leq j \leq m$) are given to the respective node candidates, and these node candidates and indices are stored. In the case of FIG. 13, data represented by circles are selected node candidates.

The above-described operation is for the case of random selection, but process P4 which obtains such node candidates may perform selection at approximately equal intervals in relation to the indices only. In this case, intervals [n/m] related to the indices are initially calculated, and a total of m node candidates are selected at the intervals of [n/m] with the start data at t0 as the initial one, and the end data at t0 is finally selected as the (m+1)-th node candidate, whereby the selection is completed. Here, [X] indicates a Gauss' notation. The above-described indices I(j) are stored also in this case.

The operation performed in process 4 is to determine an initial value of positions of node candidates and use of random numbers is well known to be effective for this problem. Also in the first embodiment, an appropriate initial value can be obtained by selection of node positions using random numbers rather than selection at approximately equal intervals.

In process P5, data for interpolating between adjacent node candidates is generated based on an interpolation function using the index numbers of the node candidates as an independent variable to obtain one-dimensional time series data approximating the original one-dimensional time series data, and an error between this data and the original data is calculated. Any interpolation function may be applied as long as it passes through nodes; for example, a spline function is applicable. However, if decompressed data has to reproduce a waveform faithful to that of the original data, it is preferable to use an interpolation function capable of approximating the original one-dimensional time series data faithfully. Conversely, if a high data compression ratio is required, approximation is not very requisite for an interpolation function to be used. Besides the spline function, series expansion expression using discrete Fourier transform or series expansion express ion using discrete cosine transformation may be used as an interpolation function. From the above-mentioned ones, only one function is selected in advance for use, and an interpolation function identical to the interpolation function used for compression is used in the case of decompression process which is described later. In this case, this may be realized by preparing several candidates for interpolation function in advance, and selecting an interpolation function from the prepared ones according to an identifier of the interpolation function used for compression previously transferred to the decompression process side.

Figure 14:
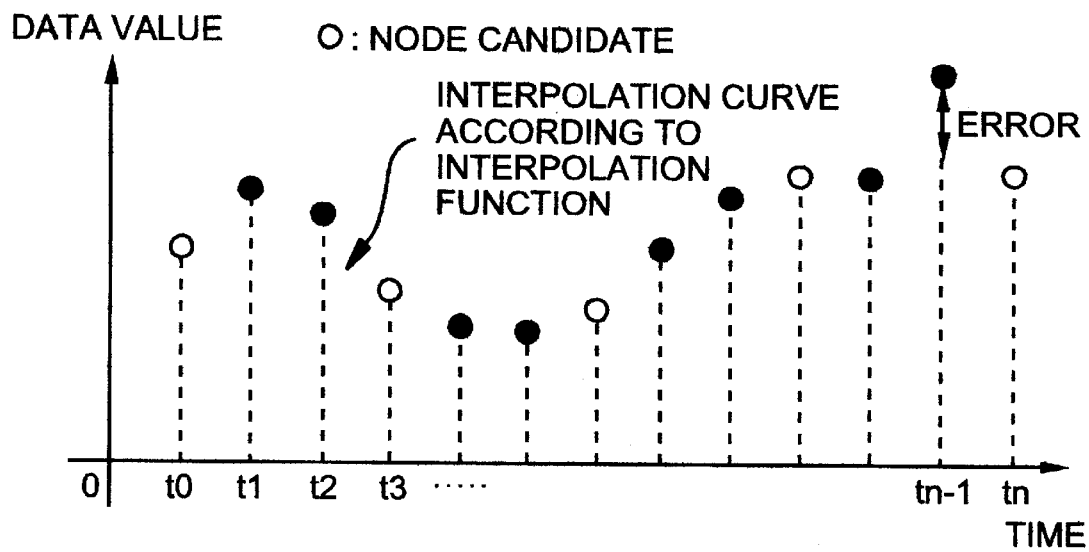
FIG. 14 is a drawing for explaining interpolation using node candidates of one-dimensional time series data.

FIG. 14 is the plot of an interpolation function for interpolating the curve shown in FIG. 12. Dots in the figure indicate data obtained by interpolating node candidates expressed as circles, using the interpolation function, and these data are abandoned in data compression. The data represented by dots have a value almost equal to that of the original data, but the data at time tn−1 has an error.

In process P6, an error between the one-dimensional time series data other than the node candidates and the interpolation function is calculated, as shown in FIG. 14. Although in FIG. 14 the error is calculated using absolute values, square error may be used for calculating the error.

In process P7, a value of a first objective function is calculated based on the error calculated in process P6. This first objective function is calculated by obtaining a maximum value, an average, and a variance of the error obtained in process P6, assigning weights to them, and adding the weighted ones.

In other words, this objective function is an error evaluation function, and to evaluate the error from a view that most optimal node candidates are the ones which provide smallest maximum value, smallest average, and smallest variance of the error between the one-dimensional time series data generated based on the selected node candidates and the original one-dimensional time series data, the weighted sum of the maximum value of the error, the average of the error, and the variance of th error is used as an error evaluation function.

Then, the value of the weighting function is decided by two methods: the one is to decide the value as a fixed one, and the other is to decide the value variably according to given data. In the case of deciding the value variably, so as to assign weights to the maximum value of the error, the average of the error, and the variance of the error evenly, the weighting function is decided such that the products of the values of the maximum value, the average, and the variance and the respective weights to them are equal to each other. In the case of previously setting a fixed value, this value is set so that all the values of the weighting function are ⅓, for example. Generally, the value experimentally judged as an appropriate one after processing actual data several times is used as a fixed value.

Figure 10:
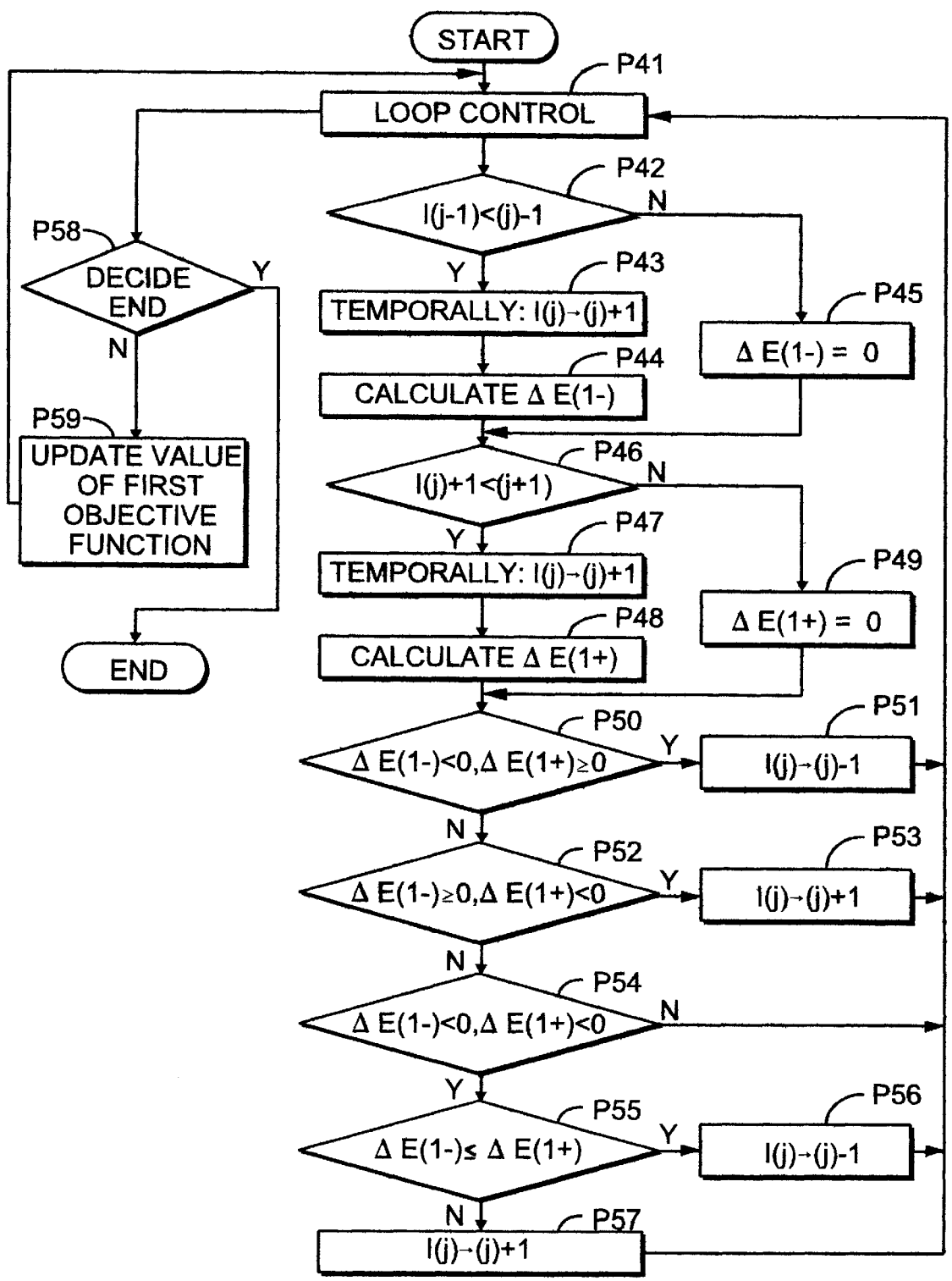
FIG. 10 is a flowchart for explaining a first method of deciding quasi-optimal node candidates.
Figure 11:
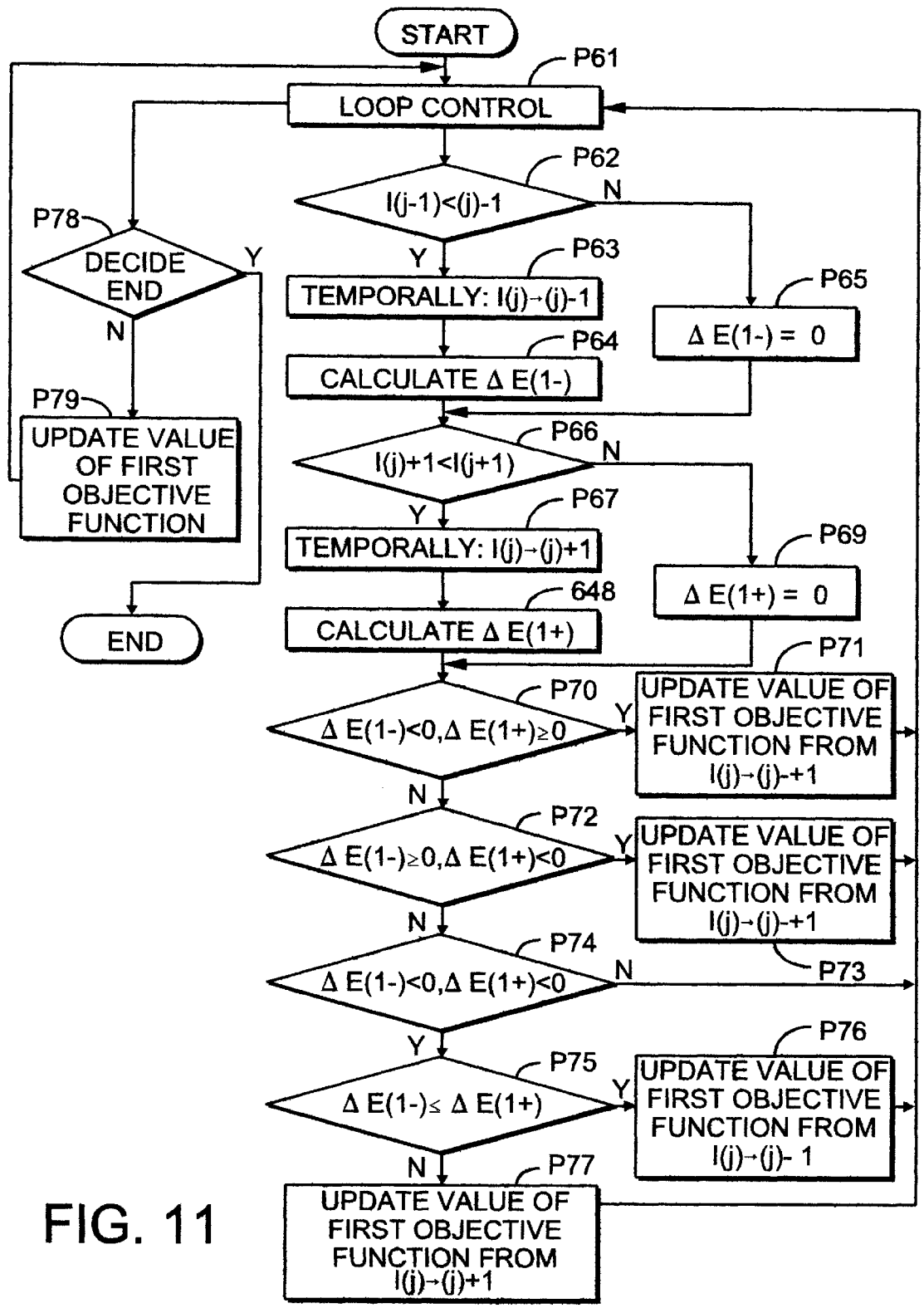
FIG. 11 is a flowchart for explaining a second method of deciding quasi-optimal node candidates.

In Process P8, quasi-optimal node candidates are obtained by repeatedly changing node candidates until the first objective function takes a smallest value, and this is performed by one of the first method shown in FIG. 10 and the second method shown in FIG. 11.

The process of deciding the quasi-optimum node candidates is to obtain a local optimum solution by initially obtaining both a value of the objective function in a condition that certain node candidates are already decided and a value of the objective function after change of the node candidates, obtaining a difference between the values, and selecting the node candidates from which the smallest difference is obtained.

Although these node candidates are decided by obtaining the optimum solution when the nodes are few in number, but with increase in the number of the nodes, it becomes difficult to find whether the optimum solution is actually optimum or not, and therefore it is sufficient to obtain local optimum solution, that is, a quasi-optimal solution, in this first embodiment.

First of all a description is given of the first method shown in FIG. 10 As is obvious from FIG. 10, this method consists of processes P41 to P59. The indexing for code candidates is performed in increasing temporal order, and the obtained indices are expressed by I(j) ($0 \leq j \leq m$), as described above. Further, in the following description of FIG. 10, j indicates a loop control valuable.

In process P41, loop control is performed using one of the following six methods.

(1) For j of an odd number, the process is performed in increasing order, whereas for j of an even number, the process is performed in decreasing order.

(2) For j of an odd number, the process is performed in decreasing order, and for j of an even number, the process is performed in increasing order.

(3) The node candidates are successively processed from j=1 to j=[m/2], and then from j=m−1 to j=[m/2]+1.

(4) The node candidates are successively processed from j=[m/2] to j=1, and then from j=[m/2]+1 to j=m−1.

(5) The node candidates are successively processed from j=1 to j=m−1.

(6) The node candidates are successively processed from j=m−1 to j=1.

In process P42, judgment is made whether the loop control valuable j for controlling the loop of the subsequent processes satisfies a relationship I(j−1)<I(j)−1. If it is found that the relationship is satisfied, the subsequent process P43 follows, and if not, the process P42 proceeds to process P45.

Figure 15:
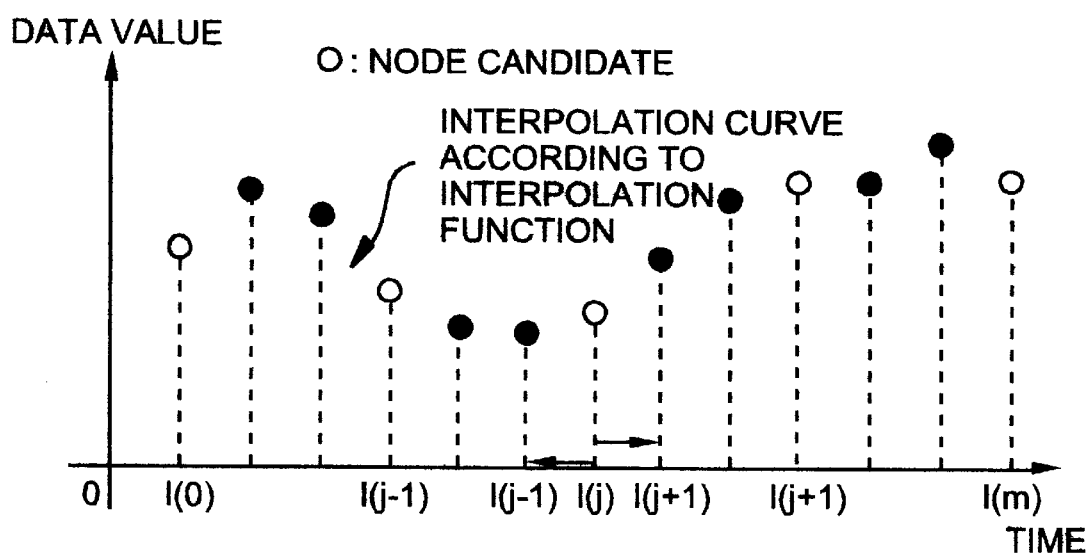
FIG. 15 is a drawing for explaining a method of selecting quasi-optimal node candidates.

In process P43, as shown in FIG. 15, a nodes candidate I(j) and a node candidate I(j)−1 are temporally exchanged. Next, the value of the first objective function after the exchange is calculated. After calculation of the function value, the exchanged node candidates are returned to their original positions.

In process P44, a value ΔE(1−) is obtained which is the value of the first objective function calculated in process P43 from which the value of the first objective function calculated in process P7 of FIG. 2 is subtracted. "1−" in the bracket added to ΔE means "shifting to the left by 1", that is, reducing the index number by 1. In process 45, the above-mentioned value of the first objective value is not calculated, and ΔE(1−) is forcibly set to 0.

In process P46, as shown in FIG. 15, the node candidate I(j) and the node candidate I(j)+1 are temporarily exchanged, and the value of the first objective function is calculated under such condition.

In process P48, a value ΔE(1+) is calculated which is the value of the first objective function calculated in process P47 from which the value of the first objective function calculated in process P7 of FIG. 2 is subtracted. In process P49, ΔE(1+) is forcibly set to 0 without calculation of the value of the first objective function.

In process P50, it is judged whether or not the above-mentioned relationships ΔE(1−)<0 and ΔE(1+)≧0 are satisfied. If these relationships are satisfied, a subsequent process P51 follows, and if not, process P51 is bypassed to perform process P52. In process P51, the node candidate I(j) is exchanged with the node candidate I(j)−1, and process P41 is performed again after the exchange.

In process P52, it is judged whether or not relationships ΔE(1−)≧0 and ΔE(1+)<0 are satisfied, and if these relationships are satisfied, the process is follow by subsequent process P53, and if not, process P53 is bypassed to perform process P54. In process P53, the node candidate I(j) is exchanged with the node candidate I(j)+1, and process P41 is performed again after the exchange.

In process P54, it is judged whether relationships ΔE(1−) <0 and ΔE(1+)<0 are satisfied or not, and if these relationships are satisfied, subsequent process P55 is performed, and if not, process P41 is performed again.

In process P55, it is judged whether a relationship ΔE(1−) ≦ΔE(1+) is satisfied or not, and if this relationship is satisfied, subsequent process P56 is performed, and if not, process P56 is bypassed to perform process P57. In process P57, the node candidate I(j) is exchanged with the node candidate I(j)−1, and process P41 is performed again after the exchange. In process P57, the node candidate I(j) is exchanged with the node candidate I(j)+1, and process P41 is performed after the exchange.

After the above-described processes are finished, process P58 is performed.

In process 58, an end decision is made. This end decision is made according to whether or not a value of the first objective function obtained after all of j are subjected to processes P41 to P57 is larger than the value of the original first objective function from which a threshold value is subtracted, or whether the exchange of node candidates are not performed for any of j or not. If one of the conditions is satisfied, execution of the sequential processes is ended and the solution obtained at the end is used as a quasi-optimal solution, and otherwise, in process P59, a value of the original first objective function is exchanged with the value of the first objective function obtained at the end of the processes, and then the sequential processes P41 to P57 are repeated.

The above processes are repeated until the end decision is made in process P58 and the value of the first objective function is converged. A decision condition based on the number of repetition of the processes may be added to the end decision. This enables to end the processes within a predetermined period of time although a degree of optimum might be degraded compared to the case in which the decision condition based on the number of repetition is not added.

Next, a description is given of the second method shown in FIG. 11. As is understood from FIG. 11 this method consists of processes P61 to P79.

In the method, however, the indexing of node candidates is performed in increasing temporal order and the indices are represented as I(j) ($0 \leq j \leq m$), as described above. Further, j is a loop control valuable as in the description about FIG. 10.

Process P61 is to perform a loop control which decides whether to repeat a series of processes as in the first method shown in FIG. 10 or not, and this loop control is executed in one of the following six methods.

(1) For j of an odd number, the process is performed in increasing order, and for of an even number, the process is performed in decreasing order.

(2) For j of an odd number, the process is performed in decreasing order, and for j of an even number, the process is performed in increasing order.

(3) The node candidates are successively processed from j=1 to j=[m/2], and then from j=m−1 to j=[m/2]+1.

(4) The node candidates are successively processed from j=[m/2] to j=1, and then from j=[m/2]+1 to j=m−1.

(5) The node candidates are successively processed from j=1 to j=m−1.

(6) The node candidates are successively processed from j=m−1 to j=1.

Processes P62 through P70 are equal to processes P42 through P50 in the first method of FIG. 10.

In process P71, a node candidate I(j) is exchanged with a node candidate I(j)−1, and then a value of the original first objective function is updated to a value of the first objective function calculated during the exchange. After the update, process P61 is performed again.

Process P72 is equal to process P52 in the first method of FIG. 10.

In process P73, the node candidate I(j) is changed to the node candidate I(j)+1. Then, the value of the first objective function is updated to the value of the first objective function calculated during the exchange. After the update, process P61 is performed again.

Processes P74 and P75 are equal to processes P54 and P55 in the first method of FIG. 10, respectively.

In process P76, the node candidate I(j) is exchanged with the node candidate I(j)−1. Next, the value of the original first objective function is updated to the value of the first objective function calculated during the exchange. After the update, process P61 is performed again.

In process P77, the node candidate I(j) is exchanged to the node candidate I(j)+1. Next, a value of the original first objective function is updated to a value of the first objective function calculated during the exchange. After the exchange, process P61 is performed again.

After the above processes are performed for all of the loop control variable j, end decision is made in process P78. This decision is equal to process P58 in the first method of FIG. 10. Process P79 is also equal to process P59 in the first method of FIG. 10.

Although in the first method the update of the value of the first objective function is performed at the time when the sequential processes have been finished with respect to all node candidates, in the second method, the value of the first objective function is changed at every update of node candidates. It is difficult to say that which of the first and second methods is superior as a method of deciding quasi-optimal node candidates, because both of the methods depend on properties of data, but it is generally thought that an objective function value is converged faster in the first method than in the second method.

After the quasi-optimal node candidates are decided by the first method of FIG. 10 or the second method of FIG. 11, the candidates are interpolated using the above-described interpolation function in process P9 of FIG. 2, by the same method performed in process P5. Then, in process P10, an error between the one-dimensional time series data obtained by the interpolation and the original one-dimensional time series data is calculated, as in process P6.

In process P11, based on the error calculated in process P10, a value of a second objective function defined by weighted sum of the maximum value of the error, the average of the error, and the variance of the error. This second objective function is an error evaluation function with respect to the original nodes. When the maximum value of the error is regarded as critical, the weights to the maximum value of the error is set to 1, and the weight to the average and the variance are set to 0. Further, to assign weights to the maximum value of the error, the average of the error, and the variance of the error evenly as in the case of the first objective function in process P7, the value of this function is previously set so that the products of the maximum value, the average, and the variance and the respective weights to them are equal to each other. In the case of obtaining a fixed value previously, the value is set so that all the values of this weighting coefficient are ⅓, for example. Moreover, the value of the function may be decided based on a ratio of the respective weights to each weight used in the case of the first objective function.

In process P12, judgment with a threshold is made for the second objective function obtained in process P11. For example, when the weight to the maximum value of the error is set to 1 and the weights to the average of the error and the variance of the error are set to 0, a value of an error of the approximation accuracy input at the start is used as a threshold. In this case, for all of the data, judgment is made whether the data is within the error of approximation accuracy or not. When it is found that the value of the second objective function is larger than the threshold after the judge with threshold, a subsequent process P13 is performed, otherwise process P13 is bypassed to process P14.

In process P13, a number of nodes after the update is obtained by adding an increment to the original node number. The increment is decided in advance.

After increasing the node number by a prescribed amount, process P4 is performed again, and the sequential processes after the decision of node candidates are repeated until the value of the second objective function is decided to be smaller than the threshold in process P12.

Then, after the value of the second objective function is decided to be smaller than the threshold in process P12, process P13 is bypassed to perform process P14 as mentioned above. In process P14, the initial time, the time interval, the index numbers of the obtained nodes, and the data values obtained at this time are output. The form of this output data is identical to that shown in FIG. 16(*a*).

Output of the indices may be changed according to the number of the obtained node candidates compared to the number of the one-dimensional time series data input at the start. To be specific, when the node candidate number is smaller then half of the number of one-dimensional time series data, the identifier indicating this fact and the index numbers of such node candidates are output, whereas, when the node candidate number is larger than half of the number of one-dimensional time series data, the identifier indicating this fact and the indices other than those of the above node candidates are listed.

Furthermore, when an initial time and a time interval of treated one-dimensional time series data are kept constant and the values are known, the initial time and the time interval may not be output in process P14.

As described above, in the first embodiment, data compression is performed in the following procedure: first of all, initial node candidates are decided based on the respective data constituting one-dimensional time series data, and one-dimensional time series data approximating the original one-dimensional time series data is generated on the basis of the initial node candidates using an interpolation function, and an error between these one-dimensional time series data is calculated and evaluated. Then, to obtain the evaluation to the error within a prescribed range, quasi-optimal node candidates are calculated by moving the above node candidates, and using the resultant interpolation function, one-dimensional time series data approximating to the original one-dimensional time series data is generated based on quasi-optimal node candidates, and an error between these one-dimensional time series data is calculated and evaluated. When the evaluation to the error is not within a prescribed range, node positions and node number are optimized by repeating the above processes with increased number of nodes, and transmission of the data other than the data of nodes is not carried out. Therefore, data compression corresponding to properties of given one-dimensional time series data can be performed.

Further, as the data compression ratio is controlled by approximation accuracy, error obtained after decompression can be grasped in advance.

Embodiment 2

Although in the first embodiment data compression processing for one-dimensional time series data is implemented in software, this may be implemented in a special hardware.

Figure 4:
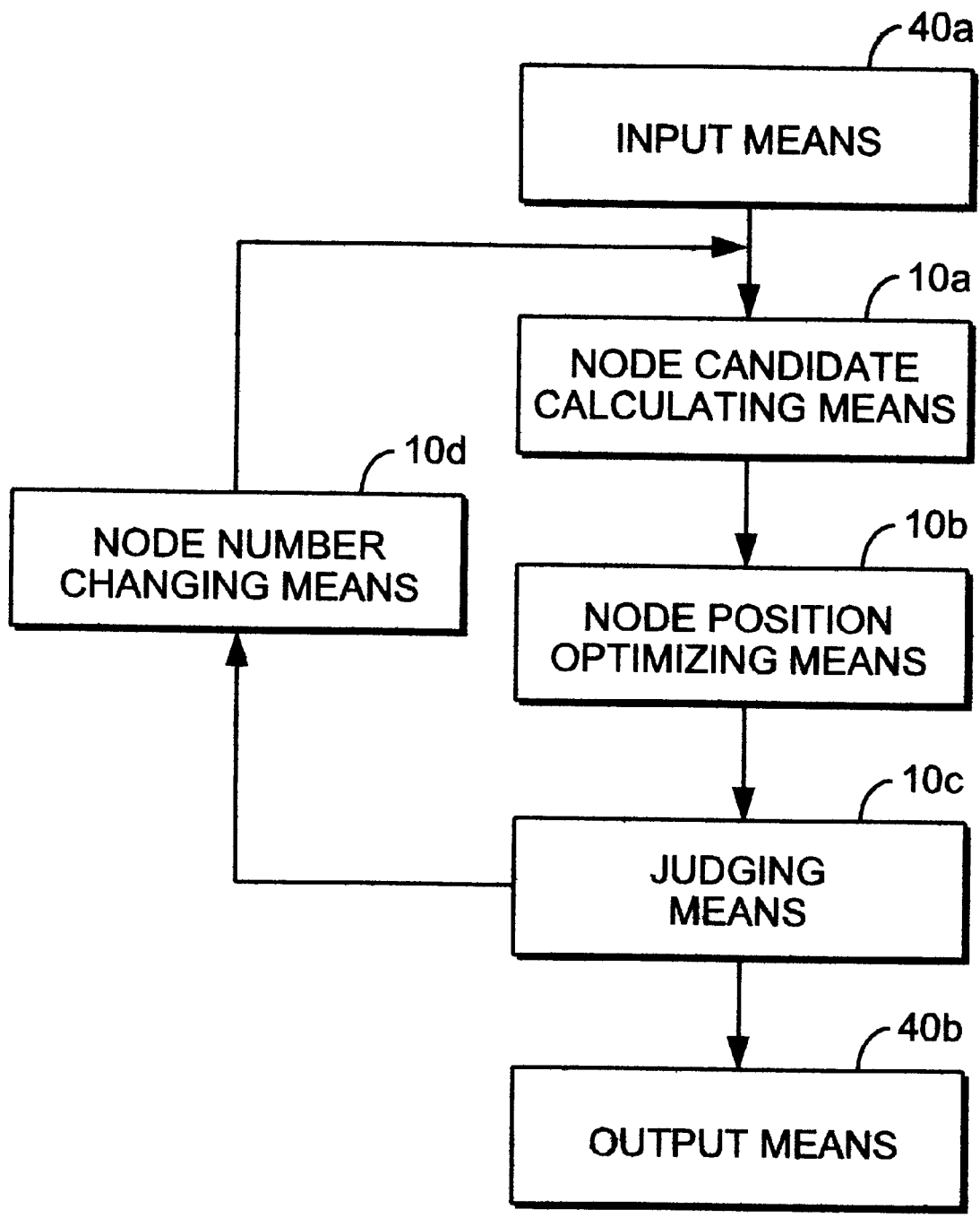
FIG. 4 is a block diagram of a compression device for one-dimensional time series data according to a second embodiment of the present invention.

FIG. 4 illustrates a compression device for one-dimensional time series data which is a special hardware for implementing the process flow shown in FIG. 1. In the figure, reference numeral 41 designates an input means for inputting one-dimensional time series data and an approximation accuracy value thereof, numeral 10a designates a node candidate calculating means for calculating node candidates through which an interpolation function approximating the one-dimensional time series data passes, numeral 10b designates a node position optimizing means for optimizing positions of the node candidates obtained by the node candidate calculating means 10a, numeral 10c designates a first judging means for judging whether or not an error between an interpolation function passing through the nodes obtained in the node position optimizing means 10b and the original one-dimensional time series data is within a value corresponding to the approximation accuracy value input by the input means 40a, numeral 10d designates a node number optimizing means for performing optimization by changing a number of nodes when it is judged that the error is not within the approximation accuracy, numeral 10e designates a second judging means for deciding whether or not an error between an interpolation function passing through the nodes obtained by the node number optimizing means 10d and the original one-dimensional time series data is within the approximation accuracy value input in by the input means 40a, numeral 40b designates an output means for outputting nodes and indices thereof when the error between the interpolating function passing through these nodes and the original one-dimensional time series data is within the approximation accuracy value input by the input means 40a.

Next, a description is given of the operation. In FIG. 4, the input means 40a inputs one-dimensional time series data to be compressed and an approximation accuracy value thereof, and the node candidate calculating means 10a calculates node candidates from all the one-dimensional data constituting one-dimensional time series data, so that one-dimensional time series data approximating the original one-dimensional time series data can be generated by letting pass a prescribed interpolation function through these node candidates. The node position optimizing means 10b optimizes node positions by moving the node candidates, and the first judging means 10c judges whether or not a value based on an error between the prescribed interpolation function passing through the optimized node candidates and the original one-dimensional time series data is within a range of the approximation accuracy value input by the input means 40a, and when it is found that the value is within the range of the approximation accuracy, the output means 40b immediately outputs the node candidates at optimized positions and indices thereof as compressed one-dimensional time series data.

On the other hand, when it is found by the first judging means 10c that the value is not within the range of the approximation accuracy, the node number optimizing means 10d optimizes node number by increasing or reducing the number of nodes as desired.

Based of the result of the optimization by the node number optimizing means 10d, the second judging means 10e judges whether or not a value based on an error between a prescribed interpolation function passing through the node candidates whose number is optimized and the original one-dimensional time series data is within the range of the approximation accuracy value input by the input means 40a, and when it is found that the value is within the range of the approximation accuracy, the output means 40b outputs the node candidates at optimized node positions and indices thereof as compressed one-dimensional time series data.

On the other hand, when it is found that the value is not within the range of the approximation accuracy, calculation of node candidates is performed again in the node candidate calculating means 10a and the above-described processes are repeated.

Figure 5:
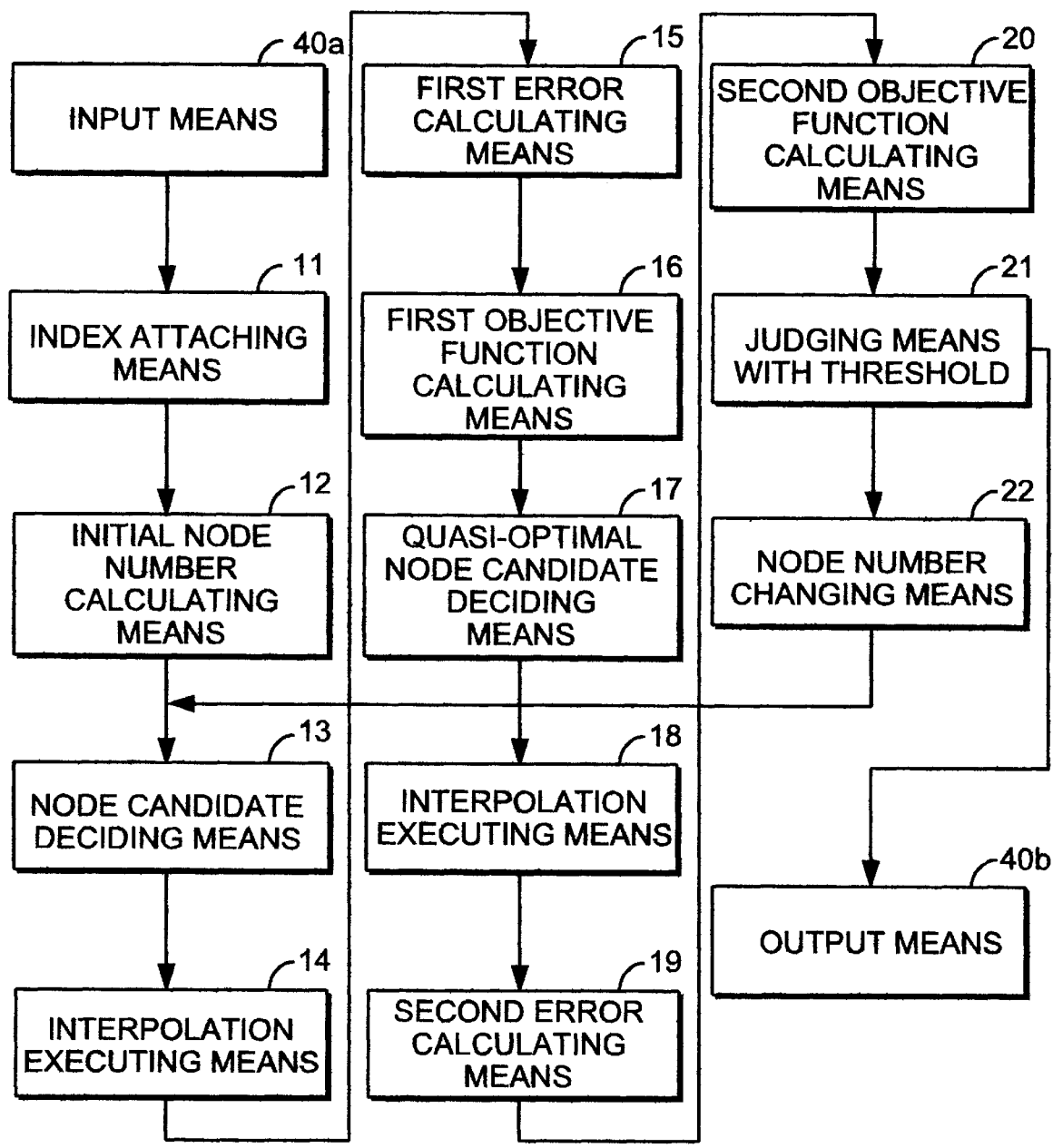
FIG. 5 is a detailed block diagram of the compression device for one-dimensional time series data according to the second embodiment.

FIG. 5 illustrates a detailed configuration of the compression device for one-dimensional time series data shown in FIG. 4.

In the figure, reference numeral 40a designates an input means for inputting one-dimensional time series data to be compressed and an approximation accuracy thereof from the exterior, numeral 11 designates an index attaching means for attaching indices to the one-dimensional time series data, numeral 12 designates an initial node number calculating means for calculating an initial number of nodes through which an interpolation function approximating the one-dimensional time series data passes, numeral 13 designates a node candidate deciding means for deciding node candidates through which an interpolating function passes, numeral 14 designates a first interpolation executing means for interpolating data between the adjacent node candidates using the interpolation function passing through node candidates, numeral 15 designates an error calculating means for calculating an error between the one-dimensional time series data obtained based on the interpolation function and the original one-dimensional time series data, numeral 16 designates an error calculating means for calculating a value of a first objective function which is an error evaluation function, numeral 7 designates a quasi-optimal node candidate deciding means for deciding quasi-optimal node candidates by moving the node candidates as desired, numeral 18 designates a second interpolation executing means for interpolating the adjacent quasi-optimal node candidates with data, using an interpolation function passing through these quasi-optimal node candidates, numeral 19 designates an error calculating means for calculating an error between the one-dimensional time series data obtained based on this interpolation function and the original one-dimensional time series data, numeral 20 designates a second objective function calculating means for calculating a value of second objective function which is an evaluation function for the error, numeral 21 designates a judging means with threshold for judging whether or not the function value of the second objective function exceeds a threshold corresponding to the approximation accuracy of the original one-dimensional time series data, numeral 22 designates a node number changing means for changing a node number when it is found that the function value of the second objective function exceeds the threshold corresponding to the approximation accuracy of the original one-dimensional time series data, numeral 40b designates an output means for outputting the quasi-optimal node candidates with indices thereof as compressed data of the original one-dimensional time series data, when it is found that the function value of the second objective function is less than the threshold.

Next, a description is given of the operation.

First of all, the input means inputs one-dimensional time series data to be compressed and a value of an approximation accuracy of an interpolation function approximating the one-dimensional time series data. The index attaching means 11 attaches indices to the one-dimensional time series data in a temporal order. For the one-dimensional time series data, sampling tine, generation time, or input time may be used as its temporal order. Further, gradually increasing data or gradually decreasing data may be used in place of such time. The initial node number calculating means 12 calculates an initial number of nodes. This initial value of the node number used for calculating the interpolation function may be set in advance because the initial number depends on a type of the interpolation function. For example, by deciding a ratio to an initial number of data in advance, the initial node number can be calculated. In this case, the initial node number is calculated with 1/a (a>0) of the total number of the one-dimensional time series data as the initial value of the node number.

The node candidate deciding means 13 initially selects start data and end data from the one-dimensional time series data to be compressed, and then selects the data between the start data and the end data at irregular intervals, in such a way that the total number of the selected data is equal to the calculated number of nodes.

Figure 13:
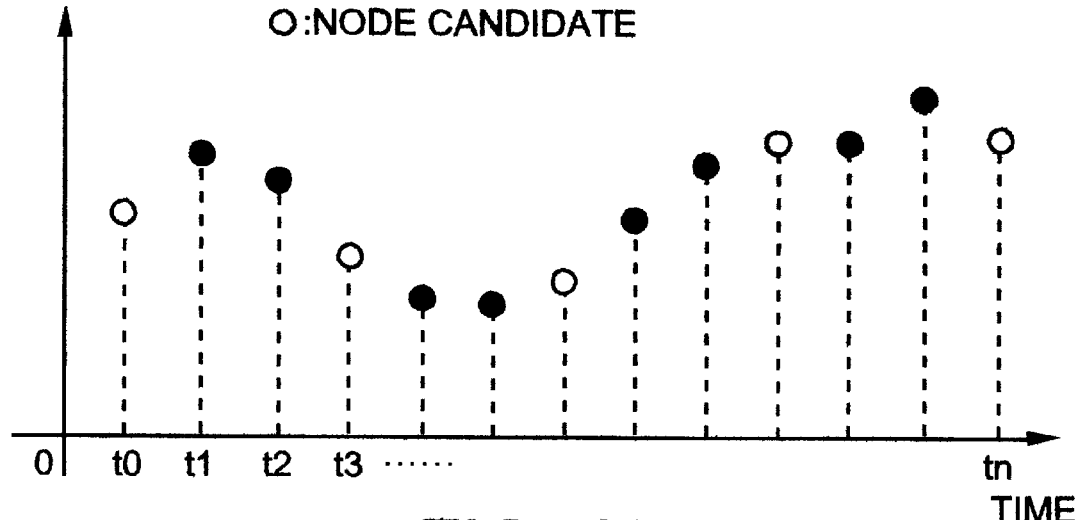
FIG. 13 is a drawing for explaining node candidates of one-dimensional time series data.

The operation in the process is identical to that shown in FIG. 13 or FIG. 14.

The operation performed in the node candidate deciding means 13 is to decide an initial value of positions of node candidates, and use of random numbers is known effective for this problem. In the second embodiment, as appropriate value is experimentally obtained by selecting node positions using random numbers than by selecting at approximately same intervals.

The interpolation executing means 14 generates data interpolating between the adjacent node candidates to obtain one-dimensional time series data approximating the original one-dimensional time series data, and calculates an error between this one-dimensional time series data and the original one-dimensional time series data. As in the case shown in FIG. 2, series expansion expression using a spline function or a discrete Fourier transform, and series expansion expression using discrete cosine transformation may be used as this interpolation function. The error calculating means 15 calculates an error between the one-dimensional time series data other than the node candidates and the interpolation function, as shown in FIG. 14 Although in the case of FIG. 14 the calculation of the error is performed using an absolute value error, the error calculation may be performed using square error.

The first objective function calculating means 16 calculates a value of a first objective function based on the error calculated by the error calculating means 15. The first objective function is obtained by initially obtaining a maximum value of the error, an average of the error, and a variance of the error all calculated by the error calculating means 15, assigning weights to them and adding these weighted ones.

The quasi-optimal node candidate deciding means 17 changes node candidates repeatedly so that the first objective function takes a smallest value and decides quasi-optimal node candidates. As in the case shown in FIG. 2, this is performed by the two methods: the first method shown in FIG. 10 and the second method shown in FIG. 11.

After the quasi-optimal node candidates are decided in the first method of FIG. 10 or the second method of FIG. 11, the interpolation executing means 18 of FIG. 5 interpolates the quasi-optimal node candidates using the above-described interpolation function, by the same method performed in the interpolation executing means 14. Then, the error calculating means 19 calculates an error between the one-dimensional time series data obtained by interpolation and the original one-dimensional time series data, as in the error calculating means 15.

Based on the error calculated in the error calculating means 19, the second objective function calculating means 20 calculates a value of a second objective function defined by weighted sum of a maximum value of the error, an average of the error, and a variance of the error. This second objective function is an error evaluation function with respect to the original nodes. When the maximum value of the error Is treated as critical one, the weight of the maximum value of the error is set to 1, and the weights of the average and the variance of the error are set to 0. Further, to assign weights to the maximum value of the error, the average of the error, and the variance of the error as in the case of treating the first objective function in the first objective function calculation means 16, the products of the values of the maximum value, the average, and the variance of the error and their respective weights are equal to each other. In the case of obtaining a fixed value, all the values of the weighting function are set to ⅓. Moreover, ratios to the respective weights in the case of the first objective function may be used as criteria.

The threshold judging means 21 made a judgment with a threshold for the value of the second objective function obtained in the second objective function calculating means 20. For example, when the weight of the maximum value of the error is set to 1 and the weights of the average of the error and of the variance of the error are both set to 0, an error of the approximation accuracy input by the input means 40a is used as a threshold. In this case, for all of the data, judge is made whether or not the data is within the approximation accuracy or not. When it is found that the value of the second objective function exceeds the threshold after the judgment with the threshold, subsequent node number changing means 22 operates, and when the value does not exceed the threshold, the changing means 22 is bypassed to the output means 40b.

The node number changing means 22 changes a number of nodes by adding an increment to the original node number. The increment is decided in advance.

After increasing the node number by a prescribed amount, the process is performed in the node candidate deciding means 13 again, and the sequential processes after the decision of node candidates are repeated until the threshold judging means 21 judges that the value of the second objective function is less than the threshold.

Then, after the value of the second objective function is judged to be less than the threshold, the subsequent processes are bypassed to the output means 40b. The output means 40b outputs the initial time, the time interval, the index numbers of the obtained nodes, and the data values obtained at this point. In this case, the form of the output data is identical to that shown in FIG. 16(a).

Output of the indices may be changed according whether a number of node candidates is less than the number of the one-dimensional time series data input at the start or larger than the input one-dimensional time series data number. When the node candidate number is less than half of the number of the one-dimensional time series data, the identifier indicating this fact and the index numbers of such node candidates are output, whereas the node candidate number is larger than the number of the one-dimensional time series data, the identifier indicating this fact and the indices other than those of the node candidates are listed.

Furthermore, when an initial time and a time interval of a treated one-dimensional time series data is kept constant and their values are already known, the initial value and the time interval may not be output from the output means 4b.

As described above, in the second embodiment, data compression is performed in a special hardware in the following procedure in which, first of all, initial node candidates are decided based on the respective data constituting one-dimensional time series data, and one-dimensional time series data approximating the original one-dimensional time series data is generated on the basis of the initial node candidates, using an interpolation function, and an error between these one-dimensional time series data is calculated and evaluated; then, quasi-optimal node candidates are calculated by moving the node candidates so that the evaluation of the error is within a prescribed range, and using the interpolation function, one-dimensional time series data approximating to the original one-dimensional time series data is generated based on the quasi-optimal node candidates, and the error between such one-dimensional time series data is calculated and evaluated; when the evaluation of the error is not within a prescribed range, optimization of node positions and node number is performed by repeating the above processes with increased number of nodes while preventing transmission of the data other than the data of nodes. Thereby, the compression corresponding to a property of given one-dimensional time series data can be performed at high speed.

Further, as a compression ratio of the data is controlled by approximation accuracy, error obtained after decompression can be grasped in advance.

Embodiment 3

Next, a description is given of a data compression method for one-dimensional time series data according to a third embodiment of the present invention, with reference to drawings.

In this third embodiment, in the compression method for one-dimensional time series data according to the first embodiment, compression for these data can be eliminated when the subsequent one-dimensional time series data are in a so-called zero sequence, that is, within a range in which data are regarded as almost zero.

Figure 6:
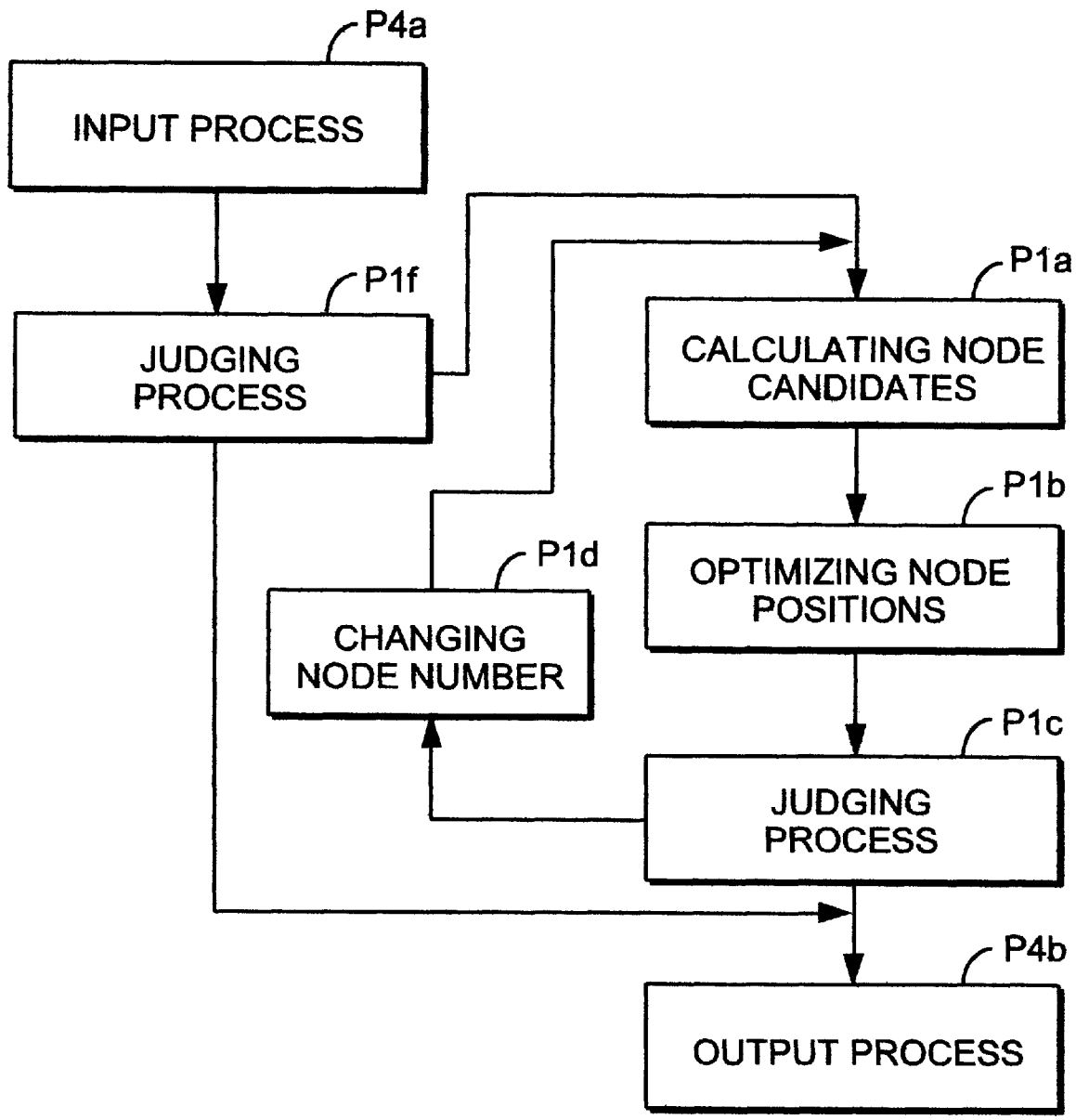
FIG. 6 is a block diagram of a compression method for one-dimensional time series data according to a third embodiment of the present invention.

FIG. 6 illustrates a process flow of the compression method for one-dimensional time series data according to the third embodiment of the present invention. The whole process shown in FIG. 6 is equal to that shown in FIG. 1. However, in this third embodiment, a judging process P1$f$ is provided immediately after input process P4$a$, and when the one-dimensional time series data input by input process P4$a$ is within approximation accuracy, process P1$f$ proceeds to output process P4$b$. On the other hand, when the data is not within approximation accuracy, the processes including node candidate calculation process P1$a$ are performed, as shown in FIG. 1.

Figure 7:
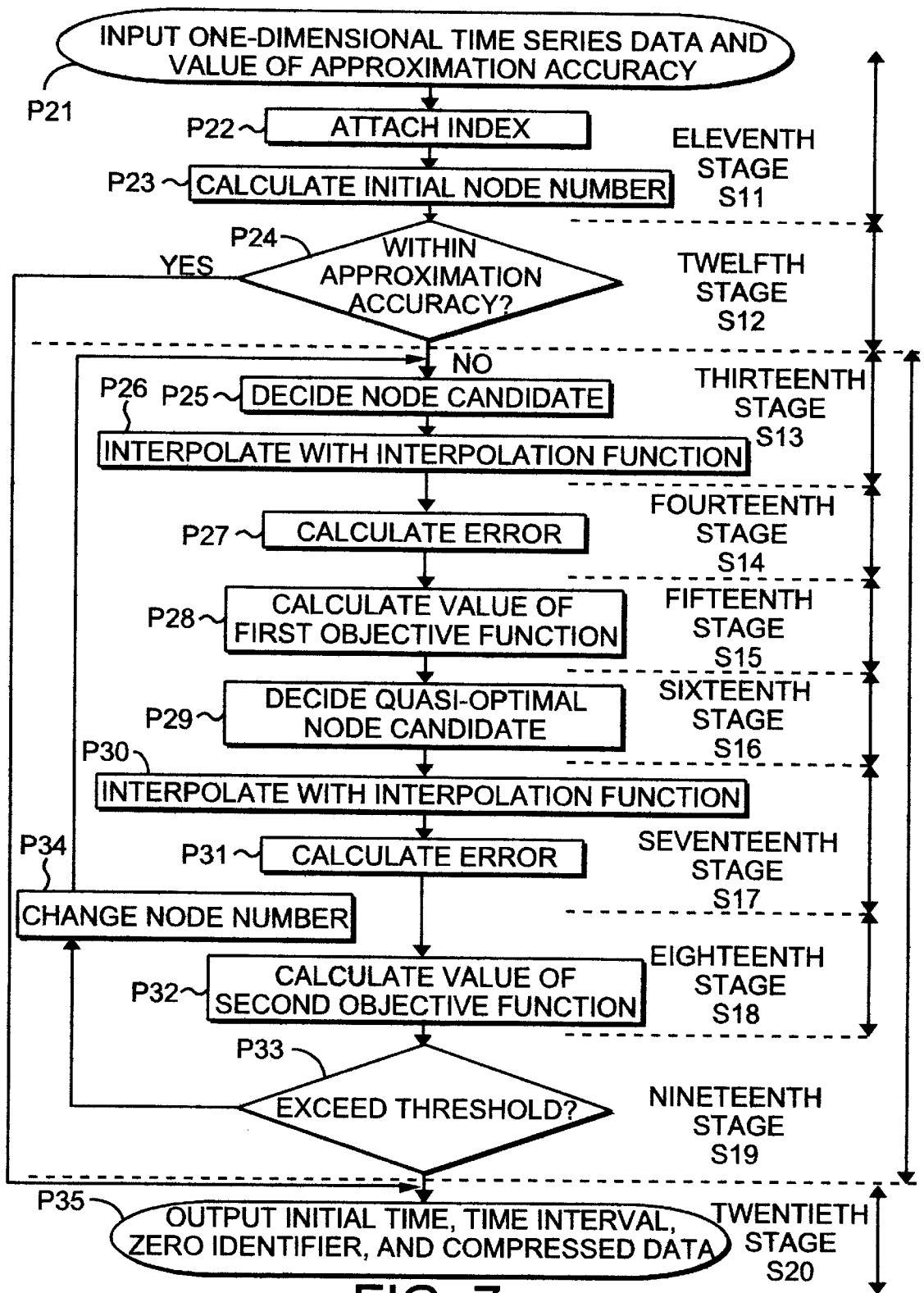
FIG. 7 is a detailed flow chart of the compression method for one-dimensional time series data according to the third embodiment.

FIG. 7 shows the processes of FIG. 6 in detail, and in the process flow of FIG. 7, the eleventh stage S11 to the twelfth stage S20 are executed in the computer of FIGS. 3($a$) and 3($b$). In this case, a program corresponding to the processes of FIG. 7 is stored in advance, in the main memory 3 of the computer of FIGS. 3($a$) and 3($b$), by loading it from the program recording medium or the like. The eleventh stage S11 is executed by process P21, process 22, and process P23, the twelfth stage S12 is executed by process P24, the thirteenth stage S13 is executed by process P25, the fourteenth stage S14 is executed by process P26 and process P27, the fifteenth stage is executed by process P28, the seventeenth stage S17 is executed by process P30 and process P31, the eighteenth stage S18 is executed by process P32, the nineteenth stage S19 is executed by processes P25 through P34, and the twelfth stage S20 is executed by process P35.

The respective processes configured above will be described in detail.

The processes in process P21 to process P23 are equal to the processes in process P1 to process P3 of the first embodiment shown in FIG. 2.

Process P24 makes a decision of whether or not the absolute values of all data values of given one-dimensional time series data are less than the approximation accuracy input in process P21. When it is decided that an approximation accuracy is less than the input accuracy, the values are in a so-called zero sequence. In this case, the information compression method of the third embodiment does not perform information compression and immediately executes process P35. On the other hand, when at least an absolute value of one data value exceeds the approximation accuracy, process P25 is executed.

The processes in process P25 to process P34 are equal to the processes in process P4 to process P13 shown in FIG. 2.

Process P35 outputs data in the form shown in FIG. 16($a$), similar to process P14 in the first embodiment of the present invention, when the thirteenth stage S13 to the nineteenth stage S19 have been already executed, while outputting the data in the form shown in FIG. 16($b$) when process P24 bypasses its subsequent processes to process P35. In other words, an initial time, a time interval, and an identifier indicating that all of the data values are zero are output.

As described above, the third embodiment can eliminate compression processes when the data is both within an approximation accuracy and within a range in which the data is treated as zero. Therefore, the processes can be eliminated when the data which can be treated as zero are successively found, whereby high-speed data compression process is available especially when such data is large in number.

Embodiment 4

Although in the third embodiment compression process for one-dimensional time series data is implemented in software, this may be realized in special hardware.

Figure 8:
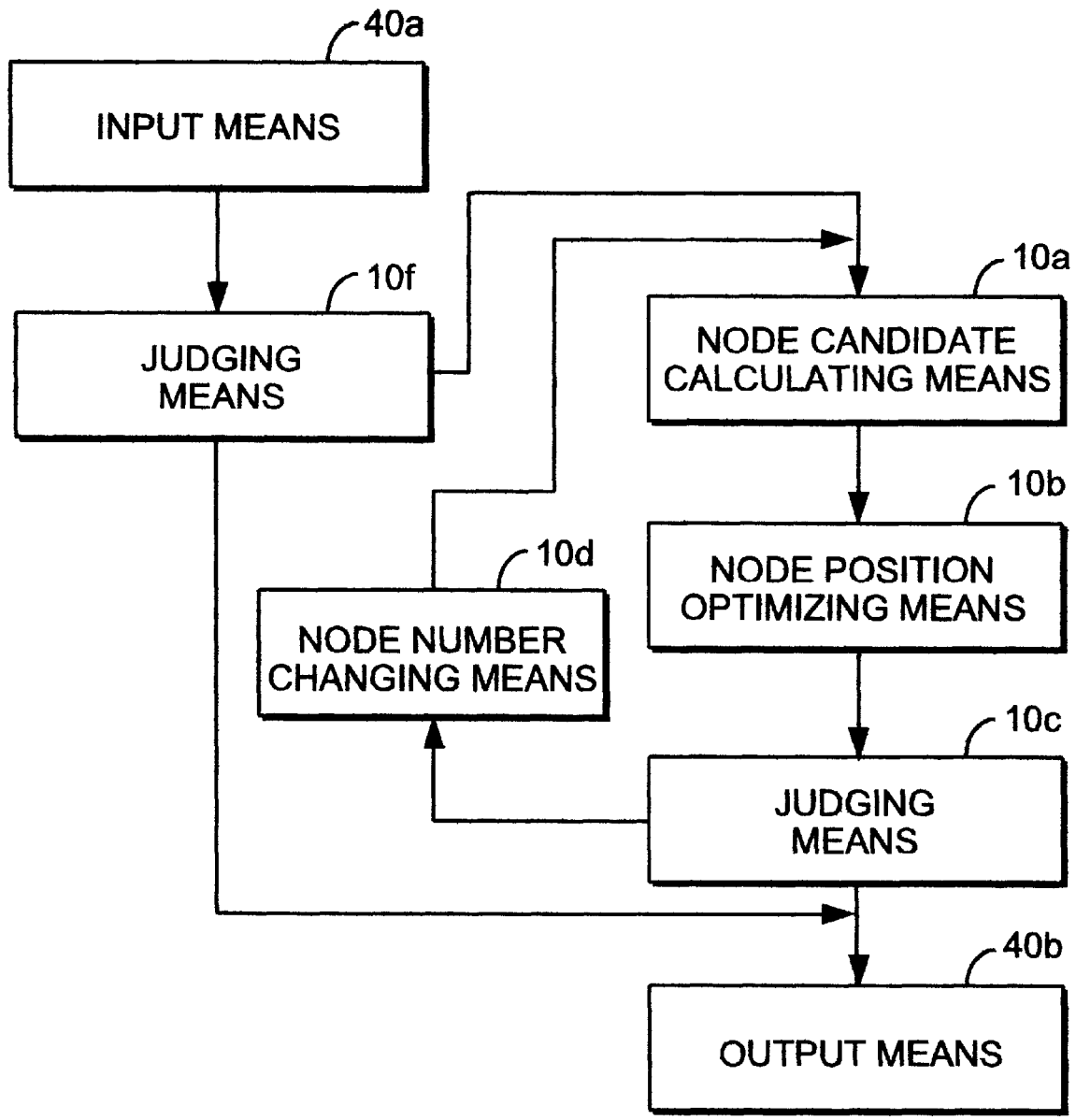
FIG. 8 is a block diagram of a compression device for one-dimensional time series data according to a fourth embodiment of the present invention.

FIG. 8 illustrates a compression device for one-dimensional time series data which implements the process flow of FIG. 6 in a special hardware. In the figure, the same reference numerals as those in FIG. 4 designate same or corresponding parts. Reference numeral 10$f$ designates a judging means provided between an input means 40$a$ and a node candidate calculating means 10$a$. When the one-dimensional time series data input by the input means 40$a$ is within an approximation accuracy, the subsequent means after the input means are bypassed to an output means 40$b$, whereas, when the data is not within the approximation accuracy, switching control of processes is performed so that the sequential data compression processes following the node candidate calculating means 10$a$ are executed again.

Figure 9:
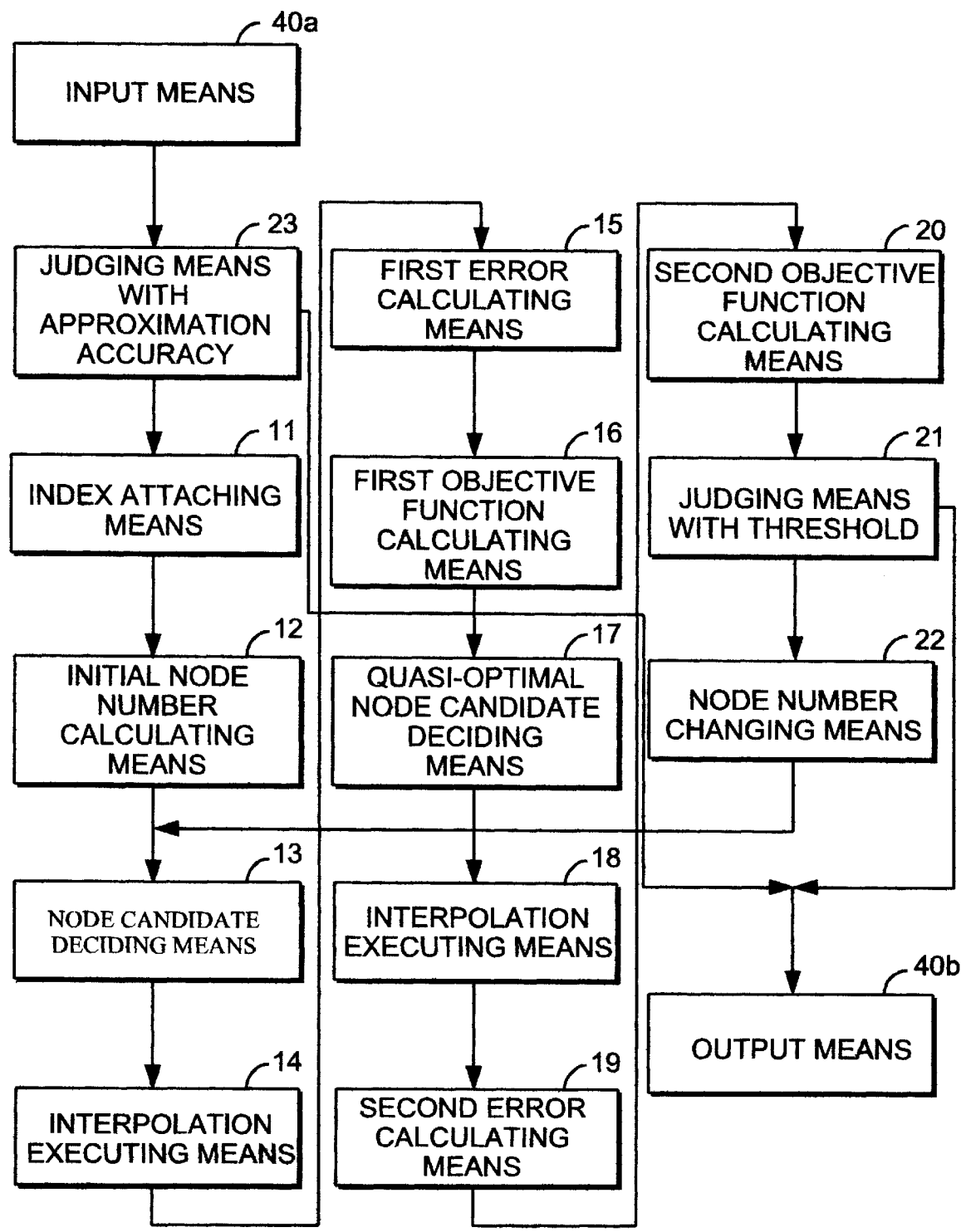
FIG. 9 is a detailed block diagram of the compression device for one-dimensional time series data according to the fourth embodiment.

FIG. 9 shows the detailed configuration of the compression device for one-dimensional time series data of FIG. 8. In the figure, the same reference numerals as those in FIG. 5 designate same or corresponding parts. Reference numeral 23 designates a judging means for making judgment using an approximation accuracy as a criteria, and the means is provided between the input means 4$a$ and the index attaching means.

Nest, a description is given of the operation.

The compression device for one-dimensional time series data comprises a judging means 23 using an approximation accuracy as a criterion between the input means 4$a$ and the index attaching means 11. The judging means 23 judges whether or not the one-dimensional time series data input by the input means 4$a$ is within an approximation accuracy. When the data is within this accuracy, the judging means 23 is followed by the output means 4$b$ because in this case, the compression device for one-dimensional time series data do not perform data compression processing. On the other hand, when the data is not within the approximation accuracy, switching control of processes is performed so that the judging means 23 is followed by the index attaching means 11 and the sequential data compression processes are executed as shown in FIG. 6.

As described above, in the fourth embodiment, when the data is within a range of approximation accuracy in which data is regarded as almost zero, its compression processes are eliminated. Therefore, when the data regarded as zero are successively found, the processes can be omitted, and when the data number is large, high-speed data compression processing is available. Furthermore, as these processes can be implemented in a special hardware, further speeding up is possible.

Embodiment 5

Hereinafter described is a method of decompressing the one-dimensional time series data compressed by the compression method according to the first or the third embodiment.

Figure 16A:
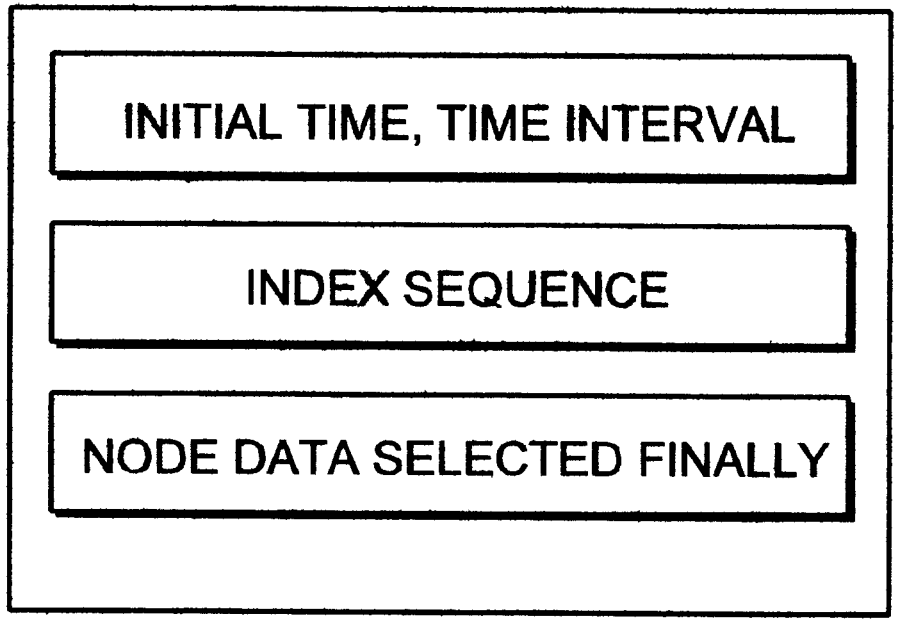
FIGS. 16(*a*) and 16(*b*) are drawings for explaining forms of compressed data.

Initially, a description is given of decompression of compressed data in the fifth embodiment in the case where it is assured that the data compressed only in the form shown in FIG. 16(a) is supplied.

Figure 17:
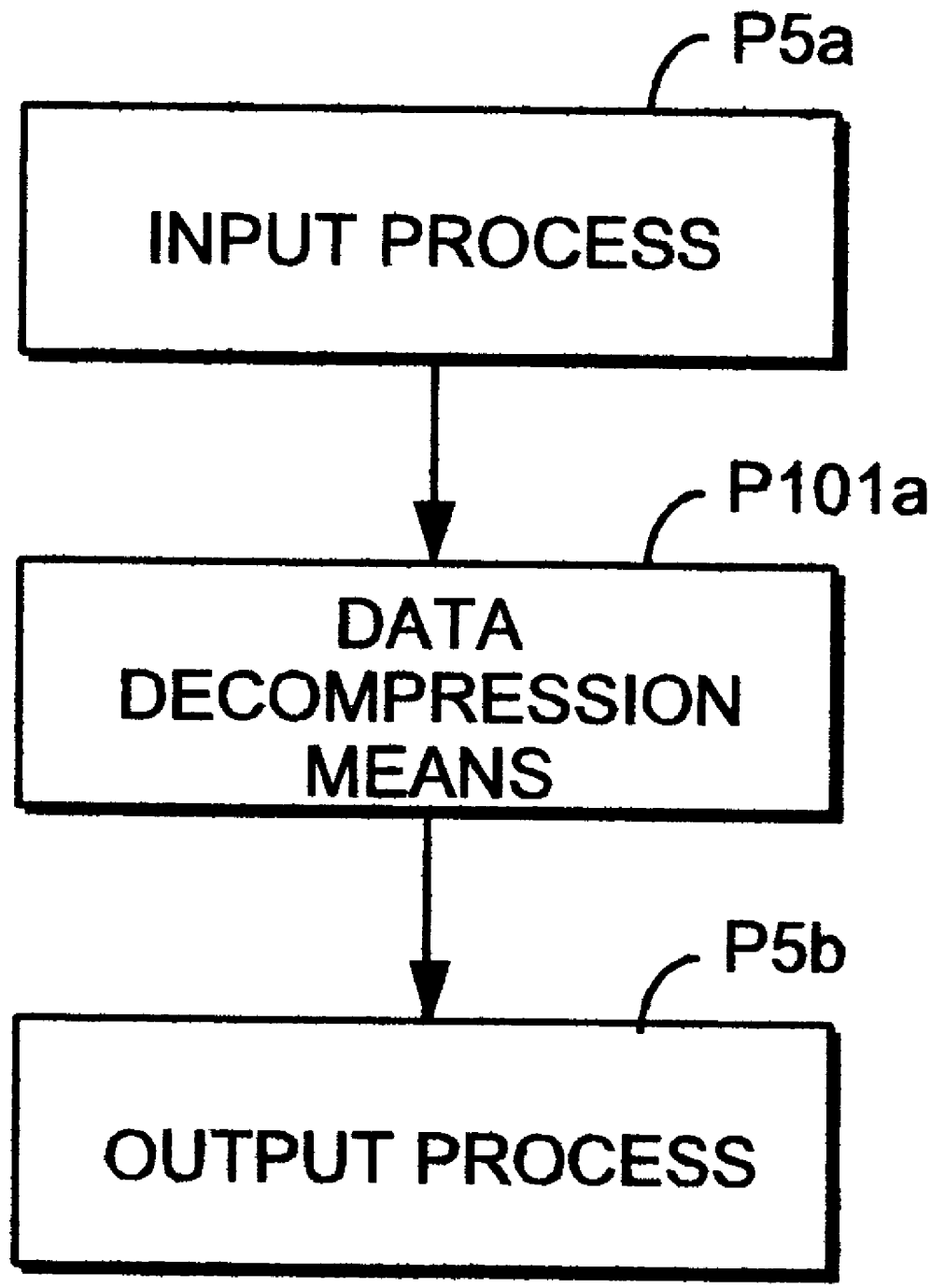
FIG. 17 is a block diagram of a decompression method for one-dimensional time series data according to a fifth embodiment of the present invention.

FIG. 17 illustrates a method of decompressing the one-dimensional time series data compressed by the compression method of the first embodiment, that is, a data decompression method In the case where the data compressed only in the form shown in FIG. 16(a) is supplied. The decompression method consists of tee stages. As shown in the figure, process P5a is an input process for inputting the compressed data which has been compressed by the compression method for one-dimensional time series data according to the first embodiment, process P101a is a data decompression process for performing decompression by interpolating the compressed data with an interpolation function, and process P5b is an output process for outputting the decompressed one-dimensional time series data.

Next, a description is given of the process method. The input process P5a inputs the compressed data which has been compressed by the compression method for one-dimensional time series data and a number of data to be generated when the compressed data is decompressed. Next, the data decompression process P101 interpolates the compressed data using the same interpolation function as that used for data compression and performs decompression. Then, the output process P5b outputs the one-dimensional time series data decompressed by the data compression process P101a.

Figure 18:
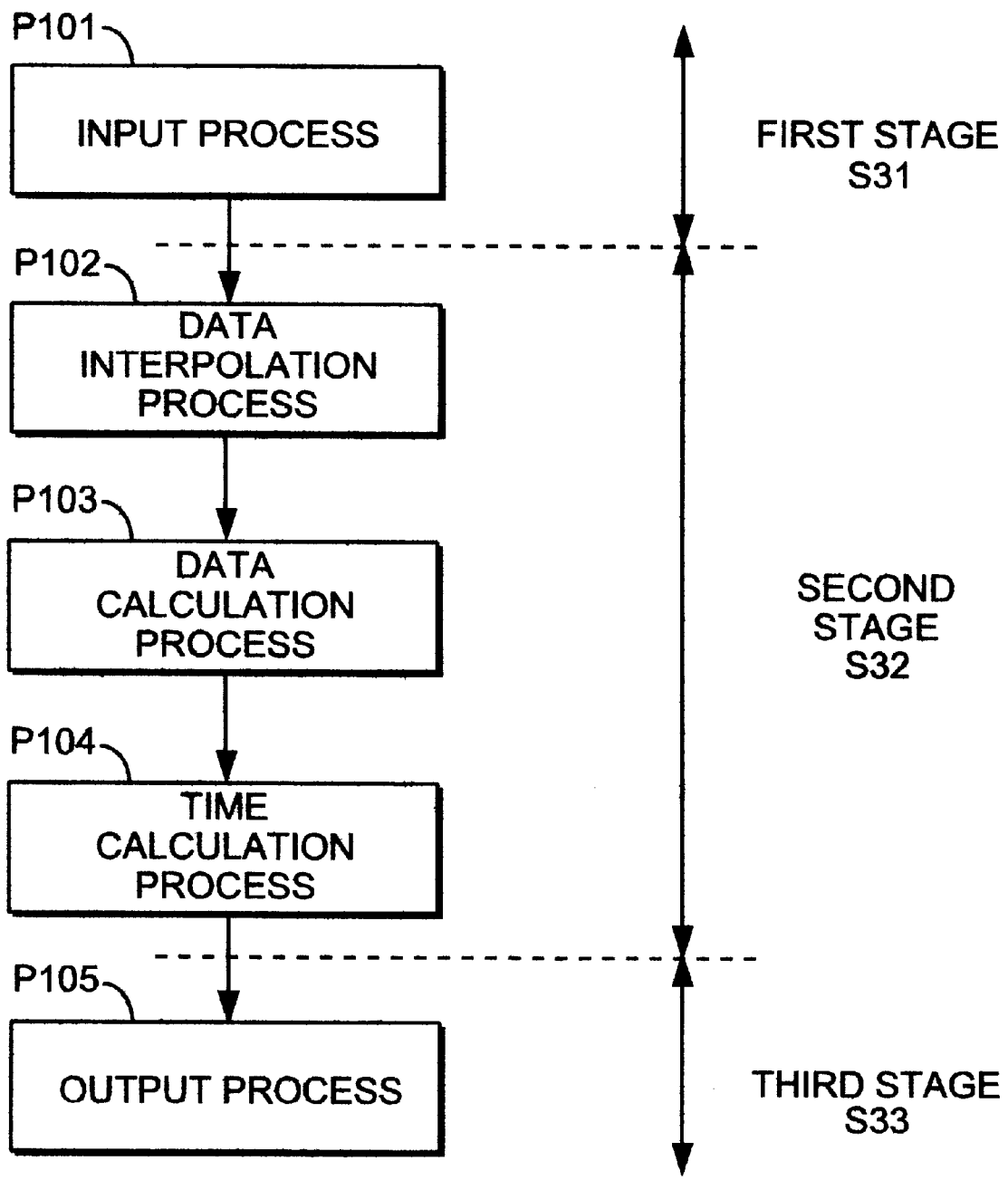
FIG. 18 is a detailed block diagram of the decompression method for one-dimensional time series data according to the fifth embodiment.

FIG. 18 illustrates the decompression method of FIG. 17 in detail.

In the figure, the first stage S31 consists of an input process P101 identical to the input process P5a of FIG. 17. The second stage S32 consists of the data interpolation process P102 for interpolating the compressed data, the data calculation process P103 for calculating the decompressed data, and the time calculation process P104 for calculating the time corresponding to the decompressed data. The third stage S33 consists of the output process P105 identical to the output process P5b of FIG. 17.

In the processes of FIG. 17, which are illustrated in detail in FIG. 18, the first stage S31 to the third stage S33 are executed by the computer of FIGS. 3(a) and 3(b). In this case, the main memory of the computer of FIGS. 3(a) and 3(b) stores a program corresponding to the processes of FIG. 17 in advance by loading the program from the program recording media.

Next, a description is given of the decompression method. First of all, in the first stage S31, the input process P101 inputs the compressed data which has been compressed by the compression method for one-dimensional time series data according to the first embodiment, and a number of data to be generated when the compressed data is decompressed.

Then, in the second stage S32, the data interpolation process P102 interpolates the compressed data using an interpolation function equal to that used for data compression to make the data continuous, and the data calculation process P103 calculates data corresponding to a number of required data, based on the continuous data, and the time calculation process calculates the time corresponding to a number of time requiring data, based on an initial time and a time interval. However, the interpolation function is a function using the indices as an independent variable, as in the case of compression, and generates an interpolation function using the values of the index sequence of the compressed data.

In the third stage S33, the output process P105 outputs the data calculated in the second stage S32 and its time as decompressed one-dimensional time series data.

As is understood from the above decompression method, to restore one-dimensional time series data, decompression can be performed to have one-dimensional time series data whose data number diggers from that of the original data. In other words, this means that the one-dimensional time series data can be changed timewise, and the control can be performed based on the number of data to be input.

Thus, the fifth embodiment can provide a decompression method for one-dimensional time series data which can decompress the one-dimensional time series data compressed by the method of the first embodiment, and increase or decrease the number of data to be generated during the decompression as desired corresponding to the original one-dimensional time series data, and further increase or decrease the number of the generated data without degrading the quality of the data.

Embodiment 6

Although in the fifth embodiment the decompression process for one-dimensional time series data is implemented in software, this may be implemented in a special hardware.

Figure 19:
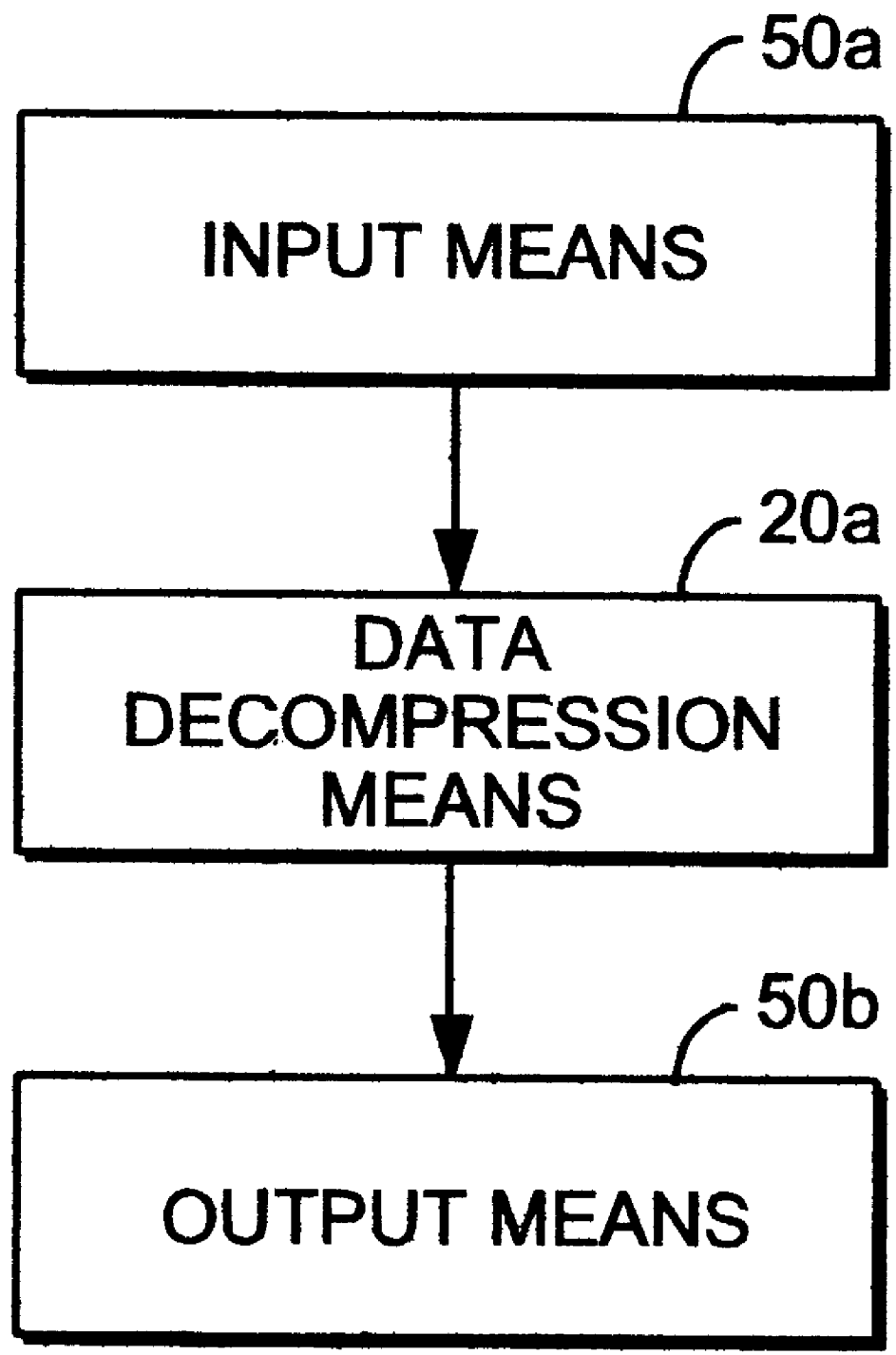
FIG. 19 is a block diagram of a decompression device for one-dimensional time series data according to a sixth embodiment of the present invention.

FIG. 19 illustrates a decompression device for one-dimensional time series data which implements the process flow of FIG. 17 in a special hardware, and the device is for decompressing the one-dimensional time series data compressed by the compression device for one-dimensional time series data of the second embodiment, that is, the data compressed only in the form shown in FIG. 16(a). As shown In the figure, reference numeral 50a designates an input means for inputting the compressed data which has been compressed by the compression device for one-dimensional time series data according to the second embodiment, numeral 20a designates a data decompressing means for decompressing by interpolating the compressed data with an interpolation function, and numeral 50b designates an output means for outputting the decompressed one-dimensional time series data.

Next, a description is given of the operation. The input means 50a inputs the compressed data which has been compressed by the compression device for one-dimensional time series data and a number of data to be generated when the compressed data is decompressed. Next, the data decompressing means 20a performs decompression by interpolating the compressed data using the same interpolation function as that used for data compression. Then, the output means 50b outputs the one-dimensional time series data decompressed by the data decompressing means 20a.

Figure 20:
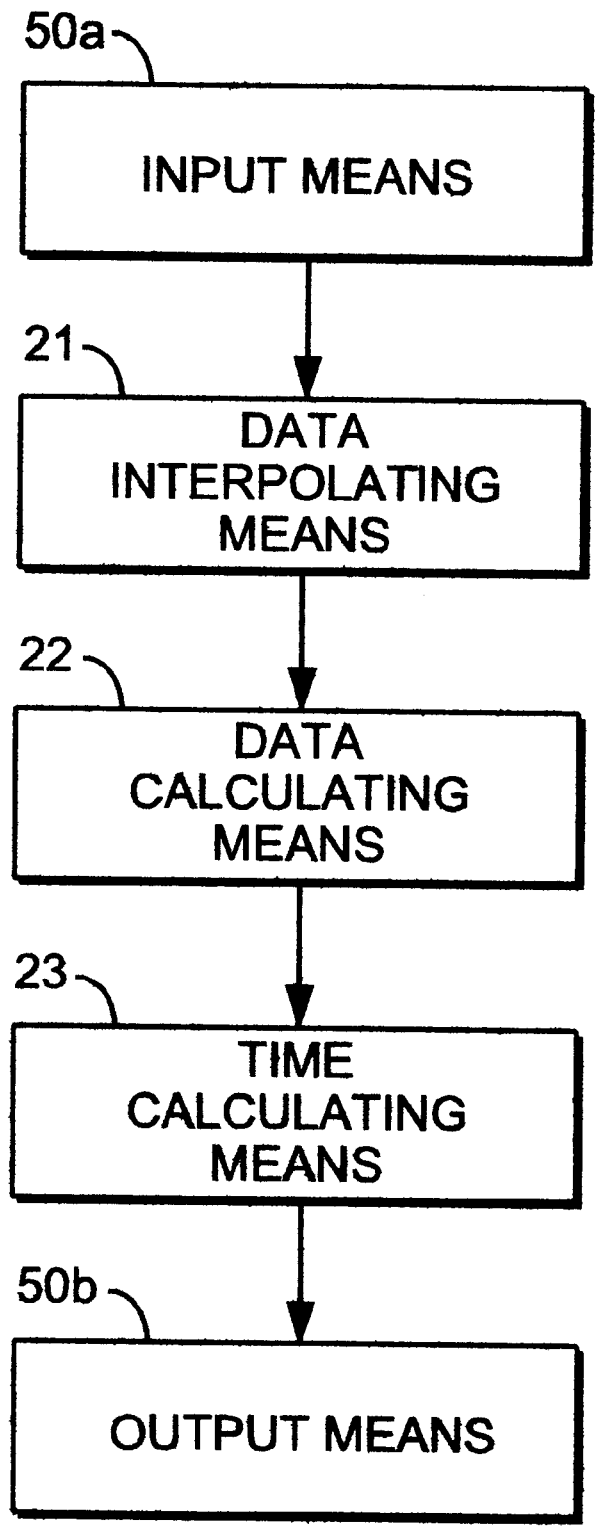
FIG. 20 is a detailed block diagram of the decompression device for one-dimensional time series data according to the sixth embodiment.

FIG. 20 illustrates the configuration of the decompression device of FIG. 10 in detail.

In the figure, reference numeral 50a designates an input means configurated like the input means 50a of FIG. 19. Reference numeral 21 designates a data interpolating means for performing data interpolation process with respect to the input data, numeral 22 designates a data calculating means for calculating an decompressed data from the interpolated data, numeral 23 designates a time calculating means for calculating a time corresponding to the data. Reference numeral 50b designates an output means configurated like the output means 50b of FIG. 19.

Next, a description is given of the operation. First of all, the input means 50a inputs the compressed data which has been compressed by the compression device for one-dimensional time series data according to the second embodiment, and a number of data to be generated when the compressed data is decompressed.

Then, the data interpolating means 21 interpolates the compressed data using an interpolation function identical to that used for data compression to make the data continuous, and the data calculating means 22 calculates a required number of data from the continuous data, and the time calculating means 23 calculates a time corresponding to a number of the data requiring the time, based on the data's initial time and time interval. However, the interpolation function is a function using the indices as an independent variable as in the case of compression, and generates an interpolation function using the value of the index sequence of the compressed data.

The output means 50b outputs the calculated data and its time as decompressed one-dimensional time series data.

Thus, the sixth embodiment enables to decompress the one-dimensional time series data compressed by the device of the second embodiment in a special hardware at higher speed, and to increase or decrease the number of data to be generated during the data decompression which corresponds to the original one-dimensional time series data, as well as to increase or decrease the number of the generated data without degrading the quality of the data.

Embodiment 7

Next, a description is given of a method of decompressing the one-dimensional time series data compressed by the compression method according to the third embodiment.

In the seventh embodiment, explained is a case where a mixture of the data in the form of FIG. 16($a$) and the data in the form of FIG. 16($b$) is supplied.

Figure 21:
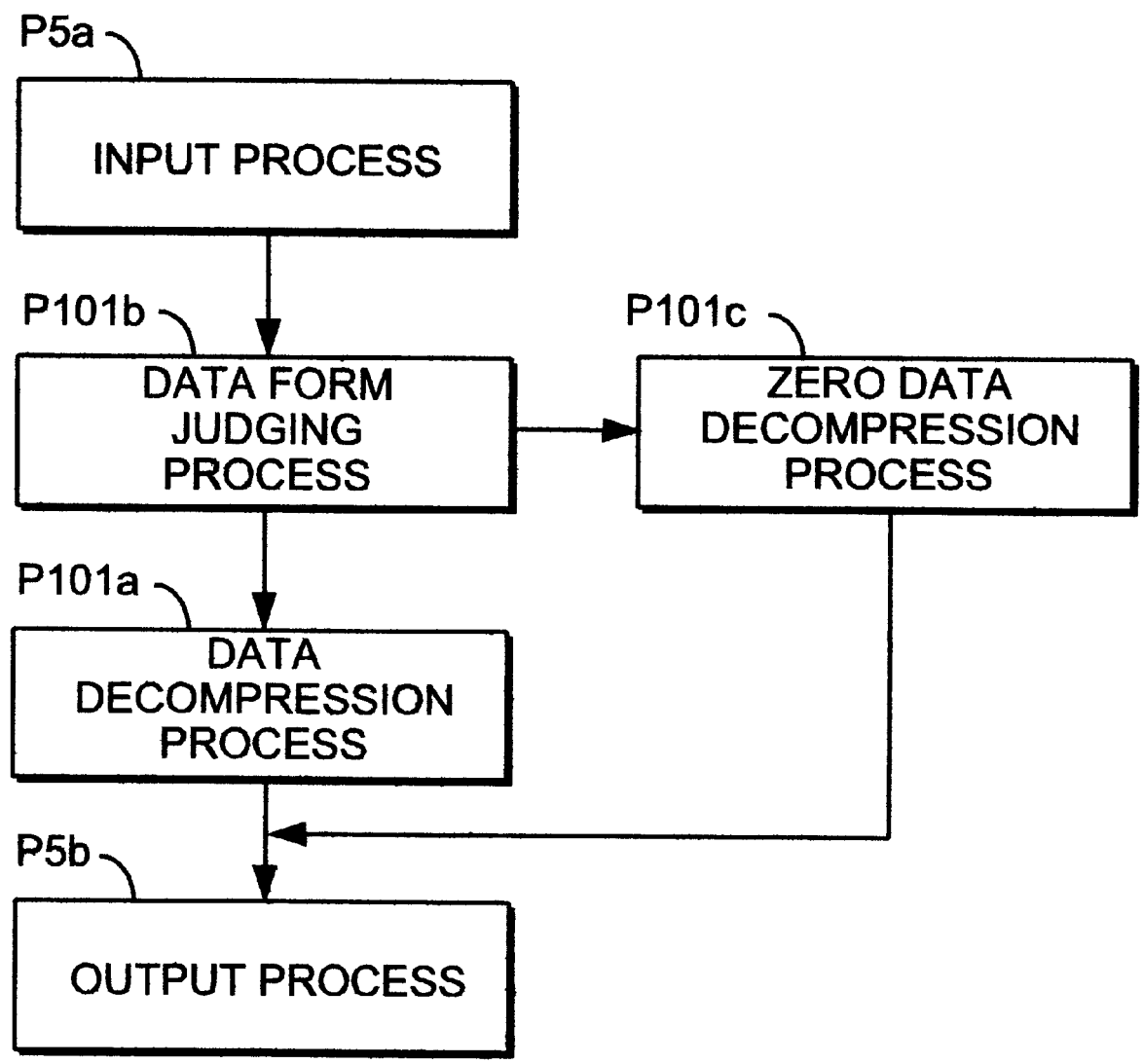
FIG. 21 is a block diagram of a decompression method for one-dimensional time series data according to a seventh embodiment of the present invention.

FIG. 21 illustrates a method of decompressing the one-dimensional time series data compressed by the compression method of the third embodiment, that is, a data decompression method in the case where a mixture of the data in the form of FIG. 16($a$) and the data in the form of FIG. 16($b$) is supplied. The decompression method consists of four stages. In the figure, the same numerals as those in FIG. 17 correspond to same or corresponding parts. P101b is a data form judging process for judging the form of the compressed data, P101c is a zero data decompression process for decompressing compressed data when it is found that all of the compressed data are "zero".

Next, the decompression method will be described more specifically. When the data in the form of FIG. 16($a$) is supplied, the data form judging process P101b inputs the data to the data decompression process P101a, and the data is decompressed as shown in FIG. 17 and output by the output process P5b.

On the other hand, when the data in the form of FIG. 16($b$) is supplied, the data form judging process P101b inputs the data to the zero data decompression process P101c. The process P101c generates the data which is all 0 in a prescribed period, and the generated data is output from the output process P5b as shown in FIG. 17.

FIG. 22 illustrates the decompression method of FIG. 21 in detail.

In the processes of FIG. 21, which are illustrated in detail in FIG. 22, are executed by the computer of FIGS. 3($a$) and 3($b$). In this case, the main memory of the computer of FIG. 3 stores a program corresponding to the processes of FIG. 22 in advance by loading the program from the program recording media or the like.

In the figure, the first stage S41 consists of an input process P101 identical to the input process P101 of FIG. 18. The second stage S42 consists of a data form judging process P106, a zero data calculation process P107, and a time calculation process P108. The third stage S43 consists of a data interpolation process P102, a data calculation process P103, and a time calculation process P104, like the second stags S32 of FIG. 18. The third stage S44 consists of an output process P105 identical to the output process P105 of FIG. 18.

Next, a description is given of the decompression method. First of all, in the first stage S41, the input process P101 inputs the compressed data which has been compressed by the compression method for one-dimensional time series data and a number of data to be generated when the compressed data is decompressed.

Then, in the second stage S42, the data form judging process P106 judges the form of the compressed data, and when the data is judged to be in the form of FIG. 16($b$), that is, has an identifier is found which indicates that all of the data are "zero", the zero data calculation process P107 calculates zero data whose number is equal to that of the compressed data, and the time calculation process P108 calculates time by a number of the data on the basis of its initial time and its time interval. The calculated zero data and its time are output from the output process P105 in the fourth stage S44 as one-dimensional time series data.

On the other hand, when it is judged in the second stags S42 that the compressed data does not have an identifier which indicates that all of the data are "zero", that is, the data is in the form of FIG. 16($a$), as in the second stage S32 of FIG. 18, the third stage S43 interpolates the compressed data with an interpolation function used for compression to make the data continuous, and calculates data corresponding to a number of data specified by the input process, based on the continuous data, and then calculates the time corresponding to the number of the data requiring time, based on its initial time and time interval. However, the interpolation function is a function using the indices as an independent variable as in the case of compression, and generates an interpolation function using the value of the index sequence of the compressed data.

In the fourth stage S44, the data calculated by the second stage S42 or the third stage S43 and its time as decompressed one-dimensional time series data.

As is understood from the above decompression method, to store the one-dimensional time series, decompression may be performed in such a way that the number of data differs from that of the original data. In other words, this means that the one-dimensional time series data can be changed timewise, and the control can be performed based on the number of data to be input.

Thus, the seventh embodiment can obtain a decompression method for one-dimensional time series data which enables to decompress the one-dimensional time series data compressed by the method of the third embodiment, and to increase or decrease the number of data to be generated for the decompression, corresponding to the original one-dimensional time series data, as well as to increase or decrease the number of the generated data without degrading the quality of the data.

Embodiment 8

Although the seventh embodiment implements decompression process for one-dimensional time series data in software, the data decompression process may be implemented in a special hardware.

Figure 16B:
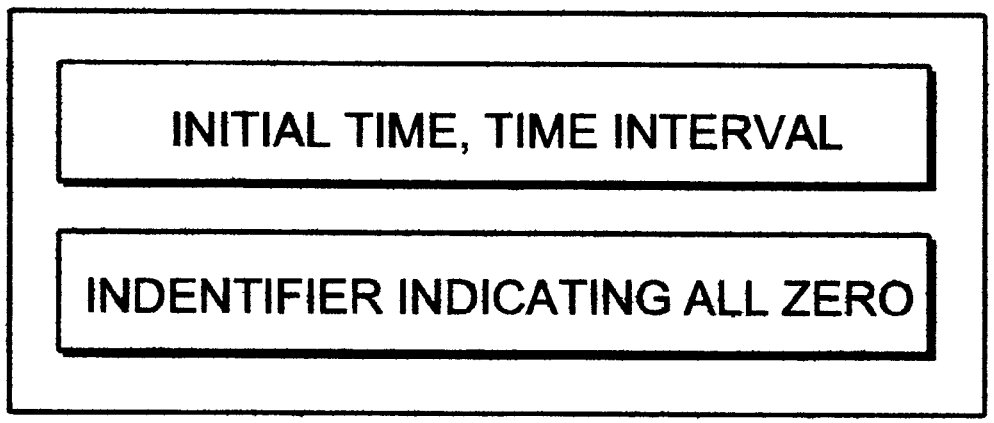
Figure 23:
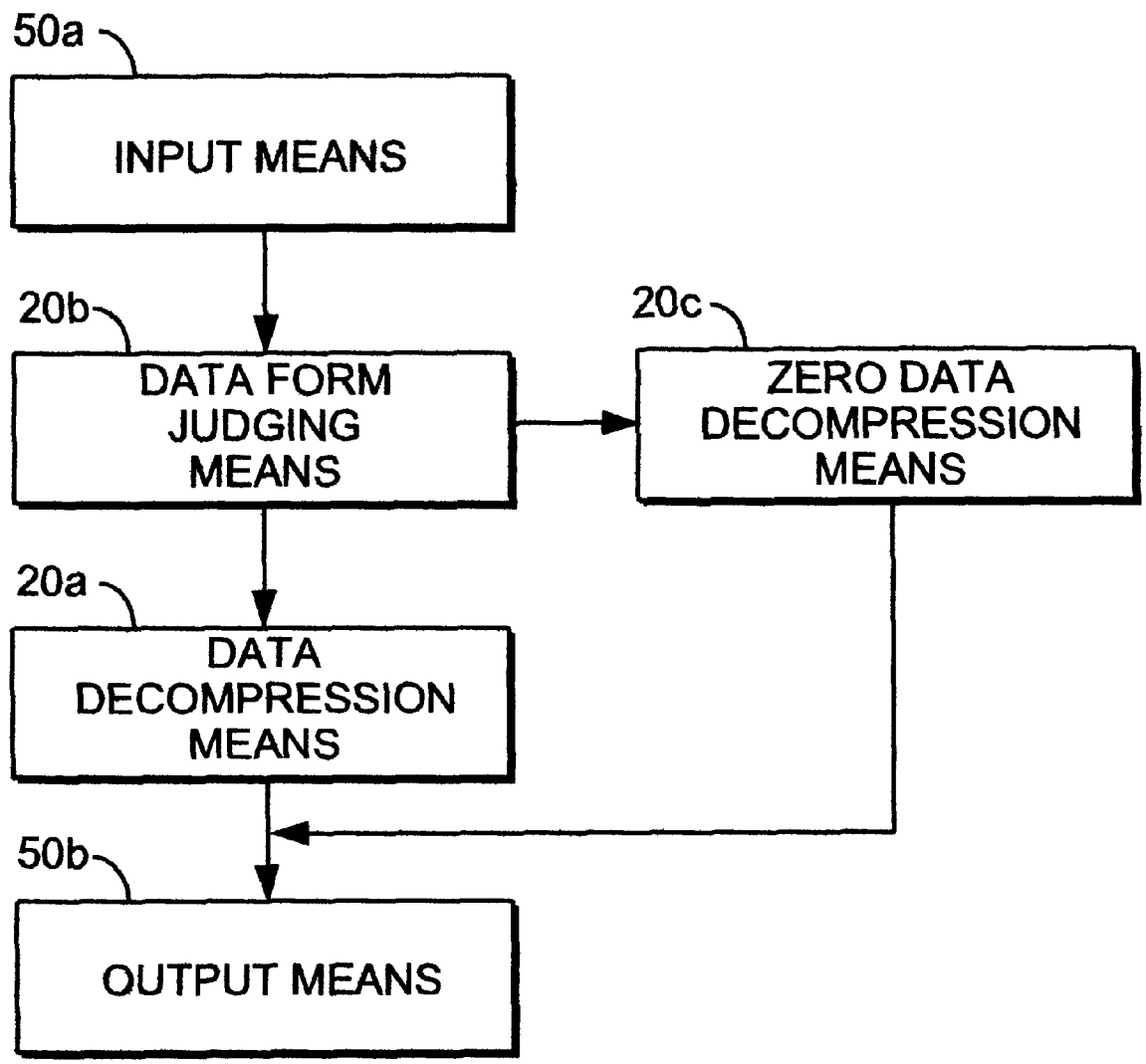
FIG. 23 is a block diagram of a decompression device for one-dimensional time series data according to an eighth embodiment of the present invention.

FIG. 23 shows a decompression device for one-dimensional time series data which implements the process flow of FIG. 21 in a special hardware. This figure illustrates the data decompression device in a case where the one-dimensional time series data compressed by the compression device of the fourth embodiment, that is, a mixture of the data in the form of FIG. 16(a) and the data in the form of FIG. 16(b) is supplied. In the figure the same reference numerals as those in FIG. 19 designate same or corresponding parts. Reference numeral 20b designates a data form judging means for judging the form of compressed data, numeral 20c designates zero data decompressing means for decompressing compressed data when all of the data is judged to be "zero".

Next, the decompression operation will be described. When the data in the form of FIG. 16(a) is supplied, the data form judging means 20b inputs this data to the data decompressing means 20b, and the data is decompressed and output by the output means 50b, as shown in FIG. 19.

On the other hand, when the data in the form of FIG. 16(b) is supplied, the data form judging means 20b inputs this data to the zero data decompressing means 20c. For a prescribed period, the zero data decompression means 20c generates the data that is all zero, which is output from the output means 50b as shown in FIG. 19.

Figure 24:
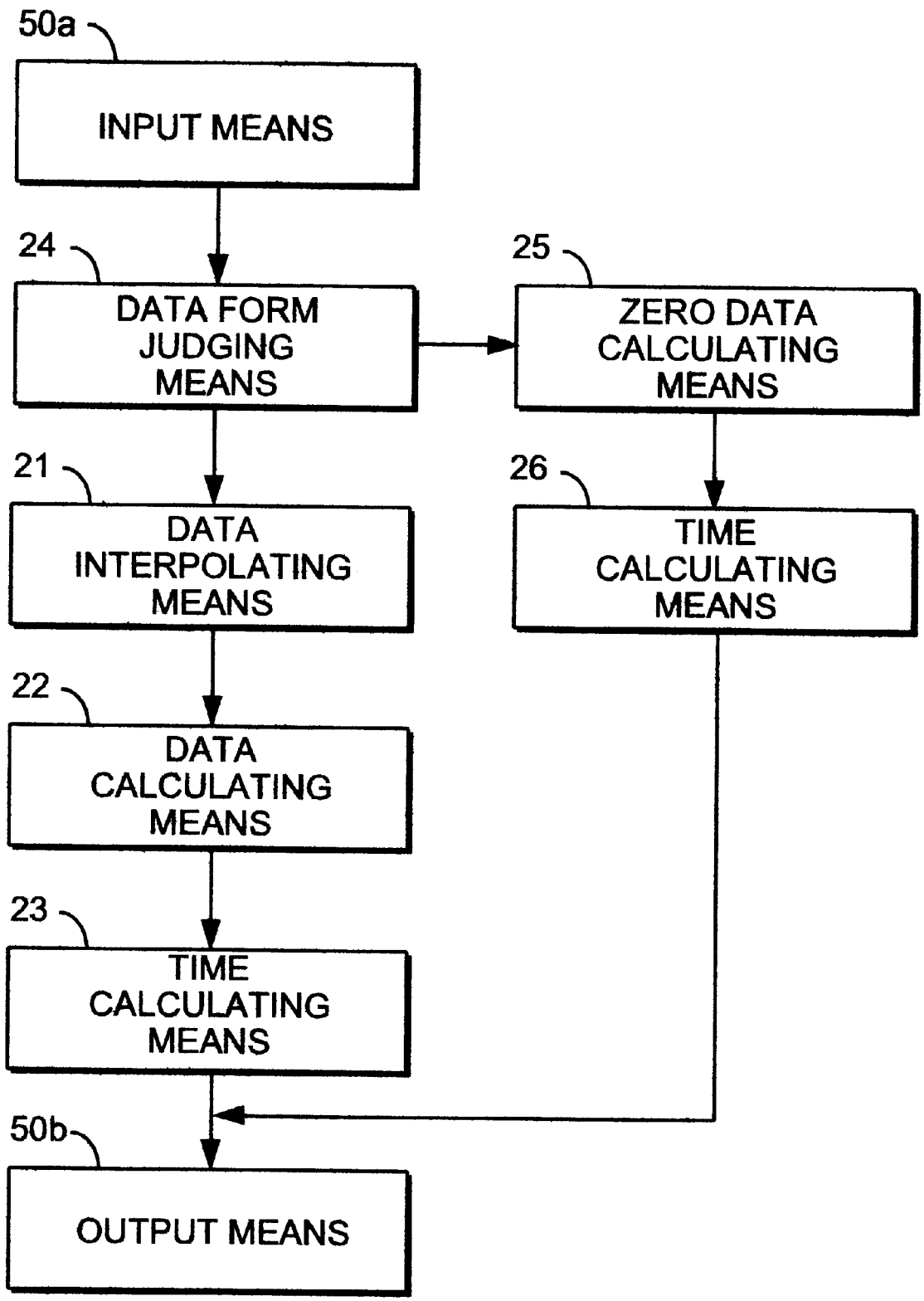
FIG. 24 is a detailed block diagram of the decompression device for one-dimensional time series data according to the eighth embodiment.

FIG. 24 illustrates the decompression device of FIG. 23 in detail. In the figure, the same reference numerals as those in FIG. 20 designate same or corresponding parts. Reference numeral 24 designates a data form judging means for judging the form of the input data, numeral 25 "zero" data, numeral 26 designates a time calculating means for calculating a time corresponding to the "zero" data.

Next, a description is given of the decompression operation. First of all, the input means 50a inputs the compressed data which has been compressed by the compression device for one-dimensional time series data and a number of the data after decompression.

Then, the data form judging means 24 judges the form of the compressed data, and when the data is judged to be in the form of FIG. 16(b), that is, to has an identifier which indicates that all of the data are "zero", the zero data calculating means 25 calculates zero data which is equal to the compressed data in number, and the time calculating means 26 calculates a time corresponding to a number of the compressed data on the basis of its initial time and its time interval. The calculated zero data and its time are output from the output means 50b as one-dimensional time series data.

On the other hand, when the data form judging means 23 judges that the compressed data does not have an identifier which indicates that all of the data are "0", that is, the data is in the form of FIG. 16(a), the compressed data is interpolated with the interpolation function used for compression to make the data continuous, and data corresponding to a number of data specified by the input means 50a is calculated on the basis of the continuous data, and then the time corresponding to the number of the data is calculated on the basis of its initial time and time interval. The interpolation function is, however, a function using the indices as an independent variable as in the case of compression, and generates an interpolation function using the value of the index sequence of the compressed data as shown in FIG. 20.

The output means 50b outputs the calculated data and its time as decompressed one-dimensional time series data, as shown in FIG. 20.

Thus, the eighth embodiment enables to decompress the one-dimensional time series data compressed by the method of the fourth embodiment in a special hardware at high speed, and to increase or decrease a number of data to be generated for the decompression as desired, corresponding to the original one-dimensional time series data, as well as to increase or decrease the number of the generated data without degrading the quality of the data.

Embodiment 9

The present invention can be applied for compression and decompression of one-dimensional time series data as well as multi-dimensional, that is, plural one-dimensional time series data, by the common compression and decompression method using the common compression and decompression devices.

For example, compression for plural one-dimensional time series data can be executed by the compression methods according to the first and third embodiments of the invention, repeatedly using the compression devices according to the second and fourth embodiments.

In a ninth embodiment, a description is given of the case of compressing such multi-dimensional time series data, with reference to Motion Data Compression as an example.

As described above, Motion Data Compression is a method of compressing an amount of multi-dimensional time series data expressing a motion of human being so as to express a motion of a human being which is here regarded as a hard body multi-joint object.

Motion Data consists of a translation vector of positions of representative points of a hard body multi-joint object modeling a human being, a rotation amount of posture vector with respect to coordinate axles of three-dimensional space, translation vector of each joint (node), and a rotation amount with respect to the respective coordinate axles of a local coordinate.

Assuming that a joint number of a hard body multi-joint object is m and a length of a time series is n, motion data is given by $\{M_i = (Cx_i, Cy_i, Cz_i, \theta_i^{cx}, \theta_i^{cy}, \theta_i^{cz}, x_i^{jt0}, y_i^{jt0}, z_i^{jt0}, \theta_i^{jtx0}, \theta_i^{jty0}, \theta_i^{jtz0}, \ldots, x_i^{jtm-1}, y_i^{jtm-1}, z_i^{jtm-1}, \theta_i^{jtxm-1}, \theta_i^{jtym-1}, \theta_i^{jtzm-1})$
$\| i=0, 1, \ldots, n-1\}$ wherein rotation priority is set to be an x coordinate axis, an y coordinate axis, and a z coordinate axis, and $Cx_i, Cy_i, Cz_i$ are roots, i.s., coordinates of fiducial points for positions on a hard body, $\theta_i^{cx}, \theta_i^{cy}, \theta_i^{cz}$ are posture control angles, $x_y^{jt0}, y_i^{jt0}, z_i^{jt0}$ are sliding amounts of joints, $\theta_i^{jtx0}, \theta_i^{jty0}, \theta_i^{jtz0}, \ldots, x_i^{jtm-1}, y_i^{jtm-1}, z_i^{jtm-1}, \theta_i^{jtxm-1}, \theta_i^{jtym-1}, \theta_i^{jtzm-1}$ are rotation angles of m joints for m, y, and z coordinate axles.

Figure 25:
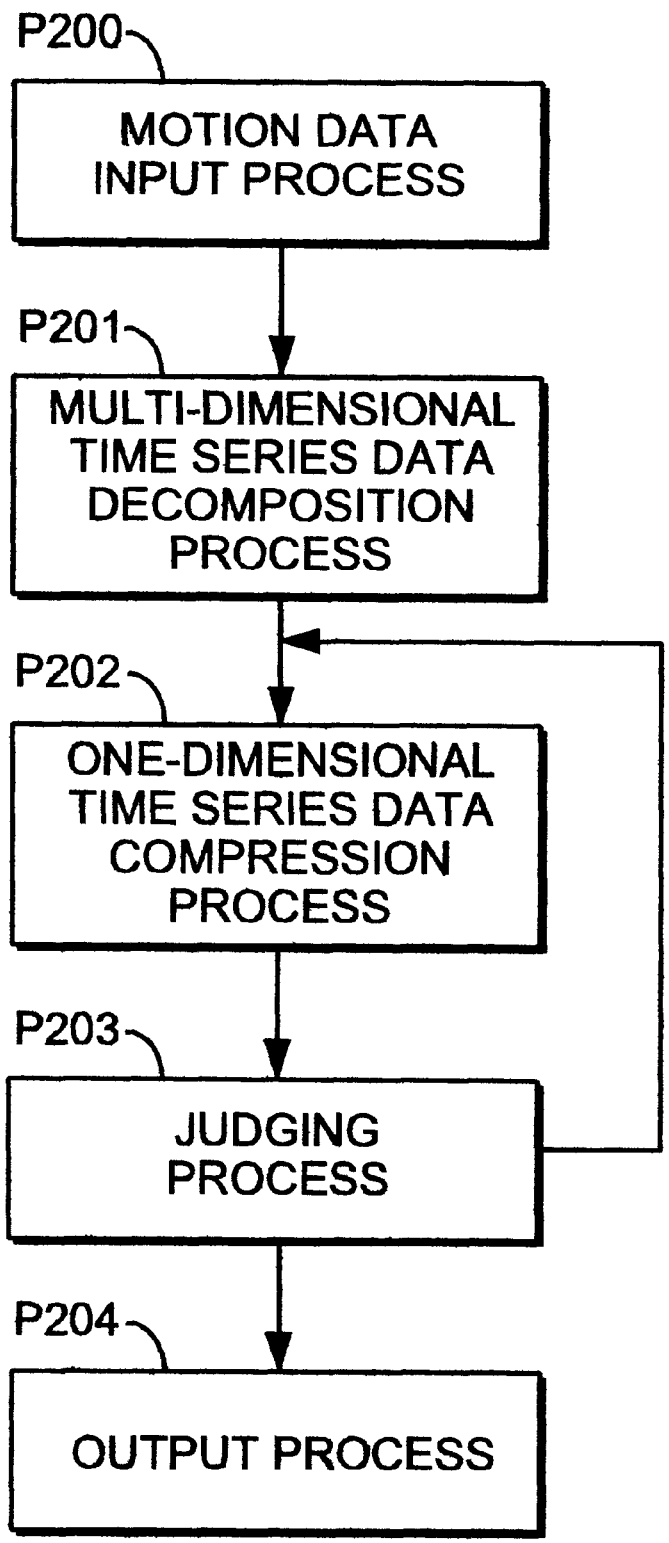
FIG. 25 is a block diagram of a compression method for multi-dimensional time series data according to a ninth embodiment of the present invention.

FIG. 25 shows a compression method for the Motion data. In the figure, reference numeral P200 designates a Motion Data input process of inputting Motion Data, numeral P201 designates multi-dimensional time series data decomposing process of decomposing Motion Data as multi-dimensional time series data into one-dimensional time series data whose number is equal to the dimension number of the multi-dimensional time series data, numeral P202 is one-dimensional time series data compression process of compressing the one-dimensional time series data as decomposed data by the compression method according to the first or third embodiment, numeral P203 designates a judging process of judging whether the compression of the one-dimensional time series data whose number is equal to the dimension number has been completed or not, and numeral P204 designates an output process of outputting the compressed multi-dimensional time series data.

The processes shown in FIG. 25 are executed by the computer of FIGS. 3(a) and 3(b), for example. In this case, the main memory 3 of the computer of FIGS. 3(a) and 3(b) has stored a program corresponding to the processes of FIG. 25 in advance by loading the program from program recording media.

Next, these processes will be described in detail. First of all, the input process P200 inputs Motion Data which is a multi-dimensional time series data. Next, the decomposing process P201 decomposes Motion Data into one-dimensional time series data as components, and gives an index to each one-dimensional time series data.

The processes following the decomposing process P201 are equal to those of the compression method for one-dimensional time series data according to the first or third embodiment.

To be more specific, following the decomposing process P201, the one-dimensional time series data compression process P202 compresses each one-dimensional time series data obtained by the decomposition, by the same compression method as that of the first or third embodiment.

Then, after the judging process P203 judges whether compression processing to all the one-dimensional time series data has been completed, the output process P204 outputs each of the compressed one-dimensional time series data, i e., compressed, multi-dimensional Motion Data.

As described above, in the ninth embodiment, multi-dimensional time series data is compressed to plural one-dimensional time series data, then compression is performed to each of the one-dimensional time series data by the same compression method as that of the first or third method. Therefore, if there is a section in one of the plural one-dimensional time series data where data compression is not performed due to the smallness of the error between an interpolation function and the original one-dimensional time series data, in the rest of the plural one-dimensional time series data, there are many sections corresponding to such section and capable of being subjected to data compression, thereby enabling compression of data to one fourth or one fifth of the original data size.

For example, in an experiment using time series data of joint angles of a hard body multi-joint object (human being) as this multi-dimensional time series data, a compression ratio of 0.16 to 0.264 can be obtained although the ratio depends on an approximation accuracy.

Further, in this case where one-dimensional time series data express motions of the respective joint angles of hard body multi-joints, errors are accumulated toward a tip of a moving body part. Therefore, in order to keep approximation accuracy constant, it is necessary to reduce the approximation accuracy to less than the approximation accuracy value used for the one-dimensional time series data not having such a relation, resulting in reduction of the whole compression ratio. To avoid such inconvenience, it is more effective to not keep constant the approximation accuracy, and to set the approximation accuracy smaller than the normal value with respect to the original joints of a hard body multi-joint object, and increase the approximation accuracy gradually toward a tip of a moving body part, compared to keeping constant the approximation accuracy.

Furthermore the one-dimensional time series data at irregular time intervals may be compressed by regarding the data as one-dimensional data whose time and data are independent, and compressing the time and the data of the one-dimensional data individually, by the compression method for multi-dimensional time series data.

Embodiment 10

Although in the ninth embodiment the compression process for multi-dimensional time series data is implemented in software, this may be implemented in special hardware.

Figure 26:
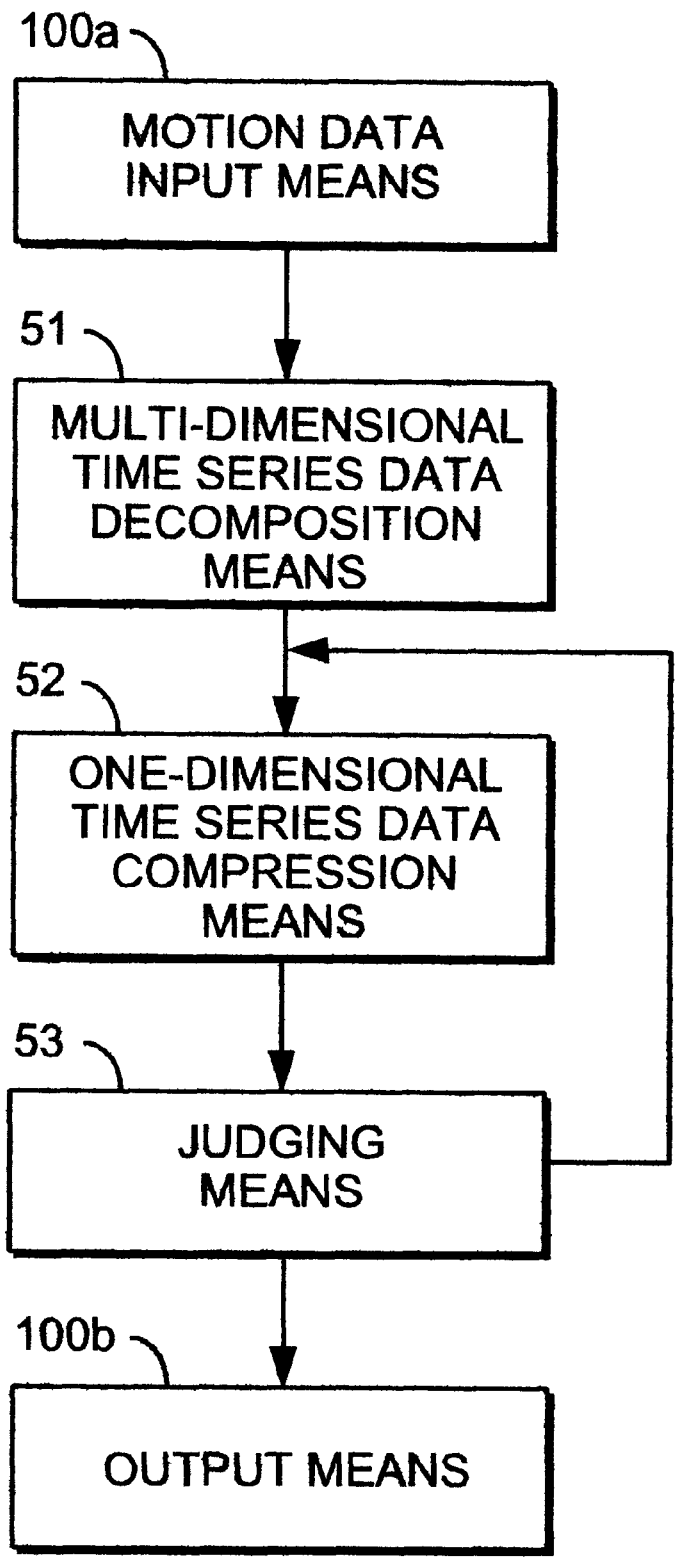
FIG. 26 is a block diagram of a compression device for multi-dimensional time series data according to a tenth embodiment of the present invention.

FIG. 26 shows a data compression device which implements a process flow of FIG. 25 in a special hardware. In the figure, reference numeral 100a designates a Motion Data input means for inputting Motion Data, numeral 51 designates a multi-dimensional time series data decomposing means for decomposing Motion Data as multi-dimensional time series data into one-dimensional time series data whose number is equal to the dimension number of the multi-dimensional time series data, numeral 52 designates one dimensional time series data compression means for compressing the one-dimensional time series data as decomposed data using the same configuration as that of the compression device of the second or fourth embodiment, numeral 53 designates a judging means for judging whether the compression of the one-dimensional time series data whose number is equal to the dimension number has been completed or not, and numeral 100b designates output means for outputting the compressed multi-dimensional time series data.

Next, the operation will be described in detail. First of all, the input means 100a inputs Motion Data which is a multi-dimensional time series data. Next, the decomposing means for multi-dimensional time series data 51 decomposes Motion Data into one-dimensional time series data as components, and attaches an index number to each one-dimensional time series data.

The processes following the decomposition means 51 are equal to those of the compression operation for one-dimensional time series data according to the second or fourth embodiment.

To be more specific, after the decomposition means 51, the one-dimensional time series data compression means 52 compresses each one-dimensional time series data obtained by the decomposition, by the same compression operation as that of the second or fourth embodiment.

Then, after the judging means 53 judges whether compression processing has been performed to all the one-dimensional time series data, the output means 100b outputs each of the compressed one-dimensional time series data, i.e., compressed multi-dimensional Motion Data.

As described above, in the tenth embodiment, multi-dimensional time series data is compressed to plural one-dimensional time series data, then compression is performed by the same compression operation as that of the second or fourth embodiment, whereby compression operation can be executed in special hardware at high speed. Further, if there is a section in one of the plural one-dimensional time series data where data compression is not performed due to the smallness of an error between an interpolation function and the original one-dimensional time series data, in the rest of the one-dimensional time series data, there are many sections corresponding to such section and capable of being subjected to data compression, thereby enabling compression of data to one fourth or one fifth of the original data size.

For example, in an experiment using time series data of joint angles of a hard body multi-joint object (human being) as such multi-dimensional time series data, a compression ratio of 0.168 to 0.264 can be obtained although the ratio depends on an approximation accuracy.

Further, in this case where one-dimensional time series data express motions of the respective joint angles of hard body multi-joints, errors are accumulated toward a tip of a moving body part. Therefore, in order to keep approximation accuracy constant, it is necessary to reduce the approximation accuracy to less then the approximation accuracy value used for the one-dimensional time series data not having such a relation, resulting in reduction of the whole compression ratio. To avoid such inconvenience, it is more effective not to hold constant the approximation accuracy and to set the approximation accuracy smaller than the normal value with respect to the original joints of a hard body multi-joint object, and increase the approximation accuracy gradually toward a tip of a moving body part, compared to keeping constant the approximation accuracy.

Furthermore, the one-dimensional time series data at irregular time intervals may be compressed by regarding the data as one-dimensional data whose time and data are independent, and compressing the time and the data of the one-dimensional data individually, using the compression device for multi-dimensional time series data according to the tenth embodiment.

Embodiment 11

Figure 27:
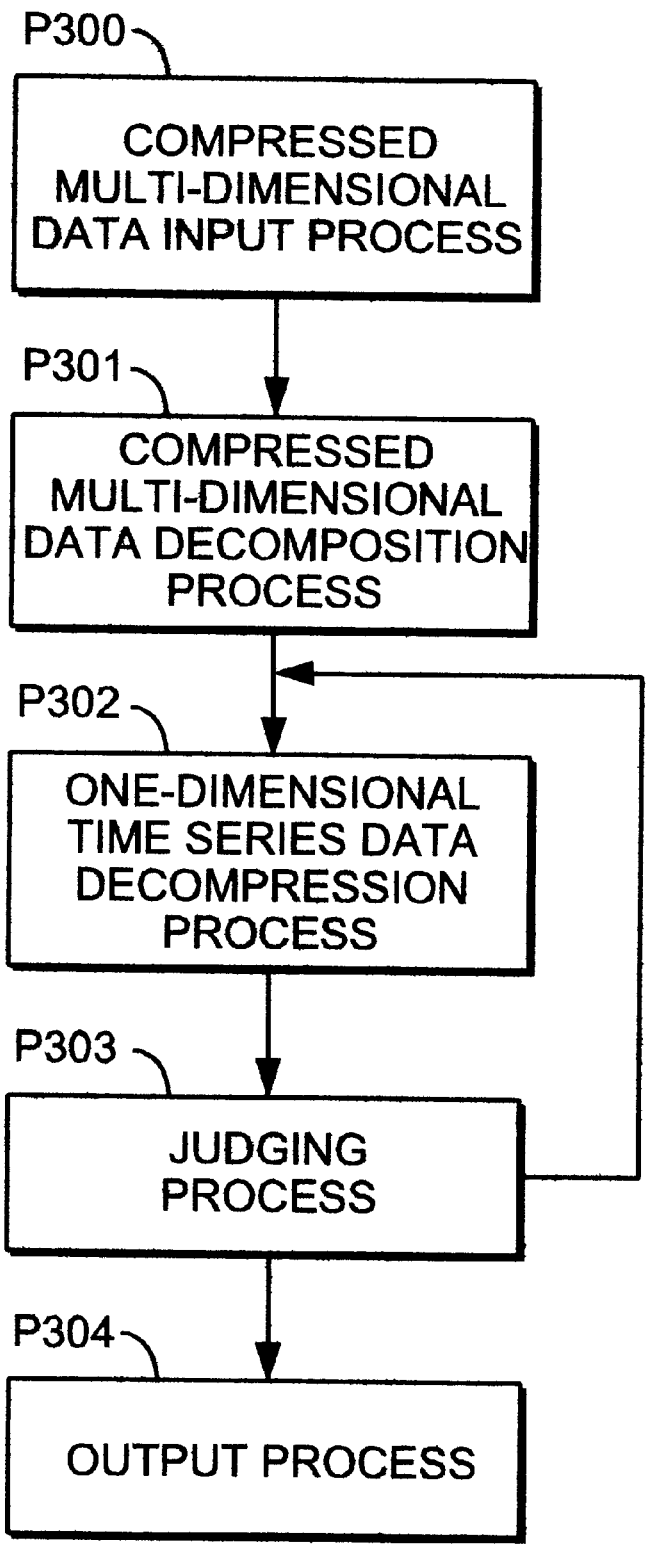
FIG. 27 is a block diagram of a decompression method for multi-dimensional time series data according to an eleventh embodiment of the present invention.

An eleventh embodiment of the invention treats a method of compressing the multi-dimensional time series data compressed according to the ninth embodiment. FIG. 27 shows a decompression method using decompression of the Motion Data compressed by the compression method of FIG. 25 as an example. In the figure, reference numeral P300 designates a compressed multi-dimensional data input process of inputting compressed Motion Data, numeral P301 designates compressed multi-dimensional data decomposition process of decomposing compressed multi-dimensional time series data into plural, compressed one-dimensional time series data, numeral P302 designates one-dimensional time series data decompression process of decompressing the one-dimensional time series data as decomposed data by the decompression method according to the fifth or seventh embodiment, numeral P303 designates a judging process of judging whether the decompression of the sequential one-dimensional time series data has been completed or not, and numeral P304 designates an output process of outputting the decompressed sequential one-dimensional time series data.

The processes shown in FIG. 27 are executed by the computer of FIGS. 3(a) and 3(b), for example. In this case, the main memory 3 of the computer of FIGS. 3(a) and 3(b) has stored a program corresponding to the processes of FIG. 27 in advance by loading the program from program recording media.

Next, these processes will be described in detail. First of all, the input process P300 inputs compressed Motion Data. Next, the decomposition process P301 decomposes the compressed Motion Data into compressed one-dimensional time series data as components, and attaches an index number to each compressed one-dimensional time series data.

The processes following the decomposition process P301 are equal to those of the decompression method for one-dimensional time series data according to the fifth or seventh embodiment.

To be more specific, following the decomposition process P301, the one-dimensional time series data compression process P302 compresses each one-dimensional time series data obtained by the decomposition, by the same decompression method as that of the fifth or seventh embodiment.

Then, after the judging process P303 judges whether or not decompression processing has been performed to all the one-dimensional time series data, the output process P304 outputs each of the decompressed one-dimensional time series data, i.e., decompressed multi-dimensional Motion Data.

As described above, in the eleventh embodiment, compressed multi-dimensional time series data is decomposed into plural one-dimensional time series data, then decompression is performed by the same decompression method as that of the fifth or seventh embodiment. Thus, the decompression processing can be performed to multi-dimensional compressed time series data.

Further, since a number of data to be generated for decompression can be set to be different from that of the original data, it is possible to produce an image of a hard body multi-joint object moving more slowly than the original hard body multi-joint object by increasing a number of data to be generated, compared to the number of the original data, especially when decompressing Motion data. Furthermore, it is also possible to produce an image of a hard body multi-joint object moving more quickly than the original one by reducing a number of data to be generated. As a result, editing motions of an object is facilitated.

Embodiment 12

Although in the eleventh embodiment the decompression processing for multi-dimensional time series data is implemented in software, this may be implemented in a special hardware.

Figure 28:
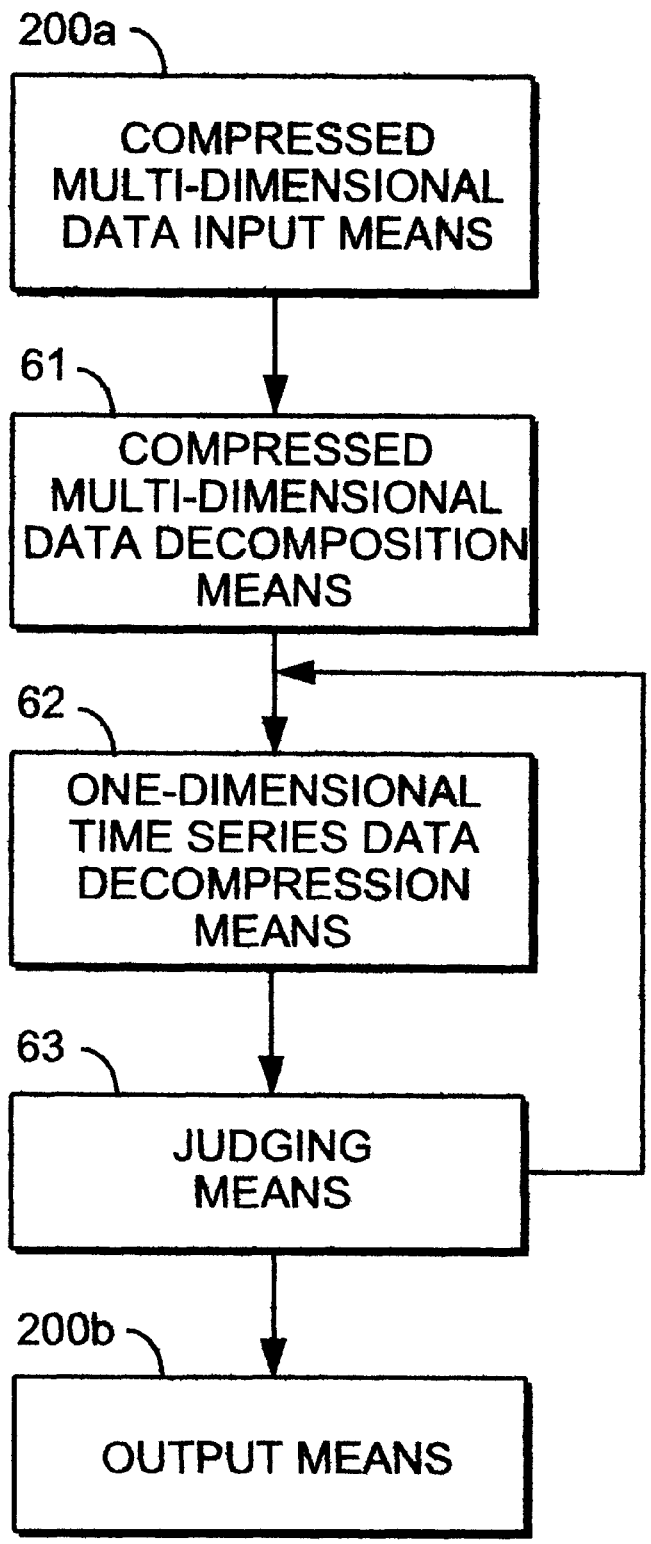
FIG. 28 is a block diagram of a decompression method for multi-dimensional time series data according to a twelfth embodiment of the present invention.

FIG. 28 shows a data decompression device for multi-dimensional time series data which implements a process flow of FIG. 27 in a special hardware. In the figure, reference numeral 200a designates a compressed multi-dimensional data input means for inputting compressed Motion Data numeral 61 designates a multi-dimensional time series data decomposition means for decomposing compressed multi-dimensional time series data into plural compressed one-dimensional time series data, numeral 62 designates one-dimensional time series data decompressing means for decompressing the one-dimensional time series data as decomposed data using the same configuration as that of the decompression device of the sixth or eighth embodiment, numeral 63 designates a judging means for judging whether the decompression of the sequential one-dimensional time series data has been completed or not, and numeral 200b designates on output means for outputting the decompressed one-dimensional time series data.

Next, the operation will be described in detail. First of all, the input means 200a inputs compressed Motion Data. Next, the decomposition means 61 decomposes the Compressed Motion Data into one-dimensional time series data as components, and attaches an index number to each compressed one-dimensional time series data.

The processes following the decomposition means 61 are equal to those of the compression device for one-dimensional time series data according to the sixth or seventh embodiment.

To be more specific, following the decomposition means 61, the one-dimensional time series data decompression means 62 decompresses each one-dimensional time series data obtained by the decomposition, by the same decompression operation as that of the sixth or eighth embodiment.

Then, after the judging means 63 judges whether decompression processing has been performed to all of the one-dimensional time series data, the output means 200b outputs each of the decompressed one-dimensional time series data, i.e., decompressed multi-dimensional Motion Data.

As described above, in the twelfth embodiment, compressed multi-dimensional time series data is decomposed into plural one-dimensional time series data and then decompression is performed using the same decompression device as that of the sixth or eighth embodiment, whereby decompression process can be executed to compressed multi-dimensional time series data in a special hardware at high speed.

Further, since a number of data to be generated for decompression can be set to a number different from that of the original data, it is possible to produce an image of a hard body multi-joint object moving more slowly than the original hard body multi-joint object by making a number of data to be generated larger than the number of the original data for decompressing Motion data, in particular. Furthermore, it is also possible to produce an image of a hard body multi-joint object moving more quickly than the original one by decreasing a number of data to be generated. As a result, editing motions of an object is facilitated.

What is claimed is:

1. A method of compressing one-dimensional time series data at uniform time interval comprising:

a first process of inputting the one-dimensional time series data and an approximation accuracy thereof;

a second process of calculating node candidates of an interpolation function approximating the one-dimensional time series data;

a third process of optimizing positions of the node candidates;

a fourth process of judging an error between one-dimensional time series data produced using the interpolation function, based on the node candidates at optimized positions, and the original one-dimensional time series data;

a fifth process of judging an error between one-dimensional time series data produced using the interpolation function on the basis of the node candidates at optimized positions and the original one-dimensional time series data, and changing a node number and returning to the second process when the error exceeds a value based on the approximation accuracy; and a sixth process of outputting data of the node candidates and corresponding time data as compressed data when it is judged in the fifth process that the error does not exceed the value based on the approximation accuracy.

2. A method of compressing one-dimensional time series data at uniform time intervals, said method comprising:

a first process of inputting the one-dimensional time series data and an approximation accuracy thereof;

a second process of judging whether the one-dimensional time series data includes data within the approximation accuracy or not;

a third process of calculating node candidates of an interpolation function which approximates the one-dimensional time series data, when the one-dimensional time series data includes no data within the approximation accuracy;

a fourth process of optimizing positions of the node candidates;

a fifth process of judging an error between one-dimensional time series data produced on the basis of the node candidates at optimized positions, using the interpolation function, and the original one-dimensional time series data;

a sixth process of judging an error between one-dimensional time series data produced on the basis of the node candidates whose number is optimized, using the interpolation function, and the original one-dimensional time series data, and changing a node number and returning to the second process when the error exceeds a value based on the approximation accuracy; and a seventh process of outputting information indicating that the one-dimensional time series data includes data within the approximation accuracy when it is judged in the second process that the one-dimensional time series data includes the data within the approximation accuracy, or outputting data of the node candidates and corresponding time data as compressed data when it is judged in the sixth process that the error does not exceed the value based on the approximation accuracy.

3. A method of compressing one-dimensional time series data at uniform time intervals, said method comprising:

a first process of inputting the one-dimensional time series data and an approximation accuracy thereof, attaching indices to the one-dimensional time series data in a temporal order, and calculating an initial node number of an interpolation function which interpolates the one-dimensional time series data;

a second process of deciding node candidates including start data and end data, at random, in such a way that a number of decided candidates corresponds to the node number;

a third process of interpolating the node candidates, using an interpolation function which utilizes the index numbers of the node candidates as an independent variable, and calculating an error between the interpolation result and the original one-dimensional time series data;

a fourth process of calculating, from the error, a value of a first objective function defined as weighted sum of the maximum value of the error, the average of the error, and the variance of the error;

a fifth process of modifying the node candidates until the first objective function takes a smallest value and deciding quasi-optimal node candidates;

a sixth process of interpolating the quasi-optimal node candidates, using the interpolation function to generate one-dimensional time series data approximating the original one-dimensional time series data, and calculating an error between the one-dimensional time series data and the original one-dimensional time series data;

a seventh process of calculating, from the error, a second objective function defined as weighted sum of the maximum value of the error, the average of the error, and the variance of the error;

an eighth process of deciding the node number with an increment as a new nod number when the value of the second objective function is greater than or equal to a threshold corresponding to the approximation accuracy, and repeating the second to seventh processes; and a ninth process of outputting an initial time and a time interval of the one-dimensional time series data, and compressed data consisting of index numbers of finally decided node candidates and the values of the node candidates, when the value of the second objective function is less than the threshold.

4. A method of compressing one-dimensional time series data obtained at uniform time intervals, aforesaid method comprising:

a first process of inputting the one-dimensional time series data and an approximation accuracy thereof, and attaching indices to the one-dimensional time series data in a temporal order, and calculating an initial node number of an interpolation function interpolating the one-dimensional time series data;

a second process of deciding node candidates including start and end data and having the indices attached at approximately equal intervals, in such a way that the number of the decided node candidates corresponds to the initial node number;

a third process of interpolating the node candidates with an interpolation function using the index numbers of the node candidates as en independent variable and calculating an error between the interpolation result and the original one-dimensional time series data;

a forth process of calculating, from the error, a value of a first objective function defined as weighted sum of the maximum of the error, the average of the error, and the variance of the error;

a fifth process of changing the node candidates repeatedly until the first objective function takes a smallest value, and deciding quasi-optimal node candidates;

a sixth process of interpolating the quasi-optimal node candidates with the interpolation function to generate one-dimensional time series data approximating the original one-dimensional time series data, and calculating an error between the one-dimensional time series data and the original one-dimensional time series data;

a seventh process of calculating, from the error, a value of a second objective function defined as weighted sum of the maximum value of the error, the average of the error, and the variance of the error;

an eighth process of employing the node number with an increment as a new node number and repeating the second to seventh processes when the value of the second objective function is greater than or equal to a threshold corresponding to the approximation accuracy; and a ninth process of outputting an initial time and a time interval of the one-dimensional time series data, and compressed data consisting of index numbers of finally decided node candidates, and the values of the node candidates when the value of the second objective function exceeds the threshold.

5. A method of compressing one-dimensional time series data obtained at uniform time intervals, said method comprising:

a first process of inputting the one-dimensional time series data and an approximation accuracy thereof, and attaching indices to the one-dimensional time series data in a temporal order, and calculating an initial node number of an interpolation function which interpolates the one-dimensional time series data;

a second process of judging whether all the absolute values of the one-dimensional time series data are less than the approximation accuracy or not, and when the absolute values are all less than the approximation accuracy, outputting an identifier indicating that all the values are zero to complete the processing or proceeding to a third process described later when all the absolute values are not less than the approximation accuracy;

a third process of deciding node candidates including start data and end data, at random, in such a way that a number of decided node candidates corresponds to the initial node number, a forth process of interpolating the node candidates with an interpolation function using the index numbers of the node candidates as an independent variable and calculating an error between the interpolation result and the original one-dimensional time series data;

a fifth process of calculating, from the error, a value of a first objective function defined as weighted sum of the maximum value of the error, the average of the error, and the variance of the error;

a sixth process of changing the node candidates repeatedly until the first objective function takes a smallest value and deciding quasi-optimal node candidates;

a seventh process of interpolating the quasi-optimal node candidates using the interpolation function to generate one-dimensional time series data approximating the original one-dimensional time series data and calculating an error between the one-dimensional time series data and the original one-dimensional time series data;

an eighth process of calculating, from the error, a value of second objective function defined as weighted sum of the maximum value of the error, the average of the error, and the variance of the error;

a ninth process of deciding the node number with an increment as a new node number when the value of the second objective function is greater than or equal to a threshold corresponding to the approximation accuracy, and repeating the third to eighth processes; and a tenth process of outputting an initial time and a time interval of the one-dimensional time series data, and compressed data consisting of index numbers of finally decided node candidates and the values of the node candidates, when the value of the second objective function is less than the threshold.

6. A method of compressing one-dimensional time series data at uniform time intervals, aforesaid method comprising:

a first process of inputting the one-dimensional time series data and an approximation accuracy thereof, and attaching indices to the one-dimensional time series data in a temporal order, and calculating an initial node number of an interpolation function interpolating the one-dimensional time series data;

a second process of judging whether all the absolute values of the one-dimensional time series data are less than the approximation accuracy or not, and when the values are all less then the approximation accuracy, outputting an identifier indicating that all the values are zero to complete the processing, or proceeding to a third process described later when all the absolute values exceed the approximation accuracy;

a third process of deciding node candidates including start and end data and having the indices attached at approximately equal intervals, in such a way that the number of the node candidates corresponds to the initial node number;

a fourth process of interpolating the node candidates with an interpolation function using the index numbers of the node candidates as an independent variable and calculating an error between the interpolation results and the original time series data;

a fifth process of calculating, from the error, a value of a first objective function defined as weighed sum of the maximum of the error, the average of the error, and the variance of the error;

a sixth process of changing the node candidates repeatedly until the first objective function takes a smallest value, and deciding quasi-optimal node candidates;

a seventh process of interpolating the quasi-optimal node candidates with the interpolation function to generate one-dimensional time series data approximating the original one-dimensional time series data, and calculating an error between the one-dimensional time series data and the original one-dimensional time series data;

an eighth process of calculating, from the error, a value of a second objective function defined as weighted sum of the maximum value of the error, the average of the error, and the variance of the error;

a ninth process of employing the node number with an increment as a new node number and repeating the third to eighth processes when the value of the second objective function is greater then or equal to a threshold corresponding to the approximation accuracy; and a tenth process of outputting a start time and a time interval of the one-dimensional time series data, and compressed data consisting of index numbers of finally decided node candidates and the values of the node candidates when the value of the second objective function is less then the threshold.

7. A method for compressing one-dimensional time series data as defined in claim 3 wherein, assuming that the indices of the node candidates numbered in an increasing order are described as I(j) ($0 \leq j \leq m$), the quasi-optimal node candidates are calculated in a procedure comprising:

when a relationship I(j−1)<I(j)−1 is satisfied, calculating a value of the first objective function obtained at the exchange of node candidates I(j) with node candidates I(j)−1, calculating a value $\Delta E(1-)$ which is the value of the first objective function from which the value of the original first objective function is subtracted, and setting the value $\Delta E(1-)$ to zero when I(j−1)$\geq$I(j)−1;

when a relationship I(j)+1<I(j+1) is satisfied, calculating a value of the first objective function obtained at the exchange of node candidates I(j) with node candidates ((j)+1, calculating a value $\Delta E(1+)$ which is the value of the first objective function from which the value of the original first objective function is subtracted, and setting the value $\Delta E(1+)$ to zero when I(j)+1$\geq$I(j+1), when relationships $\Delta E(1-)<0$ and $\Delta E(1+)\geq 0$ are satisfied, exchanging the node candidates I(j) with the node candidates I(j)−1;

when relationships $\Delta E(1-)\geq 0$ and $\Delta E(1+)<0$ are satisfied, exchanging the node candidates I(j) with the node candidates I(j)+1;

when relationships $\Delta E(1-)\geq 0$ and $\Delta E(1+)\geq 0$ are satisfied, not performing exchange of the node candidates I(j);

when relationships $\Delta E(1-)<0$ and $\Delta E(1+)<0$ are satisfied and $\Delta E(1-)$ is lees than $\Delta E(1+)$, exchanging the node candidates I(j) with the node candidates i(j)−1;

when relationships $\Delta E(1-)<0$ and $\Delta E(1+)<0$ are satisfied and $\Delta E(1-)$ exceeds $\Delta E(1+)$, exchanging the node candidates I(j) with the node candidates I(j)+1 in an increasing order for j of odd numbers and in a decreasing order for j of even numbers;

when the value of the first objective function obtained at the completion of the sequential processes is less than the value of the original first objective function from which the threshold is subtracted, exchanging the node candidates again in an increasing order for j of odd numbers and in a decreasing order for j of even numbers; and when the exchange of the node candidates is not performed at all, or the value of the first objective function exceeds the value of the original first objective function from which the threshold is subtracted, completing the processing.

8. A method for compressing one-dimensional time series data as defined in claim 3 wherein, assuming that the indices of the node candidates numbered in an increasing order are described as I(j) ($0 \leq j \leq m$), the quasi-optimal candidates are calculated in the following procedure, said procedure comprising:

when a relationship I(j−1)<I(j)−1 is satisfied, calculating a value of the first objective function obtained at the exchange of node candidates I(j) with node candidates I(j)−1, calculating a value $\Delta E(1-)$ which is the value of the first objective function from which the value of the original first objective function is subtracted, and setting the value $\Delta E(1-)$ to zero when I(j−1)$\geq$I(j)−1;

when a relationship I(j)+1<I(j+1) is satisfied, calculating a value of the first objective function obtained at the exchange of node candidates I(j) with node candidates I(j)+1, calculating a value $\Delta E(1+)$ which is the value of the first objective function from which the value of the original first objective function is subtracted, and setting the value $\Delta E(1+)$ to zero when I(j)+1$\geq$I(j+1), when relationships $\Delta E(1-)<0$ and $\Delta E(1+)\geq 0$ are satisfied, exchanging the node candidates I(j) with the node candidates I(j)−1;

when relationships $\Delta E(1-)\geq 0$ and $\Delta E(1+)<0$ are satisfied, exchanging the node candidates I(j) with the node candidates I(j)+1;

when relationships $\Delta E(1-)\geq 0$ and $\Delta E(1+)\geq 0$ are satisfied, not performing exchange of the node candidates I(j);

when relationships $\Delta E(1-)<0$ and $\Delta E(1+)<0$ are satisfied and $\Delta E(1-)$ is less than $\Delta E(1+)$, exchanging the node candidates I(j) with the node candidates I(j)−1;

when relationships $\Delta E(1-)<0$ and $\Delta E(1+)<0$ are satisfied and $\Delta E(1-)$ exceeds $\Delta E(1+)$, exchanging the node candidates I(j) with the node candidates I(j)+1 in a decreasing order for j of odd numbers and in an increasing order for j of even numbers;

when the value of the first objective function obtained at the completion of the sequential processes is less than the value of the original first objective function from which the threshold is subtracted, exchanging the node candidates again in a decreasing order for j of odd numbers and in an increasing order for j of even numbers; and when the exchange of the node candidates is not performed at all, or the value of the first objective function exceeds the value of the original first objective function from which the threshold is subtracted, completing the processing.

9. A method for compressing one-dimensional time series data as defined in claim 3 wherein, assuming that the indices of the node candidates numbered in an increasing order are described as I(j) ($0 \leq j \leq m$), the quasi-optimal candidates are calculated in a procedure comprising:

when a relationship I(j−1)<I(j)−1 is satisfied, calculating a value of the first objective function obtained at the exchange of node candidates I(j) with node candidates I(j)−1, calculating a value $\Delta E(1-)$ which is the value of the first objective function from which the value of the original first objective function is subtracted, and setting the value $\Delta E(1-)$ to zero when I(j−1)$\geq$I(j)−1;

when a relationship I(j)+1<I(j+1) is satisfied, calculating a value of the first objective function obtained at the exchange of node candidates I(j) with node candidates I(j)+1, calculating a value ΔE(1+) which is the value of the first objective function from which the value of the original first objective function is subtracted, and setting the value ΔE(1+) to zero when I(j)+1≧I(j+1);

when relationships ΔE(1−)<0 and ΔE(1+)≧0 are satisfied, exchanging the node candidates I(j) with the node candidates I(j)−1;

when relationships ΔE(1−)≧0 and ΔE(1+)<0 are satisfied, exchanging the node candidates I(j) with the node candidates I(j)+1;

when relationships ΔE(1−)≧0 and ΔE(1+)≧0 are satisfied, not performing exchange of the node candidates I(j);

when relationships ΔE(1−)<0 and ΔE(1+)<0 are satisfied and ΔE(1−) is less than ΔE(1+), exchanging the node candidates I(j) with the node candidates I(j)−1;

when relationships ΔE(1−)<0 and ΔE(1+)<0 are satisfied and ΔE(1−) exceeds ΔE(1+), successively exchanging the node candidates I(j) with the node candidates I(j)+1, initially from j=1 to j=[m/2] and then from j=m−1 to j=[m/2]+1;

when the value of the first objective function obtained at the completion of the sequential processes is less than the value of the original first objective function from which the threshold is subtracted, successively exchanging the node candidates again, from j=1 to j=[m/2] and then from j=m−1 to j=[m/2]+1; and when the exchange of the node candidates is not performed at all, or the value of the first objective function exceeds the value of the original first objective function from which the threshold is reduced, completing the processing.

10. A method for compressing one-dimensional time series data as defined in claim 3 wherein, assuming that the indices of the node candidates numbered in an increasing order are described as I(j) (0≦j≦m), the quasi-optimal candidates are calculated in a procedure comprising:

when a relationship I(j−1)<I(j)−1 is satisfied, calculating a value of the first objective function obtained at the exchange of node candidates I(j) with node candidates I(j)−1, calculating a value ΔE(1−) which is the value of the first objective function from which the value of the original first objective function is subtracted, and setting the value ΔE(1−) to zero when I(j−1)≧I(j)−1;

when a relationship I(j)+1<I(j+1) is satisfied, calculating a value of the first objective function obtained at the exchange of node candidates I(j) with node candidates I(j)+1, calculating a value ΔE(1+) which is the value of the first objective function from which the value of the original first objective function is subtracted, and setting the value ΔE(1+) to zero when I(j)+1≧I(j+1);

when relationships ΔE(1−)<0 and ΔE(1+)≧0 are satisfied, exchanging the node candidates I(j) with the node candidates I(j)−1;

when relationships ΔE(1−)≧0 and ΔE(1+)<0 are satisfied, exchanging the node candidates I(j) with the node candidates I(j)+1;

when relationships ΔE(1−)≧0 and ΔE(1+)≧0 are satisfied, not performing exchange of the node candidates I(j);

when relationships ΔE(1−)<0 and ΔE(1+)<0 are satisfied and ΔE(1−) is less than ΔE(1+), exchanging the node candidates I(j) with the node candidates I(j)−1;

when relationships ΔE(1−)<0 and ΔE(1+)<0 are satisfied and ΔE(1−) exceeds ΔE(1+), successively exchanging the node candidates I(j) with the node candidates I(j)+1, initially from j=[m/2] to j=1 and then from j=[m/2]+1 to j=m−1;

when the value of the first objective function obtained at the completion of the sequential processes is less than the value of the original first objective function from which the threshold is reduced, successively exchanging the node candidates again, from j=[m/2] to j=1 and then from j=[m/2]+1 to j=m−1; and when the exchange of the node candidates is not performed at all, or the value of the first objective function exceeds the value of the original first objective function from which the threshold is reduced, completing the processing.

11. A method for compressing one-dimensional time series data as defined in claim 3 wherein, assuming that the indices of the node candidates numbered in an increasing order are described as I(j) (0≧j≧m), the quasi-optimal candidates are calculated in a procedure comprising:

when a relationship of I(j−1)<I(j)−1 is satisfied, calculating a value of the first objective function obtained at the exchange of node candidates I(j) with node candidates I(j)−1, calculating a value ΔE(1−) which is the value of the first objective function from which the value of the original first objective function is subtracted, and setting the value ΔE(1−) to zero when I(j−1)≧I(j)−1;

when a relationship I(j)+1<I(j+1) is satisfied, calculating a value of the first objective function obtained at the exchange of node candidates I(j) with node candidates I(j)+1, calculating a value ΔE(1+) which is the value of the first objective function from which the value of the original first objective function is subtracted, and setting the value ΔE(1+) to zero when I(j)+1≧I(j+1);

when relationships ΔE(1−)<0 and ΔE(1+)≧0 are satisfied, exchanging the node candidates I(j) with the node candidates I(j)−1;

when relationships ΔE(1−)≧0 and ΔE(1+)<0 are satisfied, exchanging the node candidates I(j) with the node candidates I(j)+1;

when relationships ΔE(1−)≧0 and ΔE(1+)≧0 are satisfied, not performing exchange of the node candidates I(j);

when relationships ΔE(1−)<0 and ΔE(1+)<0 are satisfied and ΔE(1−) is less than ΔE(1+), exchanging the node candidates I(j) with the node candidates I(j)−1;

when relationships ΔE(1−)<0 and ΔE(1+)<0 are satisfied and ΔE(1−) exceeds ΔE(1+), exchanging the node candidates I(j) with the node candidates I(j)+1 successively from j=1 to j=m−1;

when the value of the first objective function obtained at the completion of the successive processes is less then the value of the original first objective function from which the threshold is subtracted, successively exchanging the node candidates again from j=1 to j=m−1; and when the exchange of the node candidates is not performed at all, or the value of the first objective function exceeds the value of the original first objective function from which the threshold is subtracted, completing the processing.

12. A method for compressing one-dimensional time series data as defined in claim 3 wherein, assuming that the indices of the node candidates numbered in an increasing order are described as I(j) (0≦j≦m), the quasi-optimal candidates are calculated in a procedure comprising:

when a relationship $I(j-1)<I(j)-1$ is satisfied, calculating a value of the first objective function obtained at the exchange of node candidates $I(j)$ with node candidates $I(j)-1$, calculating a value $\Delta E(1-)$ which is the value of the first objective function from which the value of the original first objective function is subtracted, and setting the value $\Delta E(1-)$ to zero when $I(j-1) \geqq I(j)-1$;

when a relationship $I(j)+1<I(j+1)$ is satisfied, calculating a value of the first objective function obtained at the exchange of node candidates $I(j)$ with node candidates $I(j)+1$, calculating a value $\Delta E(1+)$ which is the value of the first objective function from which the value of the original first objective function is subtracted, and setting the value $\Delta E(1+)$ to zero when $I(j)+1 \geqq I(j+1)$;

when relationships $\Delta E(1-)<0$ and $\Delta E(1+) \geqq 0$ are satisfied, exchanging the node candidates $I(j)$ with the node candidates $I(j)-1$;

when relationships $\Delta E(1-) \geqq 0$ and $\Delta E(1+)<0$ are satisfied, exchanging the node candidates $I(j)$ with the node candidates $I(j)+1$;

when relationships $\Delta E(1-) \geqq 0$ and $\Delta E(1+) \geqq 0$ are satisfied, not performing exchange of the node candidates $I(j)$;

when relationships $\Delta E(1-)<0$ and $\Delta E(1+)<0$ are satisfied and $\Delta E(1-)$ is less than $\Delta E(1+)$, exchanging the node candidates $I(j)$ with the node candidates $I(j)-1$;

when relationships $\Delta E(1-)<0$ and $\Delta E(1+)<0$ are satisfied and $\Delta E(1-)$ exceeds $\Delta E(1+)$, successively exchanging the node candidates $I(j)$ with the node candidates $I(j)+1$ from $j=m-1$ to $j=1$;

when the value of the first objective function obtained at the completion of the sequential processes is less than the value of the original first objective function from which the threshold is subtracted, successively exchanging node candidates again from $j=m-1$ to $j=1$; and when the exchange of the node candidates is not performed at all, or the value of the first objective function exceeds the value of the original first objective function from which the threshold is subtracted, completing the processing.

13. A method for compressing one-dimensional time series data as defined in claim 3 wherein, assuming that the indices of the node candidates numbered in an increasing order are described as $I(j)$ ($0 \leqq j \leqq m$), the quasi-optimal candidates are calculated in a procedure comprising:

when a relationship $I(j-1)<I(j)-1$ is satisfied, calculating a value of the first objective function obtained at the exchange of node candidates $I(j)$ with node candidates $I(j)-1$, calculating a value $\Delta E(1-)$ which is the value of the first objective function from which the value of the original first objective function is subtracted, and setting the value $\Delta E(1-)$ to zero when $I(j-1) \geqq I(j)-1$;

when a relationship $I(j)+1<I(j+1)$ is satisfied, calculating a value of the first objective function obtained at the exchange of node candidates $I(j)$ with node candidates $I(j)+1$, calculating a value $\Delta E(1+)$ which is the value of the first objective function from which the value of the original first objective function is subtracted, and setting the value $\Delta E(1+)$ to zero when $I(j)+1 \geqq I(j+1)$;

when relationships $\Delta E(1-)<0$ and $\Delta E(1+) \geqq 0$ are satisfied, exchanging the node candidates $I(j)$ with the node candidates $I(j)-1$, and exchanging the value of the first objective function obtained by the exchange, with the value of the original first objective function;

when relationships $\Delta E(1-) \geqq 0$ and $\Delta E(1+)<0$ are satisfied, exchanging the node candidates $I(j)$ with the node candidates $I(j)+1$, and exchanging the value of the first objective function obtained by the exchange, with the value of the original first objective function;

when relationships $\Delta E(1-) \geqq 0$ and $\Delta E(1+) \geqq 0$ are satisfied, not performing exchange of the node candidates $I(j)$;

when relationships $\Delta E(1-)<0$ and $\Delta E(1+)<0$ are satisfied and $\Delta E(1-)$ is less than $\Delta E(1+)$, exchanging the node candidates $I(j)$ with the node candidates $I(j)-1$, and exchanging the value of the first objective function obtained by the exchange, with the value of the original first objective value;

when relationships $\Delta E(1-)<0$ and $\Delta E(1+)<0$ are satisfied and $\Delta E(1-)$ exceeds $\Delta E(1+)$, exchanging the node candidates $I(j)$ with the node candidates $I(j)+1$ and then exchanging the value of the first objective function obtained by the exchange, with the value of the original objective function, both in an increasing order for j of odd numbers and in a decreasing order for j of even numbers;

when the value of the first objective function obtained at the completion of the sequential processes is less than the value of the original first objective function from which the threshold is subtracted, performing the above exchanges again, in an increasing order for j of odd numbers and in a decreasing order for j as even numbers; and when the exchange of the node candidates is not performed at all, or the value of the first objective function exceeds the value of the original first objective function from which the threshold is subtracted, completing the processing.

14. A method for compressing one-dimensional time series data as defined in claim 3 wherein, assuming that the indices of the node candidates numbered in an increasing order are described as $I(j)$ ($0 \leqq j \leqq m$), the quasi-optimal candidates are calculated in a procedure comprising:

when a relationship $I(j-1)<I(j)-1$ is satisfied, calculating a value of the first objective function obtained at the exchange of node candidates $I(j)$ with node candidates $I(j)-1$, calculating a value $\Delta E(1-)$ which is the value of the first objective function from which the value of the original first objective function is subtracted, and setting the value $\Delta E(1-)$ to zero when $I(j-1) \geqq I(j)-1$;

when a relationship $I(j)+1<I(j+1)$ is satisfied, calculating a value of the first objective function obtained at the exchange of node candidates $I(j)$ with node candidates $I(j)+1$, calculating a value $\Delta E(1+)$ which is the value of the first objective function from which the value of the original first objective function is subtracted, and setting the value $\Delta E(1+)$ to zero when $I(j)+1 \geqq I(j+1)$;

when relationships $\Delta E(1-)<0$ and $\Delta E(1+) \geqq 0$ are satisfied, exchanging the node candidates $I(j)$ with the node candidates $I(j)-1$;

when relationships $\Delta E(1-) \geqq 0$ and $\Delta E(1+)<0$ are satisfied, exchanging the node candidates $I(j)$ with the node candidates $I(j)+1$, and exchanging the value of the first objective function obtained by the exchange, with the value of the original first objective function;

when relationships $\Delta E(1-) \geqq 0$ and $\Delta E(1+) \geqq 0$ are satisfied, not performing exchange of the node candidates $I(j)$;

when relationships $\Delta E(1-)<0$ and $\Delta E(1+)<0$ are satisfied and $\Delta E(1-)$ is less than $\Delta E(1+)$, exchanging the node candidates I(j) with the node candidates I(j)−1, and exchanging the value of the first objective function obtained by the exchange, with the value of the original first objective value;

when relationships $\Delta E(1-)<0$ and $\Delta E(1+)<0$ are satisfied and $\Delta E(1-)$ exceeds $\Delta E(1+)$, exchanging the node candidates I(j) with the node candidates I(j)+1 and then exchanging the value of the first objective function obtained by the exchange, with the value of the original first objective function, both in a decreasing order for j as odd numbers and in an increasing order for as even numbers;

when the value of the first objective function obtained at the completion of the sequential processes is less than the value of the original first objective function from which the threshold is subtracted, performing the above exchanges again, in a decreasing order for j as odd numbers and in an increasing order for j as even numbers; and when the exchange of the node candidates is not performed at all, or the value of the first objective function exceeds the value of the original first objective function from which the threshold is subtracted, completing the processing.

15. A method for compressing one-dimensional time series data as defined in claim 3 wherein, assuming that the indices of the node candidates numbered in an increasing order are described as I(j) ($0 \leq j \leq m$), the quasi-optimal candidates are calculated in a procedure comprising:

when a relationship I(j−1)<I(j)−1 is satisfied, calculating a value of the first objective function obtained at the exchange of node candidates I(j) with node candidates I(j)−1, calculating a value $\Delta E(1-)$ which is the value of the first objective function from which the value of the original first objective function is subtracted, and setting the value $\Delta E(1-)$ to zero when I(j−1)$\leq$I(j)−1;

when a relationship I(j)+1<I(j+1) is satisfied, calculating a value of the first objective function obtained at the exchange of node candidates I(j) with node candidates I(j)+1, calculating a value $\Delta E(1+)$ which is the value of the first objective function from which the value of the original first objective function is subtracted, and setting the value $\Delta E(1+)$ to zero when I(j)+1$\geq$I(j+1);

when relationships $\Delta E(1-)<0$ and $\Delta E(1+)\geq 0$ are satisfied, exchanging the node candidates I(j) with the node candidates I(j)−1, and exchanging the value of the first objective function obtained by the exchange, with the value of the original first objective function;

when relationships $\Delta E(1-)\geq 0$ and $\Delta E(1+)<0$ are satisfied, exchanging the node candidates I(j) with the node candidates I(j)+1, and exchanging the value of the first objective function obtained by the exchange, with the value of the original first objective function;

when relationships $\Delta E(1-)\geq 0$ and $\Delta E(1+)\geq 0$ are satisfied, not performing exchange of the node candidates I(j);

when relationships $\Delta E(1-)<0$ and $E(1+)<0$ are satisfied and $\Delta E(1-)$ is less than $\Delta E(1+)$, exchanging the node candidates I(j) with the node candidates I(j)−1, and exchanging the value of the first objective function obtained by the exchange, with the value of the original first objective function;

when relationships $\Delta E(1-)<0$ and $\Delta E(1+)<0$ are satisfied and $\Delta E(1-)$ exceeds $\Delta E(1+)$, exchanging the node candidates I(j) with the node candidates I(j)+1 and then exchanging the value of the first objective function obtained by the exchange, with the value of the original first objective function, both successively from j=1 to j=[m/2] and than from j=m−1 to j=[m/2]+1;

when the value of the first objective function obtained at the completion of the sequential processes is less than the value of the original first objective function from which the threshold is subtracted, performing the above exchanges again, successively from j=1 to j=[m/2] and then from j=m−1 to j=[m/2]+1; and when the exchange of the node candidates is not performed at all, or the value of the first objective function exceeds the value of the original first objective function from which the threshold is subtracted, completing the processing.

16. A method for compressing one-dimensional time series data as defined in claim 3 wherein, assuming that the indices of the node candidates numbered in an increasing order are described as I(j) ($0 \leq j \leq m$), the quasi-optimal candidates are calculated in a procedure comprising:

when a relationship I(j−1)<I(j)−1 is satisfied, calculating a value of the first objective function obtained at the exchange of node candidates I(j) with node candidates I(j)−1, calculating a value $\Delta E(1-)$ which is the value of the first objective function from which the value of the original first objective function is subtracted, and setting the value $\Delta E(1-)$ to zero when I(j−1)$\geq$I(j)−1;

when a relationship I(j)+1<I(j+1) is satisfied, calculating a value of the first objective function obtained at the exchange of node candidates I(j) with node candidates I(j)+1, calculating a value $\Delta E(1+)$ which is the value of the first objective function from which the value of the original first objective function is subtracted, and setting the value $\Delta E(1+)$ to zero when I(j)+1$\geq$I(j+1);

when relationships $\Delta E(1-)<0$ and $\Delta E(1+)\geq 0$ are satisfied, exchanging the node candidates I(j) with the node objective function obtained by the exchange, with the value of the original first objective function;

when relationships $\Delta E(1-)\geq 0$ and $\Delta E(1+)<0$ are satisfied, exchanging the node candidates I(j) with the node candidates I(j)+1, and exchanging the value of the first objective function obtained by the exchange, with the value of the original first objective function;

when relationships $\Delta E(1-)\geq 0$ and $\Delta E(1+)\geq 0$ are satisfied, not performing exchange of the node candidates I(j);

when relationships $\Delta E(1-)<0$ and $\Delta E(1+)<0$ are satisfied and $\Delta E(1-)$ is less than $\Delta E(1+)$, exchanging the node candidates I(j) with the node candidates I(j)−1, and exchanging the value of the first objective function obtained by the exchange, with the value of the original first objective function;

when relationships $\Delta E(1-)<0$ and $\Delta E(1+)<0$ era satisfied and $\Delta E(1-)$ exceeds $\Delta E(1+)$, exchanging the node candidates I(j) with the node candidates I(j)+1 and then exchanging the value of the first objective function obtained by the exchange, with the value of the original first objective function, both successively from j=[m/2] to j=1 and then from j=[m/2]+1 to j=m−1;

when tho value of the first objective function obtained at the completion of the sequential processes is less than the value of the original first objective function from which the threshold is subtracted, performing the above exchanges again, successively from j=[m/2] to j=1 and then from j=[m/2]+1 to j=m−1; and when the exchange of the node candidates is not performed at all, or the value of the first objective function exceeds the value of the original first objective function from which the threshold is subtracted, completing the processing.

17. A method for compressing one-dimensional time series data as defined in claim 3 wherein, assuming that the indices of the node candidates numbered in an increasing order are described as I(j) ($0 \leq j \leq m$), the quasi-optimal candidates are calculated in a procedure comprising:

when a relationship I(j−1)<I(j)−1 is satisfied, calculating a value of the first objective function obtained at the exchange of node candidates I(j) with node candidates I(j)−1, calculating a value $\Delta E(1-)$ which is the value of the first objective function from which the value of the original first objective function is subtracted, and setting the value $\Delta E(1-)$ to zero when I(j−1)$\geq$I(j)−1;

when a relationship I(j)+1<I(j+1) is satisfied, calculating a value of the first objective function obtained at the exchange of node candidates I(j) with node candidates I(j)+1, calculating a value $\Delta E(1+)$ which is the value of the first objective function from which the value of the original first objective function is subtracted, and setting the value $\Delta E(1+)$ to zero when I(j)+1$\geq$I(j+1);

when relationships $\Delta E(1-)<0$ and $\Delta E(1+)\geq 0$ are satisfied, exchanging the node candidates I(j) with the node candidates I(j)−1, and exchanging the value of the first objective function obtained by the exchange, with the value of the original first objective function;

when relationships $\Delta E(1-)\geq 0$ and $\Delta E(1+)<0$ are satisfied, exchanging the node candidates I(j) with the node candidates I(j)+1, and exchanging the value of the first objective function obtained by the exchange, with the value of the original first objective function;

when relationships $\Delta E(1-)\geq 0$ and $\Delta E(1+)\geq 0$ are satisfied, not performing exchange of the node candidates I(j);

when relationships $\Delta E(1-)<0$ and $\Delta E(1+)<0$ are satisfied and $\Delta E(1-)$ is less than $\Delta E(1+)$, exchanging the node candidates I(j) with the node candidates I(j)−1, and exchanging the value of the first objective function obtained by the exchange, with the value of the original first objective function;

when relationships $\Delta E(1-)<0$ and $\Delta E(1+)<0$ are satisfied and $\Delta E(1-)$ exceeds $\Delta E(1+)$, exchanging the node candidates I(j) with the node candidates and then exchanging the value of the first objective function obtained by the exchange, with the value of the original first objective function, both successively from j=1 to j=m−1;

when the value of the first objective function obtained at the completion of the sequential processes is less than the value of the original first objective function from which the threshold is subtracted, preforming the above exchanges again, successively from j=1 to j=m−1; and when the exchange of the node candidates is not performed at all, or the value of the first objective function exceeds the value of the original first objective function from which the threshold is subtracted, completing the processing.

18. A method for compressing one-dimensional time series data as defined in claim 3 wherein, assuming that the indices of the node candidates numbered in an increasing order are described as I(j) ($0 \leq j \leq m$), the quasi-optimal candidates are calculated in a procedure comprising:

when a relationship I(j−1)<I(j)−1 is satisfied, calculating a value of the first objective function obtained at the exchange of node candidates I(j) with node candidates I(j)−1, calculating a value $\Delta E(1-)$ which is the value of the first objective function from which the value of the original first objective function is subtracted, and setting the value $\Delta E(1-)$ to zero when I(j−1)$\geq$I(j)−1;

when a relationship I(j)+1<I(j+1) is satisfied, calculating a value of the first objective function obtained at the exchange of node candidates I(j) with node candidates I(j)+1, calculating a value $\Delta E(1+)$ which is the value of the first objective function from which the value of the original first objective function is subtracted, and setting the value $\Delta E(1+)$ to zero when I(j)+1$\geq$I(j+1);

when relationships $\Delta E(1-)<0$ and $\Delta E(1+)\geq 0$ are satisfied, exchanging the node candidates I(j) with the node candidates I(j)−1, and exchanging the value of the first objective function obtained by the exchange, with the value of the original first objective function;

when relationships $\Delta E(1-)\geq 0$ and $\Delta E(1+)<0$ are satisfied, exchanging the node candidates I(j) with the node candidates I(j)+1, and exchanging the value of the first objective function obtained by the exchange, with the value of the original first objective function;

when relationships of $\Delta E(1-)\geq 0$ and $\Delta E(1+)\geq 0$ are satisfied, not performing exchange of the node candidates I(j);

when relationships $\Delta E(1-)<0$ and $\Delta E(1+)<0$ are satisfied and $\Delta E(1-)$ is less than $\Delta E(1+)$, exchanging the node candidates I(j) with the node candidates I(j)−1, and exchanging the value of the first objective function obtained by the exchange, with the value of the original first objective function;

when relationships $\Delta E(1-)<0$ and $\Delta E(1+)<0$ are satisfied and $\Delta E(1-)$ exceeds $\Delta E(1+)$, exchanging the node candidates I(j) with the node candidates I(j)+1 and then exchanging the value of the first objective function obtained by the exchange, with the value of the original first objective function, both successively from j=m−1 to j=1;

when the value of the first objective function obtained at the completion of the sequential processes is less than the value of the original first objective function from which the threshold is subtracted, performing the above exchanges again, successively from j=m−1 to j=1; and when the exchange of the node candidates is not performed at all, or the value of the first objective function exceeds the value of the original first objective function from which the threshold is subtracted completing the processing.

19. A method of compressing one-dimensional time series data as defined in claim 3 wherein, when the number of the finally decided node candidates are less than the number of the data not selected as the node candidates, compressed data is output consisting of the identifier indicating the node candidates, the index numbers of the finally decided node candidates, and the values of the node candidates and, when the number of the finally decided node candidates exceeds the number of the data not selected as the node candidates, compressed data is output consisting of the identifier indicating non-node candidates, the index numbers of the data not selected as the node candidates, and the values of the node candidates.

20. A method of compressing one-dimensional time series data as defined in claim 3 wherein data compression is performed individually for time data and data of the one-dimensional time series data at irregular time intervals, to compress the time and the data separately.

21. A method of compressing one-dimensional time series data as defined in claim 3 wherein data compression is individually performed for each of the plural one-dimensional time series data constituting multi-dimensional time series data, to compress the multi-dimensional time series data.

22. A method of compressing one-dimensional time series data as defined in claim 3 wherein, for plural one-dimensional time series data whose errors propagate, data compression is repeated with an approximation accuracy increasing gradually from one of the time series data from which the propagation starts, to compress all of the data.

23. A method of decompressing one-dimensional time series data compressed by a compression method for one-dimensional time series data as defined in claim 1, comprising:
  a first process of inputting compressed data and a number of data to be obtained by decompressing the compressed data;
  a second process of interpolating the compressed data using an interpolation function identical to that used for compression, and calculating time data whose number is equal to the data number on the basis of an initial time and a time interval; and
  a third process of outputting the data and the time data both compressed in the second process.

24. A method of decompressing one-dimensional time series data compressed by a compression method for one-dimensional time series data as defined in claim 2, comprising:
  a first process of inputting compressed data and a number of data to be obtained by decompressing the compressed data;
  a second process of calculating zero data whose number is equal to the data number and time data whose number is equal to the data number based on an initial time and a time interval when an identifier indicating that the compressed data are all zero is attached to the compressed data, or calculating data whose number is equal to the data number by interpolating the compression data using an interpolation function identical to that used for compression and calculating time data whose number is equal to the data number based on the initial time and the time interval when an identifier indicating that the compressed data are all zero is not attached to the compressed data; and
  a third process of outputting the data and time data calculated in the second process.

25. A method of decompressing one-dimensional time series data as defined in claim 23 wherein data decompression is performed individually for each of plural compressed one-dimensional time series data constituting compressed multi-dimensional time series data, to decompress the compressed multi-dimensional time series data.

26. A recording medium for one-dimensional time series data compression program storing a compression program for one-dimensional time series data at uniform time intervals, said program comprising:
  a first process of inputting the one-dimensional time series data and an approximation accuracy thereof;
  a second process of calculating node candidates of an interpolation function approximating the one-dimensional time series data;
  a third process of optimizing positions of the node candidates;
  a fourth process of deciding an error between one-dimensional time series data produced based on the node candidates at optimized positions, using an interpolation function, and the original one-dimensional time series data;
  a fifth process of judging an error between the original one-dimensional time series data and one-dimensional time series data produced on the basis of the node candidates at optimized positions using the interpolation function, and changing a node number and returning to the second process when the error exceeds a value based on the approximation precision; and
  a sixth process of outputting data of the node candidates and corresponding time data as compressed data when it is judged in the fifth process that the error is less than the value based on the approximation accuracy.

27. A recording medium for one-dimensional time series data compression program storing a compression program of one-dimensional time series data at uniform time intervals, the program comprising:
  a first process of inputting the one-dimensional time series data and an approximation accuracy thereof;
  a second process of judging whether the one-dimensional time series data includes data within the approximation accuracy or not;
  a third process of calculating node candidates of an interpolation function which approximates the one-dimensional time series data, when the one-dimensional time series data includes no data within the approximation accuracy;
  a fourth process of optimizing positions of the node candidates;
  a fifth process of judging an error between one-dimensional time series data produced on the basis of the node candidates at optimized positions, using the interpolation function, and the original one-dimensional time series data;
  a sixth process of judging an error between one-dimensional time series data produced on the basis of the node candidates whose number is optimized, using the interpolation function and the original one-dimensional time series data, and changing a node number and returning to the second process when the error exceeds a value based on the approximation accuracy; and
  a seventh process of outputting information indicating that the one-dimensional time series data includes data within the approximation accuracy when it is judged in the second process that the one-dimensional time series data includes the data within the approximation accuracy, or outputting data of the node candidates and corresponding time data as compressed data when it is judged in the sixth process that the error does not exceed the value based on the approximation accuracy.

28. A recording medium for compressed program of one-dimensional time series data storing a compression program of one-dimensional time series data at uniform time intervals, the program comprising:
  a first process of inputting the one-dimensional time series data and an approximation accuracy thereof, attaching indices to the one-dimensional time series data in a temporal order, and calculating an initial node number of an interpolation function which interpolates the one-dimensional time series data;
  a second process of deciding node candidates including start data and end data, at random, in such a way that a number of decided candidates corresponds to the node number;

a third process of interpolating the node candidates, using an interpolation function which utilizes the index numbers of the node candidates as an independent variable, and calculating an error between the interpolation result and the original one-dimensional time series data;

a fourth process of calculating, from the error, a value of a first objective function defined as weighted sum of the maximum value of the error, the average of the error, and the variance of the error;

a fifth process of changing the node candidates repeatedly until the first objective function takes a smallest value and deciding quasi-optimal node candidates;

a sixth process of interpolating the quasi-optimal node candidates using the interpolation function, to generate one-dimensional time series data approximating the original one-dimensional time series data, and calculating an error between the one-dimensional time series data and the original one-dimensional time series data;

a seventh process of calculating, from the error, a second objective function defined as weighted sum of the maximum value of the error, the average of the error, and the variance of the error;

an eighth process of deciding the node number with an increment as a new node number when the value of the second objective function exceeds a threshold corresponding to the approximation accuracy, and repeating the second to seventh processes; and a ninth process of outputting an initial time and a time interval of the one-dimensional time series data, and compressed data consisting of index numbers of finally decided node candidates and the values of the node candidates, when the value of the second objective function is less then the threshold.

29. A recording medium for one-dimensional time series data compression program storing a compression data of one-dimensional time series data at uniform time intervals, the program comprising:

a first process of inputting the one-dimensional time series data and an approximation accuracy thereof, attaching indices to the one-dimensional time series data in a temporal order, and calculating an initial node number of an interpolation function which interpolates the one-dimensional time series data;

a second process of deciding node candidates including start data and end data and having the indices attached at approximately equal intervals, in such a way that a number of decided candidates corresponds to the node number;

a third process of interpolating the node candidates, using an interpolation function which utilizes the index numbers of the node candidates as an independent variable, and calculating an error between the interpolation result and the original one-dimensional time series data;

a fourth process of calculating, from the error, a value of a first objective function defined as weighted sum of the maximum value of the error, the average of the error, and the variance of the error;

a fifth process of changing the node candidates repeatedly until the first objective function takes a smallest value and deciding quasi-optimal node candidates;

a sixth process of interpolating the quasi-optimal node candidates using the interpolation function, to generate one-dimensional time series data approximating the original one-dimensional time series data, and calculating an error between the one-dimensional time series data and the original one-dimensional time series data;

a seventh process of calculating, from the error, a second objective function defined as weighted sum of the maximum value of the error, the average of the error, and the variance of the error;

an eighth process of deciding the node number with an increment as a new nod number when the value of the second objective function is greater than or equal to a threshold corresponding to the approximation accuracy, and repeating the second to seventh processes; and a ninth process of outputting an initial time and a time interval of the one-dimensional time series data, and compressed data consisting of index numbers of finally decided node candidates and the values of the node candidates, when the value of the second objective function is less than the threshold.

30. A recording medium for one-dimensional time series data compression program storing a compression program of one-dimensional time series data at uniform time intervals, the program comprising:

a first process of inputting the one-dimensional time series data and an approximation accuracy thereof, and attaching indices to the one-dimensional time series data in a temporal order, and calculating an initial node number of an interpolation function which interpolates the one-dimensional time series data;

a second process of judging whether all the absolute values of the one-dimensional time series data are less than the approximation accuracy or not, and when the absolute values are all less than the approximation accuracy, outputting an identifier indicating that all the values are zero to complete the processing or proceeding to a third process described later when all the absolute values are not less than the approximation accuracy;

a third process of deciding node candidates including start data and end data, at random, in such a way that a number of decided node candidates corresponds to the initial node number;

a forth process of interpolating the node candidates with an interpolation function using the index numbers of the node candidates as an independent variable and calculating an error between the interpolation result and the original one-dimensional time series data;

a fifth process of calculating, from the error, a value of a first objective function defined as weighted sum of the maximum value of the error, the average of the error, and the variance of the error;

a sixth process of changing the node candidates repeatedly until the first objective function takes a smallest value and deciding quasi-optimal node candidates;

a seventh process of interpolating the quasi-optimal node candidates using the interpolation function to generate one-dimensional time series data approximating the original one-dimensional time series data and calculating an error between the one-dimensional time series data and the original one-dimensional time series data;

an eighth process of calculating, from the error, a value of second objective function defined as weighted sum of the maximum value of the error, the average of the error, and the variance of the error;

a ninth process of deciding the node number with an increment as a new node number when the value of the second objective function is greater than or equal to a threshold corresponding to the approximation accuracy, and repeating the third to eighth processes; and a tenth process of outputting an initial time and a time interval of the one-dimensional time series data, and compressed data consisting of index numbers of finally decided node candidates and the values of the node candidates, when the value of the second objective function is less then the threshold.

31. A recording medium for compressed program of one-dimensional time series data storing a compression program of one-dimensional time series data at uniform time intervals, the program comprising:

a first process of inputting the one-dimensional time series data and an approximation accuracy thereof, and attaching indices to the one-dimensional time series data in a temporal order, and calculating an initial node number of an interpolation function interpolating the one-dimensional time series data;

a second process of judging whether all the absolute values of the one-dimensional time series data are less then the approximation accuracy or not, and when the values are all less than the approximation accuracy, outputting an identifier indicating that all the values are zero to complete the processing, or proceeding to a third process described later when all the absolute values exceed the approximation accuracy;

a third process of deciding node candidates including start and end data and having the indices attached at approximately equal intervals, in such a way that the number of the node candidates corresponds to the initial node number;

a fourth process of calculating an error from the original one-dimensional time series data by interpolating the node candidates by an interpolation function using the index numbers of the node candidates as an independent variable;

a fifth process of calculating, from the error, a value of a first objective function defined as weighed sum of the maximum of the error, the average of the error, and the variance of the error;

a sixth process of changing the node candidates repeatedly until the first objective function takes a smallest value, and deciding quasi-optimal node candidates;

a seventh process of interpolating the quasi-optimal node candidates with the interpolation function to generate one-dimensional time series data approximating the original one-dimensional time series data, and calculating an error between the one-dimensional time series data and the original one-dimensional time series data;

an eighth process of calculating, from the error, a value of a second objective function defined as weighted sum of the maximum value of the error, the average of the error, and the variance of the error;

a ninth process of employing the node number with an increment as a new node number and repeating the third to eighth processes when the value of the second objective function is greater than or equal to a threshold corresponding to the approximation accuracy; and a tenth process of outputting a start time and a time interval of the one-dimensional time series data, and compressed data consisting of index numbers of finally decided node candidates and the values of the node candidates when the value of the second objective function is less than the threshold.

32. A recording medium for one-dimensional time series data compression program as defined in claim 28, which program performs calculation of the quasi-optimal node candidates, on the assumption that the indices of the node candidates numbered in an increasing order are described as $I(j)$ ($0 \leq j \leq m$), according to a procedure comprising:

when a relationship $I(j-1)<I(j)-1$ is satisfied, calculating a value of the first objective function obtained at the exchange of node candidates $I(j)$ with node candidates $I(j)-1$, calculating a value $\Delta E(1-)$ which is the value of the first objective function from which the value of the original first objective function is subtracted, and setting the value $\Delta E(1-)$ to zero when $I(j-1) \geq I(j)-1$;

when a relationship $I(j)+1<I(j+1)$ is satisfied, calculating a value of the first objective function obtained at the exchange of node candidates $I(j)$ with node candidates $I(j)+1$, calculating a value $\Delta E(1+)$ which is the value of the first objective function from which the value of the original first objective function is subtracted, and setting the value $\Delta E(1+)$ to zero when $I(j)+1 \geq I(j+1)$, when relationships $\Delta E(1-)<0$ and $\Delta E(1+) \geq 0$ are satisfied, exchanging the node candidates $I(j)$ with the node candidates $I(j)-1$;

when relationships $\Delta E(1-) \geq 0$ and $\Delta E(1+)<0$ are satisfied, exchanging the node candidates $I(j)$ with the node candidates $I(j)+1$;

when relationships $\Delta E(1-) \geq 0$ and $\Delta E(1+) \geq 0$ are satisfied, not performing exchange of the node candidates $I(j)$;

when relationships $\Delta E(1-)<0$ and $\Delta E(1+)<0$ are satisfied and $\Delta E(1-)$ is less than $\Delta E(1+)$, exchanging the node candidates $I(j)$ with the node candidates $I(j)-1$;

when relationships $\Delta E(1-)<0$ and $\Delta E(1+)<0$ are satisfied and $\Delta E(1-)$ exceeds $\Delta E(1+)$, exchanging the node candidates $I(j)$ with the node candidates $I(j)+1$ in an increasing order for j of odd numbers and in a decreasing order for j of even numbers;

when the value of the first objective function obtained at the completion of the sequential processes is less than the value of the original first objective function from which the threshold is subtracted, exchanging the node candidates again in an increasing order for j of odd numbers and in a decreasing order for j of even numbers; and when the change of the node candidates is not performed at all, or the value of the first objective function exceeds the value of the original first objective function from which the threshold is subtracted, completing the processing.

33. A recording medium for one-dimensional time series data compression program as defined in claim 28 to which program performs the calculation of the quasi-optimal node candidates, on the assumption that the indices of the node candidates numbered in an increasing order are described as $I(j)$ ($0 \leq j \leq m$), according to a procedure comprising:

when a relationship $I(j-1)<I(j)-1$ is satisfied, calculating a value of the first objective function obtained at the exchange of node candidates $I(j)$ with node candidates $I(j)-1$, calculating a value $\Delta E(1-)$ which is the value of the first objective function from which the value of the original first objective function is subtracted, and setting the value $\Delta E(1-)$ to zero when $I(j-1) \geq I(j)-1$;

when a relationship $I(j)+1<I(j+1)$ is satisfied, calculating a value of the first objective function obtained at the exchange of node candidates $I(j)$ with node candidates $I(j)+1$, calculating a value $\Delta E(1+)$ which is the value of the first objective function from which the value of the original first objective function is subtracted, and setting the value $\Delta E(1+)$ to zero when $I(j)+1 \geq I(j+1)$, when relationships $\Delta E(1-)<0$ and $\Delta E(1+)\geqq 0$ are satisfied, exchanging the node candidates I(j) with the node candidates I(j)−1;

when relationships $\Delta E(1-)\geqq 0$ and $\Delta E(1+)<0$ are satisfied, exchanging the node candidates I(j) with the node candidates I(j)+1;

when relationships $\Delta E(1-)\geqq 0$ and $\Delta E(1+)\geqq 0$ are satisfied, not performing exchange of the node candidates I(j);

when relationships $\Delta E(1-)<0$ and $\Delta E(1+)<0$ are satisfied and $\Delta E(1-)$ is less than $\Delta E(1+)$, exchanging the node candidates I(j) with the node candidates I(j)−1;

when relationships $\Delta E(1-)<0$ and $\Delta E(1+)<0$ are satisfied and $\Delta E(1-)$ exceeds $\Delta E(1+)$, exchanging the node candidates I(j) with the node candidates I(j)+1 in a decreasing order for j of odd numbers and in an increasing order for j of even numbers;

when the value of the first objective function obtained at the completion of the sequential processes is less than the value of the original first objective function from which the threshold is subtracted, exchanging the node candidates again in a decreasing order for j of odd numbers and in an increasing order for j of even numbers; and when the exchange of the node candidates is not performed at all, or the value of the first objective function exceeds the value of the original first objective function from which the threshold is subtracted, completing the processing.

34. A recording medium for one-dimensional time series data compression program as defined in claim 28, which program performs the calculation of the quasi-optimal node candidates, on the assumption that the indices of the node candidates numbered in an increasing order are described as I(j) ($0\leqq j\leqq m$), according to a procedure comprising:

when a relationship I(j−1)<I(j)−1 is satisfied, calculating a value of the first objective function obtained at the exchange of node candidates I(j) with node candidates I(j)−1, calculating a value $\Delta E(1-)$ which is the value of the first objective function from which the value of the original first objective function is subtracted, and setting the value $\Delta E(1-)$ to zero when I(j−1)$\geqq$I(j)−1;

when a relationship I(j)+1<I(j+1) is satisfied, calculating a value of the first objective function obtained at the exchange of node candidates I(j) with nodes candidates I(j)+1, calculating a value $\Delta E(1+)$ which is the value of the first objective function from which the value of the original first objective function is subtracted, and setting the value $\Delta E(1+)$ to zero when I(j)+1$\geqq$I(j+1);

when relationships $\Delta E(1-)<0$ and $\Delta E(1+)\geqq 0$ are satisfied, exchanging the node candidates I(j) with the node candidates I(j)−1;

when relationships $\Delta E(1-)\geqq 0$ and $\Delta E(1+)<0$ are satisfied, exchanging the node candidates I(j) with the node candidates I(j)+1;

when relationships $\Delta E(1-)\geqq 0$ and $\Delta E(1+)\geqq 0$ are satisfied, not performing exchange of the node candidates I(j);

when relationships $\Delta E(1-)<0$ and $\Delta E(1+)<0$ are satisfied and $\Delta E(1-)$ is less than $\Delta E(1+)$, exchanging the node candidates I(j) with the node candidates I(j)−1;

when relationships $\Delta E(1-)<0$ and $\Delta E(1+)<0$ are satisfied and $\Delta E(1-)$ exceeds $\Delta E(1+)$, successively exchanging the node candidates I(j) with the node candidates I(j)+1, initially from j=1 to j=[m/2] and then from j=m−1 to j=[m/2]+1;

when the value of the first objective function obtained at the completion of the sequential processes is less than the value of the original first objective function from which the threshold is subtracted, successively exchanging the node candidates again, from j=1 to j=[m/2] and then from j=m−1 to j=[m/2]+1; and when the exchange of the node candidates is not performed at all, or the value of the first objective function exceeds the value of the original first objective function from which the threshold is reduced, completing the processing.

35. A recording medium for one-dimensional time series data compression program as defined in claim 28, which program performs the calculation of the quasi-optimal node candidates, on the assumption that the indices of the node candidates numbered in an increasing order are described as I(j) ($0\leqq j\leqq m$), according to a procedure comprising:

when a relationship I(j−1)<I(j)−1 is satisfied, calculating a value of the first objective function obtained at the exchange of node candidates I(j) with node candidates I(j)−1, calculating a value $\Delta E(1-)$ which is the value of the first objective function from which the value of the original first objective function is subtracted, and setting the value $\Delta E(1-)$ to zero when I(j−1)$\geqq$I(j)−1;

when a relationship I(j)+1<I(j+1) is satisfied, calculating a value of the first objective function obtained at the exchange of node candidates I(j) with node candidates I(j)+1, calculating a value $\Delta E(1+)$ which is the value of the first objective function from which the value of the original first objective function is subtracted, and setting the value $\Delta E(1+)$ to zero when I(j)+1$\geqq$I(j+1);

when relationships $\Delta E(1-)<0$ and $\Delta E(1+)\geqq 0$ are satisfied, exchanging the node candidates I(j) with the node candidates I(j)−1;

when relationships $\Delta E(1-)\geqq 0$ and $\Delta E(1+)>0$ are satisfied, exchanging the node candidates I(j) with the node candidates I(j)+1;

when relationships $\Delta E(1-)\geqq 0$ and $\Delta E(1+)\geqq 0$ are satisfied, not performing exchange of the node candidates I(j);

when relationships $\Delta E(1-)<0$ and $\Delta E(1+)<0$ are satisfied and $\Delta E(1-)$ is less than $\Delta E(1+)$, exchanging the node candidates I(j) with the node candidates I(j)−1;

when relationships $\Delta E(1-)<0$ and $\Delta E(1+)<0$ are satisfied and $\Delta E(1-)$ exceeds $\Delta E(1+)$, successively exchanging the node candidates I(j) with the node candidates I(j)+1, initially from j=[m/2] to j=1 and then from j=[m/2]+1 to j=m−1;

when the value of the first objective function obtained at the completion of the sequential processes is less than the value of the original first objective function from which the threshold is reduced, successively exchanging the node candidates again, from j=[m/2] to j=1 and then from j=[m/2]+1 to j=m−1; and when the exchange of the node candidates is not performed at all, or the value of the first objective function exceeds the value of the original first objective function from which the threshold is subtracted, completing the processing.

36. A recording medium for one-dimensional time series data compression program as defined in claim 28, which program performs the calculation of the quasi-optimal node candidates, on the assumption that the indices of the node candidates numbered in an increasing order are described as I(j) ($0\leqq j\leqq m$), according to a procedure comprising:

when a relationship of I(j−1)<I(j)−1 is satisfied, calculating a value of the first objective function obtained at the exchange of node candidates I(j) with node candidates I(j)−1, calculating a value ΔE(1−) which is the value of the first objective function from which the value of the original first objective function is subtracted, and setting the value ΔE(1−) to zero when I(j−1)≧I(j)−1;

when a relationship I(j)+1<I(j+1) is satisfied, calculating a value of the first objective function obtained at the exchange of node candidates I(j) with node candidates I(j)+1, calculating a value ΔE(1+) which is the value of the first objective function from which the value of the original first objective function is subtracted, and setting the value ΔE(1+) to zero when I(j)+1≧I(j+1);

when relationships ΔE(1−)<0 and ΔE(1+)≧0 are satisfied, exchanging the node candidates I(j) with the node candidates I(j)−1;

when relationships ΔE(1−)≧0 and ΔE(1+)<0 are satisfied, exchanging the node candidates I(j) with the node candidates I(j)+1;

when relationships ΔE(1−)≧0 and ΔE(1+)≧0 are satisfied, not performing exchange of the node candidates I(j);

when relationships ΔE(1−)<0 and ΔE(1+)<0 are satisfied and ΔE(1−) is less than ΔE(1+), exchanging the node candidates I(j) with the node candidates I(j)−1;

when relationships ΔE(1−)<0 and ΔE(1+)<0 are satisfied and ΔE(1−) exceeds ΔE(1+), exchanging the node candidates I(j) with the node candidates I(j)+1 successively from j=1 to j=m−1;

when the value of the first objective function obtained at the completion of the successive processes is less then the value of the original first objective function from which the threshold is subtracted, successively exchanging the node candidates again from j=1 to j=m−1; and when the exchange of the node candidates is not performed at all, or the value of the first objective function exceeds the value of the original first objective function from which the threshold is subtracted, completing the processing.

37. A recording medium for one-dimensional time series data compression program as defined in claim 28, which program performs the calculation of the quasi-optimal node candidates, on the assumption that the indices of the node candidates numbered in an increasing order are described as I(j) (0≦j≦m), according to a procedure comprising:

when a relationship I(j−1)<I(j)−1 is satisfied, calculating a value of the first objective function obtained at the exchange of node candidates I(j) with node candidates I(j)−1, calculating a value ΔE(1−) which is the value of the first objective function from which the value of the original first objective function is subtracted, and setting the value ΔE(1−) to zero when I(j−1)≧I(j)−1;

when a relationship I(j)+1<I(j+1) is satisfied, calculating a value of the first objective function obtained at the exchange of node candidates I(j) with node candidates I(j)+1, calculating a value ΔE(1+) which is the value of the first objective function from which the value of the original first objective function is subtracted, and setting the value ΔE(1+) to zero when I(j)+1≧I(j+1);

when relationships ΔE(1−)<0 and ΔE(1+)≧0 are satisfied, exchanging the node candidates I(j) with the node candidates I(j)−1;

when relationships ΔE(1−)≧0 and ΔE(1+)<0 are satisfied, exchanging the node candidates I(j) with the node candidates I(j)+1;

when relationships ΔE(1−)≧0 and ΔE(1+)≧0 are satisfied, not performing exchange of the node candidates I(j);

when relationships ΔE(1−)<0 and ΔE(1+)<0 are satisfied and ΔE(1−) is less than ΔE(1+), exchanging the node candidates I(j) with the node candidates I(j)−1;

when relationships ΔE(1−)<0 and ΔE(1+)<0 are satisfied and ΔE(1−) exceeds ΔE(1+), successively exchanging the node candidates I(j) with the node candidates I(j)+1 from j=m−1 to j=1;

when the value of the first objective function obtained at the completion of the sequential processes is less than the value of the original first objective function from which the threshold is subtracted, successively exchanging node candidates again from j=m−1 to j=1; and when the exchange of the node candidates is not performed at all, or the value of the first objective function exceeds the value of the original first objective function from which the threshold is subtracted, completing the processing.

38. A recording medium for one-dimensional time series data compression program as defined in claim 28, which program performs the calculation of the quasi-optimal node candidates, on the assumption that the indices of the node candidates numbered in an increasing order are described as I(j) (0≦j≦m), according to a procedure comprising:

when a relationship I(j−1)<I(j)−1 is satisfied, calculating a value of the first objective function obtained at the exchange of node candidates I(j) with node candidates I(j)−1, calculating a value ΔE(1−) which is the value of the first objective function from which the value of the original first objective function is subtracted, and setting the value ΔE(1−) to zero when I(j−1)≧I(j)−1;

when a relationship I(j)+1<I(j+1) is satisfied, calculating a value of the first objective function obtained at the exchange of node candidates I(j) with node candidates I(j)+1, calculating a value ΔE(1+) which is the value of the first objective function from which the value of the original first objective function is subtracted, and setting the value ΔE(1+) to zero when I(j)+1≧I(j+1);

when relationships ΔE(1−)<0 and ΔE(1+)≧0 are satisfied, exchanging the node candidates I(j) with the node candidates I(j)−1, and exchanging the value of the first objective function obtained by the exchange, with the value of the original first objective function;

when relationships ΔE(1−)≧0 and ΔE(1+)<0 are satisfied, exchanging the node candidates I(j) with the node candidates I(j)+1, and exchanging the value of the first objective function obtained by the exchange, with the value of the original first objective function;

when relationships ΔE(1−)≧0 and ΔE(1+)≧0 are satisfied, not performing exchange of the node candidates I(j);

when relationships ΔE(1−)<0 and ΔE(1+)<0 are satisfied and ΔE(1−) is less than ΔE(1+), exchanging the node candidates I(j) with the node candidates I(j)−1, and exchanging the value of the first objective function obtained by the exchange, with the value of the original first objective value;

when relationships ΔE(1−)<0 and ΔE(1+)<0 are satisfied and ΔE(1−) exceeds ΔE(1+) exchanging the node candidates I(j) with the node candidates I(j)+1 and then exchanging the value of the first objective function obtained by the exchange, with the value of the original objective function, both in an increasing order for j of odd numbers and in a decreasing order for j of even numbers;

when the value of the first objective function obtained at the completion of the sequential processes is less than the value of the original first objective function from which the threshold is subtracted, performing the above exchanges again, successively in an increasing order for j of odd numbers and then in a decreasing order for j as even numbers; and when the exchange of the node candidates is not performed at all, or the value of the first objective function exceeds the value of the original first objective function from which the threshold is subtracted, completing the processing.

39. A recording medium for one-dimensional time series data compression program as defined in claim 28, which program performs the calculation of the quasi-optimal node candidates, on the assumption that the indices of the node candidates numbered in an increasing order are described as I(j) ($0 \leq j \leq m$), according to a procedure comprising:

when a relationship I(j−1)<I(j)−1 is satisfied, calculating a value of the first objective function obtained at the exchange of node candidates I(j) with node candidates I(j)−1, calculating a value $\Delta E(1-)$ which is the value of the first objective function from which the value of the original first objective function is subtracted, and setting the value $\Delta E(1-)$ to zero when I(j−1)$\geq$I(j)−1;

when a relationship I(j)+1<I(j+1) is satisfied, calculating a value of the first objective function obtained at the exchange of node candidates I(j) with node candidates I(j)+1, calculating a value $\Delta E(1+)$ which is the value of the first objective function from which the value of the original first objective function is subtracted, and setting the value $\Delta E(1+)$ to zero when I(j)+1$\geq$I(j+1);

when relationships $\Delta E(1-)<0$ and $\Delta E(1+)\geq 0$ are satisfied, exchanging the node candidates I(j) with the node candidates I(j)−1, and exchanging the value of the first objective function obtained by the exchange, with the value of the original first objective function;

when relationships $\Delta E(1-)\geq 0$ and $\Delta E(1+)<0$ are satisfied, exchanging the node candidates I(j) with the node candidates I(j)+1, and changing the value of the first objective function obtained by the exchange, with the value of the original first objective function;

when relationships $\Delta E(1-)\geq 0$ and $\Delta E(1+)\geq 0$ are satisfied, not performing exchange of the node candidates I(j);

when relationships $\Delta E(1-)<0$ and $\Delta E(1+)<0$ are satisfied and $\Delta E(1-)$ is less than $\Delta E(1+)$, exchanging the node candidates I(j) with the node candidates I(j)−1, and exchanging the value of the first objective function obtained by the exchange, with the value of the original first objective value;

when relationships $\Delta E(1-)<0$ and $\Delta E(1+)<0$ are satisfied and $\Delta E(1-)$ exceeds $\Delta E(1+)$, exchanging the node candidates I(j) with the node candidates I(j)+1, and then exchanging the value of the first objective function obtained by the exchange, with the value of the original first objective function both in a decreasing order for j as odd numbers and in an Increasing order for j as even numbers;

when the value of the first objective function obtained at the completion of the sequential processes is less than the value of the original first objective function from which the threshold is subtracted, performing the above exchanges again in a decreasing order for j as odd numbers and in an increasing order for j as even numbers; and when the exchange of the node candidates is not performed at all, or the value of the first objective function exceeds the value of the original first objective function from which the threshold is subtracted, completing the processing.

40. A recording medium for one-dimensional time series data compression program as defined in claim 28, which program performs the calculation of the quasi-optimal node candidates, on the assumption that the indices of the node candidates numbered in an increasing order are described as I(j) ($0 \leq j \leq m$), according to a procedure comprising:

when a relationship I(j−1)<I(j)−1 is satisfied, calculating a value of the first objective function obtained at the exchange of node candidates I(j) with node candidates I(j)−1, calculating a value $\Delta E(1-)$ which is the value of the first objective function from which the value of the original first objective function is subtracted, and setting the value $\Delta E(1-)$ to zero when I(j−1)$\geq$I(j)−1;

when a relationship I(j)+1<I(j+1) is satisfied, calculating a value of the first objective function obtained at the exchange of node candidates I(j) with node candidates I(j)+1, calculating a value $\Delta E(1+)$ which is the value of the first objective function from which the value of the original first objective function is subtracted, and setting the value $\Delta E(1+)$ to zero when I(j)+1$\geq$I(j+1);

when relationships $\Delta E(1-)<0$ and $\Delta E(1+)\geq 0$ are satisfied, exchanging the node candidates I(j) with the node candidate I(j)−1, and exchanging the value of the first objective function obtained by the exchange, with the value of the original first objective function;

when relationships $\Delta E(1-)\geq 0$ and $\Delta E(1+)<0$ are satisfied, exchanging the node candidates I(j) with the node candidates I(j)+1, and exchanging the value of the first objective function obtained by the exchange, with the value of the original first objective function;

when relationships $\Delta E(1-)\geq 0$ and $\Delta E(1+)\geq 0$ are satisfied, not performing exchange of the node candidates I(j);

when relationships $\Delta E(1-)<0$ and $\Delta E(1+)<0$ are satisfied and $\Delta E(1-)$ is less than $\Delta E(1+)$, exchanging the node candidates I(j) with the node candidates I(j)−1, and exchanging the value of the first objective function obtained by the exchange, with the value of the original first objective function;

when relationships $\Delta E(1-)<0$ and $\Delta E(1+)<0$ are satisfied and $\Delta E(1-)$ exceeds $\Delta E(1+)$, exchanging the node candidates I(j) with the node candidates I(j)+1 and then exchanging the value of the first objective function obtained by the exchange, with the value of the original first objective function, both successively from j=1 to j=[m/2] and then from j=m−1 to j=[m/2]+1;

when the value of the first objective function obtained at the completion of the sequential processes is less than the value of the original first objective function from which the threshold is subtracted, performing the above exchanges again, successively from j=1 to j=[m/2] and then from j=m−1 to j=[m/2]+1; and when the exchange of the node candidates is not performed at all, or the value of the first objective function exceeds the value of the original first objective function from which the threshold is subtracted, completing the processing.

41. A recording medium for one-dimensional time series data compression program as defined in claim 28, which program performs the calculation of the quasi-optimal node candidates, on the assumption that the indices of the node candidates numbered in an increasing order are described as I(j) ($0 \leq j \leq m$) according to a procedure comprising:

when a relationship I(j−1)<I(j)−1 is satisfied, calculating a value of the first objective function obtained at the exchange of node candidates I(j) with node candidates I(j)−1, calculating a value $\Delta E(1-)$ which is the value of the first objective function from which the value of the original first objective function is subtracted, and setting the value $\Delta E(1-)$ to zero when I(j−1)$\geq$I(j)−1;

when a relationship I(j)+1<I(j+1) is satisfied, calculating a value of the first objective function obtained at the exchange of node candidates I(j) with node candidates I(j)+1, calculating a value $\Delta E(1+)$ which is the value of the first objective function from which the value of the original first objective function is subtracted, and setting the value $\Delta E(1+)$ to zero when I(j)+1$\geq$I(j+1);

when relationships $\Delta E(1-)<0$ and $\Delta E(1+)\geq 0$ are satisfied, exchanging the node candidates I(j) with the node candidates I(j)−1, and exchanging the value of the first objective function obtained by the exchange, with the value of the original first objective function;

when relationships $\Delta E(1-)\geq 0$ and $\Delta E(1+)<0$ are satisfied, exchanging the node candidates I(j) with the node candidates I(j)+1, and exchanging the value of the first objective function obtained by the exchange, with the value of the original first objective function;

when relationships $\Delta E(1-)\geq 0$ and $\Delta E(1+)\geq 0$ are satisfied, not performing exchange of the node candidates I(j);

when relationships $\Delta E(1-)<0$ and $\Delta E(1+)<0$ are satisfied and $\Delta E(1-)$ is less than $\Delta E(1+)$, exchanging the node candidates I(j) with the node candidates I(j)−1, and exchanging the value of the first objective function obtained by the exchange, with the value of the original first objective function;

when relationships $\Delta E(1-)<0$ and $\Delta E(1+)<0$ are satisfied and $\Delta E(1-)$ exceeds $\Delta E(1+)$, exchanging the node candidates I(j) with the node candidates I(j)+1, and then exchanging the value of the first objective function obtained by the exchange, with the value of the original first objective function, both successively from j=[m/2] to j=1 and then from j=[m/2]+1 to j=m−1;

when the value of the first objective function obtained at the completion of the sequential processes is less than the value of the original first objective function from which the threshold is subtracted, performing the above exchanges again, successively from j=[m/2] to j=1 and then from j=[m/2]+1 to j=m−1;

when the exchange of the node candidates is not performed at all, or the value of the first objective function exceeds the value of the original first objective function from which the threshold is subtracted, completing the processing.

42. A recording medium for one-dimensional time series data compression program as defined in claim 28, which program performs the calculation of the quasi-optimal node candidates, on the assumption that the indices of the node candidates numbered in an increasing order are described as I(j) ($0 \leq j \leq m$), according to a procedure comprising:

when a relationship I(j−1)<I(j)−1 is satisfied, calculating a value of the first objective function obtained at the exchange of node candidates I(j) with node candidates I(j)−1, calculating a value $\Delta E(1-)$ which is the value of the first objective function from which the value of the original first objective function is subtracted, and setting the value $\Delta E(1-)$ to zero when I(j−1)$\geq$I(j)−1;

when a relationship I(j)+1<I(j+1) is satisfied, calculating a value of the first objective function obtained at the exchange of node candidates I(j) with node candidates I(j)+1, calculating a value $\Delta E(1+)$ which is the value of the first objective function from which the value of the original first objective function is subtracted, and setting the value $\Delta E(1+)$ to zero when I(j)+1$\geq$I(j+1);

when relationships $\Delta E(1-)<0$ and $\Delta E(1+)\geq 0$ are satisfied, exchanging the node candidates I(j) with the node candidates I(j)−1, and exchanging the value of the first objective function obtained by the exchange, with the value of the original first objective function;

when relationships $\Delta E(1-)\geq 0$ and $\Delta E(1+)<0$ are satisfied, exchanging the node candidates I(j) with the node candidates I(j)+1, and exchanging the value of the first objective function obtained by the exchange, with the value of the original first objective function;

when relationships $\Delta E(1-)\geq 0$ and $\Delta E(1+)\geq 0$ are satisfied, not performing exchange of the node candidates I(j);

when relationships $\Delta E(1-)<0$ and $\Delta E(1+)<0$ are satisfied and $\Delta E(1-)$ is less than $\Delta E(1+)$, exchanging the node candidates I(j) with the node candidates I(j)−1, and exchanging the value of the first objective function obtained by the exchange, with the value of the original first objective function;

when relationships $\Delta E(1-)<0$ and $\Delta E(1+)<0$ are satisfied and $\Delta E(1-)$ exceeds $\Delta E(1+)$, exchanging the node candidates I(j) with the node candidates I(j)+1 and then exchanging the value of the first objective function obtained by the exchange, with the value of the original first objective function, both successively from j=1 to j=m−1;

when the value of the first objective function obtained at the completion of the sequential processes is less than the value of the original first objective function from which the threshold is subtracted, preforming the above exchanges again, successively from j=1 to j=m−1; and when the exchange of the node candidates is not performed at all, or the value of the first objective function exceeds the value of the original first objective function from which the threshold is subtracted, completing the processing.

43. A recording medium for one-dimensional time series data compression program as defined in claim 28, which program performs the calculation of the quasi-optimal node candidates, on the assumption that the indices of the node candidates numbered in an increasing order are described as I(j) ($0 \leq j \leq m$), according to a procedure comprising:

when a relationship I(j−1)<I(j)−1 is satisfied, calculating a value of the first objective function obtained at the exchange of node candidates I(j) with node candidates I(j)−1, calculating a value $\Delta E(1-)$ which is the value of the first objective function from which the value of the original first objective function is subtracted, and setting the value $\Delta E(1-)$ to zero when I(j−1)$\geq$I(j)−1;

when a relationship I(j)+1<I(j+1) is satisfied, calculating a value of the first objective function obtained at the exchange of node candidates I(j) with node candidates I(j)+1, calculating a value $\Delta E(1+)$ which is the value of the first objective function from which the value of the original first objective function is subtracted, and setting the value ΔE(1+) to zero when I(j)+1≧I(j+1);

when relationships ΔE(1−)<0 and ΔE(1+)≧0 are satisfied, exchanging the node candidates I(j) with the node candidates I(j)−1, and exchanging the value of the first objective function obtained by the exchange, with the value of the original first objective function;

when relationships ΔE(1−)≧0 and ΔE(1+)<0 are satisfied, exchanging the node candidates I(j) with the node candidates I(j)+1, and exchanging the value of the first objective function obtained by the exchange, with the value of the original first objective function;

when relationships of ΔE(1−)≧0 and ΔE(1+)≧0 are satisfied, not performing exchange of the node candidates I(j);

when relationships ΔE(1−)<0 and ΔE(1+)<0 are satisfied and ΔE(1−) is less than ΔE(1+), exchanging the node candidates I(j) with the node candidates I(j)−1, and exchanging the value of the first objective function obtained by the exchange, with the value of the original first objective function;

when relationships ΔE(1−)<0 and ΔE(1+)<0 are satisfied and ΔE(1−) exceeds ΔE(1+), exchanging the node candidates I(j) with the node candidates I(j)+1 and then exchanging the value of the first objective function obtained by the exchange, with the value of the original first objective function, both successively from j=m−1 to j=1;

when the value of the first objective function obtained at the completion of the sequential processes is less than the value of the original first objective function from which the threshold is subtracted, performing the above exchanges again, successively from j=m−1 to j=1; and when the exchange of the node candidates is not performed at all, or the value of the first objective function exceeds the value of the original first objective function from which the threshold is subtracted, completing the processing.

44. A recording medium for one-dimensional time series data compression program as defined in claim 28 storing a compression program wherein, when the number of the finally decided node candidates are less then the number of the data not selected as the node candidates, compressed data is output consisting of the identifier indicating the node candidates, the index numbers of the finally decided node candidates, and the values of the node candidates and, when the number of the finally decided node candidates exceeds the number of the data not selected as the node candidates, compressed data is output consisting of the identifier indicating non-node candidates, the index numbers of the data not selected as the node candidates, and the values of the node candidates.

45. A recording medium for one-dimensional time series data compression program as defined in claim 28, storing a compression program wherein data compression is performed individually for time data and data of the one-dimensional time series data at irregular time intervals, to compress the time data and the data separately.

46. A recording medium for one-dimensional time series data compression program defined in claim 28 storing a compression program wherein data compression is performed individually for each of the plural one dimensional time series data constituting multi-dimensional time series data to compress the multi-dimensional time series data.

47. A recording medium for one-dimensional time series data compression program as defined in claim 28 storing a compression program wherein, for plural one-dimensional time series data whose errors propagate, data compression is repeated with an approximation accuracy increasing gradually from one of the time series data from which the propagation starts, to compress all of the data.

48. A recording medium for one-dimensional time series data decompression program storing a decompression program which performs the decompression of data compressed by a program stored in a recording medium for one-dimensional time series data compression program as defined in claim 26, the decompression program comprising:

a first process of inputting compressed data and a number of data to be obtained by decompressing the compressed data;

a second process of interpolating the compressed data using an interpolation function identical to that used for compression to calculate data whose number is equal to the data number, and calculating time data whose number is equal to the data number on the basis of an initial time and a time interval; and a third process of outputting the data and the time both calculated An the second process.

49. A recording medium for one-dimensional time series data decompression program storing a decompression program which performs the decompress of data compressed by a program stored in a recording medium for one-dimensional time series data compression program as defined in claim 27, the decompression program comprising:

a first process of inputting compressed data and a number of data to be obtained by decompressing the compressed data;

a second process of calculating zero data whose number is equal to the data number and time data whose number is equal to the data number based on an initial time and a time interval when an identifier indicating that the compressed data are all zero is attached to the compressed data, or interpolating the compression data using an interpolation function identical to that used for compression to calculating data whose number is equal to the data number and calculating time data whose number is equal to the data number based on the initial time and the time interval when an identifier indicating that the compressed data are all zero is not attached to the compressed data; and a third process of outputting the data and time data calculated in the second process.

50. A recording medium for one-dimensional time series data decompression program as defined in each of claim 48, storing a decompression program wherein data decompression is performed individually for each of plural compressed one-dimensional time series data constituting compressed multi-dimensional time series data, to decompress the compressed multi-dimensional time series data.

51. A compression device for one-dimensional time series data at uniform time intervals comprising:

a first means of inputting the one-dimensional time series data and an approximation accuracy thereof;

a second means of calculating node candidates of an interpolation function approximating the one-dimensional time series data;

a third means of optimizing positions of the node candidates;

a fourth means of judging an error between one-dimensional time series data produced using the interpolation function, based on the node candidates at optimized positions, and the original one-dimensional time series data;

a fifth means of judging an error between one-dimensional time series data produced using the interpolation function on the basis of the node candidates at optimized positions and the original one-dimensional time series data, and changing a node number and returning to the second means when the error exceeds a value based on the approximation accuracy; and a sixth means of outputting data of the node candidates and corresponding time data as compressed data when it is judged in the fifth means that the error does not exceed the value based on the approximation accuracy.

52. A compression device for one-dimensional time series data at uniform time intervals comprising:

a first means of inputting the one-dimensional time series data and an approximation accuracy thereof;

a second means of judging whether the one-dimensional time series data includes data within the approximation accuracy or not;

a third means of calculating node candidates of an interpolation function which approximates the one-dimensional time series data, when the one-dimensional time series data includes no data within the approximation accuracy;

a fourth means of optimizing positions of the node candidates;

a fifth means of judging an error between one-dimensional time series data produced on the basis of the node candidates at optimized positions, using the interpolation function, and the original one-dimensional time series data;

a sixth means of judging an error between one-dimensional time series data produced on the basis of the node candidates whose number is optimized, using the interpolation function, and the original one-dimensional time series data, and changing a node number and returning to the second means when the error exceeds a value based on the approximation accuracy; and a seventh means of outputting information indicating that the one-dimensional time series data includes data within the approximation accuracy when it is judged in the second means that the one-dimensional time series data includes the data within the approximation accuracy, or outputting data of the node candidates and corresponding time data as compressed data when it is judged in the sixth means that the error does not exceed the value based on the approximation accuracy.

53. A compression device for one-dimensional time series data at uniform time intervals comprising:

a first means of inputting the one-dimensional time series data and an approximation accuracy thereof, attaching indices to the one-dimensional time series data in a temporal order, and calculating an initial node number of an interpolation function which interpolates the one-dimensional time series data;

a second means of deciding node candidates including start data and end data, at random, in such a way that a number of decided candidates corresponds to the node number;

a third means of interpolating the node candidates, using an interpolation function which employs the index numbers of the node candidates as an independent variable, and calculating an error between the interpolation result and the original one-dimensional time series data;

a fourth means of calculating, from the error, a value of a first objective function defined as weighted sum of the maximum value of the error, the average of the error, and the variance of the error;

a fifth means of changing the node candidates repeatedly until the first objective function takes a smallest value end deciding quasi-optimal node candidates;

a sixth means of interpolating the quasi-optimal node candidates using the interpolation function, to generate one-dimensional time series data approximating the original one-dimensional time series data, and calculating an error between the one-dimensional time series data and the original one-dimensional time series data;

a seventh means of calculating, from the calculated error, a second objective function defined as weighted sum of the maximum value of the error, the average of the error, and the variance of the error;

an eighth means of deciding the node number with an increment as a new node number when the value of the second objective function is greater than or equal to a threshold corresponding to the approximation accuracy, and repeating the second to seventh means; and a ninth means of outputting an initial time and a time interval of the one-dimensional time series data, and compressed data consisting of index numbers of finally decided node candidates and the values of the node candidates, when the value of the second objective function is less than the threshold.

54. A compression device for one-dimensional time series data at uniform time intervals comprising:

a first means of inputting the one-dimensional time series data and an approximation accuracy thereof, and attaching indices to the one-dimensional time series data in a temporal order, and calculating an initial node number of an interpolation function interpolating the one-dimensional time series data;

a second means of deciding node candidates including start and end data and having the indices attached at approximately equal intervals, in such a way that the number of the decided node candidates corresponds to the initial node number;

a third means of interpolating the node candidates with an interpolation function using the index numbers of the node candidates as an independent variable and calculating an error between the interpolation result and the original one-dimensional time series data;

a forth means of calculating, from the error, a value of a first objective function defined by weighted sum of the maximum of the error, the average of the error, and the variance of the error;

a fifth means of changing the node candidates repeatedly until the first objective function takes a smallest value, and deciding quasi-optimal node candidates;

a sixth means of interpolating the quasi-optimal node candidates with the interpolation function to generate one-dimensional time series data approximating the original one-dimensional time series data, and calculating an error between the one-dimensional time series data and the original one-dimensional time series data;

a seventh means of calculating, from the error, a value of a second objective function defined as weighted sum of the maximum value of the error, the average of the error, and the variance of the error;

an eighth means of employing the node number with an increment as a new node number and repeating the second to seventh means when the value of the second objective function exceeds a threshold corresponding to the approximation accuracy; and a ninth means of outputting an initial time and a time interval of the one-dimensional time series data, and compressed data consisting of index numbers of finally decided node candidates, and the values of the node candidates when the value of the second objective function is less than the threshold.

55. A compression device for one-dimensional time series data at uniform time intervals comprising:

a first means of inputting the one-dimensional time series data and an approximation accuracy thereof, and attaching indices to the one-dimensional time series data in a temporal order, and calculating an initial node number of an interpolation function which interpolates the one-dimensional time series data;

a second means of judging whether all the absolute values of the one-dimensional time series data are less than the approximation accuracy or note and when the absolute values are all less than the approximation accuracy, outputting an identifier indicating that all the values are zero to complete the processing, or proceeding to a third means described later when all the absolute values are not less than the approximation accuracy;

a third means of deciding node candidates including start data and end data, at random, in such a way that a number of decided node candidates corresponds to the initial node number;

a forth means of interpolating the node candidates with an interpolation function using the index numbers of the node candidates as an independent variable and calculating an error between the interpolation result and the original one-dimensional time series data;

a fifth means of calculating, from the error, a value of a first objective function defined as weighted sum of the maximum value of the error, the average of the error, and the variance of the error;

a sixth means of changing the node candidates repeatedly until the first objective function takes a smallest value and deciding quasi-optimal node candidates;

a seventh means of interpolating the quasi-optimal node candidates using the interpolation function to generate one-dimensional time series data approximating the original one-dimensional time series data and calculating an error between the one-dimensional time series data and the original one-dimensional time series data;

an eighth means of calculating, from the error, a value of second objective function defined as weighted sum of the maximum value of the error, the average of the error, and the variance of the error;

a ninth means of deciding the node number with an increment as a new node number when the value of the second objective function is greater than or equal to a threshold corresponding to the approximation accuracy, and repeating the third to eighth means; and a tenth means of outputting an initial time and a time interval of the one-dimensional time series data, and compressed data consisting of index numbers of finally decided node candidates and the values of the node candidates, when the value of the second objective function is less than the threshold.

56. A compression device for one-dimensional time series data at uniform time intervals comprising:

a first means of inputting the one-dimensional time series data and an approximation accuracy thereof, and attaching indices to the one-dimensional time series data in a temporal order, and calculating an initial node number of an interpolation function interpolating the one-dimensional time series data;

a second means of judging whether all the absolute values of the one-dimensional time series data are less than the approximation accuracy or not, and when the values are all less than the approximation accuracy, outputting an identifier indicating that all the values are zero to complete the processing, or proceeding to a third means described later when all the absolute values are not less than the approximation accuracy;

a third means of deciding node candidates including start and end data and having the indices attached at approximately equal intervals, in such a way that the number of the decided node candidates corresponds to the initial node number;

a fourth means of interpolating the node candidates by an interpolation function using the index numbers of the node candidates as an independent variable, and calculating an error between the interpolation result and the original one-dimensional time series data;

a fifth means of calculating a value of a first objective function defined as weighed sum of the maximum of the error, the average of the error, and the variance of the error;

a sixth means of changing the node candidates repeatedly until the first objective function takes a smallest value, and deciding quasi-optimal node candidates;

a seventh means of interpolating the quasi-optimal node candidates with the interpolation function to generate one-dimensional time series data approximating the original one-dimensional time series data, and calculating an error between the one-dimensional time series data and the original one-dimensional time series data;

an eighth means of calculating, from the error, a value of a second objective function defined as weighted sum of the maximum value of the error, the average of the error, and the variance of the error;

a ninth means of employing the node number with an increment as a new node number and repeating the processes performed by the third to eighth means when the value of the second objective function is greater than or equal to a threshold corresponding to the approximation accuracy; and a tenth means of outputting a start time and a time interval of the one-dimensional time series data, and compressed data consisting of index numbers of finally decided node candidates and the values of the node candidates when the value of the second objective function is less then the threshold.

57. A compression device for one-dimensional time series data as defined in claim 52 wherein, assuming that the indices of the node candidates numbered in an increasing order are described as I(j) ($0 \leq j \leq m$), the quasi-optimal node candidates are calculated in the steps of:

when a relationship I(j−1)<I(j)−1 is satisfied, calculating a value of the first objective function at the exchange of node candidates I(j) with node candidates I(j)−1, calculating a value ΔE(1−) which is the value of the first objective function from which the value of the original first objective function is subtracted, and setting the value ΔE(1−) to zero when I(j−1)≧I(j)−1;

when a relationship I(j)+1<I(j+1) is satisfied, calculating a value of the first objective function at the exchange of node candidates I(j) with node candidates I(j)+1, calculating a value $\Delta E(1+)$ which is the value of the first objective function from which the value of the original first objective function is subtracted, and setting the value $\Delta E(1+)$ to zero when $I(j)+1 \geq I(j+1)$, when relationships $\Delta E(1-)<0$ and $\Delta E(1+) \geq 0$ are satisfied, exchanging the node candidates I(j) with the node candidates I(j)−1;

when relationships $\Delta E(1-) \geq 0$ and $\Delta E(1+)<0$ are satisfied, exchanging the node candidates I(j) with the node candidates I(j)+1;

when relationships $\Delta E(1-) \geq 0$ and $\Delta E(1+) \geq 0$ are satisfied, not performing exchange of the node candidates I(j);

when relationships $\Delta E(1-)<0$ and $\Delta E(1+)<0$ are satisfied and $\Delta E(1-)$ is less than $\Delta E(1+)$, exchanging the node candidates I(j) with the node candidates I(j)−1, when relationships $\Delta E(1-)<0$ and $\Delta E(1+)<0$ are satisfied and $\Delta E(1-)$ exceeds $\Delta E(1+)$, exchanging the node candidates I(j) with the node candidates I(j)+1 in an increasing order for j of add numbers and in a decreasing order for j of even numbers;

when the value of the first objective function obtained at the completion of the sequential processes is less than the value of the original first objective function from which the threshold is subtracted, exchanging the node candidates again in an increasing order for j of odd numbers and in a decreasing order for j of even numbers; and when the exchange of the node candidates is not performed at all, or the value of the first objective function exceeds the value of the original first objective function from which the threshold is subtracted, completing the processing.

58. A compression device for one-dimensional time series data as defined in claim 53 wherein, assuming that the indices of the node candidates numbered in an increasing order are described as I(j) ($0 \leq j \leq m$), the quasi-optimal candidates are calculated in the steps of:

when a relationship $I(j-1)<I(j)-1$ is satisfied, calculating a value of the first objective function obtained at the exchange of node candidates I(j) with node candidates I(j)−1, calculating a value $\Delta E(1-)$ which is the value of the first objective function from which the value of the original first objective function is subtracted, and setting the value $\Delta E(1-)$ to zero when $I(j-1) \geq I(j)-1$;

when a relationship $I(j)+1<I(j+1)$ is satisfied, calculating a value of the first objective function obtained at the exchange of rods candidates I(j) with node candidates I(j)+1, calculating a value $\Delta E(1+)$ which is the value of the first objective function from which the value of the original first objective function is subtracted, and setting the value $\Delta E(1+)$ to zero when $I(j)+1 \geq I(j+1)$, when relationships $\Delta E(1-)<0$ and $\Delta E(1+) \geq 0$ are satisfied, exchanging the node candidates I(j) with the node candidates I(j)−1;

when relationships $\Delta E(1-) \geq 0$ and $\Delta E(1+)<0$ are satisfied, exchanging the node candidates I(j) with the node candidates I(j)+1;

when relationships $\Delta E(1-) \geq 0$ and $\Delta E(1+) \geq 0$ are satisfied, not performing exchange of the node candidates I(j);

when relationships $\Delta E(1-)<0$ and $\Delta E(1+)<0$ are satisfied and $\Delta E(1-)$ is less than $\Delta E(1+)$, exchanging the node candidates I(j) with the node candidates I(j)−1;

when relationships $\Delta E(1-)<0$ and $\Delta E(1+)<0$ are satisfied and $\Delta E(1-)$ exceeds $\Delta E(1+)$, exchanging the node candidates I(j) with the node candidates I(j)+1 in a decreasing order for j of odd numbers and in an increasing order for j of even numbers;

when the value of the first objective function obtained at the completion of the sequential processes is less than the value of the original first objective function from which the threshold is subtracted, exchanging the node candidates again in a decreasing order for j of odd numbers and in an increasing order for j of even numbers; and when the exchange of the node candidates is not performed at all, or the value of the first objective function exceeds the value of the original first objective function from which the threshold is subtracted, completing the processing.

59. A compression device for one-dimensional time series data as defined claim 53 which, assuming that the indices of the node candidates numbered in an increasing order are described as I(j) ($0 \leq j \leq m$), the quasi-optimal candidates are calculated in the steps of:

when a relationship $I(j-1)<I(j)-1$ is satisfied, calculating a value of the first objective function obtained at the exchange of node candidates I(j) with node candidates I(j)−1, calculating a value $\Delta E(1-)$ which is the value of the first objective function from which the value of the original first objective function is subtracted, and setting the value $\Delta E(1-)$ to zero when $I(j-1) \geq I(j)-1$;

when a relationship $I(j)+1<I(j+1)$ is satisfied, calculating a value of the first objective function obtained at the exchange of node candidates I(j) with node candidates I(j)+1, calculating a value $\Delta E(1+)$ which is the value of the first objective function from which the value of the original first objective function is subtracted, and setting the value $\Delta E(1+)$ to zero when $I(j)+1 \geq I(j+1)$;

when relationships $\Delta E(1-)<0$ and $\Delta E(1+) \geq 0$ are satisfied, exchanging the node candidates I(j) with the node candidates I(j)−1;

when relationships $\Delta E(1-) \geq 0$ and $\Delta E(1+)<0$ are satisfied, exchanging the node candidates I(j) with the node candidates I(j)+1;

when relationships $\Delta E(1-) \geq 0$ and $\Delta E(1+) \geq 0$ are satisfied, not performing exchange of the node candidates I(j);

when relationships $\Delta E(1-)<0$ and $\Delta E(1+)<0$ are satisfied and $\Delta E(1-)$ is less than $\Delta E(1+)$, exchanging the node candidates I(j) with the node candidates I(j)−1;

when relationships $\Delta E(1-)<0$ and $\Delta E(1+)<0$ are satisfied and $\Delta E(1-)$ exceeds $\Delta E(1+)$, successively exchanging the node candidates I(j) with the node candidates I(j)+1, initially from j=1 to j=[m/2] and then from j=m−1 to j=[m/2]+1;

when the value of the first objective function obtained at the completion of the sequential processes is less than the value of the original first objective function from which the threshold is subtracted, successively exchanging the node candidates again, from j=1 to j=[m/2] and then from j=m−1 to j=[m/2]+1; and when the exchange of the node candidates is not performed at all, or the value of the first objective function exceeds the value of the original first objective function from which the threshold is reduced, completing the processing.

60. A compression device for one-dimensional time series data as defined in claim 53 wherein, assuming that the indices of the node candidates numbered in an increasing order are described as I(j) (0≦j≦m), the quasi-optimal candidates are calculated in the steps of:

when a relationship I(j−1)<I(j)−1 is satisfied, calculating a value of the first objective function obtained at the exchange of node candidates I(j) with node candidates I(j)−1, calculating a value ΔE(1−) which is the value of the first objective function from which the value of the original first objective function is subtracted, and setting the value ΔE(1−) to zero when I(j−1)≧I(j)−1;

when a relationship I(j)+1<I(j+1) is satisfied, calculating a value of the first objective function obtained at the exchange of node candidates I(j) with node candidates I(j)+1, calculating a value ΔE(1+) which is the value of the first objective function from which the value of the original first objective function is subtracted, and setting the value ΔE(1+) to zero when I(j)+1≧I(j+1);

when relationships ΔE(1−)<0 and ΔE(1+)≧0 are satisfied, exchanging the node candidates I(j) with the node candidates I(j)−1;

when relationships ΔE(1−)≧0 and ΔE(1+)<0 are satisfied, exchanging the node candidates I(j) with the node candidates I(j)+1;

when relationships ΔE(1−)≧0 and ΔE(1+)≧0 are satisfied, not performing exchange of the node candidates I(j);

when relationships ΔE(1−)<0 and ΔE(1+)<0 are satisfied and ΔE(1−) is less than ΔE(1+), exchanging the node candidates I(j) with the node candidates I(j)−1;

when relationships ΔE(1−)<0 and ΔE(1+)<0 are satisfied and ΔE(1−) exceeds ΔE(1+), successively exchanging the node candidates I(j) with the node candidates I(j)+1, initially from j=[m/2] to j=1 and then from j=[m/2]+1 to j=m−1;

when the value of the first objective function obtained at the completion of the sequential processes is less than the value of the original first objective function from which the threshold is reduced, successively exchanging the node candidates again, from j=[m/2] to j=1 in a decreasing order and then from j=[m/2]+1 to j=m−1;

when the exchange of the node candidates is not performed at all, or the value of the first objective function exceeds the value of the original first objective function from which the threshold is reduced, completing the processing.

61. A compression device for one-dimensional time series data as defined in claim 53 wherein, assuming that the indices of the node candidates numbered in an increasing order are described as I(j) (0≦j≦m), the quasi-optimal candidates are calculated in the steps of:

when a relationship of I(j−1)<I(j)−1 is satisfied, calculating a value of the first objective function obtained at the exchange of node candidates I(j) with node candidates I(j)−1, calculating a value ΔE(1−) which is the value of the first objective function from which the value of the original first objective function is subtracted, and setting the value ΔE(1−) to zero when I(j−1)≧I(j)−1;

when a relationship I(j)+1<I(j+1) is satisfied, calculating a value of the first objective function obtained at the exchange of node candidates I(j) with node candidates I(j)+1, calculating a value ΔE(1+) which is the value of the first objective function from which the value of the original first objective function is subtracted, and setting the value ΔE(1+) to zero when I(j)+1≧I(j+1);

when relationships ΔE(1−)<0 and ΔE(1+)≧0 are satisfied, exchanging the node candidates I(j) with the node candidates I(j)−1;

when relationships ΔE(1−)≧0 and ΔE(1+)<0 are satisfied, exchanging the node candidates I(j) with the node candidates (j)+1;

when relationships ΔE(1−)≧0 and ΔE(1+)≧0 are satisfied, not performing exchange of the node candidates I(j);

when relationships ΔE(1−)<0 and ΔE(1+)<0 are satisfied and ΔE(1−) is less then ΔE(1+), exchanging the node candidates I(j) with the node candidates I(j)−1;

when relationships ΔE(1−)<0 and ΔE(1+)<0 are satisfied and ΔE(1−) exceeds ΔE(1+), successively exchanging the node candidates I(j) with the node candidates I(j)+1 from j=1 to j=m−1;

when the value of the first objective function obtained at the completion of the successive processes is less than the value of the original first objective function from which the threshold is subtracted, exchanging the node candidates again successively from j=1 to j=m−1; and when the exchange of the node candidates is not performed at all, or the value of the first objective function exceeds the value of the original first objective function from which the threshold is subtracted, completing the processing.

62. A compression device for one-dimensional time series data as defined in claim 53 wherein, assuming that the indices of the node candidates numbered in an increasing order are described as I(j) (0≦j≦m), the quasi-optimal candidates are calculated in the steps of:

when a relationship I(j−1)<I(j)−1 is satisfied, calculating a value of the first objective function obtained at the exchange of node candidates I(j) with node candidates I(j)−1, calculating a value ΔE(1−) which is the value of the first objective function from which the value of the original first objective function is subtracted, and setting the value ΔE(1−) to zero when I(j−1)≧I(j)−1;

when a relationship I(j)+1<I(j+1) is satisfied, calculating a value of the first objective function obtained at the exchange of node candidates I(j) with node candidates I(j)+1, calculating a value ΔE(1+) which is the value of the first objective function from which the value of the original first objective function is subtracted, and setting the value ΔE(1+) to zero when I(j)+1≧I(j+1);

when relationships ΔE(1−)<0 and ΔE(1+)≧0 are satisfied, exchanging the node candidates I(j) with the node candidates I(j)−1;

when relationships ΔE(1−)≧0 and ΔE(1+)<0 are satisfied, changing the node candidates I(j) with the node candidates I(j)+1;

when relationships ΔE(1)≧0 and ΔE(1+)≧0 are satisfied, not performing exchange of the node candidates I(j);

when relationships ΔE(1−)<0 and ΔE(1+)<0 are satisfied and ΔE(1−) is less than ΔE(1+), exchanging the node candidates I(j) with the node candidates I(j)−1;

when relationships ΔE(1−)<0 and ΔE(1+)<0 are satisfied and ΔE(1−) exceeds ΔE(1+), successively exchanging the node candidates I(j) with the node candidates I(j)+1 from j=m−1 to j=1;

when the value of the first objective function obtained at the completion of the sequential processes is less then the value of the original first objective function from which the threshold is subtracted, successively exchanging node candidates again from j=m−1 to j=1; and when the exchange of the node candidates is not performed at all, or the value of the first objective function exceeds the value of the original first objective function from which the threshold is subtracted, completing the processing.

63. A compression device for one-dimensional time series data as defined in claim 53 wherein, assuming that the indices of the node candidates numbered in an increasing order are described as I(j) ($0 \leq j \leq m$), the quasi-optimal candidates are calculated in the steps of:

when a relationship I(j−1)<I(j)−1 is satisfied, calculating a value of the first objective function obtained at the exchange of node candidates I(j) with node candidates I(j)−1, calculating a value $\Delta E(1-)$ which is the value of the first objective function from which the value of the original first objective function is subtracted, and setting the value $\Delta E(1-)$ to zero when I(j−1)$\geq$I(j)−1;

when a relationship I(j)+1<I(j+1) is satisfied, calculating a value of the first objective function obtained at the exchange of node candidates I(j) with node candidates I(j)+1, calculating a value $\Delta E(1+)$ which is the value of the first objective function from which the value of the original first objective function is subtracted, and setting the value $\Delta E(1+)$ to zero when I(j)+1$\geq$I(j+1);

when relationships $\Delta E(1+)<0$ and $\Delta E(1+)<0$ are satisfied, exchanging the node candidates I(j) with the node candidates I(j)−1, and exchanging the value of the first objective function obtained by the exchange, with the value of the original first objective function;

when relationships $\Delta E(1-)\geq 0$ and $\Delta E(1+)<0$ are satisfied, exchanging the node candidates I(j) with the node candidates I(j)+1, and exchanging the value of the first objective function obtained by the exchange, with the value of the original first objective function;

when relationships $\Delta E(1-)\geq 0$ and $\Delta E(1+)\geq 0$ are satisfied, not performing exchange of the node candidates I(j);

when relationships $\Delta E(1-)<0$ and $\Delta E(1+)<0$ are satisfied and $\Delta E(1-)$ is less than $\Delta E(1+)$, exchanging the node candidates I(j) with the node candidates I(j)−1, and exchanging the value of the first objective function obtained by the exchange, with the value of the original first objective value;

when relationships $\Delta E(1-)<0$ and $\Delta E(1+)<0$ are satisfied and $\Delta E(1-)$ exceeds $\Delta E(1+)$, exchanging the node candidates I(j) with the node candidates I(j)+1 and then exchanging the value of the first objective function obtained by the exchange, with the value of the original objective function, both in an increasing order for j of odd numbers and in a decreasing order for j of even numbers;

when the value of the first objective function obtained at the completion of the sequential processes is less than the value of the original first objective function from which the threshold is subtracted, performing the above exchanges again in an increasing order for j of odd numbers and in a decreasing order for j as even numbers; and when the exchange of the node candidates is not performed at all, or the value of the first objective function exceeds the value of the original first objective function from which the threshold is subtracted, completing the processing.

64. A compression device for one-dimensional time series data defined in claim 53 wherein, assuming that the indices of the node candidates numbered in an increasing order are described as I(j) ($0 \leq j \leq m$), the quasi-optimal candidates are calculated in the steps of:

when a relationship I(j−1)<I(j)−1 is satisfied, calculating a value of the first objective function obtained at the exchange of nodes candidates I(j) with node candidates I(j)−1, calculating a value $\Delta E(1-)$ which is the value of the first objective function from which the value of the original first objective function is subtracted, and setting the value $\Delta E(1-)$ to zero when I(j−1)$\geq$I(j)−1;

when a relationship I(j)+1<I(j+1) is satisfied, calculating a value of the first objective function obtained at the exchange of node candidates I(j) with node candidates I(j)+1, calculating a value $\Delta E(1+)$ which is the value of the first objective function from which the value of the original first objective function is subtracted, and setting the value $\Delta E(1+)$ to zero when I(j)+1$\geq$I(j+1);

when relationships $\Delta E(1-)<0$ and $\Delta E(1+)\geq 0$ are satisfied, exchanging the node candidates I(j) with the node candidates I(j)−1, and exchanging the value of the first objective function obtained by the exchange, with the value of the original first objective function;

when relationships $\Delta E(1-)\geq 0$ and $\Delta E(1+)<0$ are satisfied, exchanging the node candidates I(j) with the node candidates I(j)+1, and exchanging the value of the first objective function obtained by the exchange, with the value of the original first objective function;

when relationships $\Delta E(1-)\geq 0$ and $\Delta E(1+)\geq 0$ are satisfied, not performing exchange of the node candidates I(j);

when relationships $\Delta E(1-)<0$ and $\Delta E(1+)<0$ are satisfied and $\Delta E(1-)$ is less than $\Delta E(1+)$, exchanging the node candidates I(j) with the node candidates I(j)−1, and exchanging the value of the first objective function obtained by the exchange, with the value of the original first objective value;

when relationships $\Delta E(1-)<0$ and $\Delta E(1+)<0$ are satisfied and $\Delta E(1-)$ exceeds $\Delta E(1+)$ exchanging the node candidates I(j) with the node candidates I(j)+1 and exchanging the value of the first objective function obtained by the exchange, with the value of the original first objective function, both in a decreasing order for j as odd numbers and in an increasing order for j as even numbers;

when the value of the first objective function obtained at the completion of the sequential processes is less than the value of the original first objective function from which the threshold is subtracted, performing the above exchanges again in a decreasing order for j as odd numbers and in an increasing order for j as even numbers; and when the exchange of the node candidates is not performed at all, or the value of the first objective function exceeds the value of the original first objective function from which the threshold is subtracted, completing the processing.

65. A compression device for one-dimensional time series data as defined in claim 53 wherein, assuming that the indices of the node candidates numbered in an increasing order are described as I(j) ($0 \leq j \leq m$), the quasi-optimal candidates are calculated in the steps of:

when a relationship I(j−1)<I(j)−1 is satisfied, calculating a value of the first objective function obtained at the exchange of node candidates I(j) with node candidates I(j)−1, calculating a value $\Delta E(1-)$ which is the value of the first objective function from which the value of the original first objective function is subtracted, and setting the value $\Delta E(1-)$ to zero when I(j−1)$\geq$I(j)−1;

when a relationship I(j)+1<I(j+1) is satisfied, calculating a value of the first objective function obtained at the exchange of node candidates I(j) with node candidates I(j)+1, calculating a value ΔE(1+) which is the value of the first objective function from which the value of the original first objective function is subtracted, and setting the value ΔE(1+) to zero when I(j)+1≧I(j+1);

when relationships ΔE(1−)<0 and ΔE(1+)≧0 are satisfied, exchanging the node candidates I(j) with the node candidates I(j)−1, and exchanging the value of the first objective function obtained by the exchange, with the value of the original first objective function;

when relationships ΔE(1−)≧0 and ΔE(1+)<0 are satisfied, exchanging the node candidates I(j) with the node candidates I(j)+1, and exchanging the value of the first objective function obtained by the exchange, with the value of the original first objective function;

when relationships ΔE(1−)≧0 and ΔE(1+)≧0 are satisfied, not performing exchange of the node candidates I(j);

when relationships ΔE(1−)<0 and ΔE(1+)<0 are satisfied and ΔE(1−) is less than ΔE(1+), exchanging the node candidates I(j) with the node candidates I(j)−1, and exchanging the value of the first objective function obtained by the exchange, with the value of the original first objective function;

when relationships ΔE(1−)<0 and ΔE(1+)<0 are satisfied and ΔE(1−) exceeds ΔE(1+), exchanging the node candidates I(j) with the node candidates I(j)+1 and then exchanging the value of the first objective function obtained by the exchange, with the value of the original first objective function, both successively from j=1 to j=[m/2] and then from j=m−1 to j=[m/2]+1;

when the value of the first objective function obtained at the completion of the sequential processes is less than the value of the original first objective function from which the threshold is subtracted, performing the above exchanges again, successively from j=1 to j=[m/2] and then from j=m−1 to j=[m/2]+1; and when the exchange of the node candidates is not performed at all, or the value of the first objective function exceeds the value of the original first objective function from which the threshold is subtracted, completing the processing.

66. A compression device for one-dimensional time series data as defined in claim 53 wherein, assuming that the indices of the node candidates numbered in an increasing order are described as I(j) (0≦j≦m), the quasi-optimal candidates are calculated in the steps of:

when a relationship I(j−1)<I(j)−1 is satisfied, calculating a value of the first objective function obtained at the exchange of node candidates I(j) with node candidates I(j)−1, calculating a value ΔE(1−) which is the value of the first objective function from which the value of the original first objective function is subtracted, and setting the value ΔE(1−) to zero when I(j−1)≧I(j)−1;

when a relationship I(j)+1<I(j+1) is satisfied, calculating a value of the first objective function obtained at the exchange of node candidates I(j) with node candidates I(j)+1, calculating a value ΔE(1+) which is the value of the first objective function from which the value of the original first objective function is subtracted, and setting the value ΔE(1+) to zero when I(j)+1≧I(j+1);

when relationships ΔE(1−)<0 and ΔE(1+)≧0 are satisfied, exchanging the node candidates I(j) with the node candidates I(j)−1, and exchanging the value of the first objective function obtained by the exchange, with the value of the original first objective function;

when relationships ΔE(1−)≧0 and ΔE(1+)<0 are satisfied, exchanging the node candidates I(j) with the node candidates I(j)+1, and exchanging the value of the first objective function obtained by the exchange, with the valve of the original first objective function;

when relationships ΔE(1−)≧0 and ΔE(1+)≧0 are satisfied, not performing exchange of the node candidates I(j);

when relationships ΔE(1−)<0 and ΔE(1+)<0 are satisfied and ΔE(1−) is less than ΔE(1+), exchanging the node candidates I(j) with the node candidates I(j)−1, and exchanging the value of the first objective function obtained by the exchange, with the value of the original first objective function;

when relationships ΔE(1−)<0 and ΔE(1+)<0 are satisfied and ΔE(1−) exceeds ΔE(1+), exchanging the node candidates I(j) with the node candidates I(j)+1 and than exchanging the value of the first objective function obtained by the exchange, with the value of the original first objective function, both successively from j=[m/2] to j=1 and then from j=[m/2]+1 to j=m−1;

when the value of the first objective function obtained at the completion of the sequential processes is less than the value of the original first objective function from which the threshold is subtracted, performing the above exchanges again, successively from j=[m/2] to j=1 and then from j=[m/2]+1 to j=m−1;

when the exchange of the node candidates is not performed at all, or the value of the first objective function exceeds the value of the original first objective function from which the threshold is subtracted, completing the processing.

67. A compression device for one-dimensional time series data as defined in claim 53 wherein, assuming that the indices of the node candidates numbered in an increasing order are described as I(j) (0≦j≦m), the quasi-optimal candidates are calculated in the steps of:

when a relationship I(j−1)<I(j)−1 is satisfied, calculating a value of the first objective function obtained at the exchange of node candidates I(j) with node candidates I(j)−1, calculating a value ΔE(1−) which is the value of the first objective function from which the value of the original first objective function is subtracted, and setting the value ΔE(1−) to zero when I(j−1)≧I(j)−1;

when a relationship I(j)+1<I(j+1) is satisfied, calculating a value of the first objective function obtained at the exchange of node candidates I(j) with node candidates I(j)+1, calculating a value ΔE(1+) which is the value of the first objective function from which the value of the original first objective function is subtracted, and setting the value ΔE(1+) to zero when I(j)+1≧I(j+1);

when relationships ΔE(1−)<0 and ΔE(1+)≧0 are satisfied, exchanging the node candidates I(j) with the node candidates I(j)−1, and exchanging the value of the first objective function obtained by the exchange, with the value of the original first objective function;

when relationships ΔE(1−)≧0 and ΔE(1+)<0 are satisfied, exchanging the node candidates I(j) with the node candidates I(j)+1, and exchanging the value of the first objective function obtained by the exchange, with the value of the original first objective function;

when relationships ΔE(1−)≧0 and ΔE(1+)≧0 are satisfied, not performing exchange of the node candidates I(j);

when relationships ΔE(1−)<0 and ΔE(1+)<0 are satisfied and ΔE(1−) is less than ΔE(1+), exchanging the node candidates I(j) with the node candidates I(j)−1, and exchanging the value of the first objective function obtained by the exchange, with the value of the original first objective function;

when relationships $\Delta E(1-)<0$ and $\Delta E(1+)<0$ are satisfied and $\Delta E(1-)$ exceeds $\Delta E(1+)$, exchanging the node candidates I(j) with the node candidates and then exchanging the value of the first objective function obtained by the exchange, with the value of the original first objective function, both successively from j=1 to j=m−1;

when the value of the first objective function obtained at the completion of the sequential processes is less than the value of the original first objective function from which the threshold is subtracted, preforming the above exchanges again successively from j=1 to j=m−1; and when the exchange of the node candidates is not performed at all, or the value of the first objective function exceeds the value of the original first objective function from which the threshold is subtracted, completing the processing.

68. A compression device for one-dimensional time series data as defined in claim 53 wherein, assuring that the indices of the node candidates numbered in an increasing order are described as I(j) ($0 \leq j \leq m$), the quasi-optimal candidates are calculated in the steps of:

when a relationship I(j−1)<I(j)−1 is satisfied, calculating a value of the first objective function obtained at the exchange of node candidates I(j) with node candidates I(j)−1, calculating a value $\Delta E(1-)$ which is the value of the first objective function from which the value of the original first objective function is subtracted, and setting the value $\Delta E(1-)$ to zero when I(j−1)$\geq$I(j)−1;

when a relationship I(j)+1<I(j+1) is satisfied, calculating a value of the first objective function obtained at the exchange of node candidates I(j) with node candidates I(j)+1, calculating a value $\Delta E(1+)$ which is the value of the first objective function from which the value of the original first objective function is subtracted, and setting the value $\Delta E(1+)$ to zero when I(j)+1$\geq$I(j+1);

when relationships $\Delta E(1-)<0$ and $\Delta E(1+)\geq 0$ are satisfied, exchanging the node candidates I(j) with the node candidates I(j)−1, and exchanging the value of the first objective function obtained by the exchange, with the value of the original first objective function;

when relationships $\Delta E(1-)\geq 0$ and $\Delta E(1+)<0$ are satisfied, exchanging the node candidates I(j) with the node candidates I(j)+1, and exchanging the value of the first objective function obtained by the exchange, with the value of the original first objective function;

when relationships of $\Delta E(1-)\geq 0$ end $\Delta E(1+)\geq 0$ are satisfied, not performing exchange of the node candidates I(j);

when relationships $\Delta E(1-)<0$ and $\Delta E(1+)<0$ are satisfied and $\Delta E(1-)$ is less than $\Delta E(1+)$, exchanging the node candidates I(j) with the node candidates I(j)−1, and exchanging the value of the first objective function obtained by the exchange, with the value of the original first objective function;

when relationships $\Delta E(1-)<0$ and $\Delta E(1+)<0$ are satisfied and $\Delta E(1-)$ exceeds $\Delta E(1+)$, exchanging the node candidates I(j) with the node candidates I(j)+1 and then exchanging the value of the first objective function obtained by the exchange, with the value of the original first objective function, both successively from j=m−1 to j=1;

when the value of the first objective function obtained at the completion of the sequential processes is less than the value of the original first objective function from which the threshold is subtracted, performing the above exchanges again, successively from j=m−1 to j=1; and when the exchange of the node candidates is not performed at all, or the value of the first objective function exceeds the value of the original first objective function from which the threshold is subtracted, completing the processing.

69. A compression device for one-dimensional time series data as defined in claim 53 wherein, when the number of the finally decided node candidates are less than the number of the data not selected as the node candidates, compressed data is output consisting of the identifier indicating the node candidates, the index numbers of the finally decided node candidates, and the values of the node candidates and, when the number of the finally decided node candidates exceeds the number of the data not selected as the node candidates, compressed data is output consisting of the identifier indicating non-node candidates, the index numbers of the data not selected as the node candidates, and the values of the node candidates.

70. A compression device for one-dimensional time series data as defined in claim 53 wherein data compression is performed individually for time data and data of the one-dimensional time series data at irregular time intervals, to compress the time data and the data separately.

71. A compression device for one-dimensional time series data as defined in claim 53 wherein data compression is individually performed for each of the plural one-dimensional time series data constituting multi-dimensional time series data, to compress the multi-dimensional time series data.

72. A compression device for one-dimensional time series data as defined in claim 53 wherein, for plural one-dimensional time series data whose errors propagate, data compression is repeated with an approximation accuracy increasing gradually from one of the time series data from which the propagation starts, to compress all of the data.

73. A decompression device for one-dimensional time series data which decompresses one-dimensional time series data compressed by a compression device for one-dimensional time series data as defined in claim 51, aforesaid device comprising:

a first process of inputting compressed data and a number of data to be obtained by decompressing the compressed data;

a second process of interpolating the compressed data using an interpolation function identical to that used for compression to calculate data whose number is equal to the data number, and calculating time data whose number is equal to the data number on the basis of an initial time and a time interval; and a third process of outputting the data and the time both calculated in the second process.

74. A decompression device for one-dimensional time series data which decompresses one-dimensional time series data compressed by a compression device for one-dimensional time series data as defined in claim 54, aforesaid device comprising:

a first process of inputting compressed data and a number of data to be obtained by decompressing the compressed data;

a second process of calculating zero data whose number is equal to the data number, and calculating time data whose number is equal to the data number based on an initial time and a time interval, when an identifier indicating that the compressed data are all zero is attached to the compressed data, or interpolating the compression data using an interpolation function identical to that used for compression to calculate data whose number is equal to the data number and calculating time data whose number is equal to the data number based on the initial time and the time interval, when an identifier indicating that the compressed data are all zero is not attached to the compressed data; and a third process of outputting the data and time data calculated in the second process.

75. A decompression device for one-dimensional time series data as defined in claim 73, wherein data decompression is performed individually for each of plural compressed one-dimensional time series data constituting compressed multi-dimensional time series data, to decompress the compressed multi-dimensional time series data.

* * * * *